(12) United States Patent
Raichelgauz et al.

(10) Patent No.: US 11,087,628 B2
(45) Date of Patent: Aug. 10, 2021

(54) USING REAR SENSOR FOR WRONG-WAY DRIVING WARNING

(71) Applicant: CARTICA AI LTD, Tel Aviv (IL)

(72) Inventors: Igal Raichelgauz, Tel Aviv (IL); Karina Odinaev, Tel Aviv (IL)

(73) Assignee: Cartica AI Ltd., Tel Aviv (IL)

( * ) Notice: Subject to any disclaimer, the term of this patent is extended or adjusted under 35 U.S.C. 154(b) by 0 days.

(21) Appl. No.: 16/731,401

(22) Filed: Dec. 31, 2019

(65) Prior Publication Data

US 2020/0258391 A1    Aug. 13, 2020

Related U.S. Application Data

(63) Continuation of application No. PCT/IB2019/058207, filed on Sep. 27, 2019.
(Continued)

(51) Int. Cl.
*G08G 1/16* (2006.01)
*G08G 1/056* (2006.01)
(Continued)

(52) U.S. Cl.
CPC ............ *G08G 1/166* (2013.01); *G08G 1/056* (2013.01); *G08G 1/162* (2013.01); *G08G 1/165* (2013.01);
(Continued)

(58) Field of Classification Search
CPC ............ G08G 1/00; G08G 1/04; G08G 1/052; G08G 1/056; G08G 1/16; G08G 1/165;
(Continued)

(56) References Cited

U.S. PATENT DOCUMENTS

| 4,733,353 A | 3/1988 | Jaswa |
| 4,932,645 A | 6/1990 | Schorey et al. |
| (Continued) | | |

FOREIGN PATENT DOCUMENTS

| EP | 1085464 A3 | 1/2007 |
| WO | 0231764 A2 | 4/2002 |
| (Continued) | | |

OTHER PUBLICATIONS

"Computer Vision Demonstration Website", Electronics and Computer Science, University of Southampton, 2005, USA.
(Continued)

*Primary Examiner* — Van T Trieu
(74) *Attorney, Agent, or Firm* — Reches Patent

(57) ABSTRACT

Using a read sensor to sense wrong-way driving. A method may include sensing, by a rear sensor of a vehicle, an environment of the vehicle to provide rear sensed information; processing the rear sensed information to provide at least one rear-sensed vehicle progress direction indications; generating or receiving at least one front-sensed vehicle progress direction indications; wherein the at least one front-sensed vehicle progress direction indications is generated by processing front-sensed information acquired during right-way progress; comparing at least one rear-sensed vehicle progress direction indications to the at least one front-sensed vehicle progress direction indications to determine whether the vehicle is wrong-way driving; and responding to the finding of the wrong-way driving.

18 Claims, 99 Drawing Sheets

Related U.S. Application Data

(60) Provisional application No. 62/750,822, filed on Oct. 26, 2018, provisional application No. 62/747,147, filed on Oct. 18, 2018, provisional application No. 62/827,112, filed on Mar. 31, 2019.

(51) Int. Cl.

| | | |
|---|---|---|
| G05D 1/00 | (2006.01) | |
| G08G 1/048 | (2006.01) | |
| B60W 40/06 | (2012.01) | |
| B60W 30/095 | (2012.01) | |
| B60W 50/14 | (2020.01) | |
| G06K 9/00 | (2006.01) | |
| G06N 20/00 | (2019.01) | |
| G06K 9/62 | (2006.01) | |
| G08G 1/0962 | (2006.01) | |
| B60W 60/00 | (2020.01) | |
| B60W 40/08 | (2012.01) | |
| G05D 1/02 | (2020.01) | |
| B60W 40/02 | (2006.01) | |
| H04W 4/46 | (2018.01) | |
| B60W 30/09 | (2012.01) | |
| G05B 13/02 | (2006.01) | |
| G06N 3/04 | (2006.01) | |
| G06N 3/08 | (2006.01) | |
| G07C 5/02 | (2006.01) | |
| G06N 5/04 | (2006.01) | |

(52) U.S. Cl.
CPC ......... *B60W 30/09* (2013.01); *B60W 30/0956* (2013.01); *B60W 40/02* (2013.01); *B60W 40/06* (2013.01); *B60W 40/08* (2013.01); *B60W 50/14* (2013.01); *B60W 60/0011* (2020.02); *B60W 60/0016* (2020.02); *B60W 60/0017* (2020.02); *B60W 60/0025* (2020.02); *B60W 60/0051* (2020.02); *B60W 2040/0872* (2013.01); *B60W 2540/10* (2013.01); *B60W 2540/12* (2013.01); *B60W 2540/18* (2013.01); *B60W 2554/00* (2020.02); *B60W 2554/4023* (2020.02); *B60W 2554/4046* (2020.02); *B60W 2556/65* (2020.02); *G05B 13/029* (2013.01); *G05D 1/0044* (2013.01); *G05D 1/0061* (2013.01); *G05D 1/0088* (2013.01); *G05D 1/0214* (2013.01); *G05D 1/0293* (2013.01); *G05D 2201/0213* (2013.01); *G06K 9/00791* (2013.01); *G06K 9/00805* (2013.01); *G06K 9/00825* (2013.01); *G06K 9/6201* (2013.01); *G06K 9/628* (2013.01); *G06K 2009/6213* (2013.01); *G06N 3/0427* (2013.01); *G06N 3/08* (2013.01); *G06N 5/04* (2013.01); *G06N 20/00* (2019.01); *G06T 2207/30261* (2013.01); *G07C 5/02* (2013.01); *G08G 1/048* (2013.01); *G08G 1/09626* (2013.01); *H04W 4/46* (2018.02)

(58) Field of Classification Search
CPC ......... G08G 1/166; G08G 1/167; G06K 9/00; B60R 21/00; B60R 21/0136; B60R 21/0027; B60R 21/0127; B60W 50/14; B60W 2050/143; B60W 2050/146
See application file for complete search history.

(56) References Cited

U.S. PATENT DOCUMENTS

| | | |
|---|---|---|
| 4,972,363 A | 11/1990 | Nguyen et al. |
| 5,078,501 A | 1/1992 | Hekker et al. |
| 5,214,746 A | 5/1993 | Fogel et al. |
| 5,307,451 A | 4/1994 | Clark |
| 5,412,564 A | 5/1995 | Ecer |
| 5,436,653 A | 7/1995 | Ellis et al. |
| 5,568,181 A | 10/1996 | Greenwood et al. |
| 5,638,425 A | 6/1997 | Meador et al. |
| 5,745,678 A | 4/1998 | Herzberg et al. |
| 5,754,938 A | 5/1998 | Herz et al. |
| 5,763,069 A | 6/1998 | Jordan |
| 5,806,061 A | 9/1998 | Chaudhuri et al. |
| 5,835,087 A | 11/1998 | Herz et al. |
| 5,835,901 A | 11/1998 | Duvoisin et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A | 3/1999 | Takahashi et al. |
| 5,926,812 A | 7/1999 | Hilsenrath et al. |
| 5,978,754 A | 11/1999 | Kumano |
| 5,991,306 A | 11/1999 | Burns et al. |
| 6,052,481 A | 4/2000 | Grajski et al. |
| 6,070,167 A | 5/2000 | Qian et al. |
| 6,076,088 A | 6/2000 | Paik et al. |
| 6,122,628 A | 9/2000 | Castelli et al. |
| 6,128,651 A | 10/2000 | Cezar |
| 6,137,911 A | 10/2000 | Zhilyaev |
| 6,144,767 A | 11/2000 | Bottou et al. |
| 6,147,636 A | 11/2000 | Gershenson |
| 6,163,510 A | 12/2000 | Lee et al. |
| 6,243,375 B1 | 6/2001 | Speicher |
| 6,243,713 B1 | 6/2001 | Nelson et al. |
| 6,275,599 B1 | 8/2001 | Adler et al. |
| 6,314,419 B1 | 11/2001 | Faisal |
| 6,329,986 B1 | 12/2001 | Cheng |
| 6,381,656 B1 | 4/2002 | Shankman |
| 6,411,229 B2 | 6/2002 | Kobayashi |
| 6,422,617 B1 | 7/2002 | Fukumoto et al. |
| 6,507,672 B1 | 1/2003 | Watkins et al. |
| 6,523,046 B2 | 2/2003 | Liu et al. |
| 6,524,861 B1 | 2/2003 | Anderson |
| 6,546,405 B2 | 4/2003 | Gupta et al. |
| 6,550,018 B1 | 4/2003 | Abonamah et al. |
| 6,557,042 B1 | 4/2003 | He et al. |
| 6,594,699 B1 | 7/2003 | Sahai et al. |
| 6,601,026 B2 | 7/2003 | Appelt et al. |
| 6,611,628 B1 | 8/2003 | Sekiguchi et al. |
| 6,618,711 B1 | 9/2003 | Ananth |
| 6,640,015 B1 | 10/2003 | Lafruit |
| 6,643,620 B1 | 11/2003 | Contolini et al. |
| 6,643,643 B1 | 11/2003 | Lee et al. |
| 6,665,657 B1 | 12/2003 | Dibachi |
| 6,681,032 B2 | 1/2004 | Bortolussi et al. |
| 6,704,725 B1 | 3/2004 | Lee |
| 6,732,149 B1 | 5/2004 | Kephart |
| 6,742,094 B2 | 5/2004 | Igari |
| 6,751,363 B1 | 6/2004 | Natsev et al. |
| 6,751,613 B1 | 6/2004 | Lee et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,813,395 B1 | 11/2004 | Kinjo |
| 6,819,797 B1 | 11/2004 | Smith et al. |
| 6,877,134 B1 | 4/2005 | Fuller et al. |
| 6,901,207 B1 | 5/2005 | Watkins |
| 6,938,025 B1 | 8/2005 | Lulich et al. |
| 6,985,172 B1 | 1/2006 | Rigney et al. |
| 7,013,051 B2 | 3/2006 | Sekiguchi et al. |
| 7,020,654 B1 | 3/2006 | Najmi |
| 7,023,979 B1 | 4/2006 | Wu et al. |
| 7,043,473 B1 | 5/2006 | Rassool et al. |
| 7,158,681 B2 | 1/2007 | Persiantsev |
| 7,215,828 B2 | 5/2007 | Luo |
| 7,260,564 B1 | 8/2007 | Lynn et al. |
| 7,289,643 B2 | 10/2007 | Brunk et al. |
| 7,299,261 B1 | 11/2007 | Oliver et al. |
| 7,302,089 B1 | 11/2007 | Smits |
| 7,302,117 B2 | 11/2007 | Sekiguchi et al. |

(56) References Cited

U.S. PATENT DOCUMENTS

| | | |
|---|---|---|
| 7,313,805 B1 | 12/2007 | Rosin et al. |
| 7,340,358 B2 | 3/2008 | Yoneyama |
| 7,346,629 B2 | 3/2008 | Kapur et al. |
| 7,353,224 B2 | 4/2008 | Chen et al. |
| 7,376,672 B2 | 5/2008 | Weare |
| 7,383,179 B2 | 6/2008 | Alves et al. |
| 7,433,895 B2 | 10/2008 | Li et al. |
| 7,464,086 B2 | 12/2008 | Black et al. |
| 7,529,659 B2 | 5/2009 | Wold |
| 7,657,100 B2 | 2/2010 | Gokturk et al. |
| 7,660,468 B2 | 2/2010 | Gokturk et al. |
| 7,801,893 B2 | 9/2010 | Gulli |
| 7,805,446 B2 | 9/2010 | Potok et al. |
| 7,860,895 B1 | 12/2010 | Scofield et al. |
| 7,872,669 B2 | 1/2011 | Darrell et al. |
| 7,921,288 B1 | 4/2011 | Hildebrand |
| 7,933,407 B2 | 4/2011 | Keidar et al. |
| 8,023,739 B2 | 9/2011 | Hohimer et al. |
| 8,266,185 B2 | 9/2012 | Raichelgauz et al. |
| 8,275,764 B2 | 9/2012 | Jeon |
| 8,285,718 B1 | 10/2012 | Ong et al. |
| 8,312,031 B2 | 11/2012 | Raichelgauz et al. |
| 8,315,442 B2 | 11/2012 | Gokturk et al. |
| 8,345,982 B2 | 1/2013 | Gokturk et al. |
| 8,386,400 B2 | 2/2013 | Raichelgauz et al. |
| 8,396,876 B2 | 3/2013 | Kennedy et al. |
| 8,418,206 B2 | 4/2013 | Bryant et al. |
| RE44,225 E | 5/2013 | Aviv |
| 8,442,321 B1 | 5/2013 | Chang et al. |
| 8,457,827 B1 | 6/2013 | Ferguson et al. |
| 8,495,489 B1 | 7/2013 | Everingham |
| 8,527,978 B1 | 9/2013 | Sallam |
| 8,634,980 B1 | 1/2014 | Urmson |
| 8,635,531 B2 | 1/2014 | Graham et al. |
| 8,655,801 B2 | 2/2014 | Raichelgauz et al. |
| 8,655,878 B1 | 2/2014 | Kulkarni et al. |
| 8,781,152 B2 | 7/2014 | Momeyer |
| 8,782,077 B1 | 7/2014 | Rowley |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,861 B2 | 10/2014 | Shimizu et al. |
| 8,886,648 B1 | 11/2014 | Procopio et al. |
| 8,954,887 B1 | 2/2015 | Tseng et al. |
| 8,990,199 B1 | 3/2015 | Ramesh et al. |
| 9,009,086 B2 | 4/2015 | Raichelgauz et al. |
| 9,104,747 B2 | 8/2015 | Raichelgauz et al. |
| 9,165,406 B1 | 10/2015 | Gray et al. |
| 9,298,763 B1 | 3/2016 | Zack |
| 9,311,308 B2 | 4/2016 | Sankarasubramaniam et al. |
| 9,323,754 B2 | 4/2016 | Ramanathan et al. |
| 9,440,647 B1 | 9/2016 | Sucan |
| 9,466,068 B2 | 10/2016 | Raichelgauz et al. |
| 9,646,006 B2 | 5/2017 | Raichelgauz et al. |
| 9,679,062 B2 | 6/2017 | Schillings et al. |
| 9,734,533 B1 | 8/2017 | Givot |
| 9,807,442 B2 | 10/2017 | Bhatia et al. |
| 9,875,445 B2 | 1/2018 | Amer et al. |
| 9,911,334 B2 * | 3/2018 | Townsend ............. G08G 1/095 |
| 9,984,369 B2 | 5/2018 | Li et al. |
| 10,133,947 B2 | 11/2018 | Yang |
| 10,347,122 B2 | 7/2019 | Takenaka |
| 10,491,885 B1 | 11/2019 | Hicks |
| 2001/0019633 A1 | 9/2001 | Tenze et al. |
| 2001/0034219 A1 | 10/2001 | Hewitt et al. |
| 2001/0038876 A1 | 11/2001 | Anderson |
| 2002/0004743 A1 | 1/2002 | Kutaragi et al. |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0032677 A1 | 3/2002 | Morgenthaler et al. |
| 2002/0038299 A1 | 3/2002 | Zernik et al. |
| 2002/0042914 A1 | 4/2002 | Walker et al. |
| 2002/0072935 A1 | 6/2002 | Rowse et al. |
| 2002/0087530 A1 | 7/2002 | Smith et al. |
| 2002/0087828 A1 | 7/2002 | Arimilli et al. |
| 2002/0091947 A1 | 7/2002 | Nakamura |
| 2002/0107827 A1 | 8/2002 | Benitez-Jimenez et al. |
| 2002/0113812 A1 | 8/2002 | Walker et al. |
| 2002/0126002 A1 | 9/2002 | Patchell |
| 2002/0126872 A1 | 9/2002 | Brunk et al. |
| 2002/0129140 A1 | 9/2002 | Peled et al. |
| 2002/0147637 A1 | 10/2002 | Kraft et al. |
| 2002/0157116 A1 | 10/2002 | Jasinschi |
| 2002/0163532 A1 | 11/2002 | Thomas et al. |
| 2002/0174095 A1 | 11/2002 | Lulich et al. |
| 2002/0184505 A1 | 12/2002 | Mihcak et al. |
| 2003/0004966 A1 | 1/2003 | Bolle et al. |
| 2003/0005432 A1 | 1/2003 | Ellis et al. |
| 2003/0037010 A1 | 2/2003 | Schmelzer |
| 2003/0041047 A1 | 2/2003 | Chang et al. |
| 2003/0089216 A1 | 5/2003 | Birmingham et al. |
| 2003/0093790 A1 | 5/2003 | Logan et al. |
| 2003/0101150 A1 | 5/2003 | Agnihotri et al. |
| 2003/0105739 A1 | 6/2003 | Essafi et al. |
| 2003/0110236 A1 | 6/2003 | Yang et al. |
| 2003/0115191 A1 | 6/2003 | Copperman et al. |
| 2003/0126147 A1 | 7/2003 | Essafi et al. |
| 2003/0140257 A1 | 7/2003 | Peterka et al. |
| 2003/0165269 A1 | 9/2003 | Fedorovskaya et al. |
| 2003/0174859 A1 | 9/2003 | Kim |
| 2003/0184598 A1 | 10/2003 | Graham |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0059736 A1 | 3/2004 | Willse |
| 2004/0091111 A1 | 5/2004 | Levy |
| 2004/0095376 A1 | 5/2004 | Graham et al. |
| 2004/0098671 A1 | 5/2004 | Graham et al. |
| 2004/0111432 A1 | 6/2004 | Adams et al. |
| 2004/0117638 A1 | 6/2004 | Monroe |
| 2004/0128511 A1 | 7/2004 | Sun et al. |
| 2004/0153426 A1 | 8/2004 | Nugent |
| 2004/0162820 A1 | 8/2004 | James et al. |
| 2004/0230572 A1 | 11/2004 | Omoigui |
| 2004/0267774 A1 | 12/2004 | Lin et al. |
| 2005/0021394 A1 | 1/2005 | Miedema et al. |
| 2005/0080788 A1 | 4/2005 | Murata |
| 2005/0114198 A1 | 5/2005 | Koningstein et al. |
| 2005/0131884 A1 | 6/2005 | Gross et al. |
| 2005/0163375 A1 | 7/2005 | Grady |
| 2005/0172130 A1 | 8/2005 | Roberts |
| 2005/0177372 A1 | 8/2005 | Wang et al. |
| 2005/0193015 A1 | 9/2005 | Logston |
| 2005/0226511 A1 | 10/2005 | Short |
| 2005/0238198 A1 | 10/2005 | Brown et al. |
| 2005/0238238 A1 | 10/2005 | Xu et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0015580 A1 | 1/2006 | Gabriel et al. |
| 2006/0020958 A1 | 1/2006 | Allamanche et al. |
| 2006/0033163 A1 | 2/2006 | Chen |
| 2006/0050993 A1 | 3/2006 | Stentiford |
| 2006/0069668 A1 | 3/2006 | Braddy et al. |
| 2006/0080311 A1 | 4/2006 | Potok et al. |
| 2006/0100987 A1 | 5/2006 | Leurs |
| 2006/0112035 A1 | 5/2006 | Cecchi et al. |
| 2006/0120626 A1 | 6/2006 | Perlmutter |
| 2006/0129822 A1 | 6/2006 | Snijder et al. |
| 2006/0217818 A1 | 9/2006 | Fujiwara |
| 2006/0217828 A1 | 9/2006 | Hicken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0242130 A1 | 10/2006 | Sadri et al. |
| 2006/0248558 A1 | 11/2006 | Barton et al. |
| 2006/0251338 A1 | 11/2006 | Gokturk et al. |
| 2006/0251339 A1 | 11/2006 | Gokturk |
| 2006/0253423 A1 | 11/2006 | McLane et al. |

(56) References Cited

U.S. PATENT DOCUMENTS

| | | |
|---|---|---|
| 2006/0288002 A1 | 12/2006 | Epstein et al. |
| 2007/0022374 A1 | 1/2007 | Huang et al. |
| 2007/0033170 A1 | 2/2007 | Sull et al. |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0074147 A1 | 3/2007 | Wold |
| 2007/0083611 A1 | 4/2007 | Farago et al. |
| 2007/0091106 A1 | 4/2007 | Moroney |
| 2007/0130159 A1 | 6/2007 | Gulli et al. |
| 2007/0136782 A1 | 6/2007 | Ramaswamy et al. |
| 2007/0156720 A1 | 7/2007 | Maren |
| 2007/0196013 A1 | 8/2007 | Li |
| 2007/0244902 A1 | 10/2007 | Seide et al. |
| 2007/0253594 A1 | 11/2007 | Lu et al. |
| 2007/0298152 A1 | 12/2007 | Baets |
| 2008/0049789 A1 | 2/2008 | Vedantham et al. |
| 2008/0072256 A1 | 3/2008 | Boicey et al. |
| 2008/0079729 A1 | 4/2008 | Brailovsky |
| 2008/0109433 A1 | 5/2008 | Rose |
| 2008/0152231 A1 | 6/2008 | Gokturk |
| 2008/0159622 A1 | 7/2008 | Agnihotri et al. |
| 2008/0165861 A1 | 7/2008 | Wen et al. |
| 2008/0166020 A1 | 7/2008 | Kosaka |
| 2008/0201299 A1 | 8/2008 | Lehikoinen et al. |
| 2008/0201314 A1 | 8/2008 | Smith et al. |
| 2008/0201361 A1 | 8/2008 | Castro et al. |
| 2008/0228995 A1 | 9/2008 | Tan et al. |
| 2008/0237359 A1 | 10/2008 | Silverbrook et al. |
| 2008/0247543 A1 | 10/2008 | Mick et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0270569 A1 | 10/2008 | McBride |
| 2008/0294278 A1 | 11/2008 | Borgeson |
| 2008/0307454 A1 | 12/2008 | Ahanger et al. |
| 2008/0313140 A1 | 12/2008 | Pereira et al. |
| 2009/0022472 A1 | 1/2009 | Bronstein |
| 2009/0024641 A1 | 1/2009 | Quigley et al. |
| 2009/0034791 A1 | 2/2009 | Doretto |
| 2009/0037088 A1 | 2/2009 | Taguchi |
| 2009/0043637 A1 | 2/2009 | Eder |
| 2009/0043818 A1 | 2/2009 | Raichelgauz |
| 2009/0080759 A1 | 3/2009 | Bhaskar |
| 2009/0096634 A1 | 4/2009 | Emam et al. |
| 2009/0125544 A1 | 5/2009 | Brindley |
| 2009/0157575 A1 | 6/2009 | Schobben et al. |
| 2009/0165031 A1 | 6/2009 | Li et al. |
| 2009/0172030 A1 | 7/2009 | Schiff et al. |
| 2009/0208106 A1 | 8/2009 | Dunlop et al. |
| 2009/0208118 A1 | 8/2009 | Csurka |
| 2009/0216761 A1 | 8/2009 | Raichelgauz |
| 2009/0220138 A1 | 9/2009 | Zhang et al. |
| 2009/0245573 A1 | 10/2009 | Saptharishi et al. |
| 2009/0254572 A1 | 10/2009 | Redlich et al. |
| 2009/0278934 A1 | 11/2009 | Ecker |
| 2009/0282218 A1 | 11/2009 | Raichelgauz et al. |
| 2009/0297048 A1 | 12/2009 | Slotine et al. |
| 2010/0042646 A1 | 2/2010 | Raichelgauz |
| 2010/0082684 A1 | 4/2010 | Churchill |
| 2010/0104184 A1 | 4/2010 | Bronstein et al. |
| 2010/0111408 A1 | 5/2010 | Matsuhira |
| 2010/0125569 A1 | 5/2010 | Nair et al. |
| 2010/0162405 A1 | 6/2010 | Cook et al. |
| 2010/0191391 A1 | 7/2010 | Zeng |
| 2010/0198626 A1 | 8/2010 | Cho et al. |
| 2010/0212015 A1 | 8/2010 | Jin et al. |
| 2010/0284604 A1 | 11/2010 | Chrysanthakopoulos |
| 2010/0293057 A1 | 11/2010 | Haveliwala et al. |
| 2010/0306193 A1 | 12/2010 | Pereira |
| 2010/0312736 A1 | 12/2010 | Kello |
| 2010/0318493 A1 | 12/2010 | Wessling |
| 2010/0325138 A1 | 12/2010 | Lee et al. |
| 2010/0325581 A1 | 12/2010 | Finkelstein et al. |
| 2011/0029620 A1 | 2/2011 | Bonforte |
| 2011/0035373 A1 | 2/2011 | Berg et al. |
| 2011/0038545 A1 | 2/2011 | Bober |
| 2011/0055585 A1 | 3/2011 | Lee |
| 2011/0164180 A1 | 7/2011 | Lee |
| 2011/0164810 A1 | 7/2011 | Zang et al. |
| 2011/0216209 A1 | 9/2011 | Fredlund et al. |
| 2011/0218946 A1 | 9/2011 | Stern et al. |
| 2011/0246566 A1 | 10/2011 | Kashef |
| 2011/0276680 A1 | 11/2011 | Rimon |
| 2011/0296315 A1 | 12/2011 | Lin et al. |
| 2012/0131454 A1 | 5/2012 | Shah |
| 2012/0133497 A1 | 5/2012 | Sasaki |
| 2012/0136853 A1 | 5/2012 | Kennedy et al. |
| 2012/0167133 A1 | 6/2012 | Carroll et al. |
| 2012/0179642 A1 | 7/2012 | Sweeney et al. |
| 2012/0179751 A1 | 7/2012 | Ahn |
| 2012/0185445 A1 | 7/2012 | Borden et al. |
| 2012/0207346 A1 | 8/2012 | Kohli et al. |
| 2012/0221470 A1 | 8/2012 | Lyon |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0265735 A1 | 10/2012 | McMillan et al. |
| 2012/0294514 A1 | 11/2012 | Saunders et al. |
| 2012/0299961 A1 | 11/2012 | Ramkumar et al. |
| 2012/0301105 A1 | 11/2012 | Rehg et al. |
| 2012/0331011 A1 | 12/2012 | Raichelgauz et al. |
| 2013/0043990 A1 | 2/2013 | Al-Jafar |
| 2013/0066856 A1 | 3/2013 | Ong et al. |
| 2013/0067364 A1 | 3/2013 | Berntson et al. |
| 2013/0086499 A1 | 4/2013 | Dyor et al. |
| 2013/0089248 A1 | 4/2013 | Remiszewski et al. |
| 2013/0103814 A1 | 4/2013 | Carrasco |
| 2013/0151522 A1 | 6/2013 | Aggarwal et al. |
| 2013/0159298 A1 | 6/2013 | Mason et al. |
| 2013/0212493 A1 | 8/2013 | Krishnamurthy |
| 2013/0226820 A1 | 8/2013 | Sedota, Jr. |
| 2013/0226930 A1 | 8/2013 | Amgren et al. |
| 2013/0227023 A1 | 8/2013 | Raichelgauz et al. |
| 2013/0283401 A1 | 10/2013 | Pabla et al. |
| 2013/0346412 A1 | 12/2013 | Raichelgauz et al. |
| 2014/0019264 A1 | 1/2014 | Wachman et al. |
| 2014/0025692 A1 | 1/2014 | Pappas |
| 2014/0059443 A1 | 2/2014 | Tabe |
| 2014/0095425 A1 | 4/2014 | Sipple |
| 2014/0111647 A1 | 4/2014 | Atsmon |
| 2014/0125703 A1 | 5/2014 | Roveta et al. |
| 2014/0147829 A1 | 5/2014 | Jerauld |
| 2014/0149918 A1 | 5/2014 | Asokan et al. |
| 2014/0152698 A1 | 6/2014 | Kim et al. |
| 2014/0156691 A1 | 6/2014 | Conwell |
| 2014/0169681 A1 | 6/2014 | Drake |
| 2014/0176604 A1 | 6/2014 | Venkitaraman et al. |
| 2014/0193077 A1 | 7/2014 | Shiiyama et al. |
| 2014/0198986 A1 | 7/2014 | Marchesotti |
| 2014/0201330 A1 | 7/2014 | Lozano Lopez |
| 2014/0250032 A1 | 9/2014 | Huang et al. |
| 2014/0282655 A1 | 9/2014 | Roberts |
| 2014/0300722 A1 | 10/2014 | Garcia |
| 2014/0330830 A1 | 11/2014 | Raichelgauz et al. |
| 2014/0341476 A1 | 11/2014 | Kulick et al. |
| 2014/0363044 A1 | 12/2014 | Williams et al. |
| 2014/0379477 A1 | 12/2014 | Sheinfeld |
| 2015/0033150 A1 | 1/2015 | Lee |
| 2015/0052089 A1 | 2/2015 | Kozloski et al. |
| 2015/0100562 A1 | 4/2015 | Kohlmeier et al. |
| 2015/0117784 A1 | 4/2015 | Lin |
| 2015/0120627 A1 | 4/2015 | Hunzinger et al. |
| 2015/0127516 A1 | 5/2015 | Studnitzer et al. |
| 2015/0134688 A1 | 5/2015 | Jing |
| 2015/0248586 A1 | 9/2015 | Gaidon et al. |
| 2015/0254344 A1 | 9/2015 | Kulkarni et al. |
| 2015/0286742 A1 | 10/2015 | Zhang et al. |
| 2015/0286872 A1 | 10/2015 | Medioni et al. |
| 2015/0324356 A1 | 11/2015 | Gutierrez et al. |
| 2015/0332588 A1 | 11/2015 | Bulan et al. |
| 2015/0363644 A1 | 12/2015 | Wnuk |
| 2016/0007083 A1 | 1/2016 | Gurha |

(56) References Cited

U.S. PATENT DOCUMENTS

| | | |
|---|---|---|
| 2016/0026707 A1 | 1/2016 | Ong et al. |
| 2016/0132194 A1 | 5/2016 | Grue et al. |
| 2016/0210525 A1 | 7/2016 | Yang |
| 2016/0221592 A1 | 8/2016 | Puttagunta |
| 2016/0275766 A1 | 9/2016 | Venetianer et al. |
| 2016/0306798 A1 | 10/2016 | Guo et al. |
| 2016/0342683 A1 | 11/2016 | Kwon |
| 2016/0357188 A1 | 12/2016 | Ansari |
| 2017/0017638 A1 | 1/2017 | Satyavarta et al. |
| 2017/0032257 A1 | 2/2017 | Sharifi |
| 2017/0041254 A1 | 2/2017 | Agara Venkatesha Rao |
| 2017/0109602 A1 | 4/2017 | Kim |
| 2017/0154241 A1 | 6/2017 | Shambik et al. |
| 2017/0255620 A1 | 9/2017 | Raichelgauz |
| 2017/0259819 A1* | 9/2017 | Takeda .................. B60W 10/04 |
| 2017/0262437 A1 | 9/2017 | Raichelgauz |
| 2017/0323568 A1 | 11/2017 | Inoue |
| 2018/0081368 A1 | 3/2018 | Watanabe |
| 2018/0101177 A1 | 4/2018 | Cohen |
| 2018/0108258 A1 | 4/2018 | Dilger |
| 2018/0157903 A1 | 6/2018 | Tu et al. |
| 2018/0157916 A1 | 6/2018 | Doumbouya |
| 2018/0158323 A1 | 6/2018 | Takenaka |
| 2018/0189613 A1 | 7/2018 | Wolf et al. |
| 2018/0204111 A1 | 7/2018 | Zadeh |
| 2018/0373929 A1 | 12/2018 | Ye |
| 2019/0005726 A1 | 1/2019 | Nakano |
| 2019/0039627 A1 | 2/2019 | Yamamoto |
| 2019/0043274 A1 | 2/2019 | Hayakawa |
| 2019/0045244 A1 | 2/2019 | Balakrishnan |
| 2019/0056718 A1 | 2/2019 | Satou |
| 2019/0061784 A1* | 2/2019 | Koehler .................. G08G 1/16 |
| 2019/0065951 A1 | 2/2019 | Luo |
| 2019/0096135 A1 | 3/2019 | Mutto et al. |
| 2019/0171912 A1 | 6/2019 | Vallespi-Gonzalez et al. |
| 2019/0188501 A1 | 6/2019 | Ryu |
| 2019/0220011 A1 | 7/2019 | Della Penna |
| 2019/0279046 A1 | 9/2019 | Han et al. |
| 2019/0304102 A1 | 10/2019 | Chen et al. |
| 2019/0317513 A1 | 10/2019 | Zhang |
| 2019/0320512 A1* | 10/2019 | Zhang ..................... B60Q 1/46 |
| 2019/0364492 A1 | 11/2019 | Azizi |
| 2019/0384303 A1 | 12/2019 | Muller |
| 2019/0384312 A1 | 12/2019 | Herbach |
| 2019/0385460 A1 | 12/2019 | Magzimof |
| 2019/0389459 A1 | 12/2019 | Berntorp |
| 2020/0004248 A1 | 1/2020 | Healey |
| 2020/0004251 A1 | 1/2020 | Zhu |
| 2020/0004265 A1 | 1/2020 | Zhu |
| 2020/0005631 A1 | 1/2020 | Visintainer |
| 2020/0018606 A1 | 1/2020 | Wolcott |
| 2020/0018618 A1 | 1/2020 | Ozog |
| 2020/0020212 A1 | 1/2020 | Song |
| 2020/0050973 A1 | 2/2020 | Stenneth |
| 2020/0073977 A1 | 3/2020 | Montemerlo |
| 2020/0090484 A1 | 3/2020 | Chen |
| 2020/0097756 A1 | 3/2020 | Hashimoto |
| 2020/0133307 A1 | 4/2020 | Kelkar |
| 2020/0043326 A1 | 6/2020 | Tao |

FOREIGN PATENT DOCUMENTS

| | | |
|---|---|---|
| WO | 2003067467 A1 | 8/2003 |
| WO | 2005027457 A1 | 3/2005 |
| WO | 2007049282 A2 | 5/2007 |
| WO | 2014076002 A1 | 5/2014 |
| WO | 2014137337 A1 | 9/2014 |
| WO | 2016040376 A1 | 3/2016 |
| WO | 2016070193 A1 | 5/2016 |

OTHER PUBLICATIONS

Big Bang Theory Series 04 Episode 12, aired Jan. 6, 2011; [retrieved from Internet: ].

Boari et al, "Adaptive Routing for Dynamic Applications in Massively Parallel Architectures", 1995 IEEE, Spring 1995, pp. 1-14.

Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Cernansky et al, "Feed-forward Echo State Networks", Proceedings of International Joint Conference on Neural Networks, Montreal, Canada, Jul. 31-Aug. 4, 2005, pp. 1-4.

Chinchor, Nancy A. et al.; Multimedia Analysis + Visual Analytics = Multimedia Analytics; IEEE Computer Society; 2010; pp. 52-60. (Year: 2010).

Fathy et al, "A Parallel Design and Implementation for Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.

Freisleben et al, "Recognition of Fractal Images Using a Neural Network", Lecture Notes in Computer Science, 1993, vol. 6861, 1993, pp. 631-637.

Garcia, "Solving the Weighted Region Least Cost Path Problem Using Transputers", Naval Postgraduate School, Monterey, California, Dec. 1989.

Guo et al, AdOn: An Intelligent Overlay Video Advertising System (Year: 2009).

Hogue, "Tree Pattern Inference and Matching for Wrapper Induction on the World Wide Web", Master's Thesis, Massachusetts Institute of Technology, Jun. 2004, pp. 1-106.

Hua et al., "Robust Video Signature Based on Ordinal Measure", Image Processing, 2004, 2004 International Conference on Image Processing (ICIP), vol. 1, IEEE, pp. 685-688, 2004.

International Search Report and Written Opinion for PCT/US2016/050471, ISA/RU, Moscow, RU, dated May 4, 2017.

International Search Report and Written Opinion for PCT/US2016/054634, ISA/RU, Moscow, RU, dated Mar. 16, 2017.

International Search Report and Written Opinion for PCT/US2017/015831, ISA/RU, Moscow, RU, dated Apr. 20, 2017.

Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.

Lau et al., "Semantic Web Service Adaptation Model for a Pervasive Learning Scenario", 2008 IEEE Conference on Innovative Technologies in Intelligent Systems and Industrial Applications, 2008, pp. 98-103.

Li et al ("Matching Commercial Clips from TV Streams Using a Unique, Robust and Compact Signature" 2005) (Year: 2005).

Lin et al., "Generating robust digital signature for image/video authentication", Multimedia and Security Workshop at ACM Multimedia '98, Bristol, U.K., Sep. 1998, pp. 245-251.

Lu et al, "Structural Digital Signature for Image Authentication: An Incidental Distortion Resistant Scheme", IEEE Transactions on Multimedia, vol. 5, No. 2, Jun. 2003, pp. 161-173.

Lyon, "Computational Models of Neural Auditory Processing", IEEE International Conference on Acoustics, Speech, and Signal Processing, ICASSP '84, Date of Conference: Mar. 1984, vol. 9, pp. 41-44.

Ma et el "Semantics modeling based image retrieval system using neural networks", 2005.

Jasinschi et al., A Probabilistic Layered Framework for Integrating Multimedia Content and Context Information, 2002, IEEE, p. 2057-2060. (Year: 2002).

Jones et al., "Contextual Dynamics of Group-Based Sharing Decisions", 2011, University of Bath, p. 1777-1786. (Year: 2011).

Iwamoto, "Image Signature Robust to Caption Superimpostion for Video Sequence Identification", IEEE, pp. 3185-3188 (Year: 2006).

Cooperative Multi-Scale Convolutional Neural, Networks for Person Detection, Markus Eisenbach, Daniel Seichter, Tim Wengefeld, and Horst-Michael Gross Ilmenau University of Technology, Neuroinformatics and Cognitive Robotics Lab (Year: 2016).

Chen, Yixin, James Ze Wang, and Robert Krovetz. "CLUE: cluster-based retrieval of images by unsupervised learning." IEEE transactions on Image Processing 14.8 (2005); 1187-1201. (Year: 2005).

(56) References Cited

OTHER PUBLICATIONS

Wusk et al (Non-Invasive detection of Respiration and Heart Rate with a Vehicle Seat Sensor; www.mdpi.com/journal/sensors; Published: May 8, 2018). (Year: 2018).
Chen, Tiffany Yu-Han, et al. "Glimpse: Continuous, real-time object recognition on mobile devices." Proceedings of the 13th ACM Confrecene on Embedded Networked Sensor Systems. 2015. (Year: 2015).
Marian Stewart B et al., "Independent component representations for face recognition", Proceedings of the SPIE Symposium on Electronic Imaging: Science and Technology; Conference on Human Vision and Electronic Imaging III, San Jose, California, Jan. 1998, pp. 1-12.
May et al, "The Transputer", Springer-Verlag Berlin Heidelberg 1989, vol. 41.
McNamara et al., "Diversity Decay in opportunistic Content Sharing Systems", 2011 IEEE International Symposium on a World of Wireless, Mobile and Multimedia Networks, pp. 1-3.
Morad et al., "Performance, Power Efficiency and Scalability of Asymmetric Cluster Chip Multiprocessors", Computer Architecture Letters, vol. 4, Jul. 4, 2005, pp. 1-4, XP002466254.
Nagy et al, "A Transputer, Based, Flexible, Real-Time Control System for Robotic Manipulators", UKACC International Conference on Control '96, Sep. 2-5, 1996, Conference Publication No. 427, IEE 1996.
Natschlager et al., "The "Liquid Computer": A novel strategy for real-time computing on time series", Special Issue on Foundations of Information Processing of telematik, vol. 8, No. 1, 2002, pp. 39-43, XP002466253.
Odinaev et al, "Cliques in Neural Ensembles as Perception Carriers", Technion—Institute of Technology, 2006 International Joint Conference on neural Networks, Canada, 2006, pp. 285-292.
Ortiz-Boyer et al, "CIXL2: A Crossover Operator for Evolutionary Algorithms Based on Population Features", Journal of Artificial Intelligence Research 24 (2005) Submitted Nov. 2004; published Jul. 2005, pp. 1-48.
Pandya etal. A Survey on QR Codes: in context of Research and Application. International Journal of Emerging Technology and U Advanced Engineering. ISSN 2250-2459, ISO 9001:2008 Certified Journal, vol. 4, Issue 3, Mar. 2014 (Year: 2014).
Queluz, "Content-Based Integrity Protection of Digital Images", SPIE Conf. on Security and Watermarking of Multimedia Contents, San Jose, Jan. 1999, pp. 85-93.
Rui, Yong et al. "Relevance feedback: a power tool for interactive content-based image retrieval." IEEE Transactions on circuits and systems for video technology 8.5 (1998): 644-655.
Santos et al., "SCORM-MPEG: an Ontology of Interoperable Metadata for multimediaand E-Learning", 23rd International Conference on Software, Telecommunications and Computer Networks (SoftCom), 2015, pp. 224-228.

Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.
Schneider et al, "A Robust Content based Digital Signature for Image Authentication", Proc. ICIP 1996, Lausane, Switzerland, Oct. 1996, pp. 227-230.
Srihari et al., "Intelligent Indexing and Semantic Retrieval of Multimodal Documents", Kluwer Academic Publishers, May 2000, vol. 2, Issue 2-3, pp. 245-275.
Srihari, Rohini K. "Automatic indexing and content-based retrieval of captioned images" Computer 0 (1995): 49-56.
Stolberg et al ("Hibrid-SOC: A Multi-Core SOC Architecture for Multimedia Signal Processing" 2003).
Stolberg et al, "Hibrid-SOC: A Mul Ti-Core SOC Architecture for Mul Timedia Signal Processing", 2003 IEEE, pp. 189-194.
Theodoropoulos et al, "Simulating Asynchronous Architectures on Transputer Networks", Proceedings of the Fourth Euromicro Workshop on Parallel and Distributed Processing, 1996. PDP '96, pp. 274-281.
Vallet et al ("Personalized Content Retrieval in Context Using Ontological Knowledge" Mar. 2007) (Year: 2007).
Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.
Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.
Whitby-Strevens, "The transputer", 1985 IEEE, pp. 292-300.
Wilk et al., "The Potential of Social-Aware Multimedia Prefetching on Mobile Devices", International Conference and Workshops on networked Systems (NetSys), 2015, pp. 1-5.
Yanagawa et al, "Columbia University's Baseline Detectors for 374 LSCOM Semantic Visual Concepts", Columbia University Advent Technical Report # 222-2006-8, Mar. 20, 2007, pp. 1-17.
Yanagawa et al., "Columbia University's Baseline Detectors for 374 LSCOM Semantic Visual Concepts", Columbia University Advent Technical Report #222, 2007, pp. 2006-2008.
Zhou et al, "Ensembling neural networks: Many could be better than all", National Laboratory for Novel Software Technology, Nanjing University, Hankou Road 22, Nanjing 210093, PR China, Available online Mar. 12, 2002, pp. 239-263.
Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.
Zhu et al., "Technology-Assisted Dietary Assesment", Proc SPIE. Mar. 20, 2008, pp. 1-15.
Zou et al., "A Content-Based Image Authentication System with Lossless Data Hiding", ICME 2003, pp. 213-216.

* cited by examiner

Searching for overlaps between regions of interest (of the k'th iteration expansion operation results) and define regions of interest that are related to the overlaps 5031

Determine to drop one or more region of interest, and dropping according to the determination 5032

Searching for relationships between regions of interest (of the k'th iteration expansion operation results) and define regions of interest that are related to the relationship 5033

Searching for proximate regions of interest (of the k'th iteration expansion operation results) and define regions of interest that are related to the proximity 5034

Searching for relationships between regions of interest (of the k'th iteration expansion operation results) and define regions of interest that are related to the relationship 5035

Merging and/or dropping k'th iteration regions of interest based on shape information related to the k'th iteration regions of interest 5036

SIGNATURE 8010={ID1 8011,..., ID2 8012,..., ID3 8013,..., ID4 8014 ...}

SIGNATURE 8010'={ID6 8016,..., ID8 8018,...}

Signature 8053' = {ID62, ID63,..., ID64,.., ID65,..., ID66, ID67}

Signature 8052' = {...,ID68,.., ID69}

Signature 8051' = {...ID61...}

Signature 8091' = {ID81, ID82, ID83, ID84, ID85, ID89}
Location information 8091" = {L81, L82, L83, L84, L85, L89}

Signature 8092' = {ID81, ID82, ID83, ID84, ID85, ID86, ID89}
Location information 8092" = {L81, L82, L83, L84, L85, L86, L89}

Signature 8093' = {ID81, ID82, ID83, ID84, ID85, ID86, ID87, ID89}
Location information 8093" = {L81, L82, L83, L84, L85, L86, L87, L89}

2630

2650

2670

2680

2720

FA SIGNATURES CLUSTERING AND REDUCTION

CONCEPT CLEANING – DELETION OF THE FA REDUCED SIGNATURE

Events

3071

3072

3073

USING REAR SENSOR FOR WRONG-WAY DRIVING WARNING

CROSS REFERENCE

The application is a continuation of PCT patent application PCT/IB2019058208 filing date Sep. 27, 2019 which claims priority from U.S. provisional Ser. No. 62/747,147 filing date Oct. 18, 2018. This application claims priority from U.S. provisional patent Ser. No. 62/827,112 filing date Mar. 31, 2019 both incorporated herein by reference.

TECHNICAL FIELD

The present disclosure generally relates to wrong-way driving warning.

BACKGROUND

Wrong-way driving (WWD) (colloquially also called ghost driving) is the act of driving a motor vehicle against the direction of traffic. It can occur on either one- or two-way roads, as well as in parking lots and parking garages, and may be due to driver inattention or impairment, or because of insufficient or confusing road markings or signage, or a driver from a right-hand traffic country being unaccustomed to driving in a left-hand traffic country (see Left- and right-hand traffic), and vice versa. People intentionally drive in the wrong direction because they missed an exit, for thrill-seeking, or as a shortcut. (www.wikipedia.org)

On a divided highway, especially freeway, WWD is a serious problem because of the high speeds usually involved, since the result is more likely a head-on collision. In the United States, about 355 people are killed each year in crashes caused by drivers headed in the wrong direction on the highway.

Given an average of 265 fatal WWD crashes, 1.34 fatalities per WWD fatal crash can be calculated. The significance of these kinds of crashes is corroborated when this number is compared to the fatalities per fatal crash rate of 1.10 for all other crash types, which translates to 24 more fatalities per 100 fatal crashes for WWD crashes than for fatal crashes in general. Most drivers who enter a divided highway or ramp in the wrong direction correct themselves by turning around.

Efforts to Reduce Wrong-Way Driving

One of the aims of highway engineering is to reduce wrong-way driving.[1] Therefore, many nations, including the U.S., Japan, and Canada, have made great efforts to combat this issue, especially in recent years.

There is a growing need to detect wrong-way driving by driver assistance systems and/or by autonomous vehicles.

BRIEF DESCRIPTION OF THE DRAWINGS

The embodiments of the disclosure will be understood and appreciated more fully from the following detailed description, taken in conjunction with the drawings in which:

FIG. 1D illustrates an example of a merge operation;
FIG. 1O illustrates an example of an image and image identifiers;
FIG. 2I illustrates an example of a method.

DESCRIPTION OF EXAMPLE EMBODIMENTS

Figure 1A:
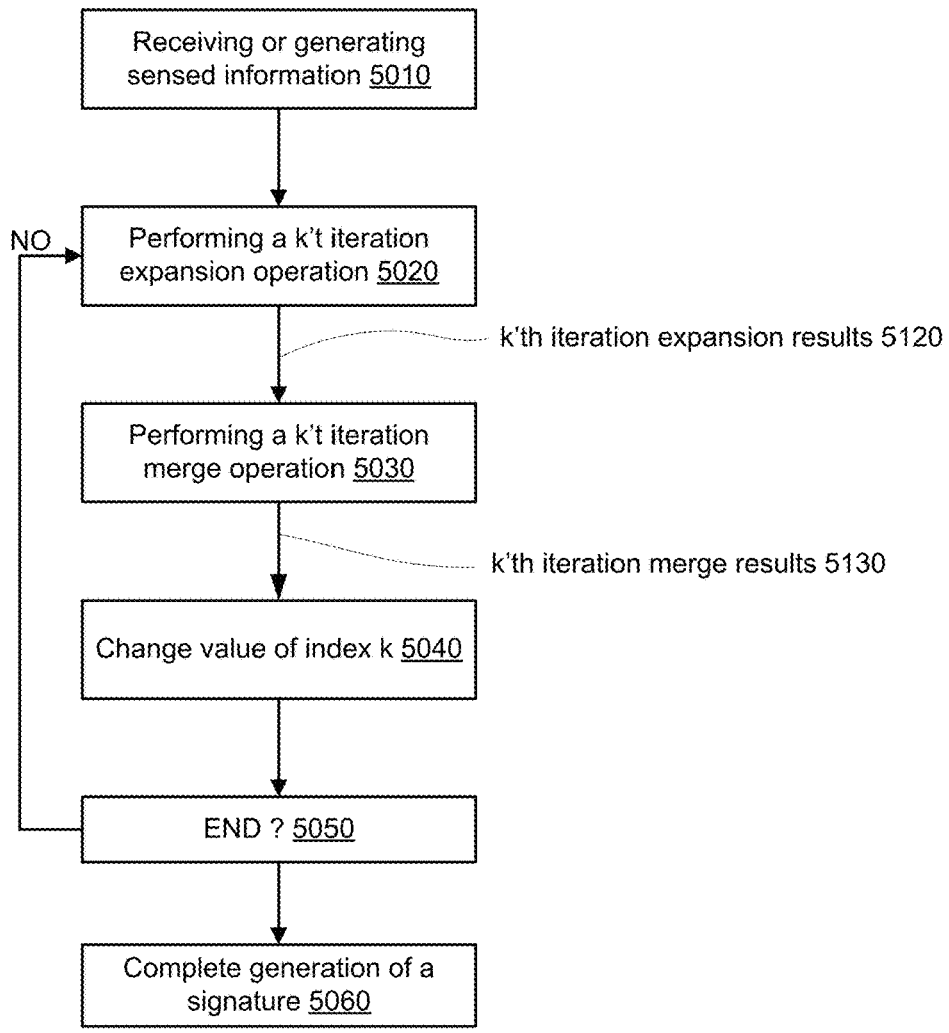
FIG. 1A illustrates an example of a method.

The specification and/or drawings may refer to an image. An image is an example of a media unit. Any reference to an image may be applied mutatis mutandis to a media unit. A media unit may be an example of sensed information. Any reference to a media unit may be applied mutatis mutandis to any type of natural signal such as but not limited to signal generated by nature, signal representing human behavior, signal representing operations related to the stock market, a medical signal, financial series, geodetic signals, geophysical, chemical, molecular, textual and numerical signals, time series, and the like. Any reference to a media unit may be applied mutatis mutandis to sensed information. The sensed information may be of any kind and may be sensed by any type of sensors—such as a visual light camera, an audio sensor, a sensor that may sense infrared, radar imagery, ultrasound, electro-optics, radiography, LIDAR (light detection and ranging), etc. The sensing may include generating samples (for example, pixel, audio signals) that represent the signal that was transmitted, or otherwise reach the sensor.

The specification and/or drawings may refer to a spanning element. A spanning element may be implemented in software or hardware. Different spanning element of a certain iteration are configured to apply different mathematical functions on the input they receive. Non-limiting examples of the mathematical functions include filtering, although other functions may be applied.

The specification and/or drawings may refer to a concept structure. A concept structure may include one or more clusters. Each cluster may include signatures and related metadata. Each reference to one or more clusters may be applicable to a reference to a concept structure.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

Low Power Generation of Signatures

The analysis of content of a media unit may be executed by generating a signature of the media unit and by comparing the signature to reference signatures. The reference signatures may be arranged in one or more concept structures or may be arranged in any other manner. The signatures may be used for object detection or for any other use.

The signature may be generated by creating a multidimensional representation of the media unit. The multidimensional representation of the media unit may have a very large number of dimensions. The high number of dimensions may guarantee that the multidimensional representation of different media units that include different objects is sparse—and that object identifiers of different objects are distant from each other—thus improving the robustness of the signatures.

The generation of the signature is executed in an iterative manner that includes multiple iterations, each iteration may include an expansion operations that is followed by a merge operation. The expansion operation of an iteration is performed by spanning elements of that iteration. By determining, per iteration, which spanning elements (of that iteration) are relevant—and reducing the power consumption of irrelevant spanning elements—a significant amount of power may be saved.

In many cases, most of the spanning elements of an iteration are irrelevant—thus after determining (by the spanning elements) their relevancy—the spanning elements that are deemed to be irrelevant may be shut down a/or enter an idle mode.

FIG. 1A illustrates a method 5000 for generating a signature of a media unit.

Method 5000 may start by step 5010 of receiving or generating sensed information.

The sensed information may be a media unit of multiple objects.

Step 5010 may be followed by processing the media unit by performing multiple iterations, wherein at least some of the multiple iterations comprises applying, by spanning elements of the iteration, dimension expansion process that are followed by a merge operation.

The processing may include:
Step 5020 of performing a k'th iteration expansion process (k may be a variable that is used to track the number of iterations).
Step 5030 of performing a k'th iteration merge process.
Step 5040 of changing the value of k.

Step 5050 of checking if all required iterations were done—if so proceeding to step 5060 of completing the generation of the signature. Else—jumping to step 5020.

The output of step 5020 is a k'th iteration expansion results 5120.

The output of step 5030 is a k'th iteration merge results 5130.

For each iteration (except the first iteration)—the merge result of the previous iteration is an input to the current iteration expansion process.

At least some of the K iterations involve selectively reducing the power consumption of some spanning elements (during step 5020) that are deemed to be irrelevant.

Figure 1B:
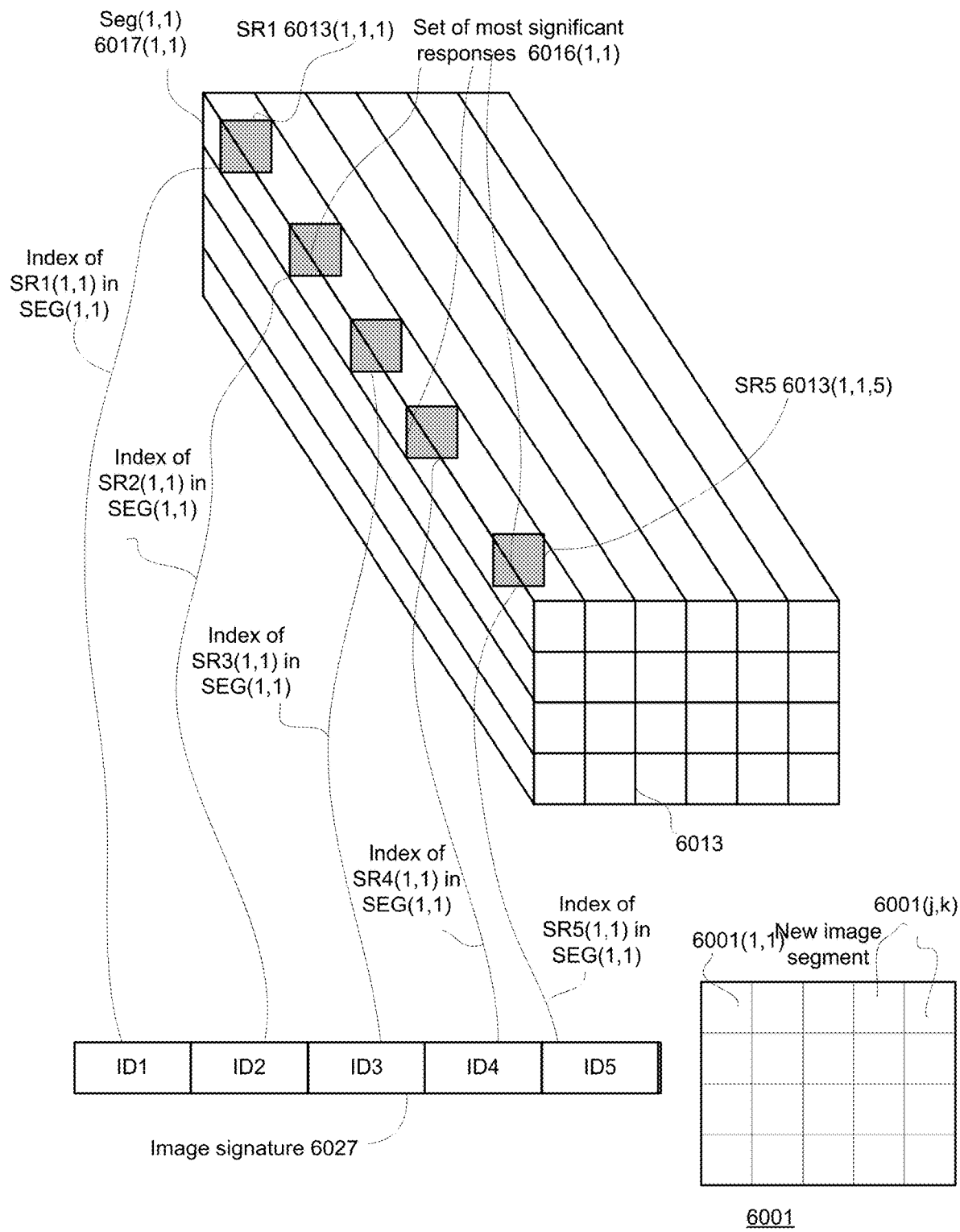
FIG. 1B illustrates an example of a signature.

FIG. 1B is an example of an image signature 6027 of a media unit that is an image 6000 and of an outcome 6013 of the last (K'th) iteration.

The image 6001 is virtually segments to segments 6000 $(i,k)$. The segments may be of the same shape and size, but this is not necessarily so.

Outcome 6013 may be a tensor that includes a vector of values per each segment of the media unit. One or more objects may appear in a certain segment. For each object—an object identifier (of the signature) points to locations of significant values, within a certain vector associated with the certain segment.

For example—a top left segment (6001(1,1)) of the image may be represented in the outcome 6013 by a vector V(1,1) 6017(1,1) that has multiple values. The number of values per vector may exceed 100, 200, 500, 1000, and the like.

The significant values (for example—more than 10, 20, 30, 40 values, and/or more than 0.1%, 0.2%. 0.5%, 1%, 5% of all values of the vector and the like) may be selected. The significant values may have the values—but may be selected in any other manner.

FIG. 1B illustrates a set of significant responses 6015(1,1) of vector V(1,1) 6017(1,1). The set includes five significant values (such as first significant value SV1(1,1) 6013(1,1,1), second significant value SV2(1,1), third significant value SV3(1,1), fourth significant value SV4(1,1), and fifth significant value SV5(1,1) 6013(1,1,5).

The image signature 6027 includes five indexes for the retrieval of the five significant values—first till fifth identifiers ID1-ID5 are indexes for retrieving the first till fifth significant values.

Figure 1C:
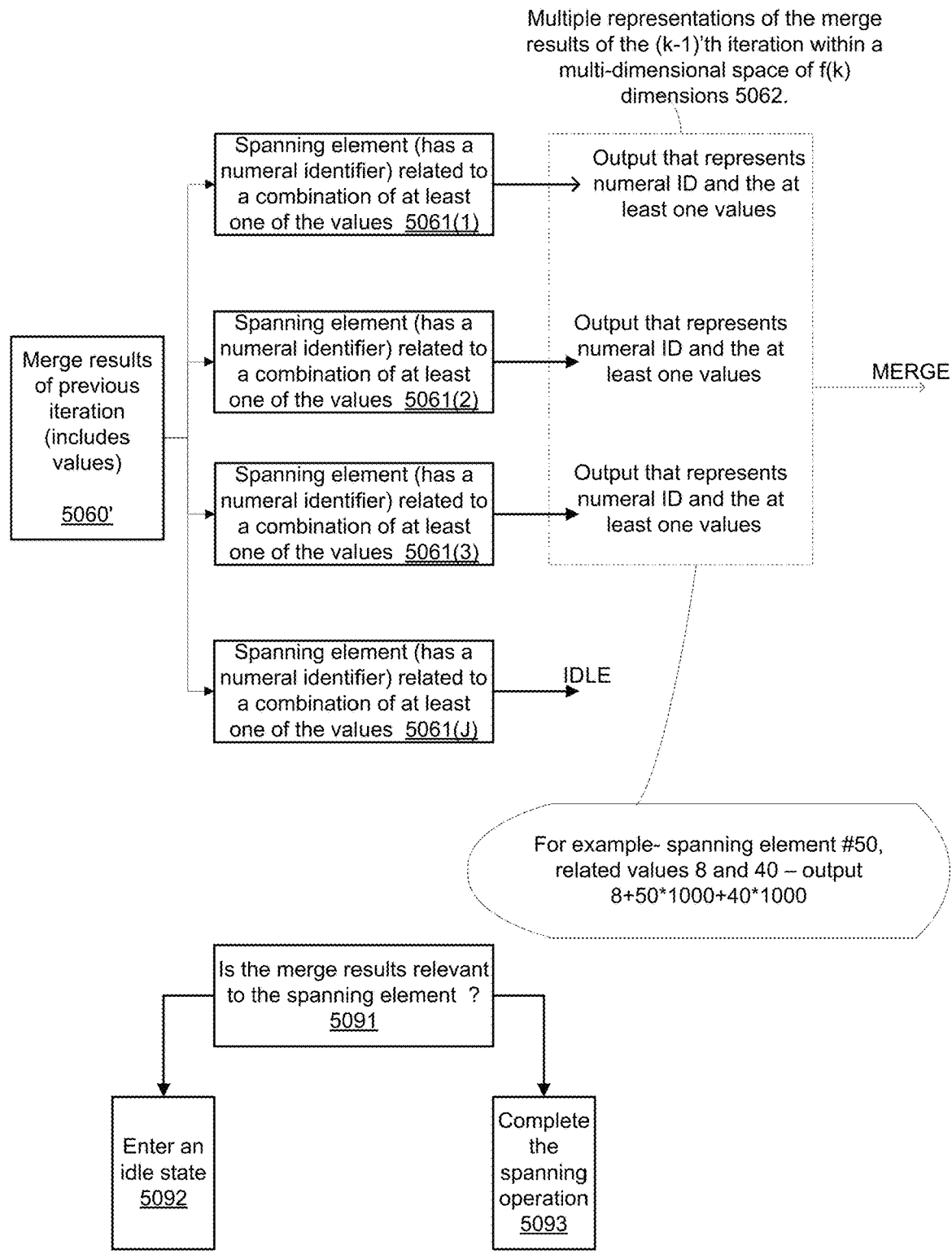
FIG. 1C illustrates an example of a dimension expansion process.

FIG. 1C illustrates a k'th iteration expansion process.

The k'th iteration expansion process start by receiving the merge results 5060' of a previous iteration.

The merge results of a previous iteration may include values are indicative of previous expansion processes—for example—may include values that are indicative of relevant spanning elements from a previous expansion operation, values indicative of relevant regions of interest in a multi-dimensional representation of the merge results of a previous iteration.

The merge results (of the previous iteration) are fed to spanning elements such as spanning elements 5061(1)-5061(J).

Each spanning element is associated with a unique set of values. The set may include one or more values. The spanning elements apply different functions that may be orthogonal to each other. Using non-orthogonal functions may increase the number of spanning elements—but this increment may be tolerable.

The spanning elements may apply functions that are decorrelated to each other—even if not orthogonal to each other.

The spanning elements may be associated with different combinations of object identifiers that may "cover" multiple possible media units. Candidates for combinations of object identifiers may be selected in various manners—for example based on their occurrence in various images (such as test images) randomly, pseudo randomly, according to some rules and the like. Out of these candidates the combinations may be selected to be decorrelated, to cover said multiple possible media units and/or in a manner that certain objects are mapped to the same spanning elements.

Each spanning element compares the values of the merge results to the unique set (associated with the spanning element) and if there is a match—then the spanning element is deemed to be relevant. If so—the spanning element completes the expansion operation.

If there is no match—the spanning element is deemed to be irrelevant and enters a low power mode. The low power mode may also be referred to as an idle mode, a standby mode, and the like. The low power mode is termed low power because the power consumption of an irrelevant spanning element is lower than the power consumption of a relevant spanning element.

In FIG. 1C various spanning elements are relevant (5061(1)-5061(3)) and one spanning element is irrelevant (5061(J)).

Each relevant spanning element may perform a spanning operation that includes assigning an output value that is indicative of an identity of the relevant spanning elements of the iteration. The output value may also be indicative of identities of previous relevant spanning elements (from previous iterations).

For example—assuming that spanning element number fifty is relevant and is associated with a unique set of values of eight and four—then the output value may reflect the numbers fifty, four and eight—for example one thousand multiplied by (fifty+forty) plus forty. Any other mapping function may be applied.

FIG. 1C also illustrates the steps executed by each spanning element:

Checking if the merge results are relevant to the spanning element (step 5091).

If-so—completing the spanning operation (step 5093).

If not—entering an idle state (step 5092).

FIG. 1D is an example of various merge operations.

A merge operation may include finding regions of interest. The regions of interest are regions within a multidimensional representation of the sensed information. A region of interest may exhibit a more significant response (for example a stronger, higher intensity response).

The merge operation (executed during a k'th iteration merge operation) may include at least one of the following:

Step 5031 of searching for overlaps between regions of interest (of the k'th iteration expansion operation results) and define regions of interest that are related to the overlaps.

Step 5032 of determining to drop one or more region of interest, and dropping according to the determination.

Step 5033 of searching for relationships between regions of interest (of the k'th iteration expansion operation results) and define regions of interest that are related to the relationship.

Step 5034 of searching for proximate regions of interest (of the k'th iteration expansion operation results) and define regions of interest that are related to the proximity. Proximate may be a distance that is a certain fraction (for example less than 1%) of the multi-dimensional space, may be a certain fraction of at least one of the regions of interest that are tested for proximity.

Step 5035 of searching for relationships between regions of interest (of the k'th iteration expansion operation results) and define regions of interest that are related to the relationship.

Step 5036 of merging and/or dropping k'th iteration regions of interest based on shape information related to shape of the k'th iteration regions of interest.

The same merge operations may be applied in different iterations.

Alternatively, different merge operations may be executed during different iterations.

Figure 1E:
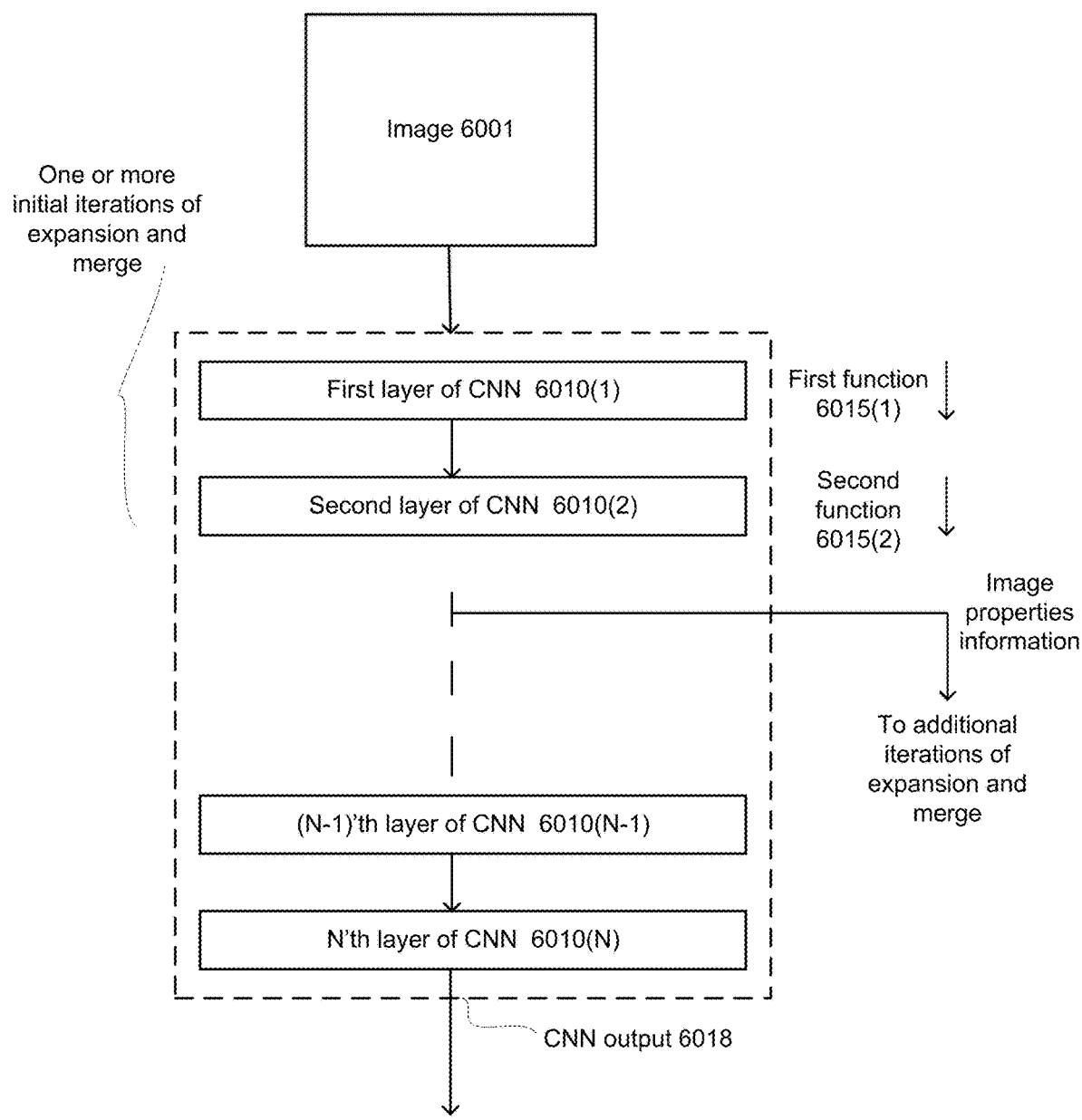
FIG. 1E illustrates an example of hybrid process.

FIG. 1E illustrates an example of a hybrid process and an input image 6001.

The hybrid process is hybrid in the sense that some expansion and merge operations are executed by a convolutional neural network (CNN) and some expansion and merge operations (denoted additional iterations of expansion and merge) are not executed by the CNN— but rather by a process that may include determining a relevancy of spanning elements and entering irrelevant spanning elements to a low power mode.

In FIG. 1E one or more initial iterations are executed by first and second CNN layers 6010(1) and 6010(2) that apply first and second functions 6015(1) and 6015(2).

The output of these layers provided information about image properties. The image properties may not amount to object detection. Image properties may include location of edges, properties of curves, and the like.

The CNN may include additional layers (for example third till N'th layer 6010(N)) that may provide a CNN output 6018 that may include object detection information. It should be noted that the additional layers may not be included.

It should be noted that executing the entire signature generation process by a hardware CNN of fixed connectivity may have a higher power consumption—as the CNN will not be able to reduce the power consumption of irrelevant nodes.

Figure 1F:
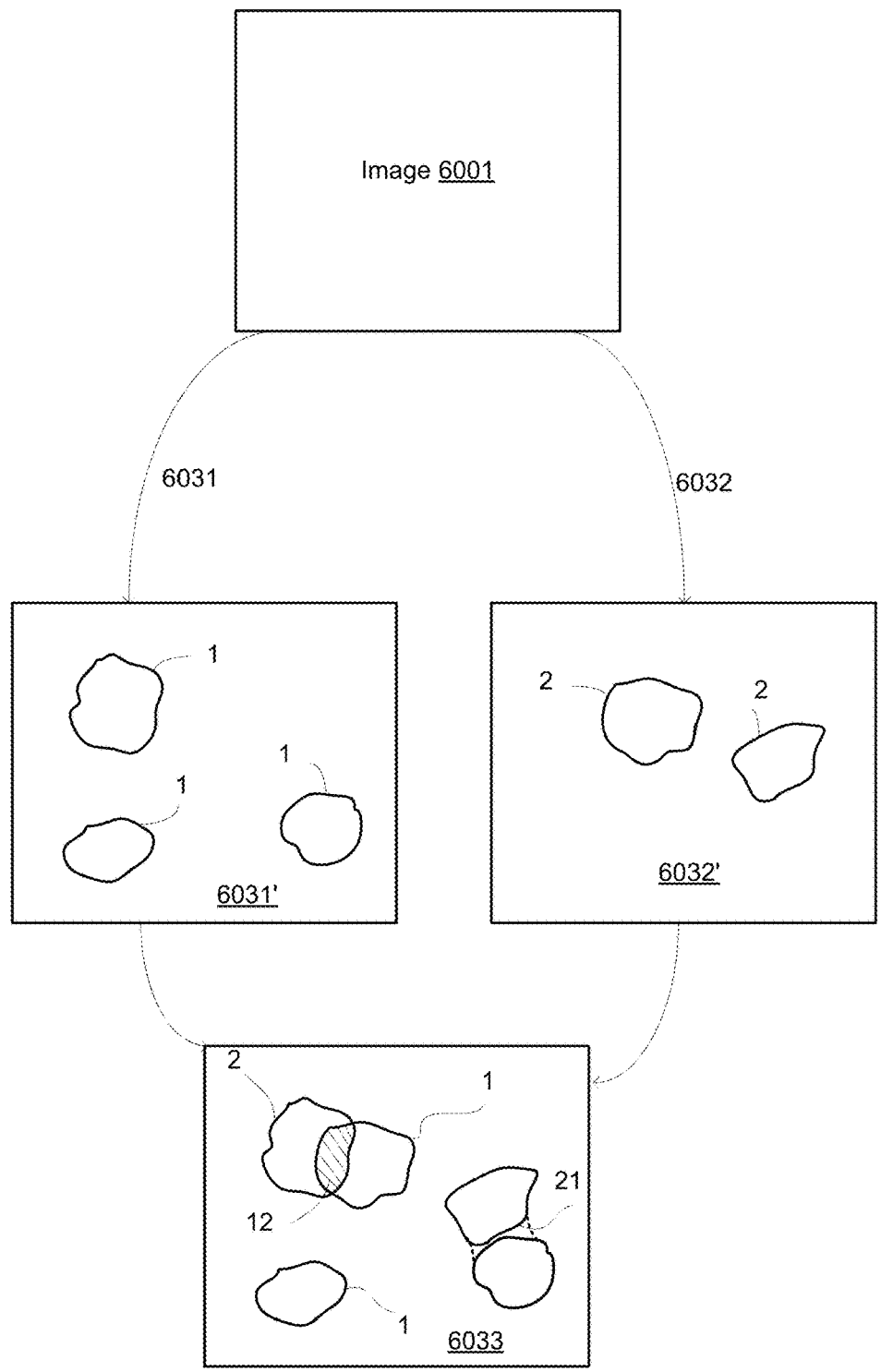
FIG. 1F illustrates an example of a first iteration of the dimension expansion process.

FIG. 1F illustrates an input image 6001, and a single iteration of an expansion operation and a merge operation.

In FIG. 1F the input image 6001 undergoes two expansion operations.

The first expansion operation involves filtering the input image by a first filtering operation 6031 to provide first regions of interest (denoted 1) in a first filtered image 6031'.

The first expansion operation also involves filtering the input image by a second filtering operation 6032 to provide first regions of interest (denoted 2) in a second filtered image 6032', The merge operation includes merging the two images by overlaying the first filtered image on the second filtered image to provide regions of interest 1, 2, 12 and 21. Region of interest 12 is an overlap area shared by a certain region of interest 1 and a certain region of interest 2. Region of interest 21 is a union of another region of interest 1 and another region of interest 2.

Figure 1G:
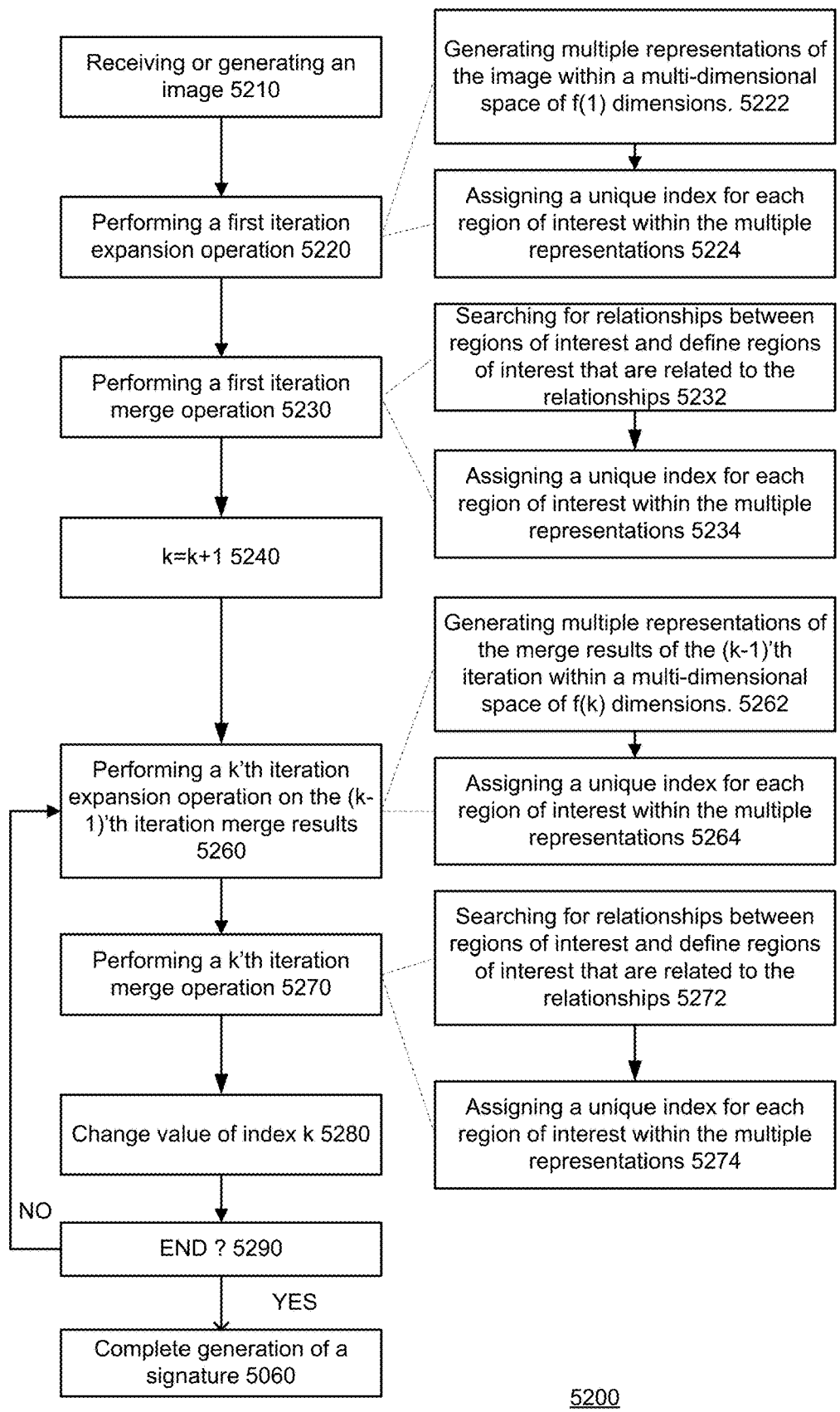
FIG. 1G illustrates an example of a method.

FIG. 1G illustrates method 5200 for generating a signature.

Method 5200 may include the following sequence of steps:

Step 5210 of receiving or generating an image.

Step 5220 of performing a first iteration expansion operation (which is an expansion operation that is executed during a first iteration)

Step 5230 of performing a first iteration merge operation.

Figure 7:
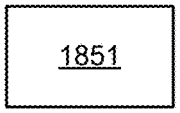
FIG. 7 is an example of a method.
Figure 7:
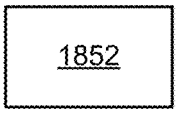
Figure 7:
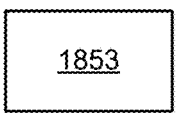
Figure 7:
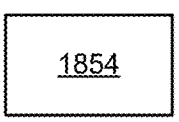
Figure 7:
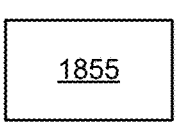

Step 5240 of amending index k (k is an iteration counter). In FIG. 7 in incremented by one—this is only an example of how the number of iterations are tracked.

Step 5260 of performing a k'th iteration expansion operation on the (k-1)'th iteration merge results.

Step 5270 of performing a k'th iteration merge operation (on the k'th iteration expansion operation results.

Step 5280 of changing the value of index k.

Step 5290 of checking if all iteration ended (k reached its final value—for example K).

If no—there are still iterations to be executed—jumping from step 5290 to step 5260.

If yes—jumping to step 5060 of completing the generation of the signature. This may include, for example, selecting significant attributes, determining retrieval information (for example indexes) that point to the selected significant attributes.

Step 5220 may include:

Step 5222 of generating multiple representations of the image within a multi-dimensional space of f(1) dimensions. The expansion operation of step 5220 generates a first iteration multidimensional representation of the first image. The number of dimensions of this first iteration multidimensional representation is denoted f(1).

Step 5224 of assigning a unique index for each region of interest within the multiple representations. For example, referring to FIG. 6—indexes 1 and indexes 2 are assigned to regions of interests generated during the first iteration expansion operations 6031 and 6032.

Step 5230 may include:

Step 5232 of searching for relationships between regions of interest and define regions of interest that are related to the relationships. For example—union or intersection illustrate din FIG. 6.

Step 5234 of assigning a unique index for each region of interest within the multiple representations. For example—referring to FIG. 6—indexes 1, 2, 12 and 21.

Step 5260 may include:

Step 5262 of generating multiple representations of the merge results of the (k-1)'th iteration within a multi-dimensional space of f(k) dimensions. The expansion operation of step 5260 generates a k'th iteration multidimensional representation of the first image. The number of dimensions of this kth iteration multidimensional representation is denoted f(k).

Step 5264 of assigning a unique index for each region of interest within the multiple representations.

Step 5270 may include

Step 5272 of searching for relationships between regions of interest and define regions of interest that are related to the relationships.

Step 5274 of Assigning a unique index for each region of interest within the multiple representations.

Figure 1H:
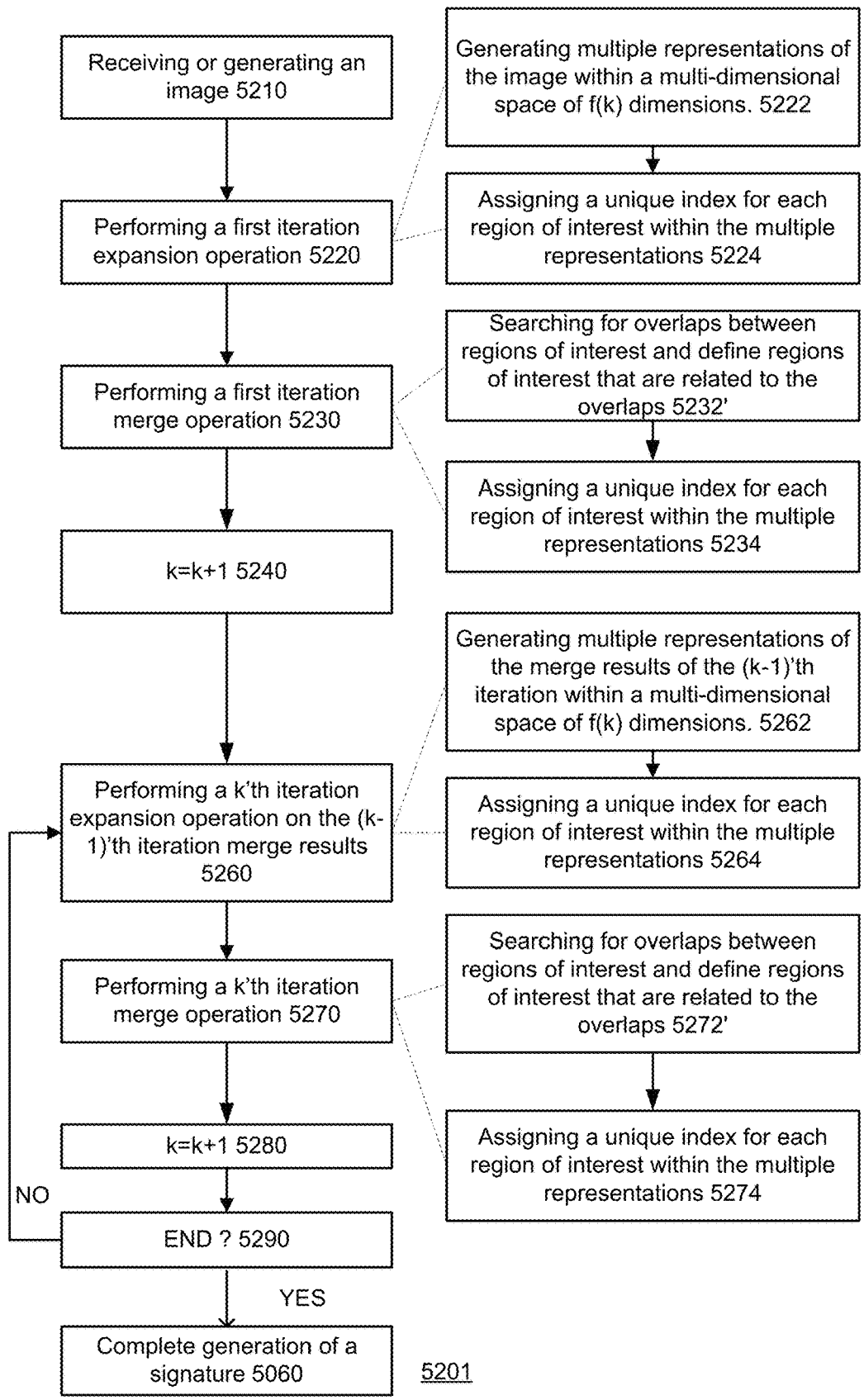
FIG. 1H illustrates an example of a method.

FIG. 1H illustrates a method 5201. In method 5201 the relationships between the regions of interest are overlaps.

Thus—step 5232 is replaced by step 5232' of searching for overlaps between regions of interest and define regions of interest that are related to the overlaps.

Step 5272 is replaced by step 5272' of searching for overlaps between regions of interest and define regions of interest that are related to the overlaps.

Figure 1I:
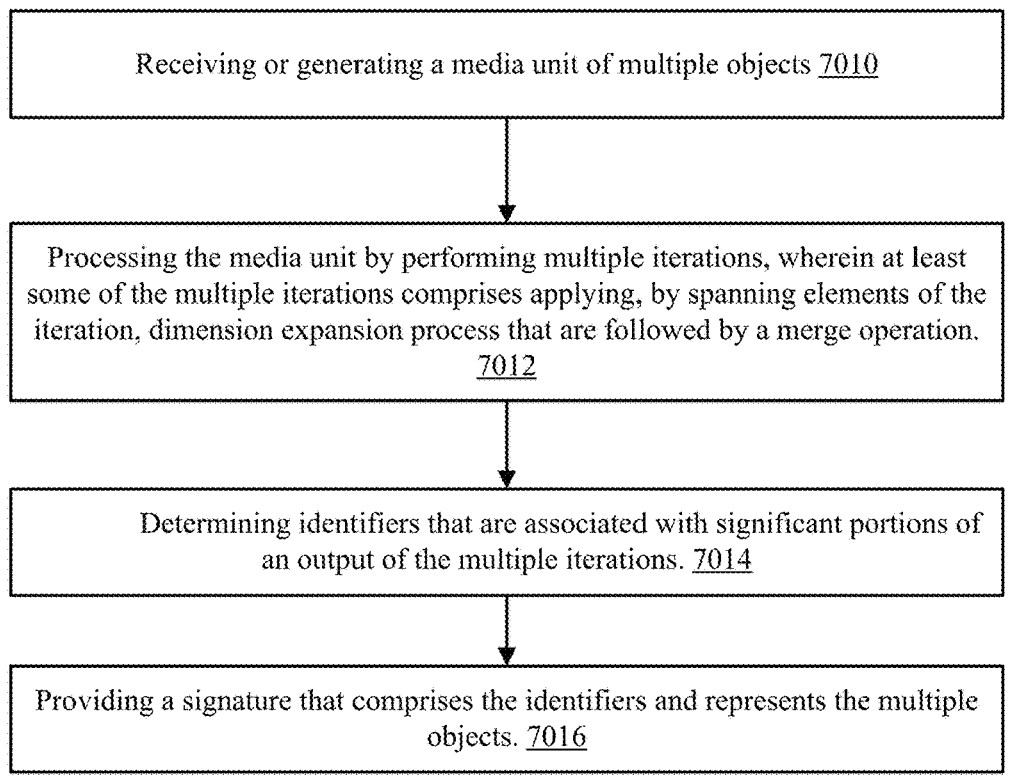
FIG. 1I illustrates an example of a method.

FIG. 1I illustrates a method 7000 for low-power calculation of a signature.

Method 7000 starts by step 7010 of receiving or generating a media unit of multiple objects.

Step 7010 may be followed by step 7012 of processing the media unit by performing multiple iterations, wherein at least some of the multiple iterations comprises applying, by spanning elements of the iteration, dimension expansion process that are followed by a merge operation.

The applying of the dimension expansion process of an iteration may include (a) determining a relevancy of the spanning elements of the iteration; and (b) completing the dimension expansion process by relevant spanning elements of the iteration and reducing a power consumption of irrelevant spanning elements until, at least, a completion of the applying of the dimension expansion process.

The identifiers may be retrieval information for retrieving the significant portions.

The at least some of the multiple iterations may be a majority of the multiple iterations.

The output of the multiple iteration may include multiple property attributes for each segment out of multiple segments of the media unit; and wherein the significant portions of an output of the multiple iterations may include more impactful property attributes.

The first iteration of the multiple iteration may include applying the dimension expansion process by applying different filters on the media unit.

The at least some of the multiple iteration exclude at least a first iteration of the multiple iterations. See, for example, FIG. 1E.

The determining the relevancy of the spanning elements of the iteration may be based on at least some identities of relevant spanning elements of at least one previous iteration.

The determining the relevancy of the spanning elements of the iteration may be based on at least some identities of relevant spanning elements of at least one previous iteration that preceded the iteration.

The determining the relevancy of the spanning elements of the iteration may be based on properties of the media unit.

The determining the relevancy of the spanning elements of the iteration may be performed by the spanning elements of the iteration.

Method 7000 may include a neural network processing operation that may be executed by one or more layers of a neural network and does not belong to the at least some of the multiple iterations. See, for example, FIG. 1E.

The at least one iteration may be executed without reducing power consumption of irrelevant neurons of the one or more layers.

The one or more layers may output information about properties of the media unit, wherein the information differs from a recognition of the multiple objects.

The applying, by spanning elements of an iteration that differs from the first iteration, the dimension expansion process may include assigning output values that may be indicative of an identity of the relevant spanning elements of the iteration. See, for example, FIG. 1C.

The applying, by spanning elements of an iteration that differs from the first iteration, the dimension expansion process may include assigning output values that may be indicative a history of dimension expansion processes until the iteration that differs from the first iteration.

The each spanning element may be associated with a subset of reference identifiers. The determining of the relevancy of each spanning elements of the iteration may be based a relationship between the subset of the reference identifiers of the spanning element and an output of a last merge operation before the iteration.

The output of a dimension expansion process of an iteration may be a multidimensional representation of the media unit that may include media unit regions of interest that may be associated with one or more expansion processes that generated the regions of interest.

The merge operation of the iteration may include selecting a subgroup of media unit regions of interest based on a spatial relationship between the subgroup of multidimensional regions of interest. See, for example, FIGS. 3 and 6.

Method 7000 may include applying a merge function on the subgroup of multidimensional regions of interest. See, for example, FIGS. 1C and 1F.

Method 7000 may include applying an intersection function on the subgroup of multidimensional regions of interest. See, for example, FIGS. 1C and 1F.

The merge operation of the iteration may be based on an actual size of one or more multidimensional regions of interest.

The merge operation of the iteration may be based on relationship between sizes of the multidimensional regions of interest. For example—larger multidimensional regions of interest may be maintained while smaller multidimensional regions of interest may be ignored of.

The merge operation of the iteration may be based on changes of the media unit regions of interest during at least the iteration and one or more previous iteration.

Step 7012 may be followed by step 7014 of determining identifiers that are associated with significant portions of an output of the multiple iterations.

Step 7014 may be followed by step 7016 of providing a signature that comprises the identifiers and represents the multiple objects.

Localization and Segmentation

Any of the mentioned above signature generation method provides a signature that does not explicitly includes accurate shape information. This adds to the robustness of the signature to shape related inaccuracies or to other shape related parameters.

The signature includes identifiers for identifying media regions of interest.

Each media region of interest may represent an object (for example a vehicle, a pedestrian, a road element, a human made structure, wearables, shoes, a natural element such as a tree, the sky, the sun, and the like) or a part of an object (for example—in the case of the pedestrian—a neck, a head, an arm, a leg, a thigh, a hip, a foot, an upper arm, a forearm, a wrist, and a hand). It should be noted that for object detection purposes a part of an object may be regarded as an object.

The exact shape of the object may be of interest.

Figure 1J:
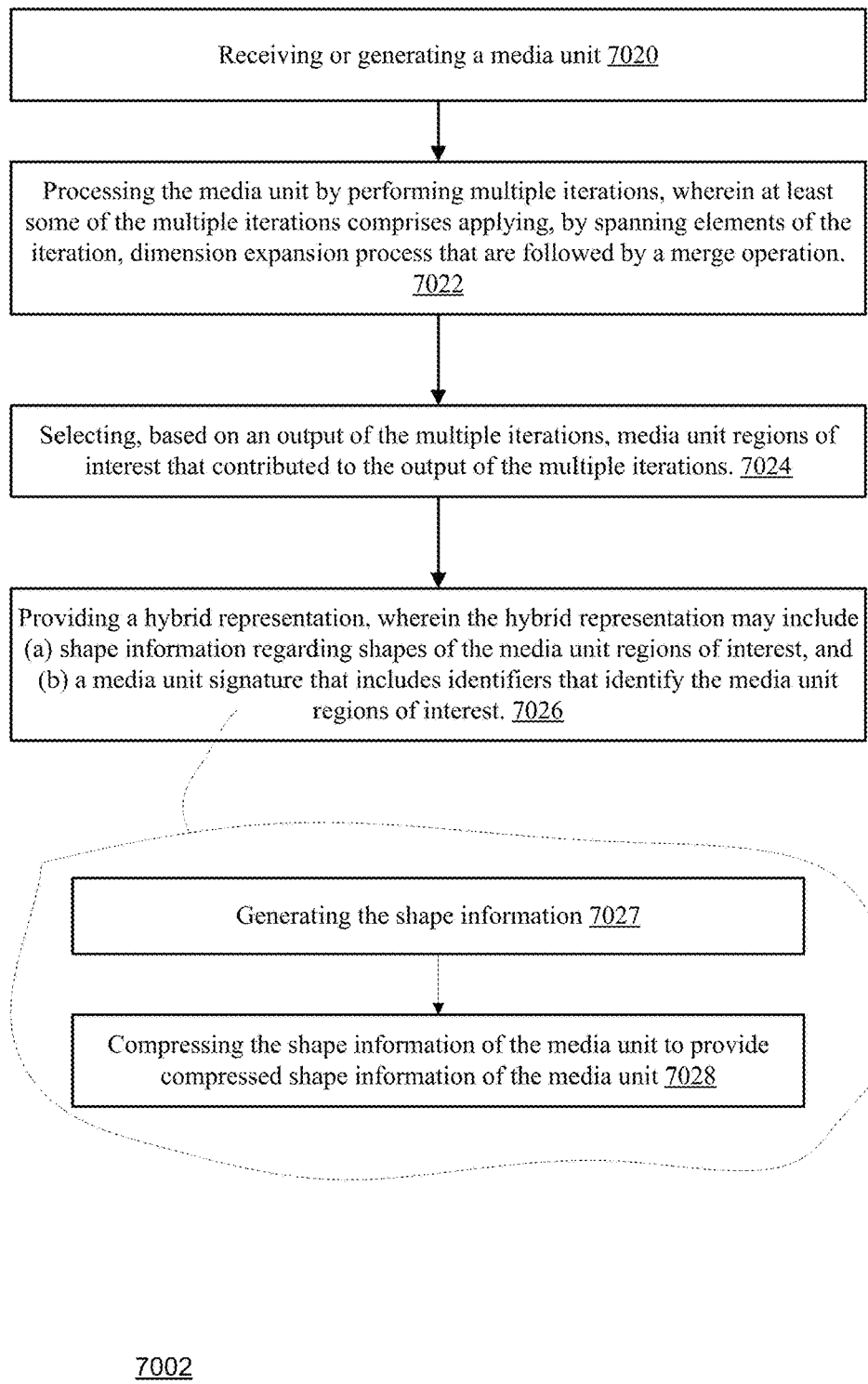
FIG. 1J illustrates an example of a method.

FIG. 1J illustrates method 7002 of generating a hybrid representation of a media unit.

Method 7002 may include a sequence of steps 7020, 7022, 7024 and 7026.

Step 7020 may include receiving or generating the media unit.

Step 7022 may include processing the media unit by performing multiple iterations, wherein at least some of the multiple iterations comprises applying, by spanning elements of the iteration, dimension expansion process that are followed by a merge operation.

Step 7024 may include selecting, based on an output of the multiple iterations, media unit regions of interest that contributed to the output of the multiple iterations.

Step 7026 may include providing a hybrid representation, wherein the hybrid representation may include (a) shape information regarding shapes of the media unit regions of interest, and (b) a media unit signature that includes identifiers that identify the media unit regions of interest.

Step 7024 may include selecting the media regions of interest per segment out of multiple segments of the media unit. See, for example, FIG. 2.

Step 7026 may include step 7027 of generating the shape information.

The shape information may include polygons that represent shapes that substantially bound the media unit regions of interest. These polygons may be of a high degree.

In order to save storage space, the method may include step 7028 of compressing the shape information of the media unit to provide compressed shape information of the media unit.

Figure 1K:
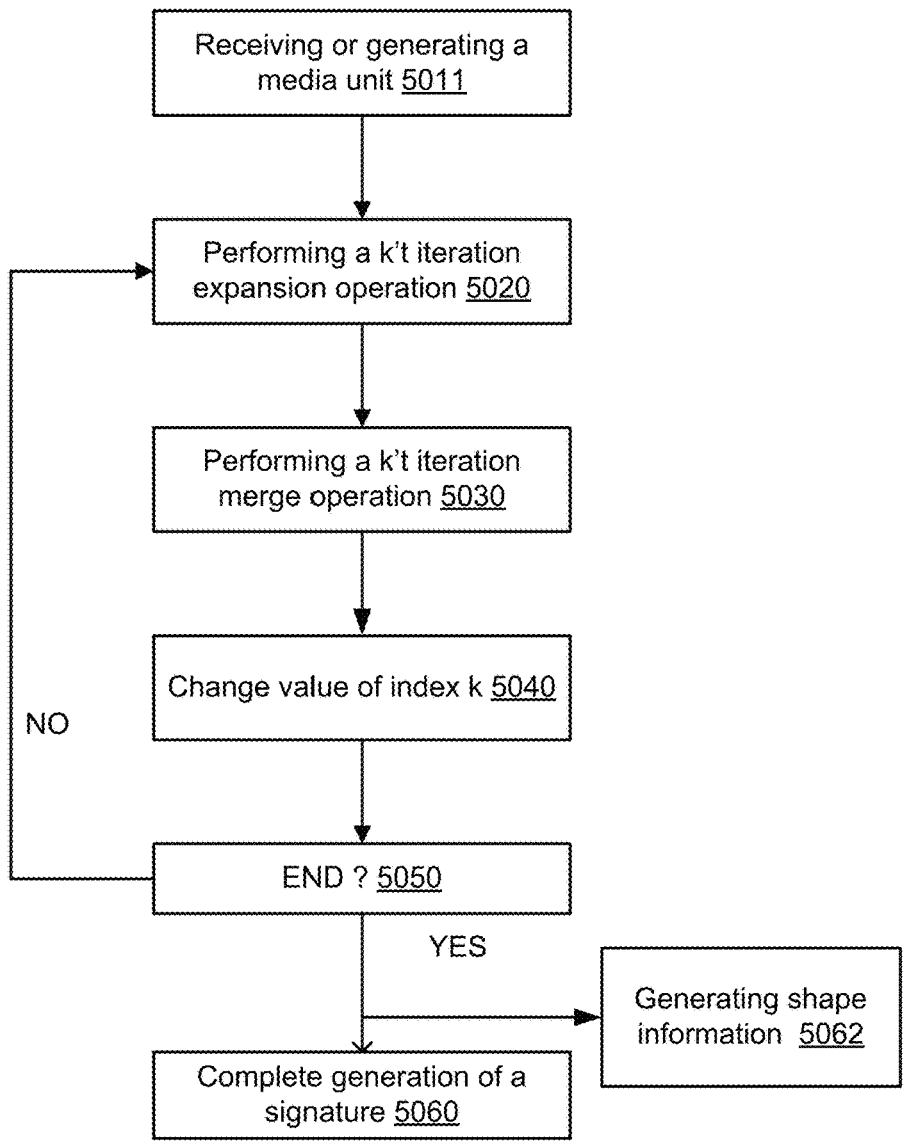
FIG. 1K illustrates an example of a method.

FIG. 1K illustrates method 5002 for generating a hybrid representation of a media unit.

Method 5002 may start by step 5011 of receiving or generating a media unit.

Step 5011 may be followed by processing the media unit by performing multiple iterations, wherein at least some of the multiple iterations comprises applying, by spanning elements of the iteration, dimension expansion process that are followed by a merge operation.

The processing may be followed by steps 5060 and 5062.

The processing may include steps 5020, 5030, 5040 and 5050.

Step 5020 may include performing a k'th iteration expansion process (k may be a variable that is used to track the number of iterations).

Step 5030 may include performing a k'th iteration merge process.

Step 5040 may include changing the value of k.

Step 5050 may include checking if all required iterations were done—if so proceeding to steps 5060 and 5062. Else—jumping to step 5020.

The output of step 5020 is a k'th iteration expansion result.

The output of step 5030 is a k'th iteration merge result.

For each iteration (except the first iteration)—the merge result of the previous iteration is an input to the current iteration expansion process.

Step 5060 may include completing the generation of the signature.

Step 5062 may include generating shape information regarding shapes of media unit regions of interest. The signature and the shape information provide a hybrid representation of the media unit.

The combination of steps 5060 and 5062 amounts to a providing a hybrid representation, wherein the hybrid representation may include (a) shape information regarding shapes of the media unit regions of interest, and (b) a media unit signature that includes identifiers that identify the media unit regions of interest.

Figure 1L:
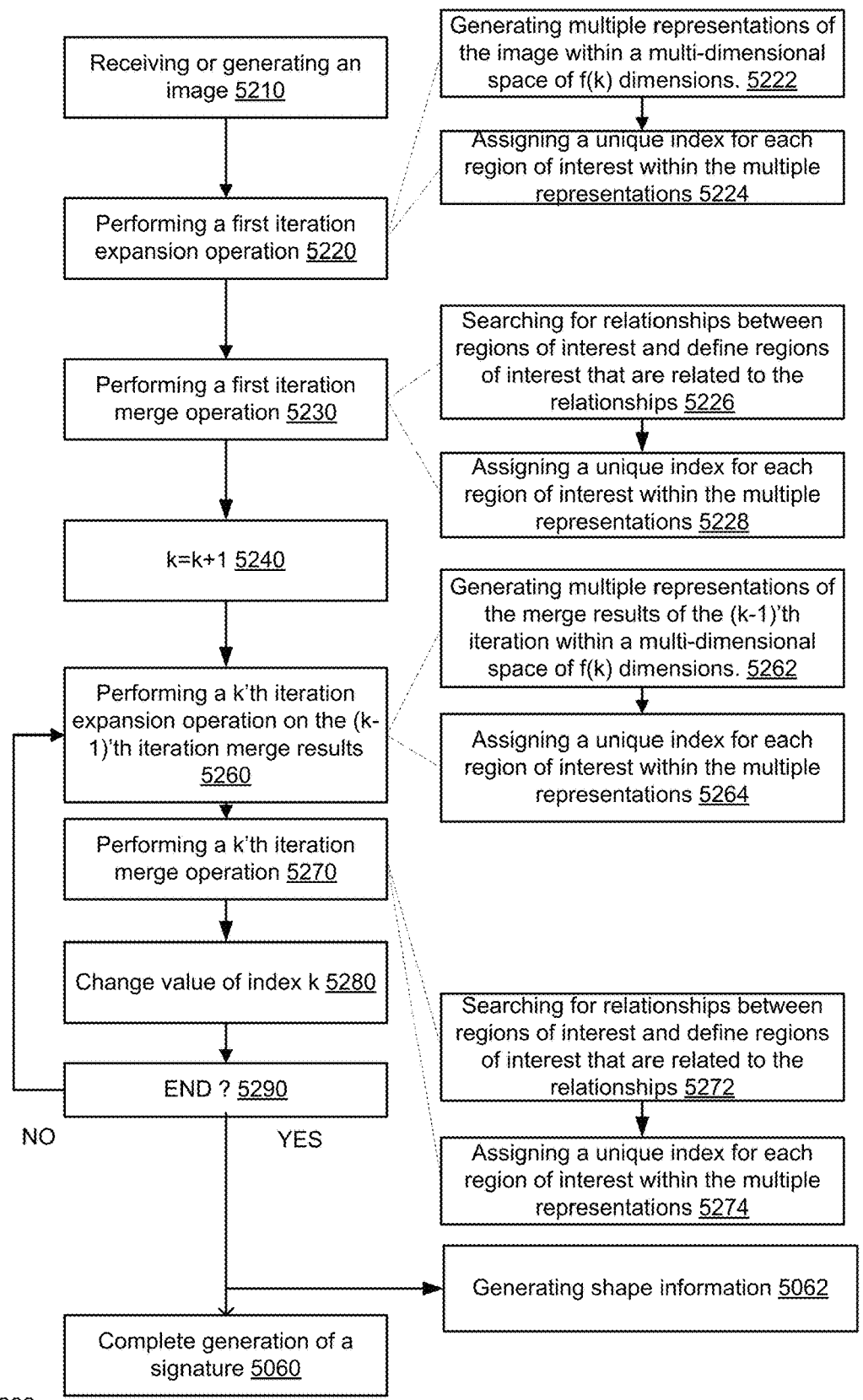
FIG. 1L illustrates an example of a method.

FIG. 1L illustrates method 5203 for generating a hybrid representation of an image.

Method 5200 may include the following sequence of steps:

Step 5210 of receiving or generating an image.

Step 5230 of performing a first iteration expansion operation (which is an expansion operation that is executed during a first iteration)

Step 5240 of performing a first iteration merge operation.

Step 5240 of amending index k (k is an iteration counter). In FIG. 1L in incremented by one—this is only an example of how the number of iterations are tracked.

Step 5260 of performing a k'th iteration expansion operation on the (k−1)'th iteration merge results.

Step 5270 of Performing a k'th iteration merge operation (on the k'th iteration expansion operation results.

Step 5280 of changing the value of index k.

Step 5290 of checking if all iteration ended (k reached its final value—for example K).

If no—there are still iterations to be executed—jumping from step 5290 to step 5260.

If yes—jumping to step 5060.

Step 5060 may include completing the generation of the signature. This may include, for example, selecting significant attributes, determining retrieval information (for example indexes) that point to the selected significant attributes.

Step 5062 may include generating shape information regarding shapes of media unit regions of interest. The signature and the shape information provide a hybrid representation of the media unit.

The combination of steps 5060 and 5062 amounts to a providing a hybrid representation, wherein the hybrid representation may include (a) shape information regarding shapes of the media unit regions of interest, and (b) a media unit signature that includes identifiers that identify the media unit regions of interest.

Step 5220 may include:

Step 5222 of generating multiple representations of the image within a multi-dimensional space of f(k) dimensions.

Step 5224 of assigning a unique index for each region of interest within the multiple representations. (for example, referring to FIG. 1F—indexes 1 and indexes 2 following first iteration expansion operations 6031 and 6032.

Step 5230 may include

Step 5226 of searching for relationships between regions of interest and define regions of interest that are related to the relationships. For example—union or intersection illustrated in FIG. 1F.

Step 5228 of assigning a unique index for each region of interest within the multiple representations. For example—referring to FIG. 1F—indexes 1, 2, 12 and 21.

Step 5260 may include:

Step 5262 of generating multiple representations of the merge results of the (k−1)'th iteration within a multi-dimensional space of f(k) dimensions. The expansion operation of step 5260 generates a k'th iteration multidimensional representation of the first image. The number of dimensions of this kth iteration multidimensional representation is denoted f(k).

Step 5264 of assigning a unique index for each region of interest within the multiple representations.

Step 5270 may include

Step 5272 of searching for relationships between regions of interest and define regions of interest that are related to the relationships.

Step 5274 of assigning a unique index for each region of interest within the multiple representations.

Figure 1M:
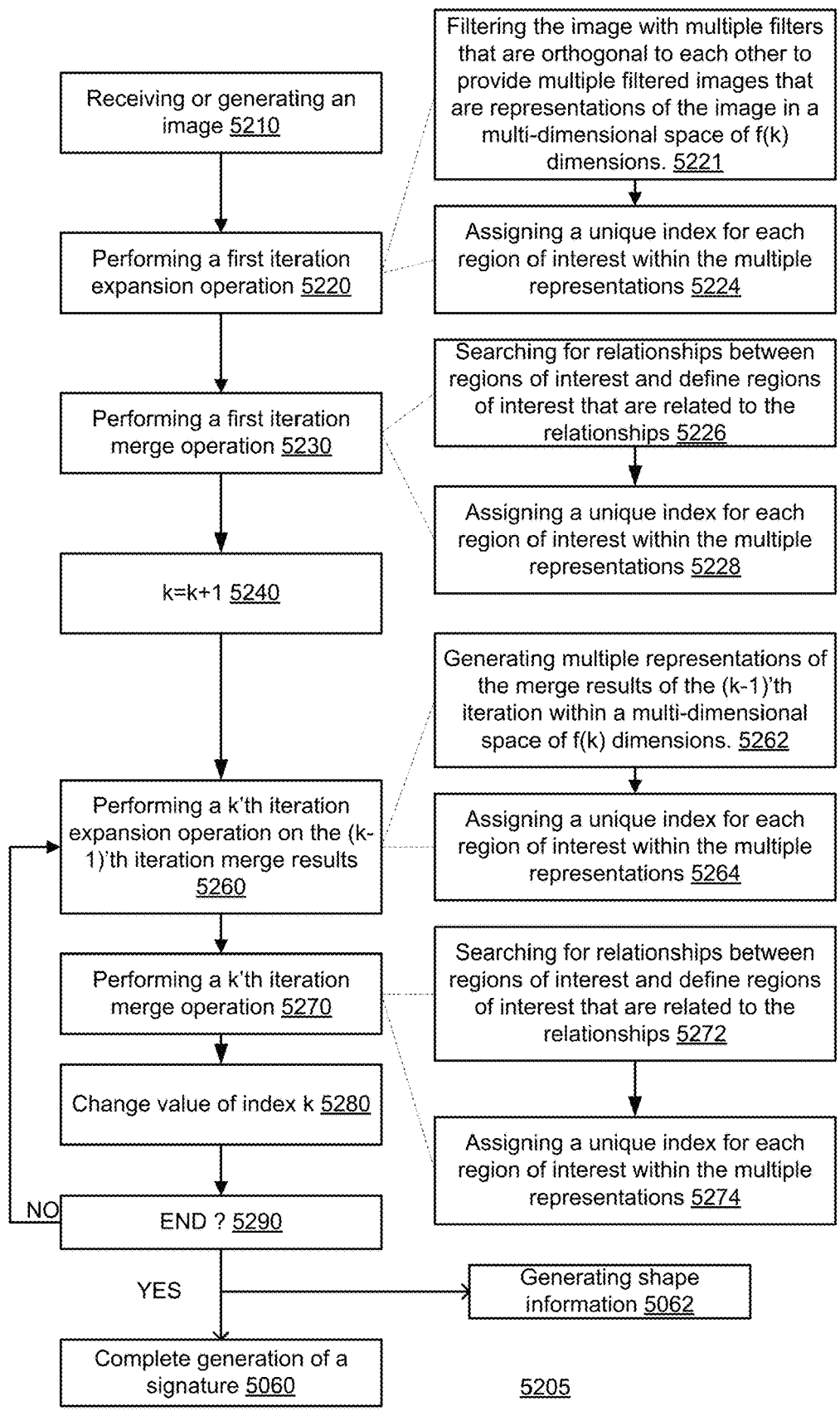
FIG. 1M illustrates an example of a method.

FIG. 1M illustrates method 5205 for generating a hybrid representation of an image.

Method 5200 may include the following sequence of steps:

Step 5210 of receiving or generating an image.

Step 5230 of performing a first iteration expansion operation (which is an expansion operation that is executed during a first iteration)

Step 5240 of performing a first iteration merge operation.

Step 5240 of amending index k (k is an iteration counter). In FIG. 1M in incremented by one—this is only an example of how the number of iterations are tracked.

Step 5260 of performing a k'th iteration expansion operation on the (k−1)'th iteration merge results.

Step 5270 of performing a k'th iteration merge operation (on the k'th iteration expansion operation results.

Step 5280 of changing the value of index k.

Step 5290 of checking if all iteration ended (k reached its final value—for example K).

If no—there are still iterations to be executed—jumping from step 5290 to step 5260.

If yes—jumping to steps 5060 and 5062.

Step 5060 may include completing the generation of the signature. This may include, for example, selecting significant attributes, determining retrieval information (for example indexes) that point to the selected significant attributes.

Step 5062 may include generating shape information regarding shapes of media unit regions of interest. The signature and the shape information provide a hybrid representation of the media unit.

The combination of steps 5060 and 5062 amounts to a providing a hybrid representation, wherein the hybrid representation may include (a) shape information regarding shapes of the media unit regions of interest, and (b) a media unit signature that includes identifiers that identify the media unit regions of interest.

Step 5220 may include:

Step 5221 of filtering the image with multiple filters that are orthogonal to each other to provide multiple filtered images that are representations of the image in a multi-dimensional space of f(1) dimensions. The expansion operation of step 5220 generates a first iteration multidimensional representation of the first image. The number of filters is denoted f(1).

Step 5224 of assigning a unique index for each region of interest within the multiple representations. (for example, referring to FIG. 1F—indexes 1 and indexes 2 following first iteration expansion operations 6031 and 6032.

Step 5230 may include

Step 5226 of searching for relationships between regions of interest and define regions of interest that are related to the relationships. For example—union or intersection illustrated in FIG. 1F.

Step 5228 of assigning a unique index for each region of interest within the multiple representations. For example—referring to FIG. 1F—indexes 1, 2, 12 and 21.

Step 5260 may include:

Step 5262 of generating multiple representations of the merge results of the (k−1)'th iteration within a multi-dimensional space of f(k) dimensions. The expansion operation of step 5260 generates a k'th iteration multidimensional representation of the first image. The number of dimensions of this kth iteration multidimensional representation is denoted f(k).

Step 5264 of assigning a unique index for each region of interest within the multiple representations.

Step 5270 may include

Step 5272 of searching for relationships between regions of interest and define regions of interest that are related to the relationships.

Step 5274 of assigning a unique index for each region of interest within the multiple representations.

The filters may be orthogonal may be non-orthogonal—for example be decorrelated. Using non-orthogonal filters may increase the number of filters—but this increment may be tolerable.

Object Detection Using Compressed Shape Information

Object detection may include comparing a signature of an input image to signatures of one or more cluster structures in order to find one or more cluster structures that include one or more matching signatures that match the signature of the input image.

The number of input images that are compared to the cluster structures may well exceed the number of signatures of the cluster structures. For example—thousands, tens of thousands, hundreds of thousands (and even more) of input signature may be compared to much less cluster structure signatures. The ratio between the number of input images to the aggregate number of signatures of all the cluster structures may exceed ten, one hundred, one thousand, and the like.

In order to save computational resources, the shape information of the input images may be compressed.

On the other hand—the shape information of signatures that belong to the cluster structures may be uncompressed—and of higher accuracy than those of the compressed shape information.

When the higher quality is not required—the shape information of the cluster signature may also be compressed.

Compression of the shape information of cluster signatures may be based on a priority of the cluster signature, a popularity of matches to the cluster signatures, and the like.

The shape information related to an input image that matches one or more of the cluster structures may be calculated based on shape information related to matching signatures.

For example—a shape information regarding a certain identifier within the signature of the input image may be determined based on shape information related to the certain identifiers within the matching signatures.

Any operation on the shape information related to the certain identifiers within the matching signatures may be applied in order to determine the (higher accuracy) shape information of a region of interest of the input image identified by the certain identifier.

For example—the shapes may be virtually overlaid on each other and the population per pixel may define the shape.

For example—only pixels that appear in at least a majority of the overlaid shaped should be regarded as belonging to the region of interest.

Other operations may include smoothing the overlaid shapes, selecting pixels that appear in all overlaid shapes.

The compressed shape information may be ignored of or be taken into account.

Figure 1N:
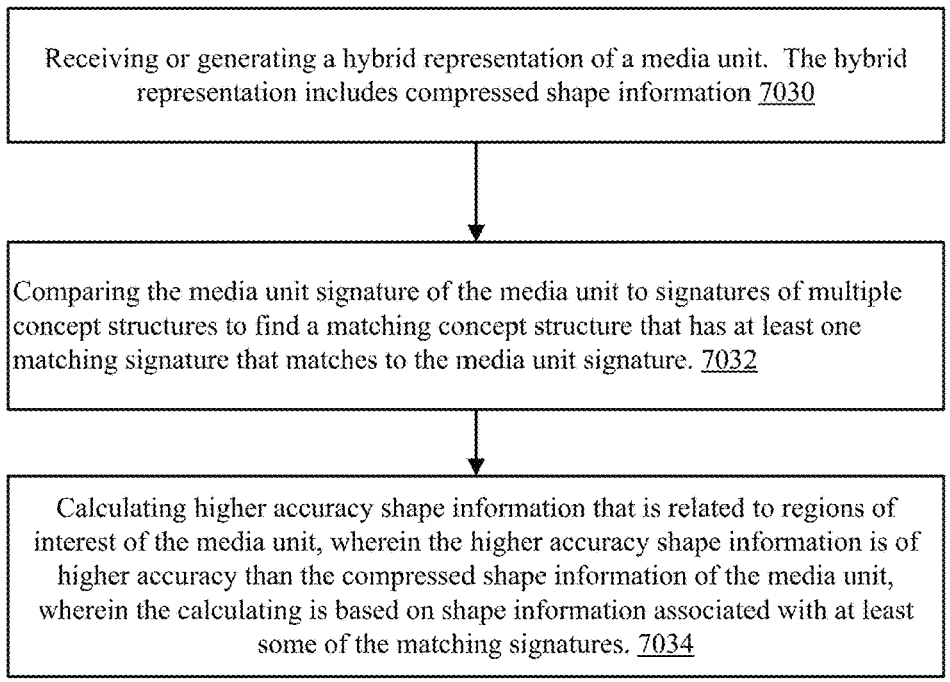
FIG. 1N illustrates an example of a matching process and a generation of a higher accuracy shape information.

FIG. 1N illustrates method 7003 of determining shape information of a region of interest of a media unit.

Method 7003 may include a sequence of steps 7030, 7032 and 7034.

Step 7030 may include receiving or generating a hybrid representation of a media unit. The hybrid representation includes compressed shape information.

Step 7032 may include comparing the media unit signature of the media unit to signatures of multiple concept structures to find a matching concept structure that has at least one matching signature that matches to the media unit signature.

Step 7034 may include calculating higher accuracy shape information that is related to regions of interest of the media unit, wherein the higher accuracy shape information is of higher accuracy than the compressed shape information of the media unit, wherein the calculating is based on shape information associated with at least some of the matching signatures.

Step 7034 may include at least one out of:

Determining shapes of the media unit regions of interest using the higher accuracy shape information.

For each media unit region of interest, virtually overlaying shapes of corresponding media units of interest of at least some of the matching signatures.

FIG. 1O illustrates a matching process and a generation of a higher accuracy shape information.

It is assumed that there are multiple (M) cluster structures 4974(1)-4974(M). Each cluster structure includes cluster signatures, metadata regarding the cluster signatures, and shape information regarding the regions of interest identified by identifiers of the cluster signatures.

For example—first cluster structure 4974(1) includes multiple (N1) signatures (referred to as cluster signatures CS) CS(1,1)-CS(1,N1) 4975(1,1)-4975(1,N1), metadata 4976(1), and shape information (Shapeinfo 4977(1)) regarding shapes of regions of interest associated with identifiers of the CSs.

Yet for another example—M'th cluster structure 4974(M) includes multiple (N2) signatures (referred to as cluster signatures CS) CS(M,1)-CS(M,N2) 4975(M,1)-4975(M, N2), metadata 4976(M), and shape information (Shapeinfo 4977(M)) regarding shapes of regions of interest associated with identifiers of the CSs.

The number of signatures per concept structure may change over time—for example due to cluster reduction attempts during which a CS is removed from the structure to provide a reduced cluster structure, the reduced structure is checked to determine that the reduced cluster signature may still identify objects that were associated with the (non-reduced) cluster signature—and if so the signature may be reduced from the cluster signature.

The signatures of each cluster structures are associated to each other, wherein the association may be based on similarity of signatures and/or based on association between metadata of the signatures.

Assuming that each cluster structure is associated with a unique object—then objects of a media unit may be identified by finding cluster structures that are associated with said objects. The finding of the matching cluster structures may include comparing a signature of the media unit to signatures of the cluster structures—and searching for one or more matching signature out of the cluster signatures.

In FIG. 1O—a media unit having a hybrid representation undergoes object detection. The hybrid representation includes media unit signature 4972 and compressed shape information 4973.

The media unit signature 4972 is compared to the signatures of the M cluster structures—from CS(1,1) 4975(1,1) till CS(M,N2) 4975(M,N2).

We assume that one or more cluster structures are matching cluster structures.

Once the matching cluster structures are found the method proceeds by generating shape information that is of higher accuracy then the compressed shape information.

The generation of the shape information is done per identifier.

For each j that ranges between 1 and J (J is the number of identifiers per the media unit signature 4972) the method may perform the steps of:

Find (step 4978(j)) the shape information of the j'th identifier of each matching signature- or of each signature of the matching cluster structure.

Generate (step 4979(j)) a higher accuracy shape information of the j'th identifier.

For example—assuming that the matching signatures include CS(1,1) 2975(1,1), CS(2,5) 2975(2,5), CS(7,3) 2975(7,3) and CS(15,2) 2975(15,2), and that the j'th identifier is included in CS(1,1) 2975(1,1),CS(7,3) 2975(7,3) and CS(15,2) 2975(15,2)—then the shape information of the j'th identifier of the media unit is determined based on the shape information associated with CS(1,1) 2975(1,1),CS(7,3) 2975(7,3) and CS(15,2) 2975(15,2).

Figure 1P:
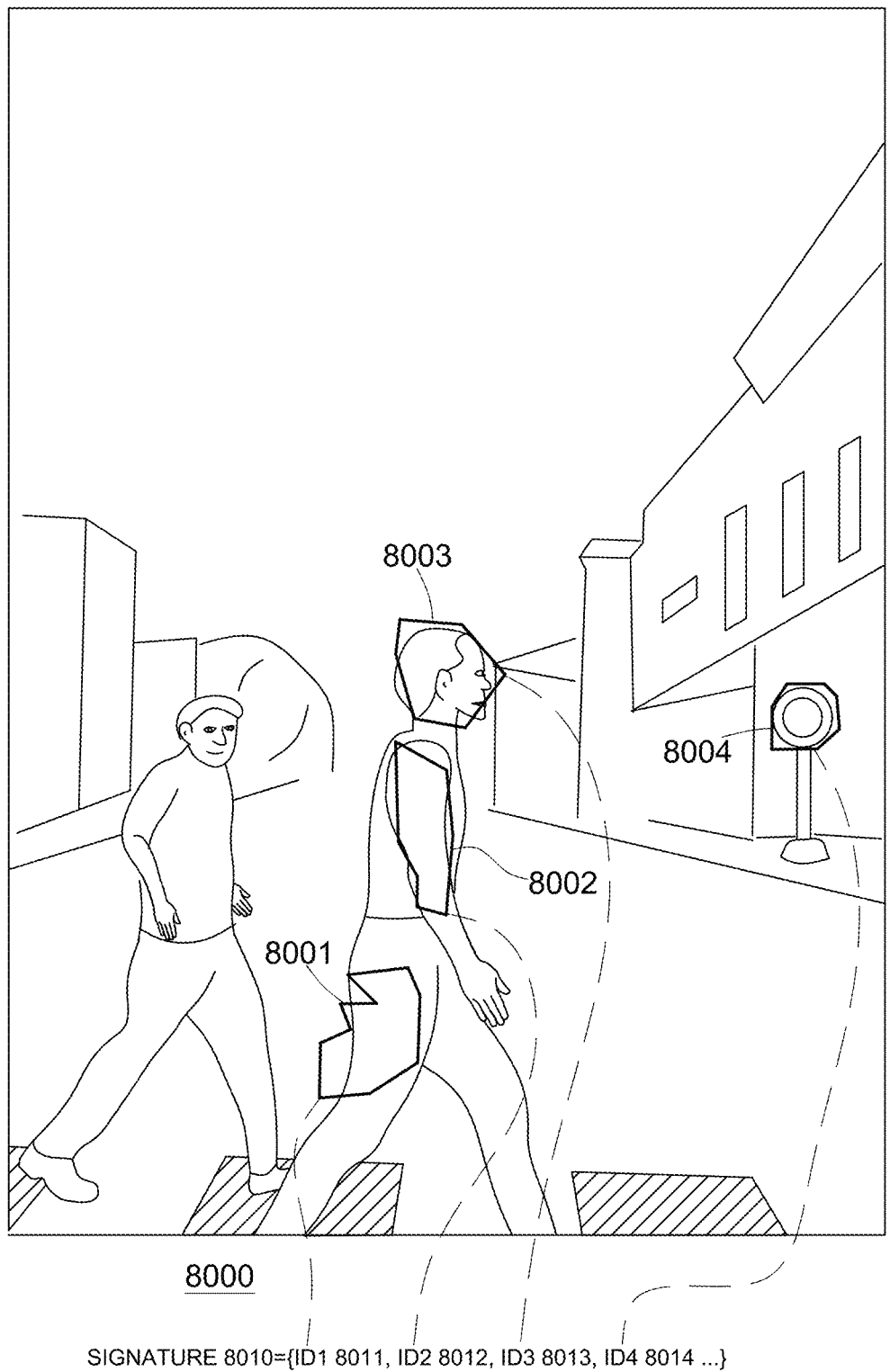
FIG. 1P illustrates an example of an image, approximated regions of interest, compressed shape information and image identifiers.

FIG. 1P illustrates an image 8000 that includes four regions of interest 8001, 8002, 8003 and 8004. The signature 8010 of image 8000 includes various identifiers including ID1 8011, ID2 8012, ID3 8013 and ID4 8014 that identify the four regions of interest 8001, 8002, 8003 and 8004.

The shapes of the four regions of interest 8001, 8002, 8003 and 8004 are four polygons. Accurate shape information regarding the shapes of these regions of interest may be generated during the generation of signature 8010.

Figure 1Q:
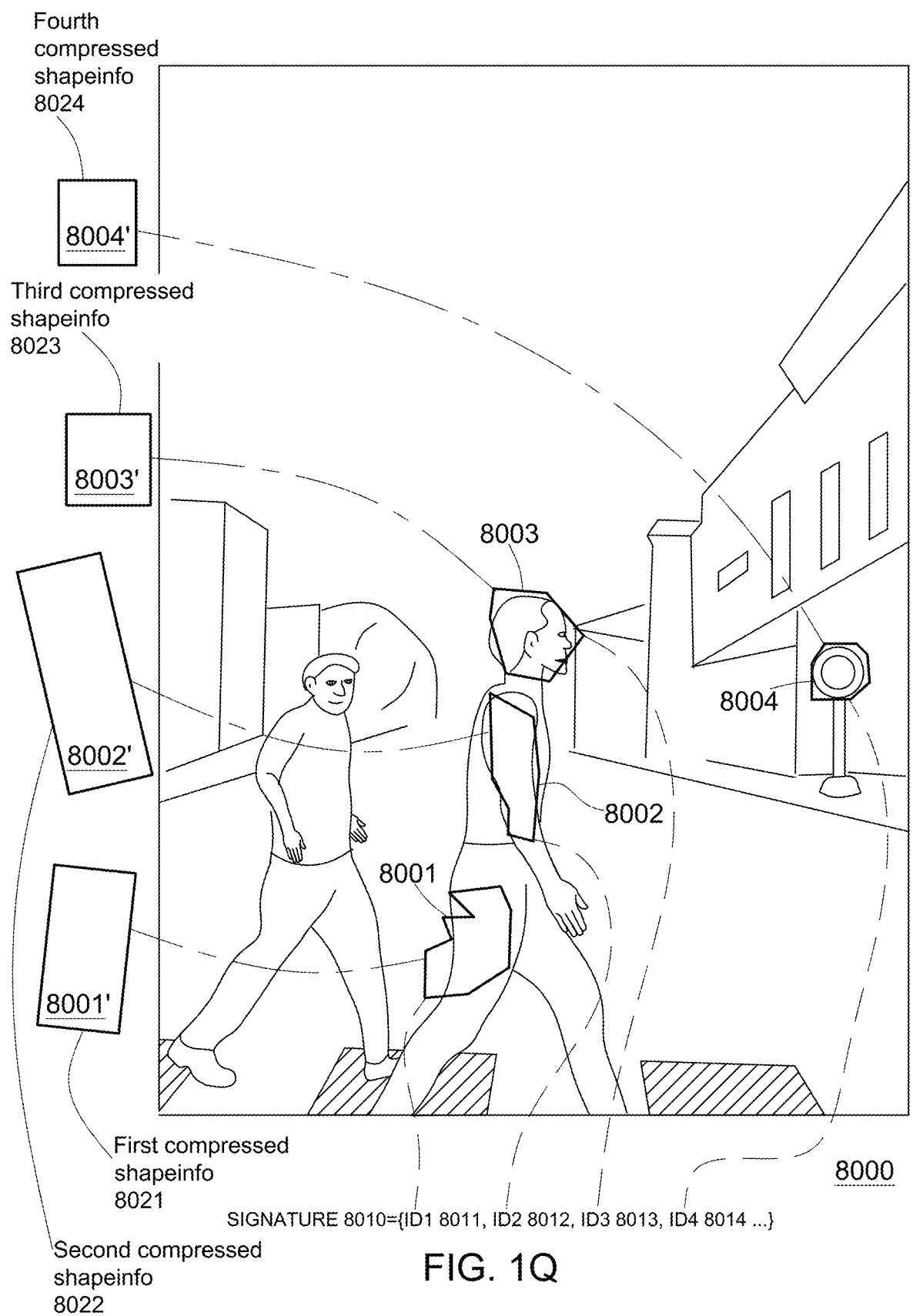
FIG. 1Q illustrates an example of an image, approximated regions of interest, compressed shape information and image identifiers.

FIG. 1Q illustrates the compressing of the shape information to represent a compressed shape information that reflects simpler approximations (8001', 8002', 8003' and 8004') of the regions of interest 8001, 8002, 8003 and 8004. In this example simpler may include less facets, fewer values of angles, and the like.

Figure 1R:
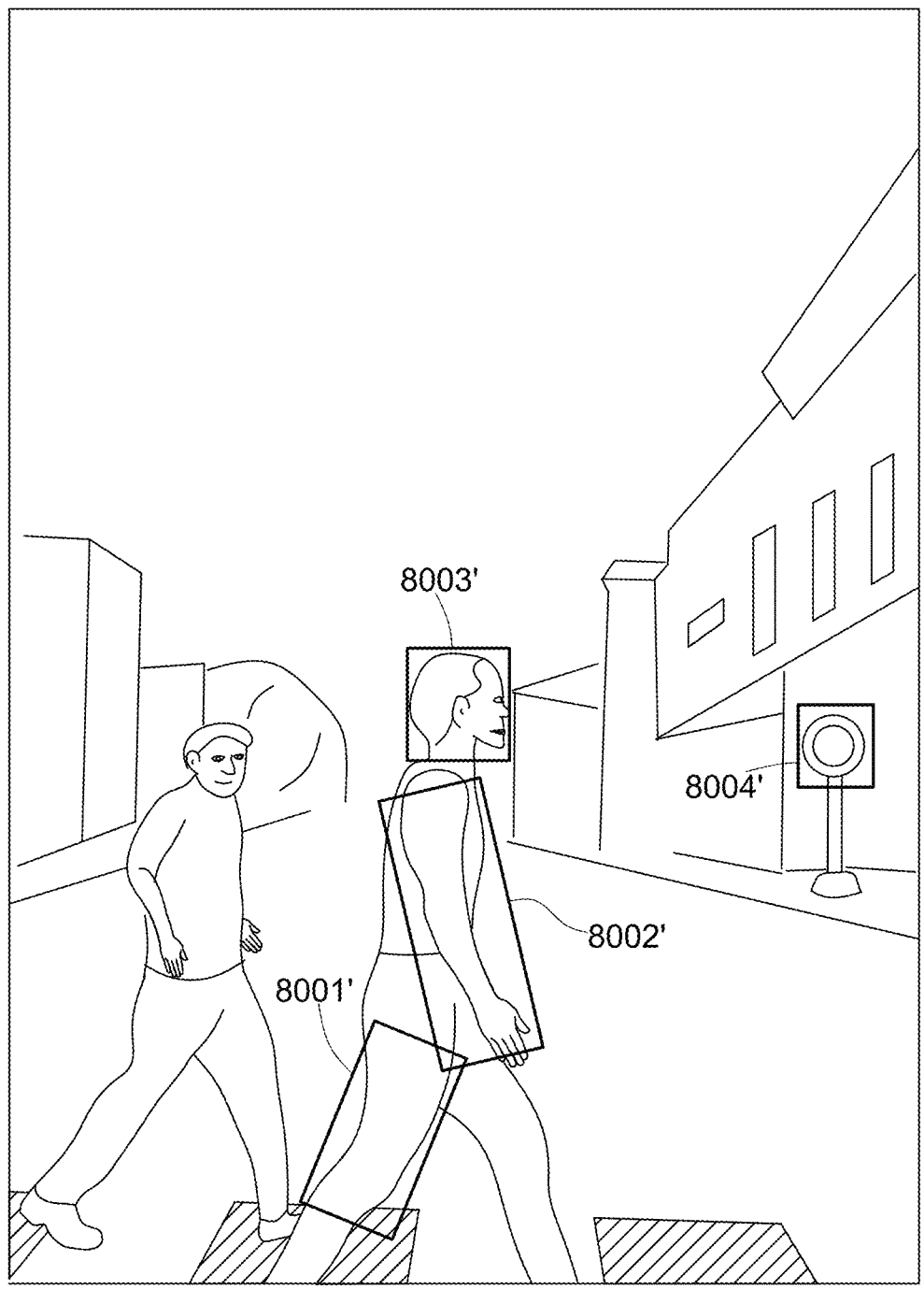
FIG. 1R illustrates an example of an image.

The hybrid representation of the media unit, after compression represent a media unit with simplified regions of interest 8001', 8002', 8003' and 8004'—as shown in FIG. 1R.

Scale Based Bootstrap

Objects may appear in an image at different scales. Scale invariant object detection may improve the reliability and repeatability of the object detection and may also use fewer number of cluster structures—thus reduced memory resources and also lower computational resources required to maintain fewer cluster structures.

Figure 1S:
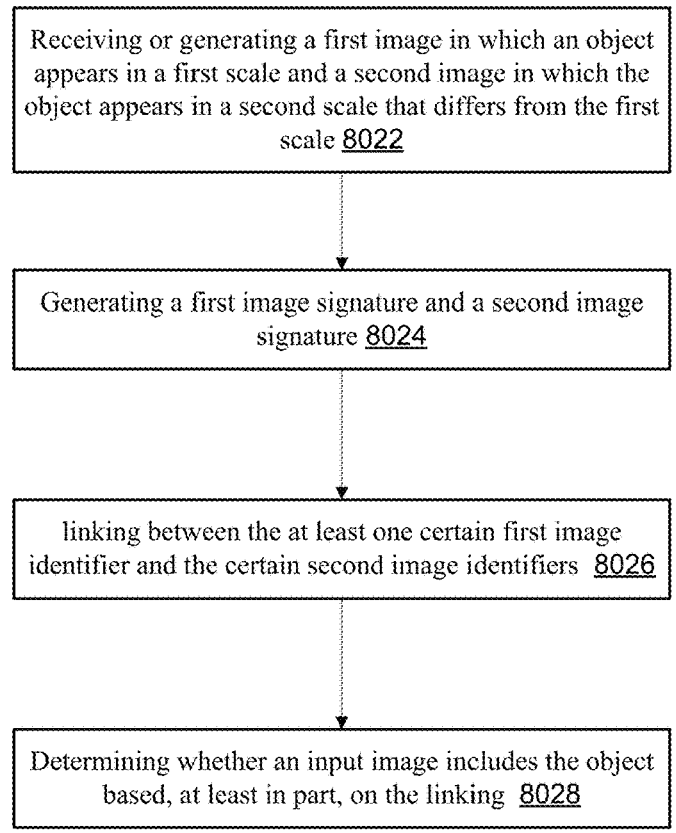
FIG. 1S illustrates an example of a method.

FIG. 1S illustrates method 8020 for scale invariant object detection.

Method 8020 may include a first sequence of steps that may include step 8022, 8024, 8026 and 8028.

Step 8022 may include receiving or generating a first image in which an object appears in a first scale and a second image in which the object appears in a second scale that differs from the first scale.

Step 8024 may include generating a first image signature and a second image signature.

The first image signature includes a first group of at least one certain first image identifier that identifies at least a part of the object. See, for example image 8000' of FIG. 2A. The person is identified by identifiers ID6 8016 and ID8 8018 that represent regions of interest 8006 and 8008.

The second image signature includes a second group of certain second image identifiers that identify different parts of the object.

Figure 19:
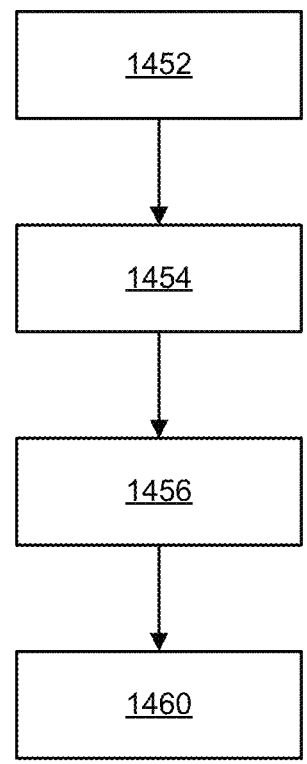
FIG. 19 is an example of a method.

See, for example image 8000 of FIG. 19. The person is identified by identifiers ID1 8011, ID2 8012, ID3 8013, and ID4 8014 that represent regions of interest 8001, 8002, 8003 and 8004.

The second group is larger than first group—as the second group has more members than the first group.

Step 8026 may include linking between the at least one certain first image identifier and the certain second image identifiers.

Step 8026 may include linking between the first image signature, the second image signature and the object.

Step 8026 may include adding the first signature and the second signature to a certain concept structure that is associated with the object. For example, referring to FIG. 1O, the signatures of the first and second images may be included in a cluster concept out of 4974(1)-4974(M).

Step 8028 may include determining whether an input image includes the object based, at least in part, on the linking. The input image differs from the first and second images.

The determining may include determining that the input image includes the object when a signature of the input image includes the at least one certain first image identifier or the certain second image identifiers.

The determining may include determining that the input image includes the object when the signature of the input image includes only a part of the at least one certain first image identifier or only a part of the certain second image identifiers.

The linking may be performed for more than two images in which the object appears in more than two scales.

Figure 2A:
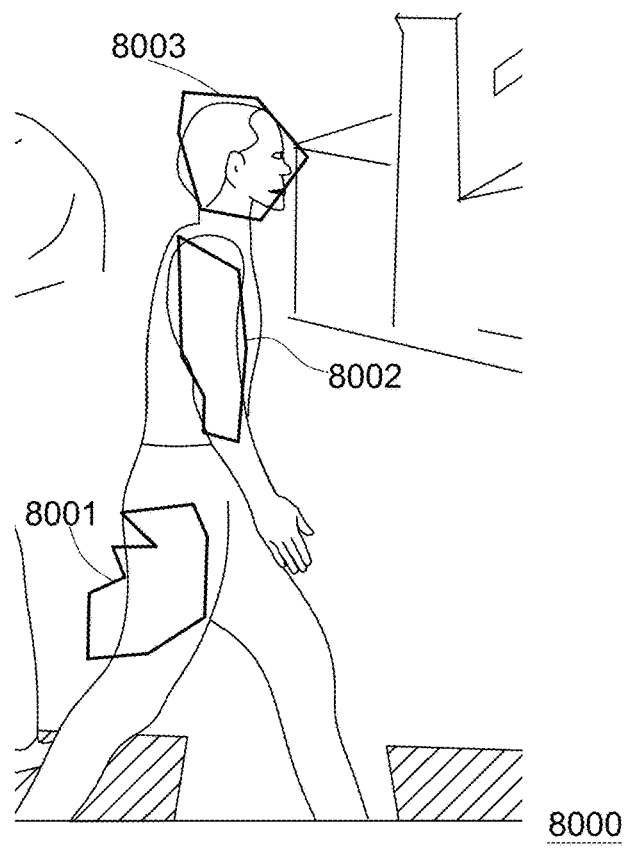
FIG. 2A illustrates an example of images of different scales.
Figure 2A:
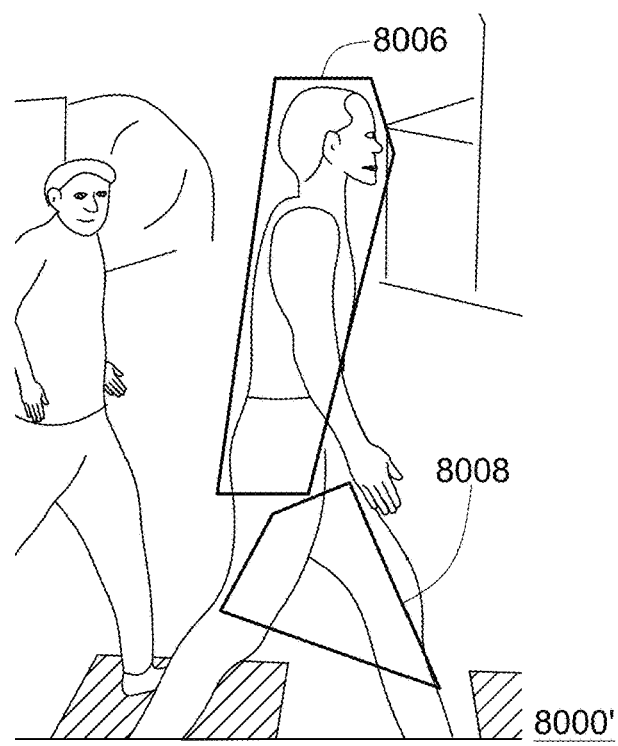
Figure 2B:
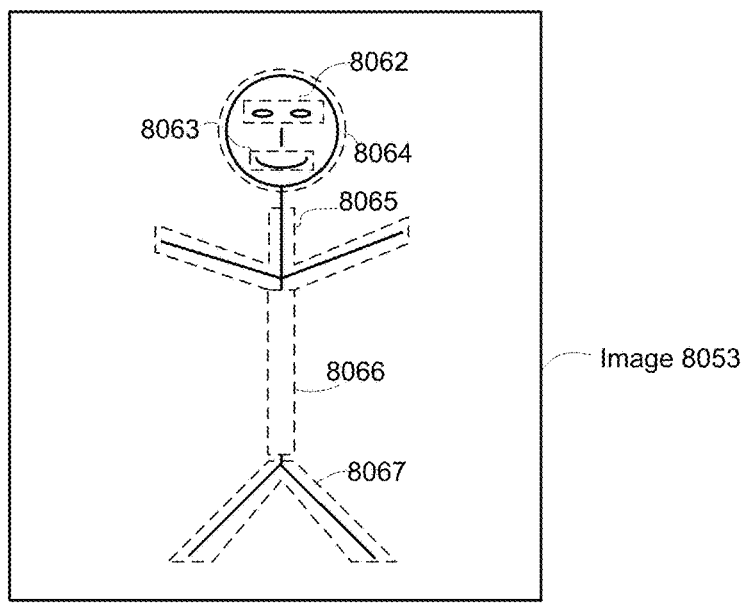
FIG. 2B illustrates an example of images of different scales.
Figure 2B:
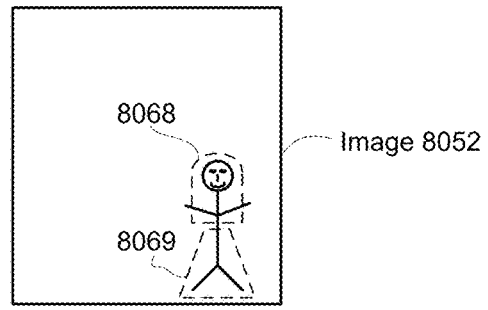
Figure 2B:
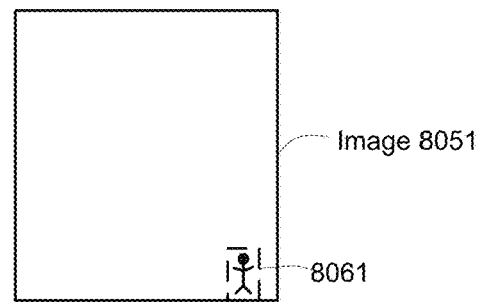

For example, see FIG. 2B in which a person appears at three different scales—at three different images.

In first image 8051 the person is included in a single region of interest 8061 and the signature 8051' of first image 8051 includes an identifier ID61 that identifies the single region of interest—identifies the person.

In second image 8052 the upper part of the person is included in region of interest 8068, the lower part of the person is included in region of interest 8069 and the signature 8052' of second image 8052 includes identifiers ID68 and ID69 that identify regions of interest 8068 and 8069 respectively.

In third image 8053 the eyes of the person are included in region of interest 8062, the mouth of the person is included in region of interest 8063, the head of the person appears in region of interest 8064, the neck and arms of the person appear in region of interest 8065, the middle part of the person appears in region of interest 8066, and the lower part of the person appears in region of interest 8067. Signature 8053' of third image 8053 includes identifiers ID62, ID63, ID64, ID65, ID55 and ID67 that identify regions of interest 8062-8067 respectively.

Method 8020 may link signatures 8051', 8052' and 8053' to each other. For example—these signatures may be included in the same cluster structure.

Method 8020 may link (i) ID61, (ii) signatures ID68 and ID69, and (ii) signature ID62, ID63, ID64, ID65, ID66 and ID67.

Figure 2C:
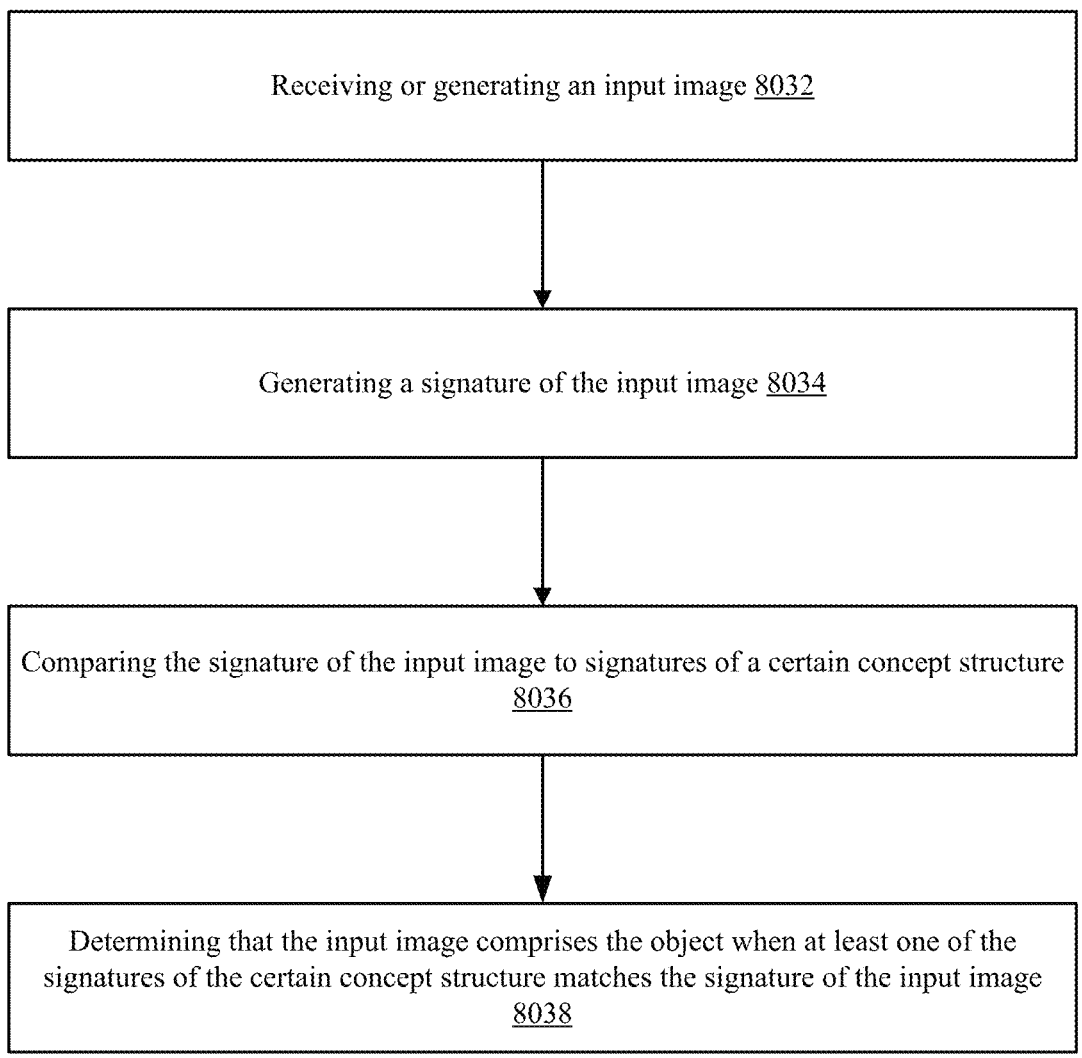
FIG. 2C illustrates an example of a method.

FIG. 2C illustrates method 8030 for object detection.

Method 8030 may include the steps of method 8020 or may be preceded by steps 8022, 8024 and 8026.

Method 8030 may include a sequence of steps 8032, 8034, 8036 and 8038.

Step 8032 may include receiving or generating an input image.

Step 8034 may include generating a signature of the input image.

Step 8036 may include comparing the signature of the input image to signatures of a certain concept structure. The certain concept structure may be generated by method 8020.

Step 8038 may include determining that the input image comprises the object when at least one of the signatures of the certain concept structure matches the signature of the input image.

Figure 2D:
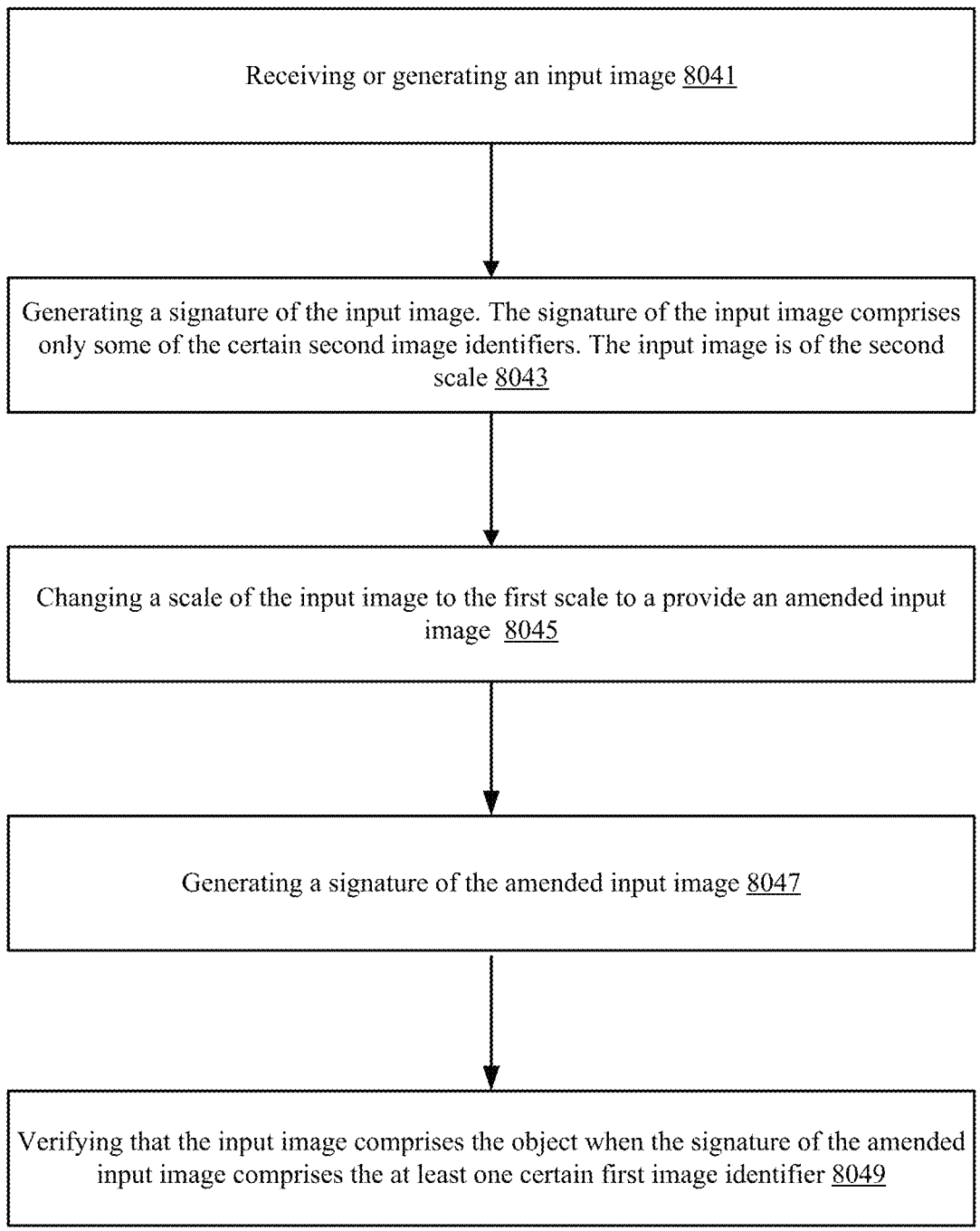
FIG. 2D illustrates an example of a method.

FIG. 2D illustrates method 8040 for object detection.

Method 8040 may include the steps of method 8020 or may be preceded by steps 8022, 8024 and 8026.

Method 8040 may include a sequence of steps 8041, 8043, 8045, 8047 and 8049.

Step 8041 may include receiving or generating an input image.

Step 8043 may include generating a signature of the input image, the signature of the input image comprises only some of the certain second image identifiers; wherein the input image of the second scale.

Step 8045 may include changing a scale of the input image to the first scale to a provide an amended input image.

Step 8047 may include generating a signature of the amended input image.

Step 8049 may include verifying that the input image comprises the object when the signature of the amended input image comprises the at least one certain first image identifier.

Figure 2E:
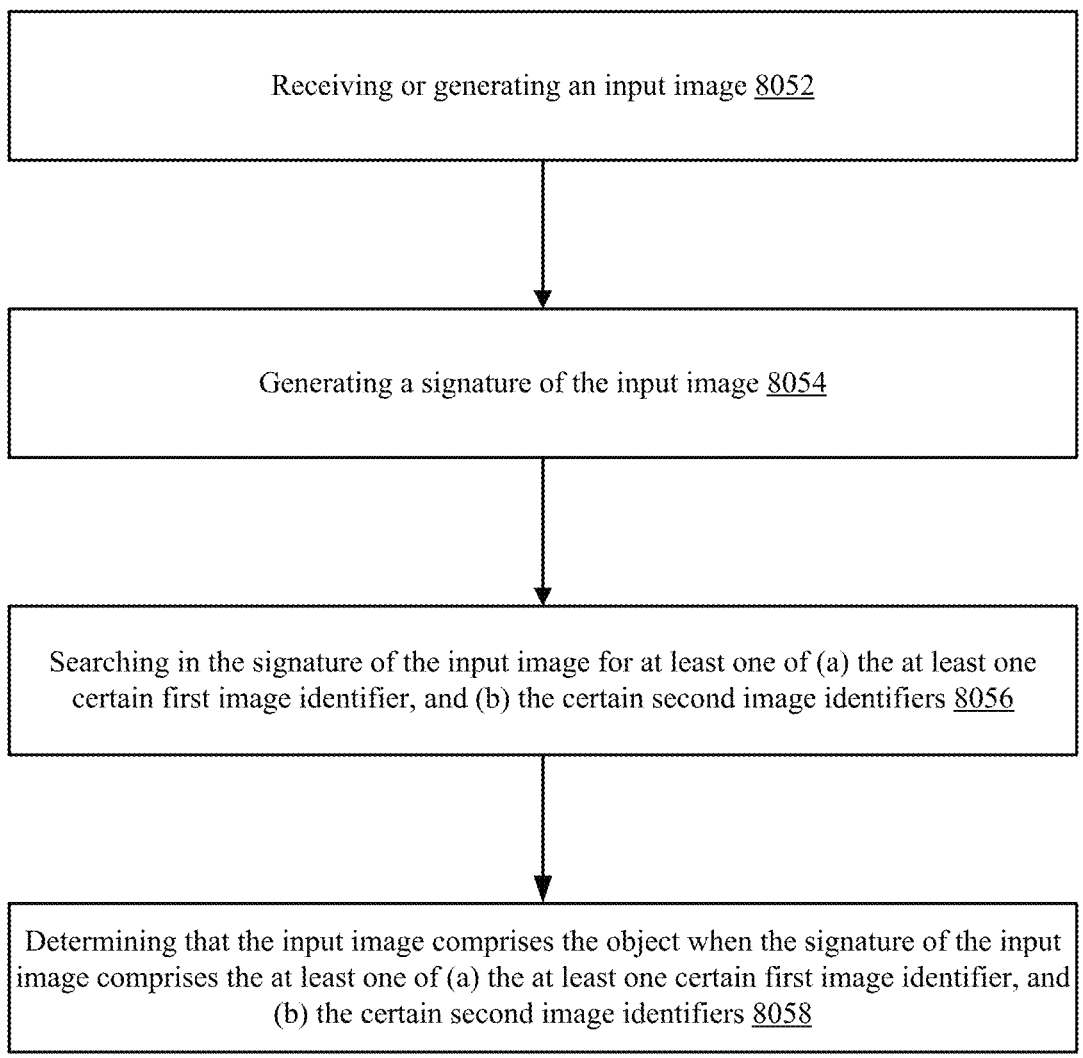
FIG. 2E illustrates an example of a method.

FIG. 2E illustrates method 8050 for object detection.

Method 8050 may include the steps of method 8020 or may be preceded by steps 8022, 8024 and 8026.

Method 8050 may include a sequence of steps 8052, 8054, 8056 and 8058.

Step 8052 may include receiving or generating an input image.

Step 8054 may include generating a signature of the input image.

Step 8056 may include searching in the signature of the input image for at least one of (a) the at least one certain first image identifier, and (b) the certain second image identifiers.

Step 8058 may include determining that the input image comprises the object when the signature of the input image comprises the at least one of (a) the at least one certain first image identifier, and (b) the certain second image identifiers.

It should be noted that step 8056 may include searching in the signature of the input image for at least one of (a) one or more certain first image identifier of the at least one certain first image identifier, and (b) at least one certain second image identifier of the certain second image identifiers.

It should be noted that step 8058 may include determining that the input image includes the object when the signature of the input image comprises the at least one of (a) one or more certain first image identifier of the at least one certain first image identifier, and (b) the at least one certain second image identifier.

Movement Based Bootstrapping

A single object may include multiple parts that are identified by different identifiers of a signature of the image. In cases such as unsupervised learning, it may be beneficial to link the multiple object parts to each other without receiving prior knowledge regarding their inclusion in the object.

Additionally or alternatively, the linking can be done in order to verify a previous linking between the multiple object parts.

Figure 2F:
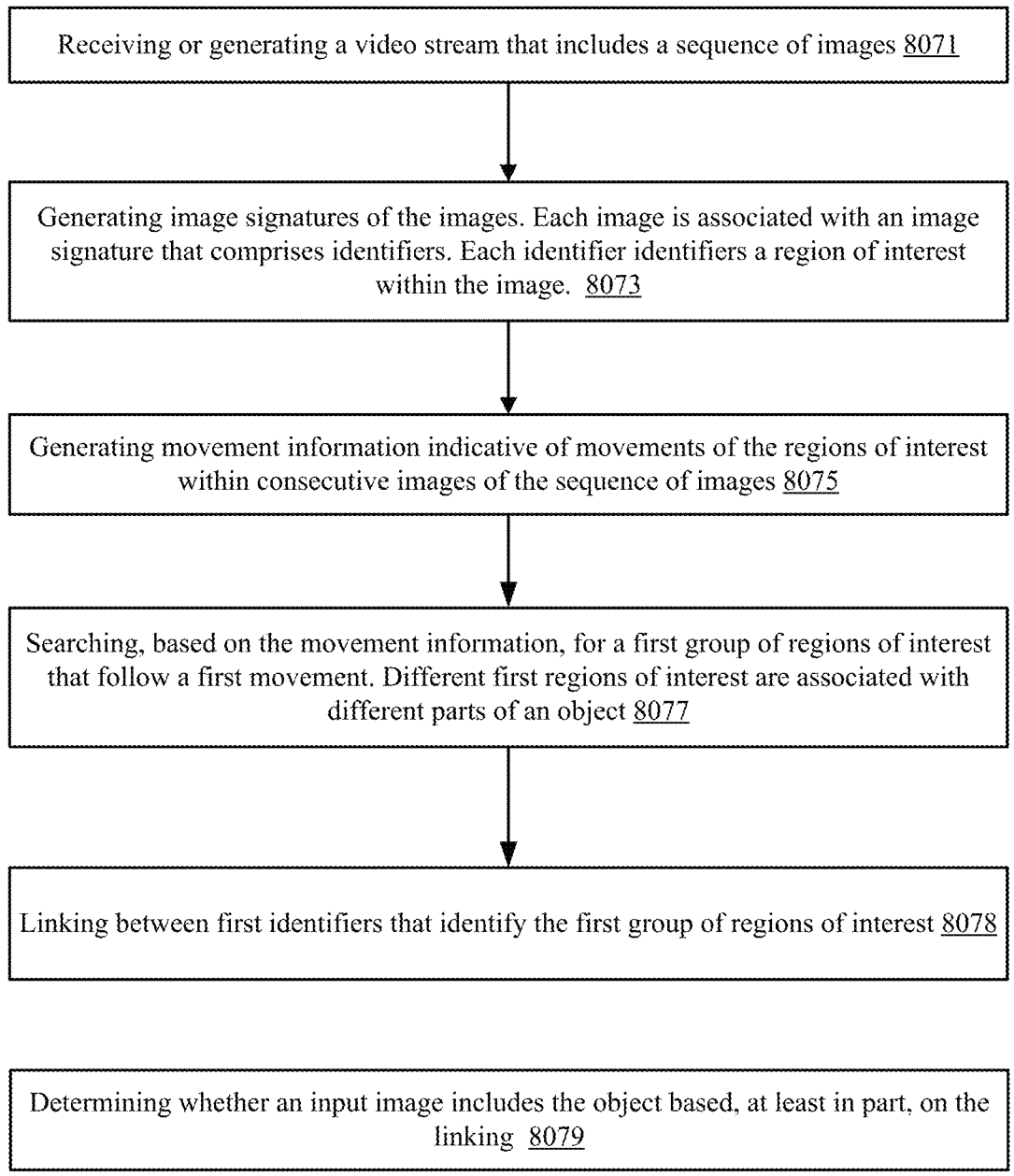
FIG. 2F illustrates an example of a method.

FIG. 2F illustrates method 8070 for object detection.

Method 8070 is for movement based object detection.

Method 8070 may include a sequence of steps 8071, 8073, 8075, 8077, 8078 and 8079.

Step 8071 may include receiving or generating a video stream that includes a sequence of images.

Step 8073 may include generating image signatures of the images. Each image is associated with an image signature that comprises identifiers. Each identifier identifiers a region of interest within the image.

Step 8075 may include generating movement information indicative of movements of the regions of interest within consecutive images of the sequence of images. Step 8075 may be preceded by or may include generating or receiving location information indicative of a location of each region of interest within each image. The generating of the movement information is based on the location information.

Step 8077 may include searching, based on the movement information, for a first group of regions of interest that follow a first movement. Different first regions of interest are associated with different parts of an object.

Step 8078 may include linking between first identifiers that identify the first group of regions of interest.

Step 8079 may include linking between first image signatures that include the first linked identifiers.

Step 8079 may include adding the first image signatures to a first concept structure, the first concept structure is associated with the first image.

Figure 2G:
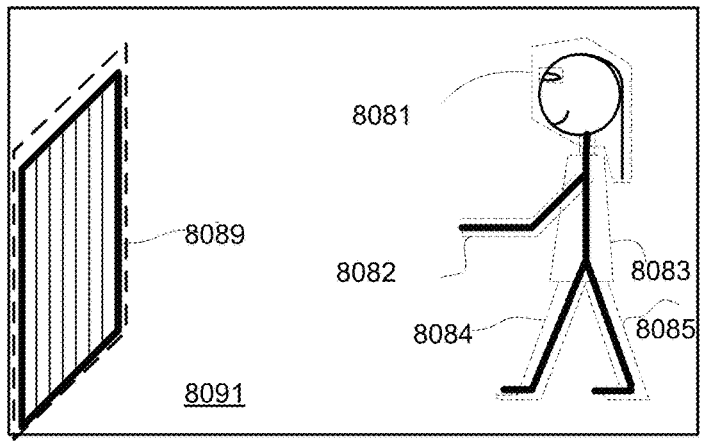
FIG. 2G illustrates an example of different images.
Figure 2G:
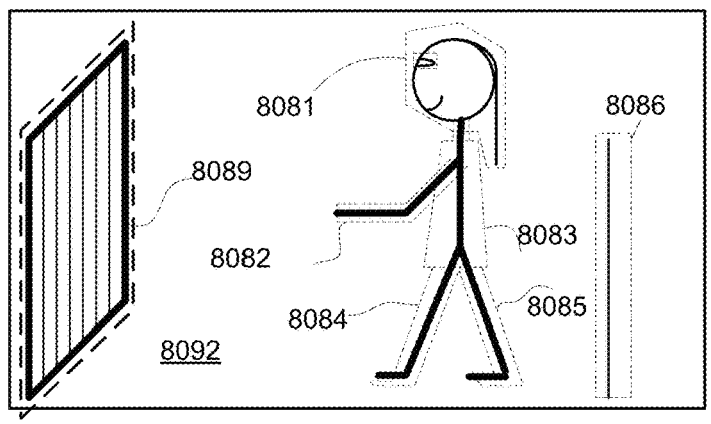
Figure 2G:
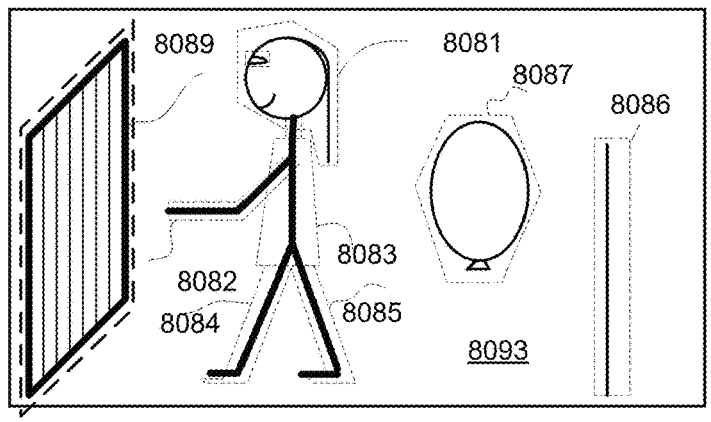
Figure 2H:
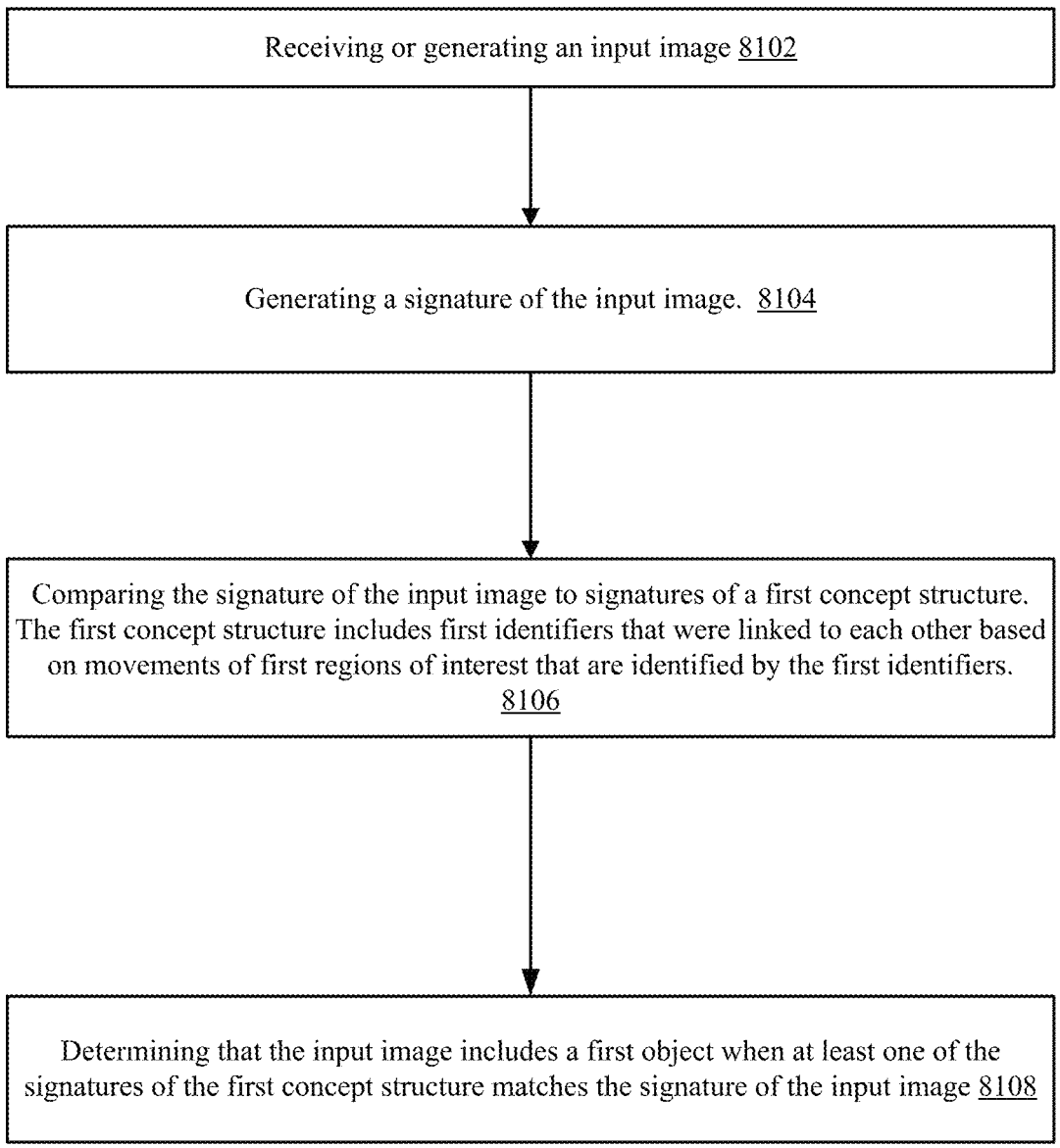
FIG. 2H illustrates an example of a method.

Step 8079 may be followed by determining whether an input image includes the object based, at least in part, on the linking An example of various steps of method 8070 is illustrated in FIG. 2H.

FIG. 2G illustrates three images 8091, 8092 and 8093 that were taken at different points in time.

First image 8091 illustrates a gate 8089' that is located in region of interest 8089 and a person that faces the gate. Various parts of the person are located within regions of interest 8081, 8082, 8083, 8084 and 8085.

The first image signature 8091' includes identifiers ID81, ID82, ID83, ID84, ID85 and ID89 that identify regions of interest 8081, 8082, 8083, 8084, 8085 and 8089 respectively.

The first image location information 8091" includes the locations L81, L82, L83, L84, L85 and L89 of regions of interest 8081, 8082, 8083, 8084, 8085 and 8089 respectively. A location of a region of interest may include a location of the center of the region of interest, the location of the borders of the region of interest or any location information that may define the location of the region of interest or a part of the region of interest.

Second image 8092 illustrates a gate that is located in region of interest 8089 and a person that faces the gate. Various parts of the person are located within regions of interest 8081, 8082, 8083, 8084 and 8085. Second image also includes a pole that is located within region of interest 8086. In the first image that the pole was concealed by the person.

The second image signature 8092' includes identifiers ID81, ID82, ID83, ID84, ID85, ID86, and ID89 that identify regions of interest 8081, 8082, 8083, 8084, 8085, 8086 and 8089 respectively.

The second image location information 8092" includes the locations L81, L82, L83, L84, L85, L86 and L89 of regions of interest 8081, 8082, 8083, 8084, 8085, 8086 and 8089 respectively.

Third image 8093 illustrates a gate that is located in region of interest 8089 and a person that faces the gate. Various parts of the person are located within regions of interest 8081, 8082, 8083, 8084 and 8085. Third image also includes a pole that is located within region of interest 8086, and a balloon that is located within region of interest 8087.

The third image signature 8093' includes identifiers ID81, ID82, ID83, ID84, ID85, ID86, ID87 and ID89 that identify regions of interest 8081, 8082, 8083, 8084, 8085, 8086, 8087 and 8089 respectively.

The third image location information 8093" includes the locations L81, L82, L83, L84, L85, L86, L87 and L89 of regions of interest 8081, 8082, 8083, 8084, 8085, 8086, 8086 and 8089 respectively.

The motion of the various regions of interest may be calculated by comparing the location information related to different images. The movement information may take into account the different in the acquisition time of the images.

The comparison shows that regions of interest 8081, 8082, 8083, 8084, 8085 move together and thus they should be linked to each other—and it may be assumed that they all belong to the same object.

FIG. 2H illustrates method 8100 for object detection.

Method 8100 may include the steps of method 8070 or may be preceded by steps 8071, 8073, 8075, 8077 and 8078.

Method 8100 may include the following sequence of steps:

Step 8102 of receiving or generating an input image.

Step 8104 of generating a signature of the input image.

Step 8106 of comparing the signature of the input image to signatures of a first concept structure. The first concept structure includes first identifiers that were linked to each other based on movements of first regions of interest that are identified by the first identifiers.

Step 8108 of determining that the input image includes a first object when at least one of the signatures of the first concept structure matches the signature of the input image.

FIG. 2I illustrates method 8110 for object detection.

Method 8110 may include the steps of method 8070 or may be preceded by steps 8071, 8073, 8075, 8077 and 8078.

Method 8110 may include the following sequence of steps:

Step 8112 of receiving or generating an input image.

Step 8114 of generating a signature of the input image.

Step 8116 of searching in the signature of the input image for at least one of the first identifiers.

Step 8118 of determining that the input image comprises the object when the signature of the input image comprises at least one of the first identifiers.

Object Detection that is Robust to Angle of Acquisition

Object detection may benefit from being robust to the angle of acquisition—to the angle between the optical axis of an image sensor and a certain part of the object. This allows the detection process to be more reliable, use fewer different clusters (may not require multiple clusters for identifying the same object from different images).

Figure 2J:
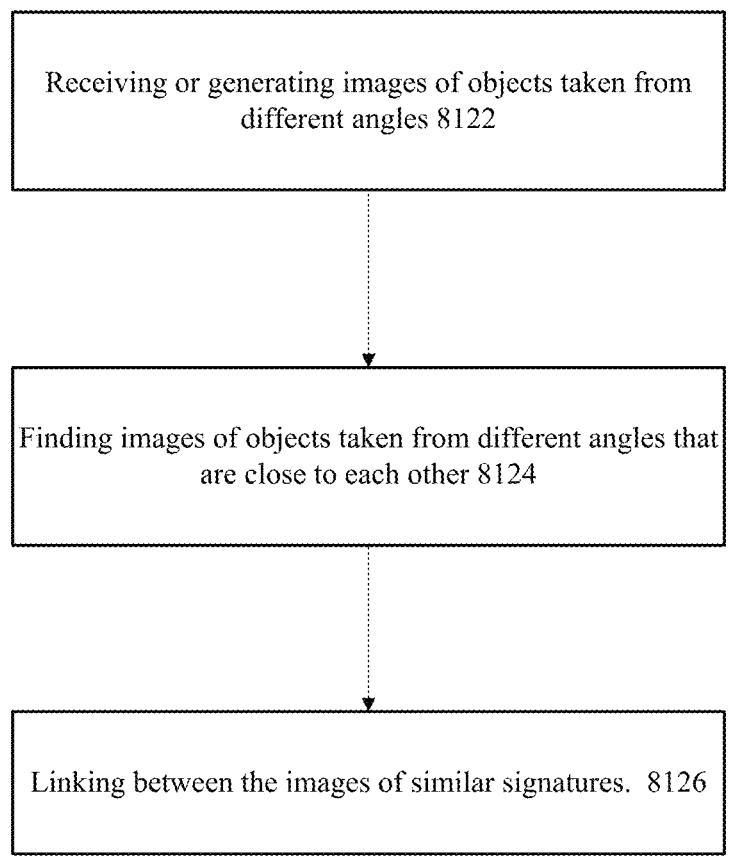
FIG. 2J illustrates an example of a method.

FIG. 2J illustrates method 8120 that includes the following steps:

Step 8122 of receiving or generating images of objects taken from different angles.

Step 8124 of finding images of objects taken from different angles that are close to each other. Close enough may be less than 1, 5, 10, 15 and 20 degrees—but the closeness may be better reflected by the reception of substantially the same signature.

Step 8126 of linking between the images of similar signatures. This may include searching for local similarities. The similarities are local in the sense that they are calculated per a subset of signatures. For example—assuming that the similarity is determined per two images—then a first signature may be linked to a second signature that is similar to the first image. A third signature may be linked to the second image based on the similarity between the second and third signatures—and even regardless of the relationship between the first and third signatures.

Step 8126 may include generating a concept data structure that includes the similar signatures.

This so-called local or sliding window approach, in addition to the acquisition of enough images (that will statistically provide a large angular coverage) will enable to generate a concept structure that include signatures of an object taken at multiple directions.

Figure 2K:
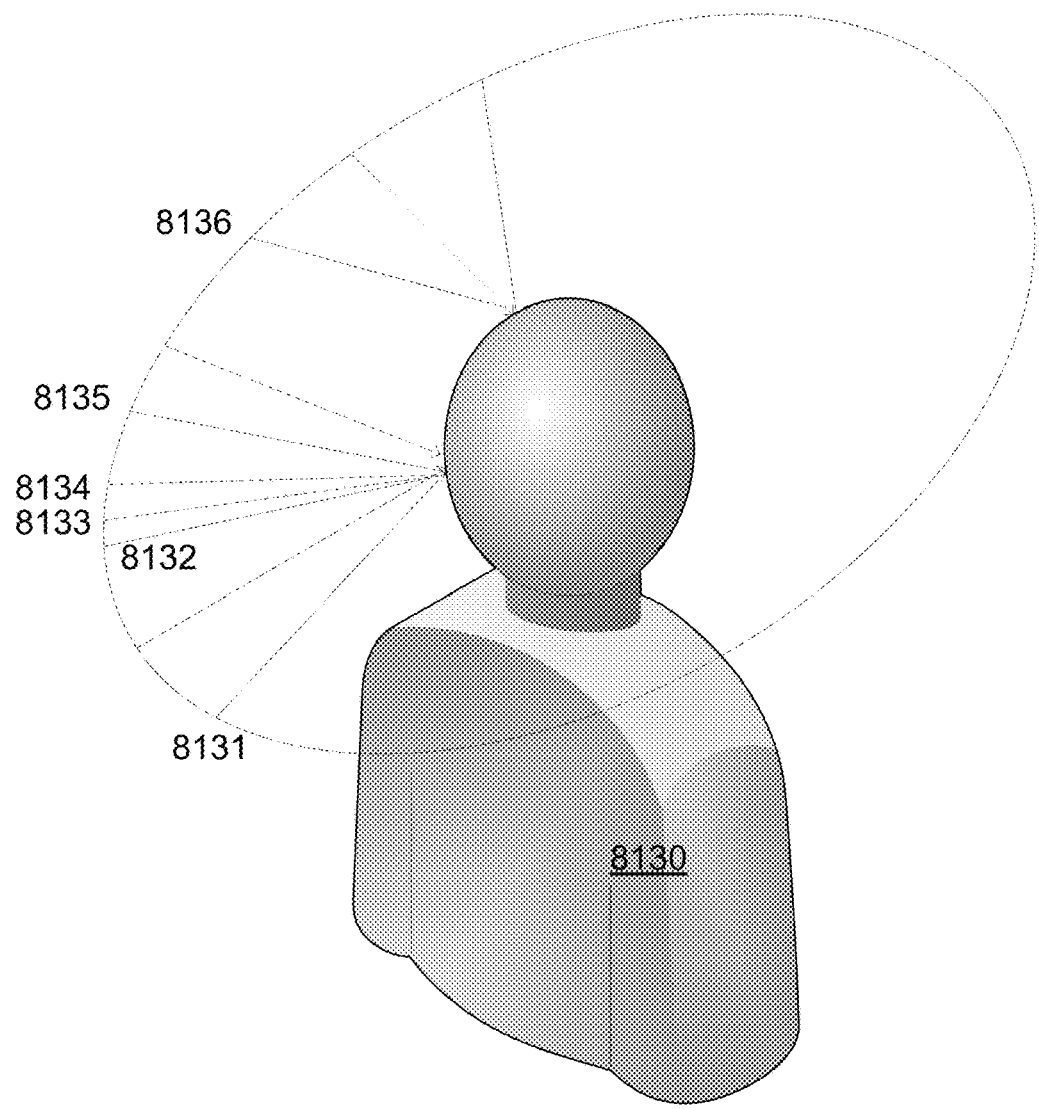
FIG. 2K illustrates an example of different images acquisition angles.

FIG. 2K illustrates a person 8130 that is imaged from different angles (8131, 8132, 8133, 8134, 8135 and 8136). While the signature of a front view of the person (obtained from angle 8131) differs from the signature of the side view of the person (obtained from angle 8136), the signature of images taken from multiple angles between angles 8141 and 8136 compensates for the difference—as the difference between images obtained from close angles are similar (local similarity) to each other.

Signature Tailored Matching Threshold

Object detection may be implemented by (a) receiving or generating concept structures that include signatures of media units and related metadata, (b) receiving a new media unit, generating a new media unit signature, and (c) comparing the new media unit signature to the concept signatures of the concept structures.

The comparison may include comparing new media unit signature identifiers (identifiers of objects that appear in the new media unit) to concept signature identifiers and determining, based on a signature matching criteria whether the new media unit signature matches a concept signature. If such a match is found then the new media unit is regarded as including the object associated with that concept structure.

It was found that by applying an adjustable signature matching criteria, the matching process may be highly effective and may adapt itself to the statistics of appearance of identifiers in different scenarios. For example—a match may be obtained when a relatively rear but highly distinguishing identifier appears in the new media unit signature and in a cluster signature, but a mismatch may be declared when multiple common and slightly distinguishing identifiers appear in the new media unit signature and in a cluster signature.

Figure 2L:
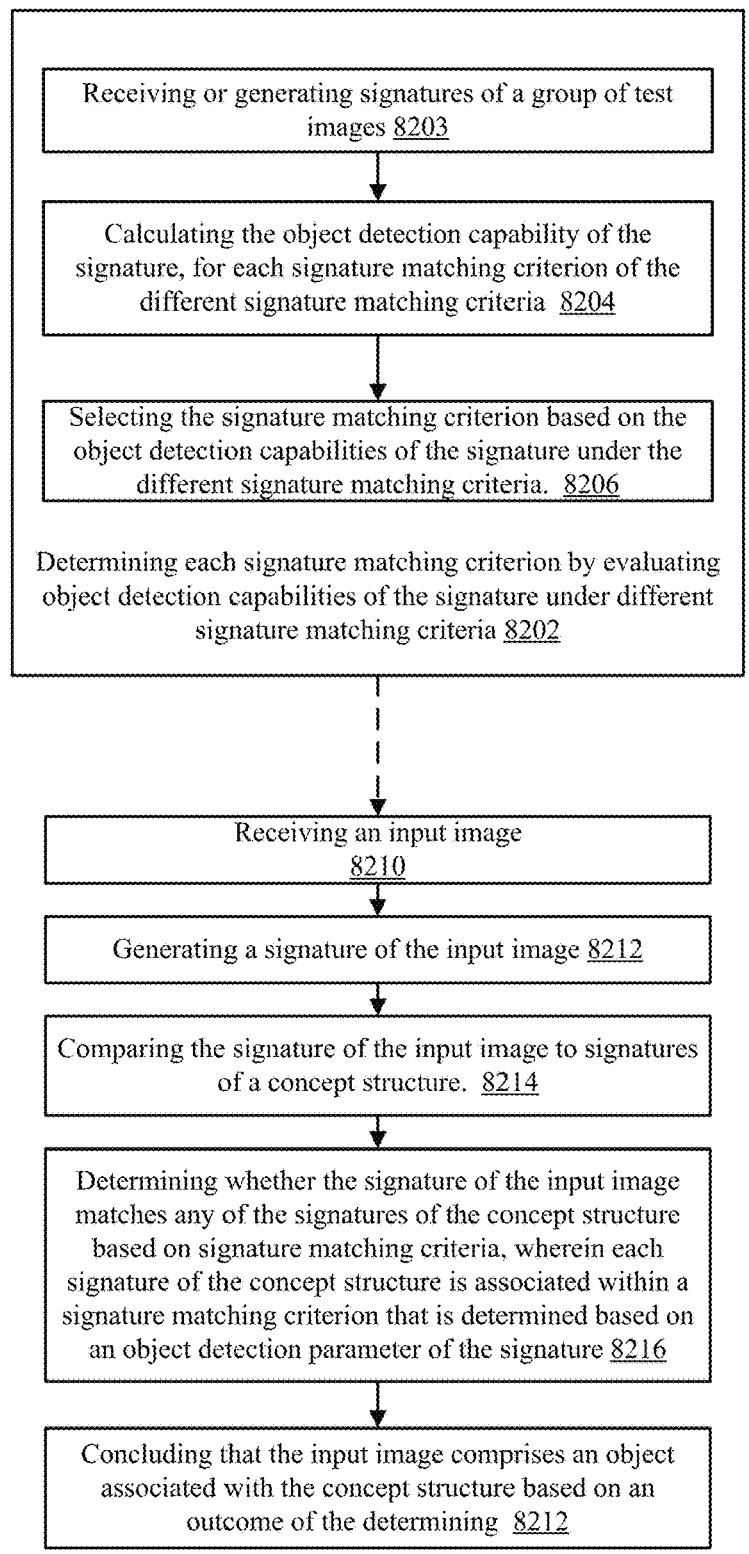
FIG. 2L illustrates an example of a method.

FIG. 2L illustrates method 8200 for object detection.

Method 8200 may include:

Step 8210 of receiving an input image.

Step 8212 of generating a signature of the input image.

Step 8214 of comparing the signature of the input image to signatures of a concept structure.

Step 8216 of determining whether the signature of the input image matches any of the signatures of the concept structure based on signature matching criteria, wherein each signature of the concept structure is associated within a signature matching criterion that is determined based on an object detection parameter of the signature.

Step 8218 of concluding that the input image comprises an object associated with the concept structure based on an outcome of the determining.

The signature matching criteria may be a minimal number of matching identifiers that indicate of a match. For example—assuming a signature that include few tens of identifiers, the minimal number may vary between a single identifier to all of the identifiers of the signature.

It should be noted that an input image may include multiple objects and that a signature of the input image may match multiple cluster structures. Method 8200 is applicable to all of the matching processes—and that the signature matching criteria may be set for each signature of each cluster structure.

Step 8210 may be preceded by step 8202 of determining each signature matching criterion by evaluating object detection capabilities of the signature under different signature matching criteria.

Step 8202 may include:

Step 8203 of receiving or generating signatures of a group of test images.

Step 8204 of calculating the object detection capability of the signature, for each signature matching criterion of the different signature matching criteria.

Step 8206 of selecting the signature matching criterion based on the object detection capabilities of the signature under the different signature matching criteria.

The object detection capability may reflect a percent of signatures of the group of test images that match the signature.

The selecting of the signature matching criterion comprises selecting the signature matching criterion that once applied results in a percent of signatures of the group of test images that match the signature that is closets to a predefined desired percent of signatures of the group of test images that match the signature.

The object detection capability may reflect a significant change in the percent of signatures of the group of test images that match the signature. For example—assuming, that the signature matching criteria is a minimal number of matching identifiers and that changing the value of the minimal numbers may change the percentage of matching test images. A substantial change in the percentage (for example a change of more than 10, 20, 30, 40 percent) may be indicative of the desired value. The desired value may be set before the substantial change, proximate to the substantial change, and the like.

For example, referring to FIG. 1O, cluster signatures CS(1,1), CS(2,5), CS(7,3) and CS(15,2) match unit signature 4972. Each of these matches may apply a unique signature matching criterion.

Figure 2M:
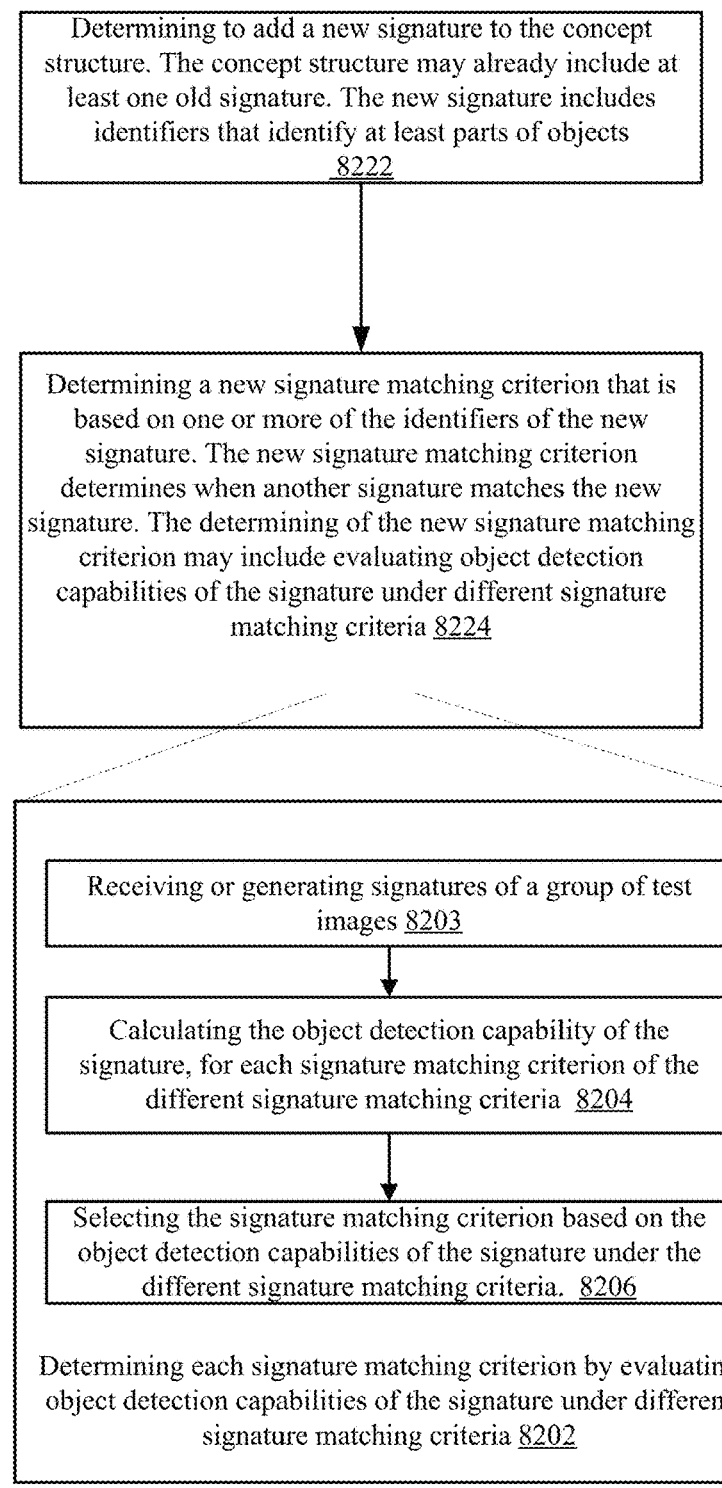
FIG. 2M illustrates an example of a method.

FIG. 2M illustrates method 8220 for object detection.

Method 8220 is for managing a concept structure.

Method 8220 may include:

Step 8222 of determining to add a new signature to the concept structure. The concept structure may already include at least one old signature. The new signature includes identifiers that identify at least parts of objects.

Step 8224 of determining a new signature matching criterion that is based on one or more of the identifiers of the new signature. The new signature matching criterion determines when another signature matches the new signature. The determining of the new signature matching criterion may include evaluating object detection capabilities of the signature under different signature matching criteria.

Step 8224 may include steps 8203, 8204 and 8206 (include din step 8206) of method 8200.

Examples of Systems

Figure 2N:
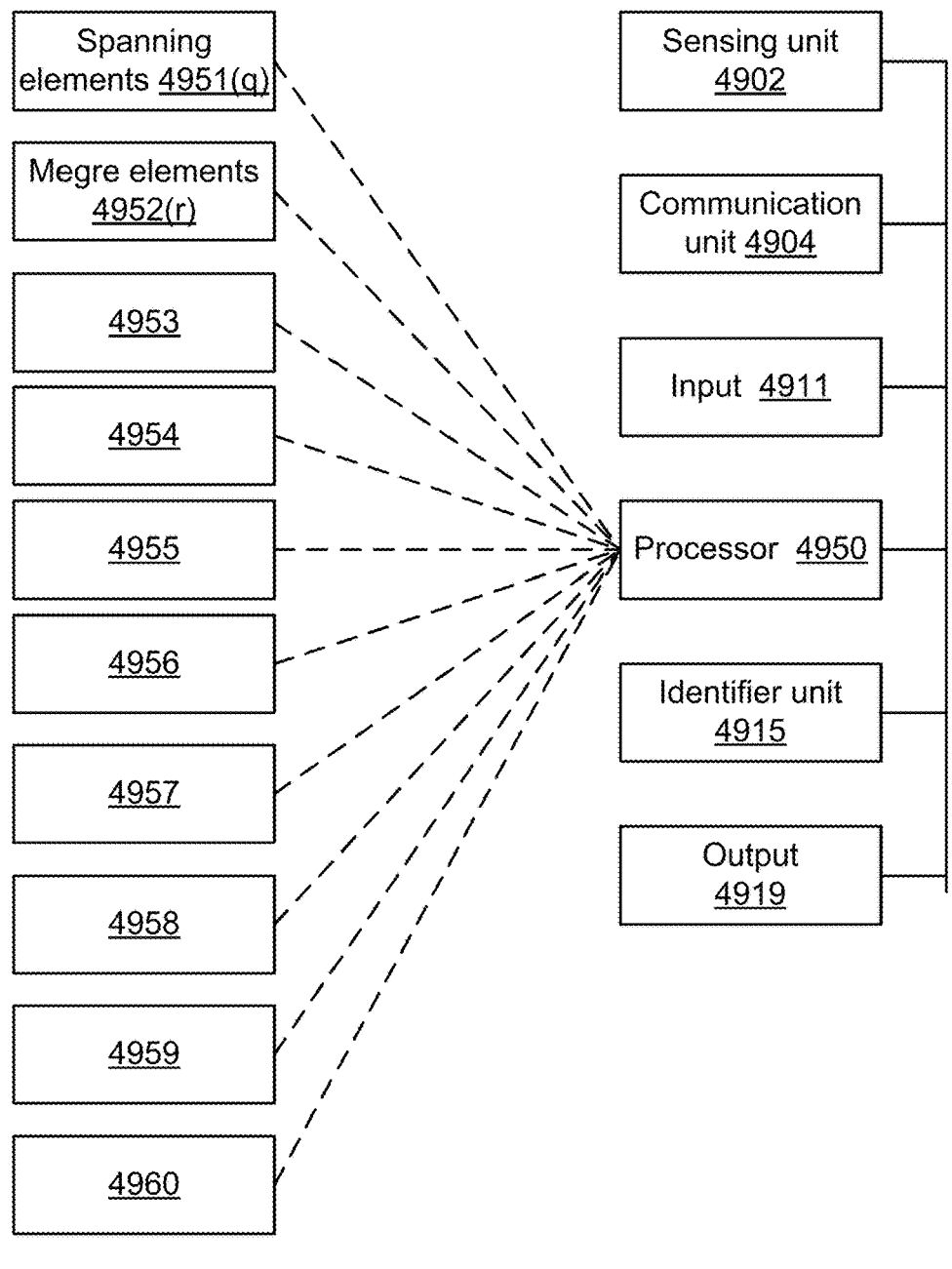
FIG. 2N illustrates an example of a system.

FIG. 2N illustrates an example of a system capable of executing one or more of the mentioned above methods.

The system include various components, elements and/or units.

A component element and/or unit may be a processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Alternatively, each component element and/or unit may be implemented in hardware, firmware, or software that may be executed by a processing circuitry.

System 4900 may include sensing unit 4902, communication unit 4904, input 4911, processor 4950, and output 4919. The communication unit 4904 may include the input and/or the output.

Input and/or output may be any suitable communications component such as a network interface card, universal serial bus (USB) port, disk reader, modem or transceiver that may be operative to use protocols such as are known in the art to communicate either directly, or indirectly, with other elements of the system.

Processor 4950 may include at least some out of

Multiple spanning elements 4951(*q*).

Multiple merge elements 4952(*r*).

Object detector 4953.

Cluster manager 4954.

Controller 4955.

Selection unit 4956.

Object detection determination unit 4957.

Signature generator 4958.

Movement information unit 4959.

Identifier unit 4960.

Obstacle Avoidance

It will be appreciated that in "normal", non-assisted driving scenarios, a driver may encounter driving obstacles that are not necessarily indicated in commonly available roadmaps. For example, it is not uncommon for a roadway to have potholes that may complicate the driving process. Some potholes are large enough to cause damage to the wheels or undercarriage of the vehicle. Accordingly, when encountering a pothole, the driver may swerve to avoid it. However, depending on the layout of the roadway and/or traffic conditions, it may not be feasible for the driver to react in such a manner. It is also possible that depending on current visibility, the speed of the vehicle, and/or the alertness of the driver, the driver may not even see the pothole in time to avoid it.

It will be appreciated that such issues are also relevant in an assisted/autonomous driving scenario. As discussed hereinabove, such systems may use one or more sensors to acquire information about the current driving environment in order to determine how to drive along the roadway as per a stored map. It is possible, that the vehicle's sensor(s) may not detect an obstacle, e.g., a pothole, sufficiently in advance in order to enable the system to determine that evasive action should be taken to avoid the obstacle and to perform that action in time. It will be appreciated that such a scenario may be further complicated by the presence of other vehicles and/or pedestrians in the immediate vicinity of the vehicle.

Figure 3A:
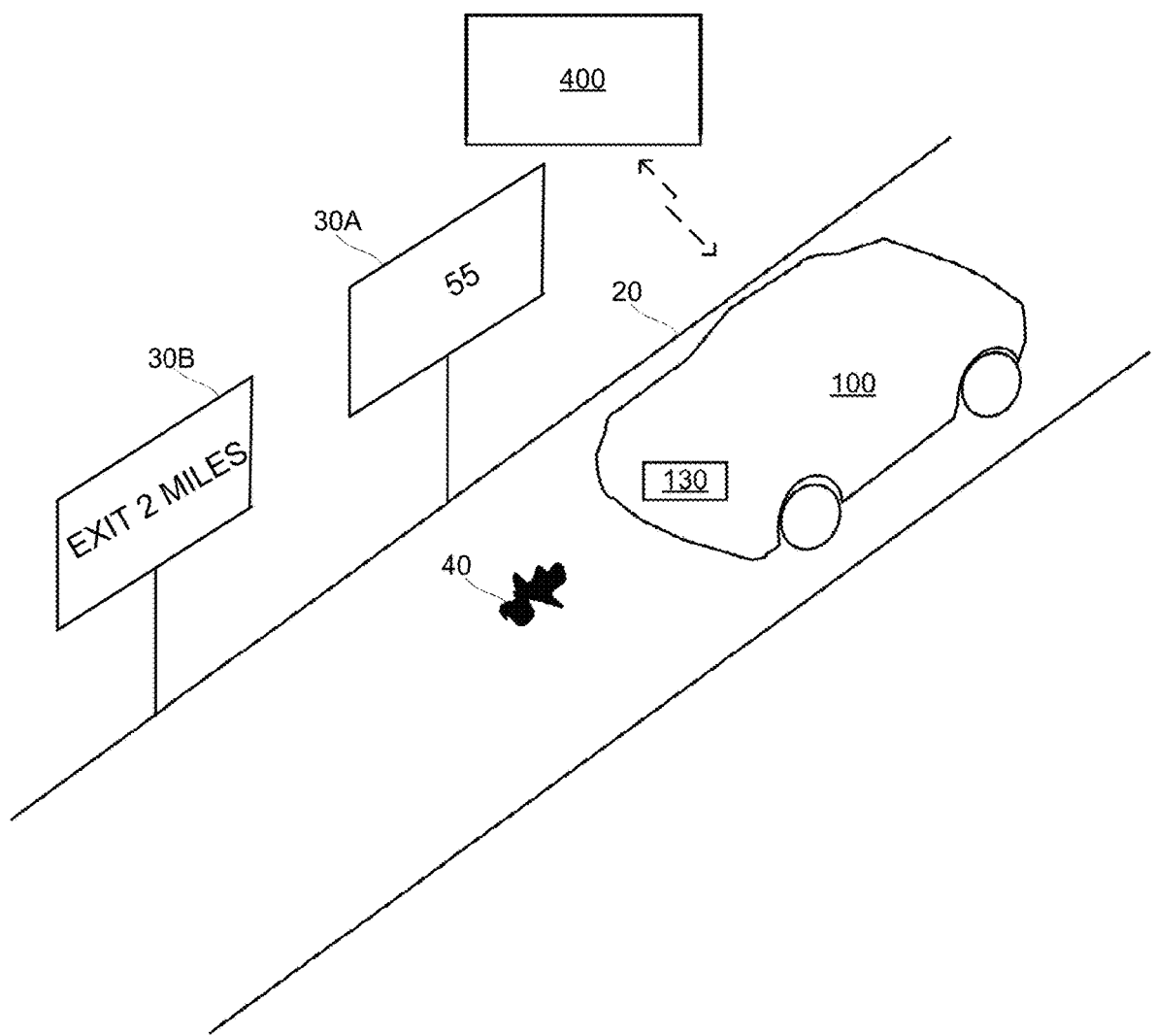
FIG. 3A is a partly-pictorial, partly-block diagram illustration of an exemplary obstacle detection and mapping system, constructed and operative in accordance with embodiments described herein.

Reference is now made to FIG. 3A, which is a partly-pictorial, partly-block diagram illustration of an exemplary obstacle detection and mapping system 10 (hereinafter referred to also as "system 10") constructed and operative in accordance with embodiments described herein. As described herein, system 10 may be operative to process sensor data to detect and map obstacles on a roadway in order to enable an assisted/autonomous driving system to predict and avoid obstacles in the path of a vehicle.

System 10 comprises vehicle 100 and obstacle avoidance server 400 which may be configured to communicate with each other over a communications network such as, for example, the Internet. In accordance with the exemplary embodiment of FIG. 3A, vehicle 100 may be configured with an autonomous driving system (not shown) operative to autonomously provide driving instructions to vehicle 100 without the intervention of a human driver. It will be appreciated that the embodiments described herein may also support the configuration of vehicle 100 with an assisted (or "semi-autonomous") driving system where in at least some situations a human driver may take control of vehicle 100 and/or where in at least some situations the semi-autonomous driving system provides warnings to the driver without necessarily directly controlling vehicle 100.

In accordance with the exemplary embodiment of FIG. 3A, vehicle 100 may be configured with at least one sensor 130 to provide information about a current driving environment as vehicle 100 proceeds along roadway 20. It will be appreciated that while sensor 130 is depicted in FIG. 3A as a single entity, in practice, as will be described hereinbelow, there may be multiple sensors 130 arrayed on, or inside of, vehicle 130. In accordance with embodiments described herein, sensor(s) 130 may be implemented using a conventional camera operative to capture images of roadway 20 and objects in its immediate vicinity. It will be appreciated that sensor 130 may be implemented using any suitable imaging technology instead of, or in addition to, a conventional camera. For example, sensor 130 may also be operative to use infrared, radar imagery, ultrasound, electro-optics, radiography, LIDAR (light detection and ranging), etc. Furthermore, in accordance with some embodiments, one or more sensors 130 may also be installed independently along roadway 20, where information from such sensors 130 may be provided to vehicle 100 and/or obstacle avoidance server 400 as a service.

In accordance with the exemplary embodiment of FIG. 3A, static reference points 30A and 30B (collectively referred to hereinafter as static reference points 30) may be located along roadway 20. For example, static reference point 30A is depicted as a speed limit sign, and static reference point 30B is depicted as an exit sign. In operation, sensor 130 may capture images of static reference points 30. The images may then be processed by the autonomous driving system in vehicle 100 to provide information about the current driving environment for vehicle 100, e.g., the speed limit or the location of an upcoming exit.

Obstacle 40, e.g., a pothole, may be located on roadway 20. In accordance with embodiments described herein, sensor 130 may also be operative to capture images of obstacle 40. The autonomous driving system may be operative to detect the presence of obstacle 40 in the images provided by sensor 130 and to determine an appropriate response, e.g., whether or not vehicle 100 should change speed and/or direction to avoid or minimize the impact with obstacle 40. For example, if the autonomous driving system determines that obstacle 40 is a piece of paper on roadway 20, no further action may be necessary. However, if obstacle 40 is a pothole, the autonomous driving system may instruct vehicle 100 to slow down and/or swerve to avoid obstacle 40.

It will be appreciated that there may not be sufficient processing time for the autonomous driving system to determine an appropriate response; depending on the speed of vehicle 100 and the distance at which sensor 130 captures an image of obstacle 40, vehicle 100 may drive over/through obstacle 40 (or collide with it) before obstacle 40 is detected and/or an appropriate response may be determined by the autonomous driving system. In accordance with embodiments described herein, in order to provide additional processing time for obstacle detection and response determination, vehicle 100 may exchange obstacle information with obstacle avoidance server 400. The autonomous driving system may be operative to upload the imagery received from sensor 130 and/or the determination of the nature of obstacle 40 to obstacle avoidance server 400, and obstacle avoidance server 400 may be operative to provide obstacle information received in such manner from other vehicles 100 in order to enable the autonomous driving system to anticipate and respond to obstacles 40 in advance of, or in parallel to, receiving the relevant imagery from sensor 130.

Depending on the configuration of system 10 and vehicle 100, obstacle avoidance server 400 and vehicle 100 may exchange obstacle information in real-time (or near real-time) and/or in a burst mode, where the obstacle information may be provided either periodically and/or when conditions are suitable for a data exchange between obstacle avoidance server 400 and vehicle 100. For example, vehicle 100 may be configured to perform regular uploads/downloads of obstacle information when the engine is turned on (or off, with a keep alive battery function to facilitate communication with obstacle avoidance server 400). Alternatively, or in addition, vehicle 100 may be configured to perform such uploads/downloads when stationary (e.g., parked, or waiting at a traffic light) and a sufficiently reliable wireless connection is detected. Alternatively, or in addition, the uploads/downloads may be triggered by location, where obstacle information may be downloaded from obstacle avoidance server 400 when vehicle 100 enters an area for which it does not have up-to-date obstacle information.

It will also be appreciated that in some situations, the autonomous driving system may not detect obstacle 40 at all; it is possible that vehicle 100 may pass by/over/through obstacle 40 without detecting it. The autonomous driving system may have finite resources available to analyze imagery from sensor 130 in a finite period of time in order to determine a currently relevant driving policy. It is understandable that if, for whatever reason (e.g., driving speed, visibility, etc.), the autonomous driving system does not detect obstacle 40 in real-time or near-real time there may be little benefit to be realized from continuing processing the imagery on vehicle 100. However, the detection of a "missed" obstacle 40 may be of benefit to another vehicle 100 on roadway 20.

Accordingly, in some configurations of system 10, vehicle 100 may also be configured to upload raw driving data from sensor 130 for processing by obstacle avoidance server 400 to detect obstacles 40. Obstacle information associated with obstacles 40 detected in such manner may then be provided by obstacle avoidance server 400 as described hereinabove.

It will also be appreciated that it may be possible to use non-image data to detect obstacles 40 from the raw driving data. For example, at least one sensor 130 may be implemented as an electronic control unit (ECU) controlling the shock absorbers of vehicle 100. Obstacle avoidance server 400 may be configured to determine that one or more shocks of a certain magnitude and/or pattern registered by the shock absorber ECU may be indicative of a pothole.

In accordance with some embodiments described herein, the sources for raw driving data to be used by obstacle avoidance server 400 to detect obstacles 40 may not be limited to just vehicles 100 with an autonomous driving system. Obstacle avoidance server 400 may also receive raw driving data from vehicles that are being driven manually and/or with the assistance of a semi-autonomous driving system. It will be appreciated that in for such vehicles, the raw driving data may include indications of driver recognition of obstacles 40. For example, when a driver detects obstacle 40, e.g., sees a pothole, the driver may slow down in approach of obstacle 40, swerve to avoid it, and/or even change lanes. Accordingly, the raw driving data processed by obstacle avoidance server 400 may also include raw data uploaded from vehicles without an autonomous driving system.

Obstacle avoidance server 400 may use supervised and/or unsupervised learning methods to detect obstacles 40 in the raw driving data; reference data sets for the detection of obstacles 40 and the determination of associated driving policies may be prepared based on unsupervised analysis of raw driving data and/or using manual labelling and extraction.

It will be appreciated that it may not be a trivial task to pinpoint a location for obstacle 40. While it may generally be assumed that vehicle 100 is configured with a location-based service, e.g., global positioning satellite (GPS) system, such systems may not necessarily be accurate enough to provide a sufficient resolution regarding the expected location for obstacle 40. For example, one possible driving policy for evasive action may entail avoiding obstacle 40 by swerving or changing lanes on roadway 20. If the location-based service is only accurate to within five feet, swerving within the lane may actually increase the likelihood of vehicle 100 hitting the pothole. Similarly, it may not be possible to determine in which lane obstacle 40 is located.

In accordance with embodiments described herein, static reference points 30 may be used in system 10 to more accurately determine a location for obstacle 40; the location of obstacle 40 may be defined as an offset from a fixed location for one of static reference points 30. For example, in the exemplary embodiment of FIG. 3A, the location of obstacle 40 may be defined as "x" feet past static reference point 30A, where the distance in feet may be calculated as a function of the frames per second of the camera used for sensor 130 and the speed of vehicle 100. Alternatively, or in addition, two sensors 130 may be employed to use triangulation to determine the distance between static reference point 30A and obstacle 40. Alternatively, or in addition, the distance may be calculated using both reference points 30A and 30B to triangulate.

It will be appreciated that as described hereinabove, obstacle 40 may be a "persistent obstacle" in that it may be reasonably expected to remain on roadway 20 for an extended period of time. For example, potholes typically remain (and even increase in size) for several months before being repaired. However, some obstacles may be more transient in nature. For example, a tree fallen on the road or debris from a traffic accident may typically be removed from roadway 20 within a few hours. Such transient obstacles may, at least in some cases, be easier to detect than persistent obstacles, e.g., a fallen tree is easier to identifying from an approaching vehicle than a pothole.

It will therefore be appreciated that the driving policies for transient obstacles may be different than for persistent obstacles. For example, in a case where obstacle 40 is a pothole that may be assumed to be persistent, the associated driving policy may entail the autonomous driving system "erring on the side of caution" by performing evasive action (e.g., swerving or changing lanes) even if the pothole isn't detected in the data provided by sensor 130 when vehicle 100 reaches the pothole's expected location. However, in a case where obstacle 40 is a tree on roadway 20, the associated driving policy may entail the autonomous driving system performing preventative action, e.g., slowing down, prior to reaching the tree's expected location, but not to perform evasive action if the tree isn't actually detected according to the data provided by sensor 130.

It will also be appreciated that some obstacles may be "recurring obstacles" where transient obstacles recur in the same location. For example, recurring obstacle 50 represents a slight depression in roadway 20. The impact on vehicle 100 as it drives over a slight depression in roadway 20 may be minimal. However, in some cases it may be observed that the slight depression may fill with water or mud when it rains, or intermittently ice over during the winter. Accordingly, the driving policies for recurring obstacles 50 may more heavily weight other environmental factors, e.g., season or weather, than the driving policies for obstacles 40.

Figure 3B:
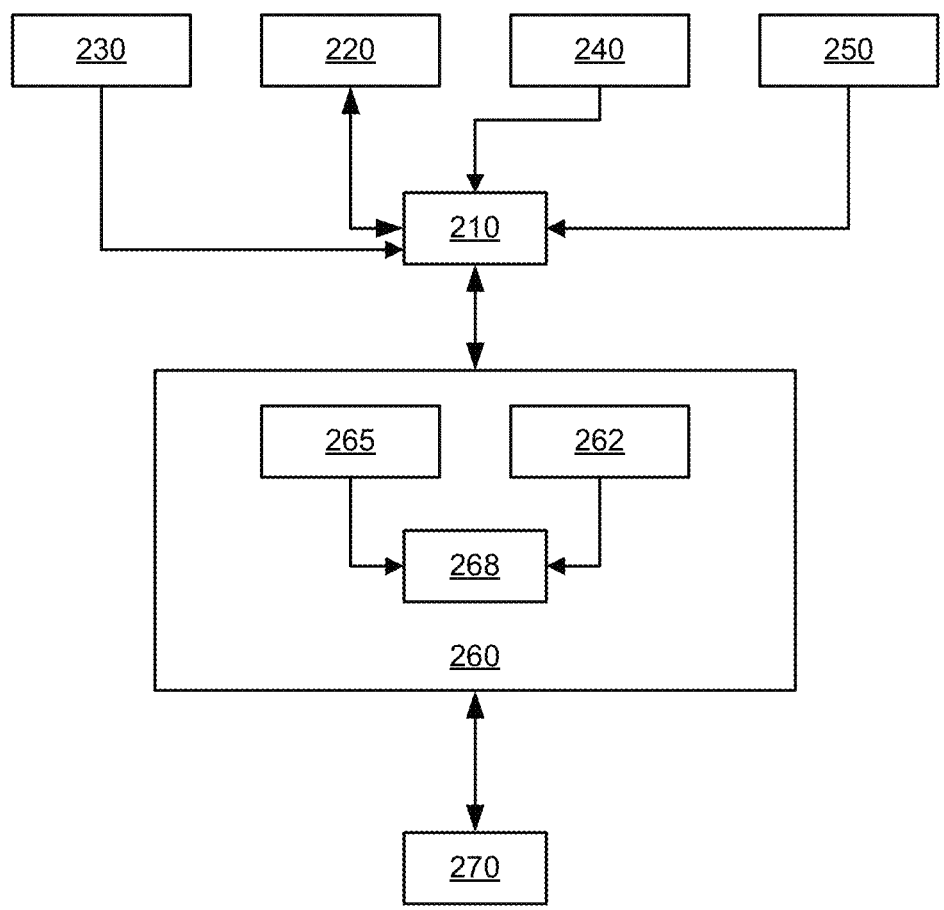
FIG. 3B is a block diagram of an exemplary autonomous driving system to be integrated in the vehicle of FIG. 3A.

Reference is now made to FIG. 3B which is a block diagram of an exemplary autonomous driving system 200 (hereinafter also referred to as system 200), constructed and implemented in accordance with embodiments described herein. Autonomous driving system 200 comprises processing circuitry 210, input/output (I/O) module 220, camera 230, telemetry ECU 240, shock sensor 250, autonomous driving manager 260, and obstacle database 270. Autonomous driving manager 260 may be instantiated in a suitable memory for storing software such as, for example, an optical storage medium, a magnetic storage medium, an electronic storage medium, and/or a combination thereof. It will be appreciated that autonomous driving system 200 may be implemented as an integrated component of an onboard computer system in a vehicle, such as, for example, vehicle 100 from FIG. 3A. Alternatively, system 200 may be implemented and a separate component in communication with the onboard computer system. It will also be appreciated that in the interests of clarity, while autonomous driving system 200 may comprise additional components and/or functionality e.g., for autonomous driving of vehicle 100, such additional components and/or functionality are not depicted in FIG. 3B and/or described herein.

Processing circuitry 210 may be operative to execute instructions stored in memory (not shown). For example, processing circuitry 210 may be operative to execute autonomous driving manager 260. It will be appreciated that processing circuitry 210 may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits. It will similarly be appreciated that autonomous driving system 200 may comprise more than one instance of processing circuitry 210. For example, one such instance of processing circuitry 210 may be a special purpose processor operative to execute autonomous driving manager 260 to perform some, or all, of the functionality of autonomous driving system 200 as described herein.

I/O module 220 may be any suitable communications component such as a network interface card, universal serial bus (USB) port, disk reader, modem or transceiver that may be operative to use protocols such as are known in the art to communicate either directly, or indirectly, with other elements of system 10 (FIG. 3A) and/or system 200, such as, for example, obstacle avoidance server 400 (FIG. 3A), camera 230, telemetry ECU 240, and/or shock sensor 250. As such, I/O module 220 may be operative to use a wired or wireless connection to connect to obstacle avoidance server 400 via a communications network such as a local area network, a backbone network and/or the Internet, etc. I/O module 220 may also be operative to use a wired or wireless connection to connect to other components of system 200, e.g., camera 230, telemetry ECU 240, and/or shock sensor 250. It will be appreciated that in operation I/O module 220 may be implemented as a multiplicity of modules, where different modules may be operative to use different communication technologies. For example, a module providing mobile network connectivity may be used to connect to obstacle avoidance server 400, whereas a local area wired connection may be used to connect to camera 230, telemetry ECU 240, and/or shock sensor 250.

In accordance with embodiments described herein, camera 230, telemetry ECU 240, and shock sensor 250 represent implementations of sensor(s) 130 from FIG. 3A. It will be appreciated that camera 230, telemetry ECU 240, and/or shock sensor 250 may be implemented as integrated components of vehicle 100 (FIG. 3A) and may provide other functionality that is the interests of clarity is not explicitly described herein. As described hereinbelow, system 200 may use information about a current driving environment as received from camera 230, telemetry ECU 240, and/or shock sensor 250 to determine an appropriate driving policy for vehicle 100.

Autonomous driving manager 260 may be an application implemented in hardware, firmware, or software that may be executed by processing circuitry 210 to provide driving instructions to vehicle 100. For example, autonomous driving manager 260 may use images received from camera 230 and/or telemetry data received from telemetry ECU 240 to determine an appropriate driving policy for arriving at a given destination and provide driving instructions to vehicle 100 accordingly. It will be appreciated that autonomous driving manager 260 may also be operative to use other data sources when determining a driving policy, e.g., maps of potential routes, traffic congestion reports, etc.

As depicted in FIG. 3B, autonomous driving manager 260 comprises obstacle detector 265, obstacle predictor 262, and obstacle avoidance module 268. It will be appreciated that the depiction of obstacle detector 265, obstacle predictor 262, and obstacle avoidance module 268 as integrated components of autonomous driving manager 260 may be exemplary. The embodiments described herein may also support implementation of obstacle detector 265, obstacle predictor 262, and obstacle avoidance module 268 as independent applications in communication with autonomous driving manager 260, e.g., via I/O module 220.

Obstacle detector 265, obstacle predictor 262, and obstacle avoidance module 268 may be implemented in hardware, firmware, or software and may be invoked by autonomous driving manager 260 as necessary to provide input to the determination of an appropriate driving policy for vehicle 100. For example, obstacle detector 265 may be operative to use information from sensor(s) 130 (FIG. 3A), e.g., camera 230, telemetry ECU 240, and/or shock sensor 250 to detect obstacles in (or near) the driving path of vehicle 100, e.g., along (or near) roadway 20 (FIG. 3A). Obstacle predictor 262 may be operative to use obstacle information received from obstacle avoidance server 400 to predict the location of obstacles along or near roadway 20 before, or in parallel to their detection by obstacle detector 265. Obstacle avoidance module 268 may be operative to determine an appropriate driving policy based at least on obstacles detected/predicted (or not detected/predicted) by obstacle detector 265 and/or obstacle predictor 262.

Autonomous driving manager 260 may store obstacle information received from obstacle avoidance server 400 in obstacle database 270 for use by obstacle detector 265, obstacle predictor 262, and obstacle avoidance module 268 as described herein. It will be appreciated that obstacle information, including driving policies to avoid detected obstacles may also be stored in obstacle database 270 for use by obstacle detector 265, obstacle predictor 262, and obstacle avoidance module 268.

Figure 3C:
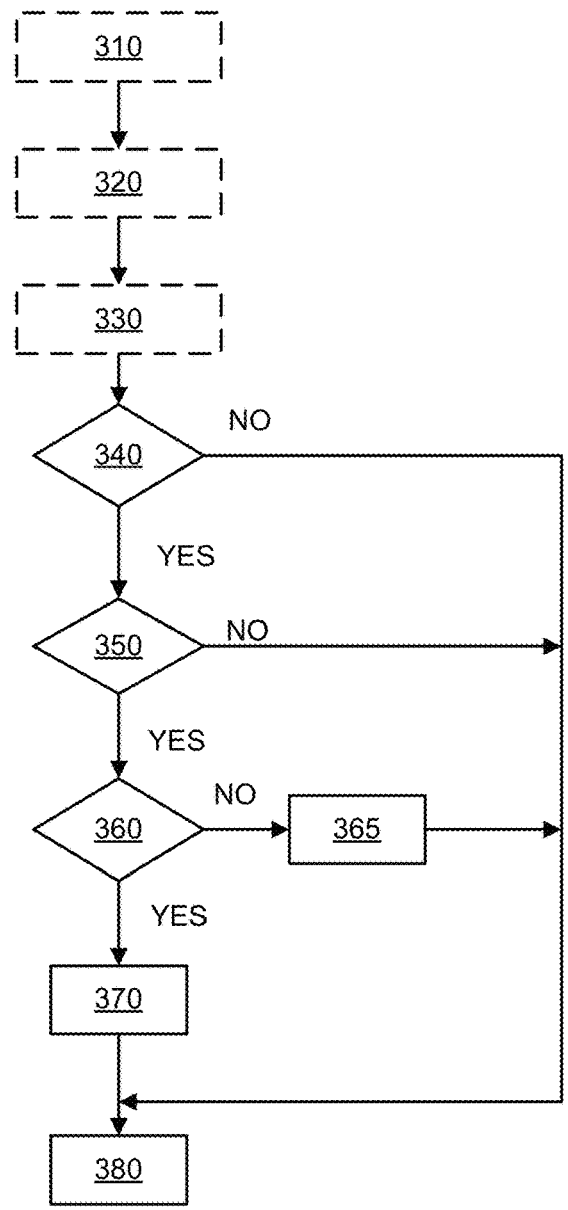
FIG. 3C is a flowchart of an exemplary process to be performed by the autonomous driving system of FIG. 3B.

Reference is now made also to FIG. 3C which is a flowchart of an exemplary obstacle detection and avoidance process 300 (hereinafter also referred to as process 300) to be performed by system 200 during (or preceding) a driving session for vehicle 100 (FIG. 3A). The components of systems 100 and 200 will be referred to herein as per the reference numerals in FIGS. 3A and 3B.

In accordance with some embodiments described herein, system 200 may receive (step 310) an obstacle warning from obstacle avoidance server 400, e.g. obstacle information received from other vehicles 100 using system 10 and/or and other suitable sources as described with reference to FIG. 3A. It will be appreciated that the obstacle warning may be received by I/O module 220. Depending on the configuration of system 100, the obstacle warning may be received in a batch update process, either periodically and/or triggered by an event, e.g., when vehicle 100 is turned on, when vehicle 100 enters a new map area, when vehicle 100 enters an area with good wireless reception, etc. It will be appreciated that the obstacle warning received in step 310 may also include a description of the obstacle, e.g., a pothole.

Autonomous driving manager 260 may invoke obstacle predictor 262 to estimate (step 320) a location for the obstacle associated with the obstacle warning. It will be appreciated that, as discussed hereinabove, while the obstacle warning may include GPS coordinates for the obstacle, the coordinates may not be accurate enough to provide the location with sufficient precision to be of use in an automated. Furthermore, even if the coordinates for the obstacle, e.g., obstacle 40 (FIG. 3A) are accurate, vehicle 10 will likely be in movement and it may not be possible to accurately determine the GPS coordinates of vehicle 10 as it approaches the obstacle.

In accordance with embodiments described herein, the obstacle information in the obstacle warning may include landmarks to be used for calculating the obstacle location. For example, the location of the associated obstacle may be indicated in the obstacle warning as an offset from a local landmark, e.g., one or more of static reference points 30 (FIG. 3A). It will be appreciated that static reference points 30 may be visible from a greater distance than obstacle 40; a signpost typically extends vertically from the ground such that static reference points 30 may be captured by sensor(s) 130, e.g., camera 230, in advance of detection of obstacle 40. Obstacle predictor may then use static reference points 30 to predict a location for the associated obstacle 40 as an offset from the observed location of one or more static reference points 30 before sensor(s) 130 may actually provide an indication of the location. Distance from a given static reference point 30 may be estimated as a function of current speed for vehicle 10 and a frames-per-second setting for camera 230. Alternatively, or in addition, multiple static reference points may be used to locate obstacle 40 by triangulation, e.g., a distance from both static reference points 30A and 30B may be estimated and then used to predict the location of obstacle 40.

It will be appreciated that in some embodiments, sensor(s) 130 may be operative to provide an estimate for distance. For example, sensor(s) may be operative to use radar imagery, LIDAR, etc.

Autonomous driving manager 260 may invoke obstacle avoidance module 268 to enact (step 330) preventative measures to avoid colliding with, or running over, obstacle 40. Obstacle avoidance module 268 may enact the preventative measures in accordance with driving policies stored in obstacle database 270. It will be appreciated that the obstacle warning may include a description of obstacle 40, e.g., a pothole. Using the obstacle description and other available information (e.g., distance to obstacle 40 as estimated in step 320, current speed, road conditions, etc.), obstacle avoidance module 268 may select an appropriate driving policy from obstacle database 270 for implementation. For example, the selected driving policy may entail a reduction in speed, switching lanes (if possible under current conditions), swerving within a lane, etc. It will be appreciated that the driving policies in obstacle database may be pre-stored in obstacle database 270. It will further be appreciated that the driving policies may be derived based on supervised or unsupervised analysis of imagery from actual driving sessions. Some, or all, of the driving policies may also be defined manually.

In some cases, the selected driving policy may entail more extreme preventative measures. For example, obstacle 40 may be described in the obstacle warning as a very large obstacle that may effectively block traffic on roadway 20, e.g., a rockfall, or debris from a multi-vehicle accident. In such a case, the driving policy may entail actions such as, for example, pulling over on the shoulder, stopping in place, or changing routes.

Autonomous driving manager may invoke obstacle detector 265 to determine if an obstacle, e.g., obstacle 40, has been detected (step 340). For example, obstacle detector 265 may use imagery received from sensor(s) 130 to detect obstacle 40 in roadway 20.

It will be appreciated that in typical operation of process 300, steps 310-330 may not always be performed; autonomous driving system 200 may not always receive an obstacle warning in advance of encountering obstacle 40. For example, vehicle 100 may be the first vehicle associated with system 10 to encounter obstacle 40. It will therefore be appreciated that autonomous driving manager 260 may continuously execute process 300 in an attempt to detect and avoid obstacles as vehicle 100 progresses along roadway 20. Accordingly, step 340 may be performed independently of whether or not an obstacle warning has been received for a given area on roadway 20. It will, however, be appreciated, that in the event that an obstacle warning was indeed received, the relevant obstacle information may be used by obstacle detector 265 to determine whether or not the indicated obstacle, e.g., obstacle 40, is indeed in place on roadway 20 as indicated in the obstacle warning.

Alternatively, or in addition, obstacle detector 265 may be detected in response to information received from shock sensor 250. Shock sensor 250 may be a sensor operative to monitor the operation of the shock absorbers on vehicle 100. It will be appreciated that when running over a pothole, shock absorbers may absorb the ensuing shock and stabilize vehicle 100. It will also be appreciated that in some situations, potholes may not be detected until vehicle 100 actually drives over them. In such a situation, obstacle detector 265 may use information from shock sensor 250 to detect obstacle 40, albeit after vehicle 100 has already hit obstacle 40.

If obstacle 40 is detected in step 340, autonomous driving manager 260 may invoke obstacle avoidance module 268 to determine whether obstacle 40 is in the path of vehicle 100 (step 350). It will be appreciated that some obstacles 40 on roadway 20 may not be in the direct path of vehicle 100; some obstacles 40 may be in a different lane than vehicle 100. Additionally, if step 330 was performed, vehicle 100 may have already switched lanes in advance of obstacle 40 being detected in step 340. Furthermore, if obstacle 40 was detected using shock sensor 250, vehicle 100 may have already run over obstacle 40 such that the result of step 350 may be "no". If obstacle 40 is not detected in step 340, process control may flow through to step 380.

If, as per the result of step 350, obstacle 40 is in the path of vehicle 100, obstacle avoidance module 268 may determine whether obstacle 40 is avoidable (step 360). It will be appreciated that obstacle 40 may not be detected in step 340 until vehicle 100 is very close. For example, visibility may be poor, obstacle 40 may be located immediately around a bend in roadway 20, obstacle 40 may be effectively camouflaged by its surroundings (e.g., some potholes are not distinguishable from a distance), etc. Accordingly, by the time obstacle 40 is detected, there may not be enough time to enact avoidance measures prior to impact. If, as per the result of step 350, obstacle 40 is not avoidable, process control may flow through to step 380.

If, as per the result of step 360, obstacle 40 is avoidable, obstacle avoidance module 268 may instruct vehicle 100 to avoid (step 370) obstacle 40. For example, obstacle avoidance module 268 may instruct vehicle 100 to straddle obstacle 40, swerve within the lane, or switch lanes altogether.

If, as per the result of step 360, obstacle 40 is not avoidable, obstacle avoidance module 268 may instruct vehicle 100 to minimize (step 365) impact with obstacle 40. For example, obstacle avoidance module 268 may instruct vehicle 100 to reduce speed and/or to swerve to avoid hitting the center of obstacle 40. Process control may then flow through to step 380.

Autonomous driving manager 380 may use I/O module 220 to send an obstacle report to obstacle avoidance server 400. The obstacle report may, for example, include telemetry data and sensor imagery that may be used by obstacle avoidance server 400 to determine a location for obstacle 40. For example, the obstacle report may include camera images (from camera 230) and telemetry data (from telemetry ECU 240) from a period staring a given number of seconds before obstacle 40 was detected in step 340. Alternatively, or in addition, the telemetry data and camera images may be from a period defined according to a physical distance from obstacle 40. The obstacle report may also include data from shock sensor 250 where applicable.

Depending on the configuration of systems 100 and 200, step 380 may be performed in real time or near real time after obstacle 40 is detected in step 340. Alternatively, or in addition, step 380 may be performed in a periodic and/or event triggered batch process.

It will be appreciated that obstacle reports may also be provided for "no" results in process 300. If obstacle 40 is not detected in step 340, an obstacle report may be provided to obstacle avoidance server 400 indicating that an obstacle was not detected at the associated location. It will be appreciated that in some cases, a "no" result in step 340 may indicate that an obstacle associated with an obstacle warning may no longer be found on roadway 20, e.g., the pothole may have been filled in. In other cases, where an obstacle warning was not received, the "no" result may indicate that the default condition, e.g., "no obstacles", is in effect for roadway 20.

Figure 4:
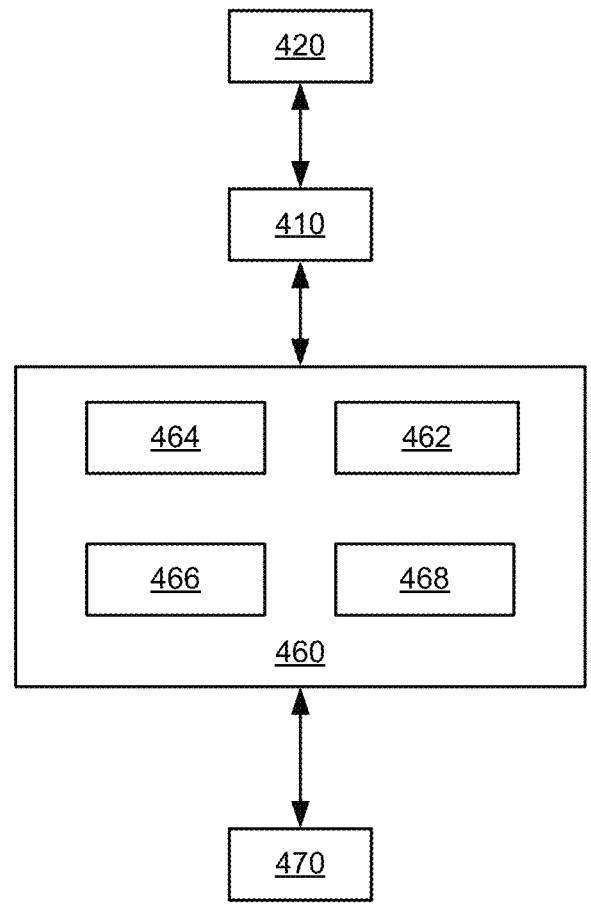
FIG. 4 is a block diagram of an exemplary obstacle avoidance server of FIG. 3A.

Reference is now made to FIG. 4 which is a block diagram of an exemplary obstacle avoidance server 400 (hereinafter also referred to as server 400), constructed and implemented in accordance with embodiments described herein. Server 400 comprises processing circuitry 410, input/output (I/O) module 420, obstacle avoidance manager 460, and obstacle database 470. Obstacle avoidance manager 460 may be instantiated in a suitable memory for storing software such as, for example, an optical storage medium, a magnetic storage medium, an electronic storage medium, and/or a combination thereof.

Processing circuitry 410 may be operative to execute instructions stored in memory (not shown). For example, processing circuitry 410 may be operative to execute obstacle avoidance manager 260. It will be appreciated that processing circuitry 410 may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits. It will similarly be appreciated that server 400 may comprise more than one instance of processing circuitry 410. For example, one such instance of processing circuitry 410 may be a special purpose processor operative to execute obstacle avoidance manager 460 to perform some, or all, of the functionality of server 400 as described herein.

I/O module 420 may be any suitable communications component such as a network interface card, universal serial bus (USB) port, disk reader, modem or transceiver that may be operative to use protocols such as are known in the art to communicate either directly, or indirectly, with other elements of system 10 (FIG. 3A) such as, for example, system 200 (FIG. 3B). As such, I/O module 420 may be operative to use a wired or wireless connection to connect to system 200 via a communications network such as a local area network, a backbone network and/or the Internet, etc. It will be appreciated that in operation I/O module 220 may be implemented as a multiplicity of modules, where different modules may be operative to use different communication technologies. For example, a module providing mobile network connectivity may be used to connect wirelessly to one instance of system 200, e.g., one vehicle 100 (FIG. 3A), whereas a local area wired connection may be used to connect to a different instance of system 100, e.g., a different vehicle 100.

Obstacle avoidance manager 460 may be an application implemented in hardware, firmware, or software that may be executed by processing circuitry 410 to provide obstacle warnings and/or driving policies to vehicles 100. For example, obstacle avoidance manager 460 may use obstacle information in obstacle reports received from vehicles 100 to provide obstacle warnings in real time, near real time, and/or batch mode to vehicles 100 in system 10 (FIG. 3A). It will be appreciated that obstacle avoidance manager 460 may also be operative to use other data sources when detecting obstacles and determining driving policies, e.g., maps of potential routes, traffic congestion reports, etc.

As depicted in FIG. 4, obstacle avoidance manager 460 comprises obstacle extractor 462, obstacle categorizer 464, obstacle policy manager 466, and obstacle timer 468. It will be appreciated that the depiction of obstacle extractor 462, obstacle categorizer 464, obstacle policy manager 466, and obstacle timer 468 as integrated components of obstacle avoidance manager 460 may be exemplary. The embodiments described herein may also support implementation of obstacle extractor 462, obstacle categorizer 464, obstacle policy manager 466, and obstacle timer 468 as independent applications in communication with obstacle avoidance manager 460, e.g., via I/O module 420.

Obstacle extractor 462, obstacle categorizer 464, obstacle policy manager 466, and obstacle timer 468 may be implemented in hardware, firmware, or software and may be invoked by obstacle avoidance manager 460 as necessary to provide obstacle warnings and associated driving policies to vehicles 100. For example, obstacle extractor 462 may be operative to extract obstacle information from obstacle reports received from vehicles 100. Obstacle categorizer 464 may be operative to use categorize obstacles in terms of danger level and/or persistence characteristics. Obstacle policy manager 466 may be operative to determine an appropriate driving policy for a given obstacle or category of obstacle. Obstacle timer 468 may be operative to set an expiration timer for obstacles according to their associated obstacle categories.

Obstacle avoidance manager 460 may store obstacle information received from vehicles 100 in obstacle database 270 for use by obstacle extractor 462, obstacle categorizer 464, obstacle policy manager 466, and obstacle timer 468 as described herein. It will be appreciated that obstacle database 470 may also be used to store obstacle information, including driving policies, derived by obstacle extractor 462, obstacle categorizer 464, obstacle policy manager 466, and obstacle timer 468.

Figure 5:
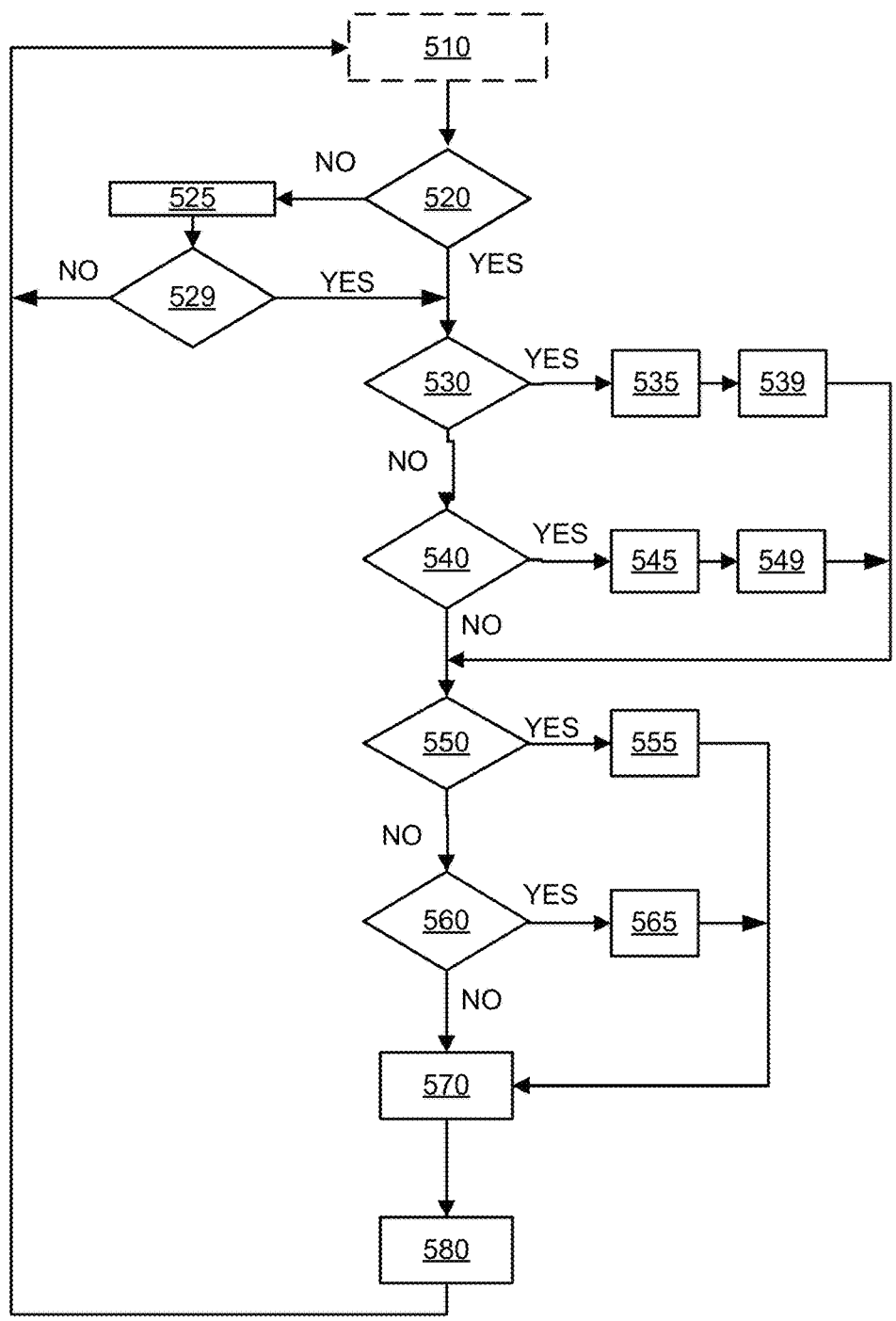
FIG. 5 is a flowchart of an exemplary process to be performed by the obstacle avoidance server of FIG. 4.

Reference is now made also to FIG. 5 which is a flowchart of an exemplary obstacle detection and warning process 500 (hereinafter also referred to as process 500) to be performed by server 400 to support driving sessions for vehicles 100 (FIG. 3A). The components of systems 10 and 200 will be referred to herein as per the reference numerals in FIGS. 3A and 3B. 1 and 2. Similarly, the components of server 400 will be referred to herein as per the reference numerals in FIG. 4.

In accordance with some embodiments described herein, server 400 may receive (step 510) an obstacle report from vehicle 100. It will be appreciated that the obstacle warning may be received by I/O module 420. Depending on the configuration of system 10, the obstacle report may be received in real time or near real time after vehicle 100 encounters obstacle 40. Alternatively, or in addition, the obstacle report may be received in a batch update process, either periodically and/or triggered by an event, e.g., when vehicle 100 is turned on, when vehicle 100 enters a new map area, when vehicle 100 enters an area with good wireless reception, etc. It will be appreciated that the obstacle report received in step 510 may also include an image of obstacle 40.

It will be appreciated that as described hereinabove with respect to process 300 (FIG. 3C), a given obstacle report may not necessarily be triggered by detection of an obstacle by vehicle 100. The obstacle report may represent a periodic upload of GPS data, camera images, telemetry data, and/or other sensor data that may not be associated with a specific detection of an obstacle. The obstacle report may also be associated with a non-detection of an obstacle that was otherwise indicated by a previously issued obstacle warning. Furthermore, as described with respect to FIG. 3A, raw driving data from manually and/or semi-autonomously driven vehicles may also be provided to server 400. In accordance with embodiments described herein, such raw driving data may also be input to process 500 along with obstacle reports.

Accordingly, obstacle avoidance server 400 may invoke obstacle extractor 462 to analyze received obstacle reports and/or raw driving data to determine if a given obstacle report (or raw driving data) includes a reported obstacle (step 520), i.e., where the obstacle report specifically addresses an obstacle, whether it was detected by vehicle 100 and/or it was included in a previous obstacle warning.

Obstacle extractor 462 may determine if the obstacle report or raw driving data includes at least a reference to a reported obstacle (step 520). It will be appreciated that as described with respect to process 300, an obstacle report may be sent in response to an obstacle warning, even if the associated obstacle is not actually detected by autonomous driving manager 360. Such an obstacle report may still include a reference to the reported obstacle. If the obstacle report or raw driving data includes at least a reference to a reported obstacle (step 520) processing may continue with step 530.

If the obstacle report or raw driving data does not include a reference to a reported obstacle (step 520), obstacle extractor 462 may process (step 525) the obstacle report (or raw driving data) to extract obstacle information for obstacles. For example, obstacle extractor 464 may be operative to detect an obstacle based on an image of an obstacle, where the image may be matched to a reference image of an obstacle stored in obstacle database 470. Alternatively, or in addition, obstacle extractor 464 may be operative to detect an obstacle based on telemetry data, where certain driving patterns maybe indicative of a driver avoiding an obstacle. Alternatively, or in addition, obstacle extractor 464 may be operative to detect an obstacle based on analysis of shock absorber data, where shock events may be indicative of a vehicle running over a pothole. It will be appreciated that the obstacle information extracted in step 525 may also include reference data that may be used to provide a location for the extracted obstacle, e.g., GPS coordinates, offsets from fixed reference points 30, radar imagery, etc.

If one or more obstacles are extracted (step 529) processing control may flow through to step 530. Otherwise, processing control may return to step 510.

Obstacle avoidance manager 460 may determine whether a reported obstacle or an extracted obstacle is a "new" obstacle (step 530), i.e., whether the associated obstacle is already known to server 400 from a previous iteration of process 300. If the obstacle is a new obstacle, obstacle avoidance manager 460 may invoke obstacle categorizer 464 to categorize the obstacle. Obstacle categorizer 464 may categorize the obstacle based on a level of danger it may represent to vehicle 100. For example, if the obstacle is a relatively shallow pothole, obstacle categorizer may assign it to a low-risk category. If the obstacle is a patch of ice, obstacle categorizer may assign it to a medium-risk category. If the obstacle is a large slab of concrete, obstacle categorizer may assign it to a high-risk category. It will be appreciated that the examples provided herein for obstacles and their associated categories are not limiting; the embodiments described herein may support other combinations of obstacles and categories.

Obstacle categorizer 464 may also be operative to categorize obstacles based on their expected persistence. For example, a pothole may be a persistent obstacle; it may be expected to remain on roadway 20 for weeks, months, or even years after first being observed. Debris from a traffic accident may be a temporary obstacle; it may be expected to be cleared from roadway 20 within hours or perhaps a day or two after first being observed. Some obstacles may be recurring in nature; such obstacles may be observed intermittently in the same location. For example, puddles or ice patches may tend to recur in the same locations based on the topography of roadway 20. Some obstacles may have hybrid persistence characteristics. For example, a pothole may also tend to fill with rain/slow and freeze during the winter. The pothole itself may be of a persistent nature, whereas the resulting ice patch (or puddle) may be of a recurring nature. Obstacle categorizer 464 may categorize (step 535) the obstacle accordingly, e.g. as persistent, temporary, recurring, or hybrid.

Obstacle avoidance manager 460 may invoke obstacle policy manager 466 to set (step 539), based at least on the obstacle's category, an appropriate driving policy for avoiding (or at least minimizing the risks associated with) the obstacle.

If, per step 530, the obstacle is not a new obstacle, obstacle avoidance manager 460 may use obstacle information stored in obstacle database 470 to determine whether the current obstacle information is consistent with previously observed obstacle information (step 540). For example, a pothole may expand in size and/or fill with water/ice compared to a previous observation. Debris from a traffic accident may shift or be partially removed. If the current obstacle information is inconsistent with the stored obstacle information, obstacle avoidance manager 460 may invoke obstacle categorizer 464 to update (step 545) the category or categories assigned in step 535, and obstacle policy manager 466 to update (step 549) the driving policy set in step 539.

As described hereinabove, even though a given obstacle report may be associated with a previously issued obstacle warning, in some cases the obstacle report may not include sensor data indicative of an observation of the associated obstacle. Vehicle 100 may receive an obstacle warning, but by the time vehicle 100 reaches the location indicated in the obstacle warning, the associated obstacle may no longer be there. For example, based on obstacle information received by obstacle avoidance server 400, obstacle avoidance manager 460 may determine that debris from traffic accident may be at a given location on roadway 20, and send an obstacle warning to vehicle 100 for the given location. However, the debris may be cleared by the time that vehicle 100 reaches the given location. As described with reference to process 300, in such a case, vehicle 100 may provide an obstacle report to server 400 even though it did not actually detect the obstacle associated with the obstacle warning.

Accordingly, obstacle avoidance manager 460 may determine if an obstacle associated with the obstacle report was actually detected by autonomous driving system 200 or obstacle extractor 462 (step 550). If an obstacle was detected per step 550, obstacle avoidance manager 460 may use obstacle timer 468 to set (step 555) a timer for the detected obstacle. The timer may be set according to an anticipated duration for the obstacle. For example, if the obstacle is debris from a traffic accident, the timer may be set to a number of hours; for a pothole the timer may be set for a number of weeks or months.

It will be appreciated that the detected obstacle from step 550 may already have had a timer set in a previous iteration of process 500, e.g., the obstacle report is associated with a known obstacle for which an obstacle warning was previously generated and sent to vehicle(s) 100. In such a case, the timer may be reset to extend the anticipated duration of the obstacle per a more recent observation. For example, if the obstacle was debris from a traffic accident, the timer may have originally been set for two hours. If an obstacle report is received ninety minutes later indicating that the debris is still there, obstacle avoidance manager 460 may reset the timer to update the anticipated duration based on the latest information (i.e., the recent obstacle report).

If an obstacle associated with the obstacle report was not detected by autonomous driving system 200 or obstacle extractor 462 (step 550), obstacle avoidance manager 460 may determine if the obstacle warning has expired (step 560) according to the timer (re)set in step 555. If the timer has expired, obstacle avoidance manager 460 may remove (step 465) the obstacle from a warning list of currently relevant obstacle warnings. Otherwise, processing control may continue to step 570.

Obstacle avoidance manager 460 may then update (step 570) the warning list as necessary e.g., adding obstacle warnings, modifying driving policies, removing obstacle warnings, etc. Obstacle avoidance manager 460 may then send (step 580) the obstacle warning(s) from the warning list to vehicle(s) 100. Depending on the configuration of systems 10, 200, and 400, step 580 may be performed in real time or near real time after step 570. Alternatively, or in addition, step 580 may be performed in a periodic and/or event triggered batch process.

Process control may then return to step 510. It will be appreciated that in some embodiments, steps 520-570 (or combinations, thereof) may be performed iteratively, e.g., if multiple obstacles are extracted from raw driving data.

Obstacle Detection Based on Visual and Non-Visual Information

Obstacles may be viewed as elements that introduce changes in the behavior of a vehicle. Obstacles may be automatically detected by processing images obtained while a vehicle performs maneuvers that are suspected as being obstacle avoidance maneuvers.

Figure 6:
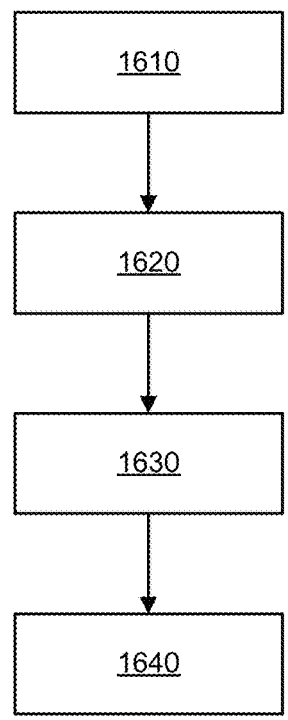
FIG. 6 is an example of a method.

FIG. 6 illustrates a method 1600 executed by computerized system for detecting obstacles. The computerized system may be located outside a vehicle, may be distributed between different vehicles, and the like.

Method 1600 may start by step 1610 of receiving, from a plurality of vehicles, and by an I/O module of a computerized system, visual information acquired during executions of vehicle maneuvers that are suspected as being obstacle avoidance maneuvers.

Step 1610 may also include receiving behavioral information regarding behavior of the plurality of vehicles, during an execution of the maneuvers that are suspected as being obstacle avoidance maneuvers. The behavioral information may represent the behavior (speed, direction of propagation, and the like) of the entire vehicle and/or may represent the behavior of parts or components of the vehicle (for example damping a shock by a shock absorber, slowing the vehicle by the breaks, turns of the steering wheel, and the like), and/or may represent the behavior of the driver (the manner in which the driver drives), and the like.

A determination of what constitutes a vehicle maneuver suspected as being an obstacle avoidance maneuver may be detected in a supervised manner or in an unsupervised manner. For example—when in supervised manner method 1600 may include receiving examples of maneuvers that are tagged as obstacle avoidance maneuvers.

Such a maneuver may be an uncommon maneuver in comparison to at least one out of (a) maneuvers of the same vehicle, (b) maneuvers performed at the same location by other drivers, (c) maneuvers performed in other places by other drivers, and the like. The maneuver may be compared to other maneuvers at the same time of day, at other times of day, at the same date, at other dates and the like.

The vehicle maneuver suspected as being an obstacle avoidance maneuver may be detected based on behavioral information that may be obtained from one or more sensors such as an accelerometer, a wheel speed sensor, a vehicle speed sensor, a brake sensor, a steering wheel sensor, a shock absorber sensor, an engine sensor, a driver sensor for sensing one or more physiological parameter of the driver (such as heart beat), or any other sensor—especially any other non-visual sensor.

The vehicle maneuver suspected as being an obstacle avoidance maneuver may involve a change (especially a rapid change) in the direction and/or speed and/or acceleration of the vehicle, a deviation from a lane, a deviation from a previous driving pattern followed at attempt to correct the deviation, and the like.

For example—when applying supervised learning of obstacles—the computerized system may be fed with examples of vehicle behaviors when bypassing known obstacles, when approaching a significant bump, and the like.

For example—the determining may include ruling out common behaviors such as stopping in front of a red traffic light.

For example—a fast and significant change in the speed and direction of a vehicle at a linear road path may indicate that the vehicle encountered an obstacle.

The visual information may be raw image data (such as images) acquired by a visual sensor of the vehicle, processed images, metadata or any other type of visual information that represents the images acquired by visual sensor.

The visual information may include one or more robust signatures of one or more images acquired by one or more visual sensors of the vehicle. A non-limiting example of a robust signature is illustrated in U.S. Pat. No. 8,326,775 which is incorporated herein by reference.

Step 1610 may be followed by step 1620 of determining, based at least on the visual information, at least one visual obstacle identifier for visually identifying at least one obstacle.

The determining may include clustering visual information based on the objects represented by the visual information, and generating a visual obstacle identifier that represents a cluster. The clusters may be linked to each other and a visual obstacle identifier may represent a set of linked clusters.

The determining may include filtering out objects that are represented in the visual information based on a frequency of appearance of the objects in the visual information. For example—the road may appear in virtually all images and may be ignored.

The clustering may or may not be responsive to the behavior of the vehicle during the executions of vehicle maneuvers that are suspected as being obstacle avoidance maneuvers.

The visual obstacle identifier may be a model of the obstacle, a robust signature of the obstacle, configuration information of a neural network related to the obstacle.

A model of the obstacle may define one or more parameters of the obstacle such as shape, size, color of pixels, grayscale of pixels, and the like.

The configuration information of a neural network may include weights to be assigned to a neural network. Different neural networks may be used to detect different obstacles.

The visual obstacle identifier for visually identifying an obstacle may identify a group of obstacles to which the obstacle belongs. For example—the visual obstacle identifier may identify a concept. See, for example, U.S. Pat. No. 8,266,185 which is incorporated herein by reference.

A visual obstacle identifier that identifies an obstacle may include at least one out of severity metadata indicative of a severity of the obstacle, type metadata indicative of a type of the obstacle (for example—pothole, tree, bump), size metadata indicative of a size of the obstacle, timing metadata indicative of a timing of an existence of the obstacle (for example—persistent, temporary, recurring), and location metadata indicative of a location of the obstacle. See, for example severity metadata 1851, type metadata 1852, size metadata 1853, timing metadata 1854 and location metadata 1855 of FIG. 7.

Step 1620 may be followed by step 1630 of responding to the outcome of step 1620. For example—step 1630 may include transmitting to one or more of the plurality of vehicles, the at least one visual obstacle identifier. Additionally or alternatively, step 1630 may include populating an obstacle database. The visual obstacle identifier may be included in an obstacle warning.

The behavioral information is obtained by non-visual sensors of the plurality of vehicles.

Step 1630 may also include verifying, based on at least the visual information, whether the maneuvers that are suspected as being obstacle avoidance maneuvers are actually obstacle avoidance maneuvers.

The verification may include detecting at least a predefined number of indications about a certain obstacle.

The verification may include receiving information from another source (for example input from drivers, information provided from the police, department of transportation or other entity responsible to the maintenance of roads, regarding the existence of obstacles.

Step 1630 may be followed by step 1640 of transmitting to one or more of the plurality of vehicles, verification information indicative of the maneuvers that are actually obstacle avoidance maneuvers. This may help the vehicles to ignore maneuvers that were suspected as obstacle avoidance maneuvers—which are not actual obstacle avoidance maneuvers.

Method 1600 enables a vehicle that receives a visual obstacle identifier to identify an obstacle of known parameters—even if the vehicle is the first one to image that obstacle. Method 1600 may be executed without human intervention and may detect obstacles without prior knowledge of such obstacles. This provides a flexible and adaptive method for detecting obstacles. The visual information and/or the visual obstacle identifier may be very compact—thereby allowing the learning of obstacles and afterwards detecting obstacles to be executed using a relatively small amount of computational and/or storage and/or communication resources.

Figure 10:
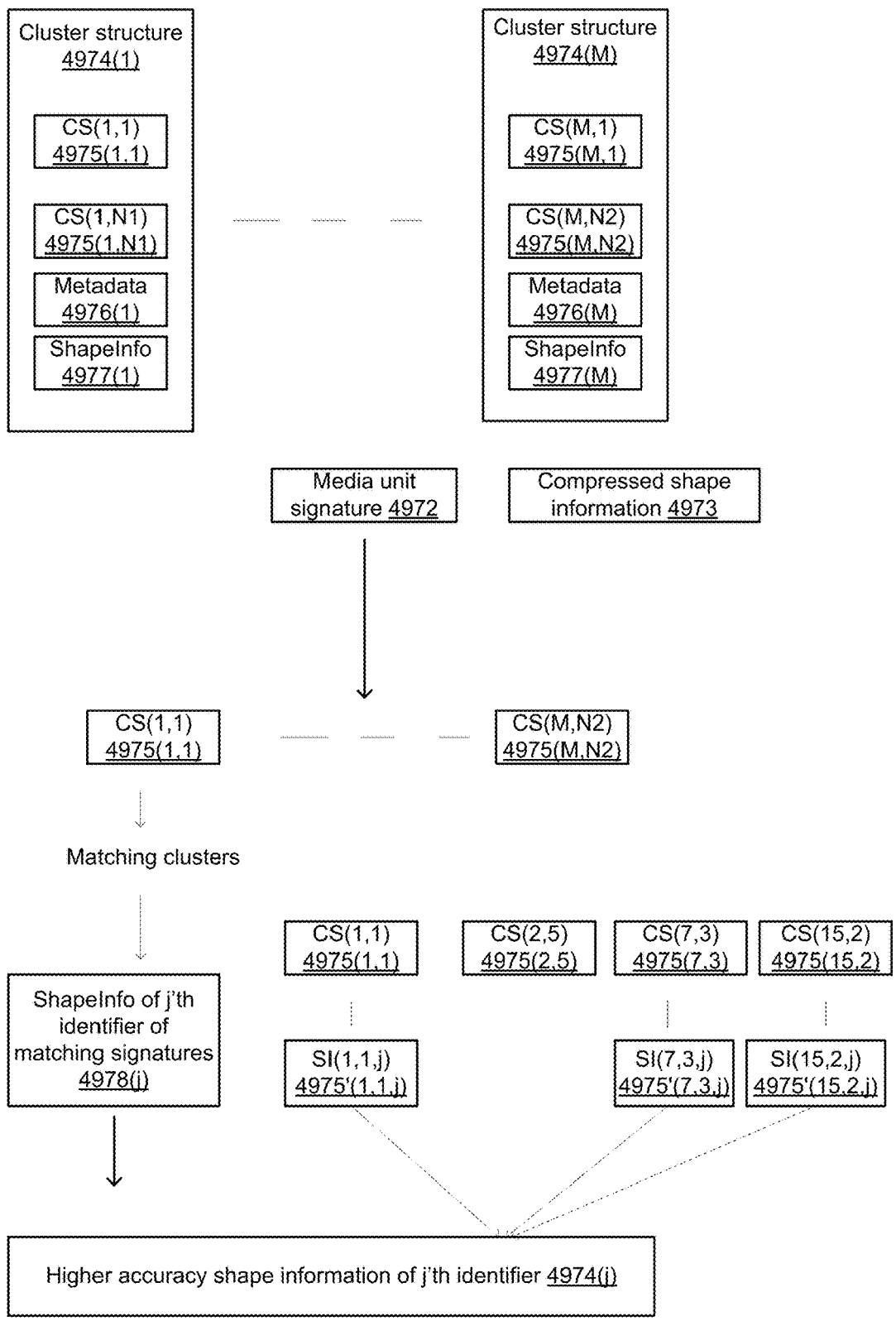
FIG. 10 is an example of a driving scenario.

It should be noted that different vehicle may perform obstacle avoidance maneuvers that may differ from each other by duration, vehicle behavior and the like. An example is illustrated in FIGS. 8-10 in which first, second and third vehicles perform different obstacle avoidance maneuvers and acquire different numbers of images during said obstacle avoidance maneuvers.

Figure 8:
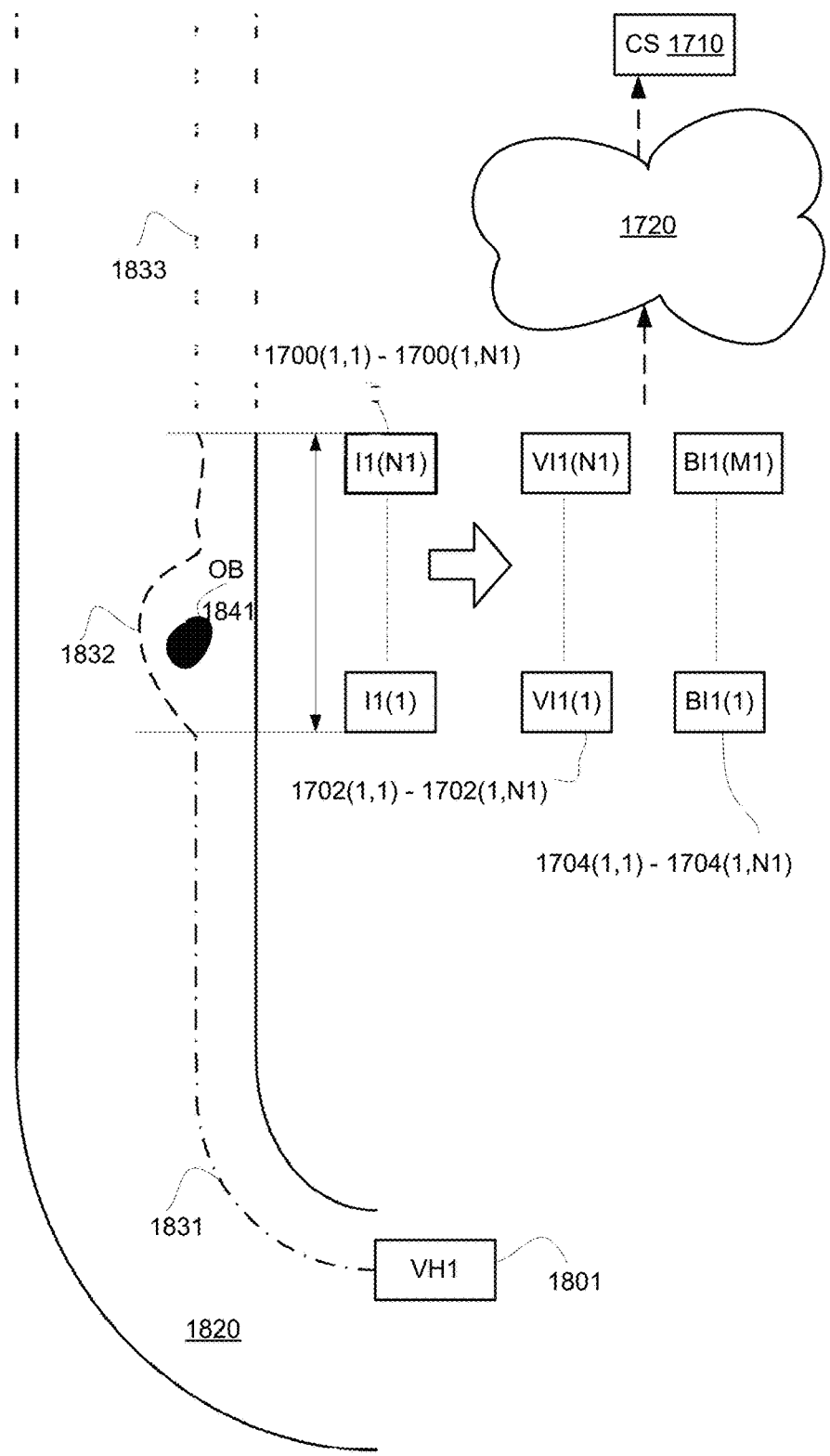
FIG. 8 is an example of a driving scenario.
Figure 9:
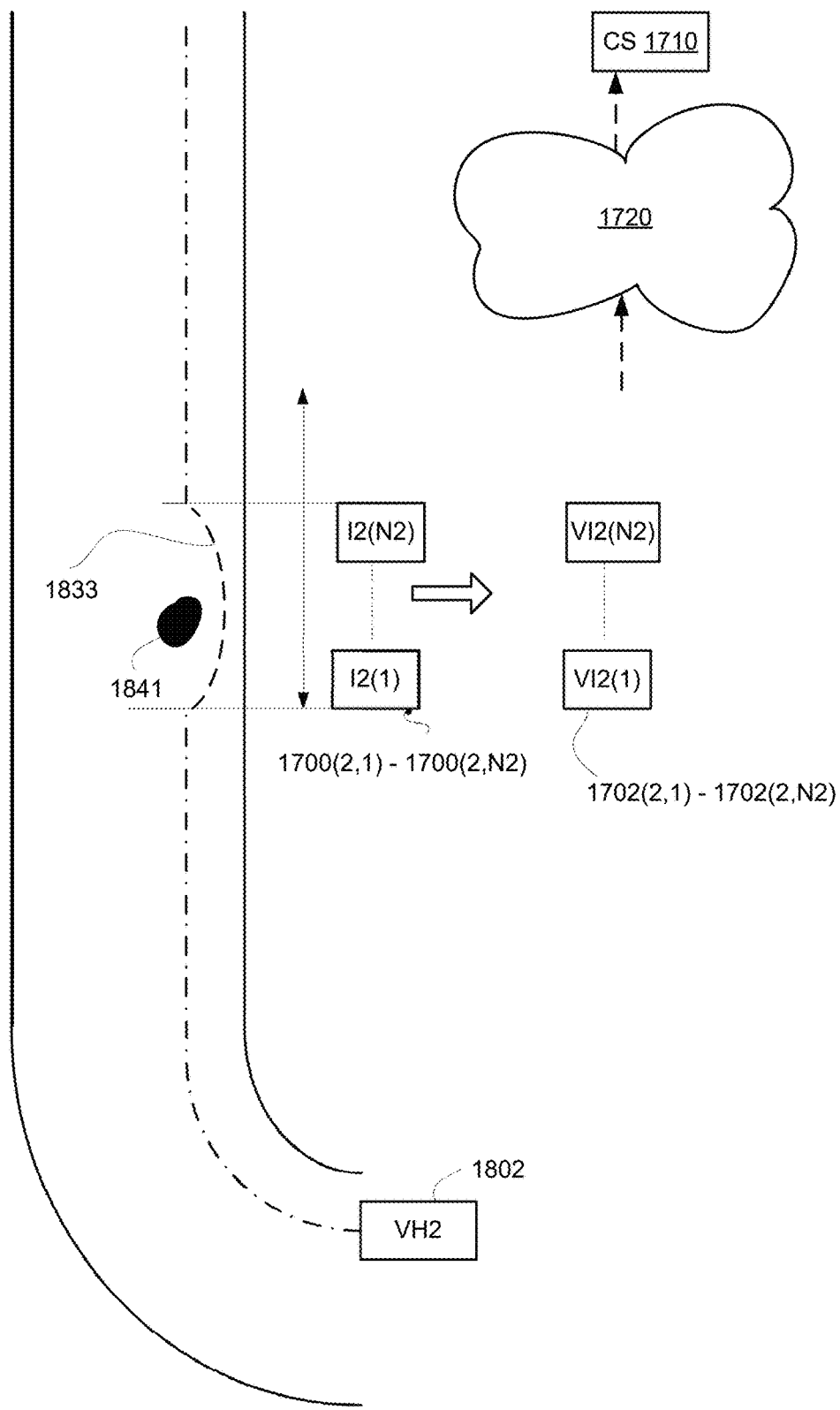
FIG. 9 is an example of a driving scenario.
Figure 10:
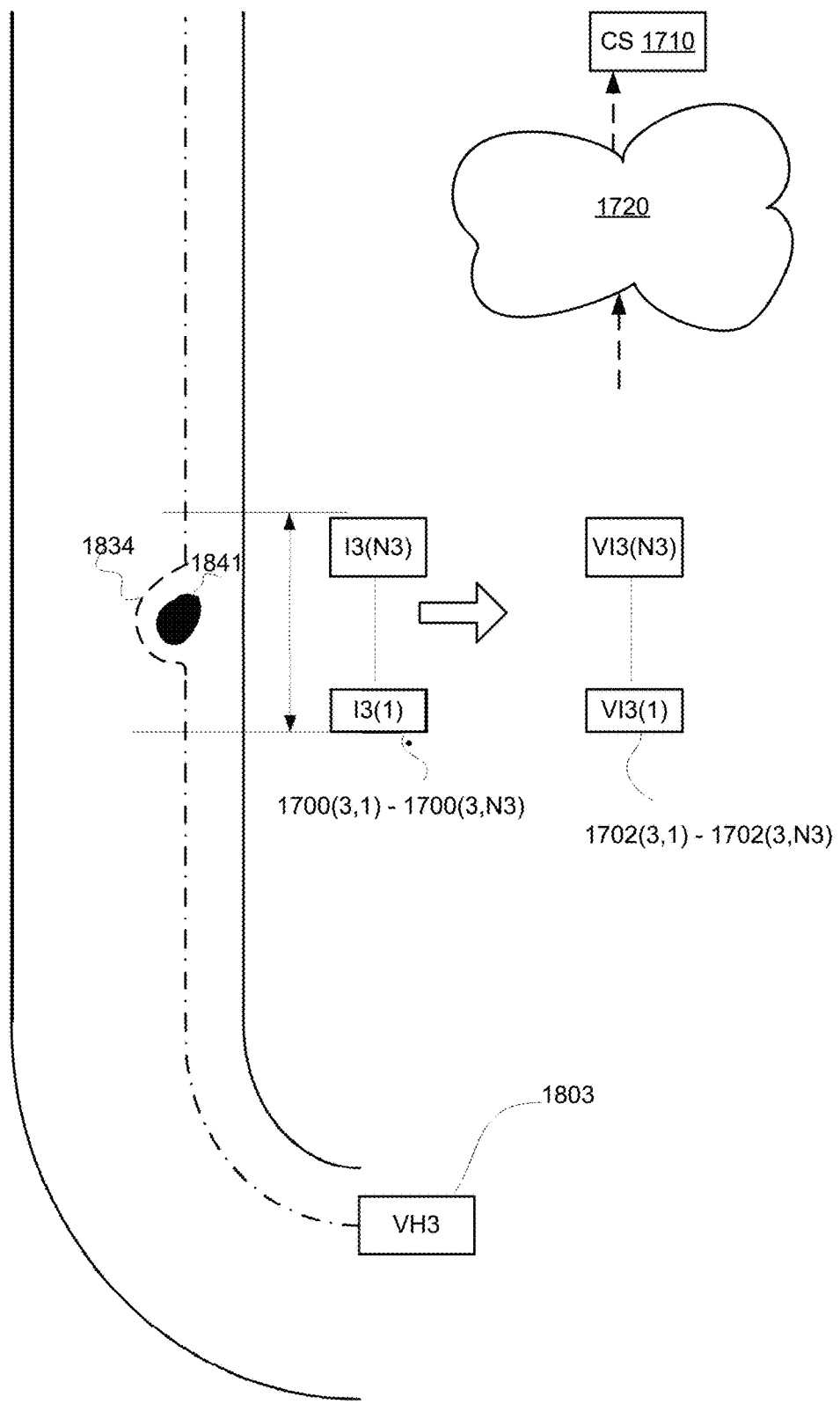

FIG. 8 illustrates a first vehicle (VH1) 1801 that propagates along a road 1820. First vehicle 1801 performs a maneuver 1832 suspected as being an obstacle avoidance maneuver when encountered with obstacle 1841. Maneuver 1832 is preceded by a non-suspected maneuver 1831 and is followed by another non-suspected maneuver 1833.

First vehicle 1801 acquires a first plurality (N1) of images I1(1)-I1(N1) 1700(1,1)-1700(1,N1) during obstacle avoidance maneuver 1832.

Visual information V1(1)-V1(N1) 1702(1,1)-1702(1,N1) is sent from first vehicle 1801 to computerized system (CS) 1710 via network 1720.

The visual information may be the images themselves. Additionally or alternatively, first vehicle processes the images to provide a representation of the images.

First vehicle 1801 may also transmit behavioral information B1(1)-B1(N1) 1704(1,1)-1704(1,N1) that represents the behavior of the vehicle during maneuver 1832.

FIG. 9 illustrates a second vehicle (VH2) 1802 that propagates along a road 1820. Second vehicle 1802 performs a maneuver 1833 suspected as being an obstacle avoidance maneuver when encountered with obstacle 1841. Maneuver 1832 is preceded by a non-suspected maneuver and is followed by another non-suspected maneuver.

Second vehicle 1802 acquires a second plurality (N2) of images I2(1)-I2(N2) 1700(2,1)-1700(2,N2) during maneuver 1833.

Visual information V2(1)-V2(N2) 1702(2,1)-1702(2,N2) is sent from second vehicle 1802 to computerized system (CS) 1710 via network 1720.

The visual information may be the images themselves. Additionally or alternatively, second vehicle processes the images to provide a representation of the images.

Second vehicle 1802 may also transmit behavioral information (not shown) that represents the behavior of the vehicle during maneuver 1832.

FIG. 10 illustrates a third vehicle (VH2) 1803 that propagates along a road. Third vehicle 1803 performs a maneuver 1834 suspected as being an obstacle avoidance maneuver when encountered with obstacle 1841. Maneuver 1834 is preceded by a non-suspected maneuver and is followed by another non-suspected maneuver.

Third vehicle 1803 acquires a third plurality (N3) of images I3(1)-I3(N3) 1700(3,1)-1700(3,N3) during maneuver 1834.

Visual information V3(1)-V3(N3) 1702(3,1)-1702(3,N3) is sent from third vehicle 1803 to computerized system (CS) 1710 via network 1720.

The visual information may be the images themselves. Additionally or alternatively, third vehicle processes the images to provide a representation of the images.

Third vehicle 1803 may also transmit behavioral information (not shown) that represents the behavior of the vehicle during maneuver 1832.

Figure 11:
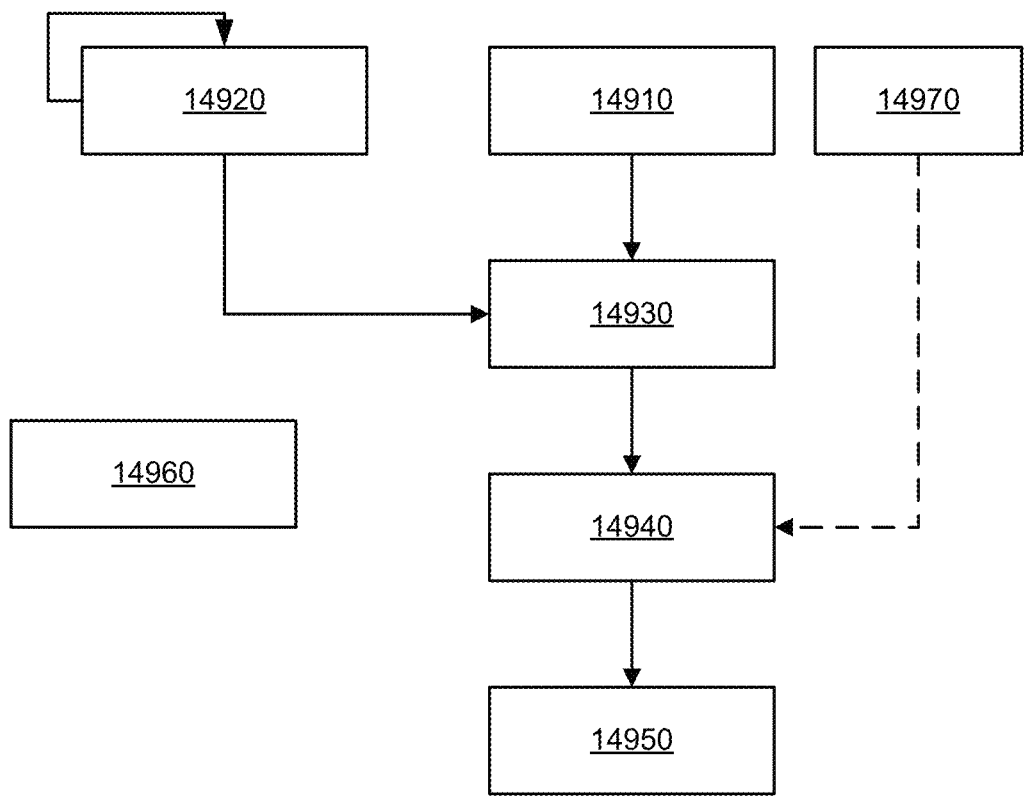
FIG. 11 is an example of a method.

FIG. 11 illustrates a method 1900 for detecting obstacles. The method may be executed by a vehicle.

Method 1900 may start by steps 1910 and 1920.

Step 1910 may include sensing, by a non-visual sensor of a vehicle, a behavior of a vehicle. The non-visual sensor may be an accelerometer, a shock absorber sensor, a brakes sensor, and the like.

Step 1920 may include acquiring, by a visual sensor of the vehicle, images of an environment of the vehicle. Step 1920 may continue even when such a suspected maneuver is not detected.

Steps 1920 and 1930 may be followed by step 1930 of determining, by a processing circuitry of the vehicle, whether the behavior of the vehicle is indicative of a vehicle maneuver that is suspected as being an obstacle avoidance maneuver.

The vehicle maneuver suspected as being an obstacle avoidance maneuver may be detected based on behavioral information that may be obtained from one or more sensors such as an accelerometer, a wheel speed sensor, a vehicle speed sensor, a brake sensor, a steering wheel sensor, an engine sensor, a shock absorber sensor, a driver sensor for sensing one or more physiological parameter of the driver (such as heart beat), or any other sensor—especially any other non-visual sensor.

The vehicle maneuver suspected as being an obstacle avoidance maneuver may involve a change (especially a rapid change) in the direction and/or speed and/or acceleration of the vehicle, a deviation from a lane, a deviation from a previous driving pattern followed at attempt to correct the deviation, and the like.

Step 1930 may be followed by step 1940 of processing the images of the environment of the vehicle obtained during a vehicle maneuver that is suspected as being the obstacle avoidance maneuver to provide visual information.

The visual information may be raw image data (such as images) acquired by a visual sensor of the vehicle, processed images, metadata or any other type of visual information that represents the images acquired by visual sensor.

The visual information may include one or more robust signatures of one or more images acquired by one or more visual sensors of the vehicle. A non-limiting example of a robust signature is illustrated in U.S. Pat. No. 8,326,775 which is incorporated herein by reference.

Step 1940 may be followed by step 1950 of transmitting the visual information to a system that is located outside the vehicle.

Method 1900 may also include step 1960 of receiving at least one visual obstacle identifier from a remote computer.

Method 1900 may include step 1970 receiving verification information indicative of whether the maneuver that was suspected being an obstacle avoidance maneuver is actually an obstacle avoidance maneuver. This may be used in the vehicle during step 1930.

Methods 1900 and 1600 illustrate a learning process. The products of the learning process may be used to detect obstacles—during an obstacle detection process that uses the outputs of the learning process.

The obstacle detection process may include detecting newly detected obstacles that were not detected in the past.

The learning process may continue during the obstacle detection process or may terminate before the obstacle detection process.

Figure 12:
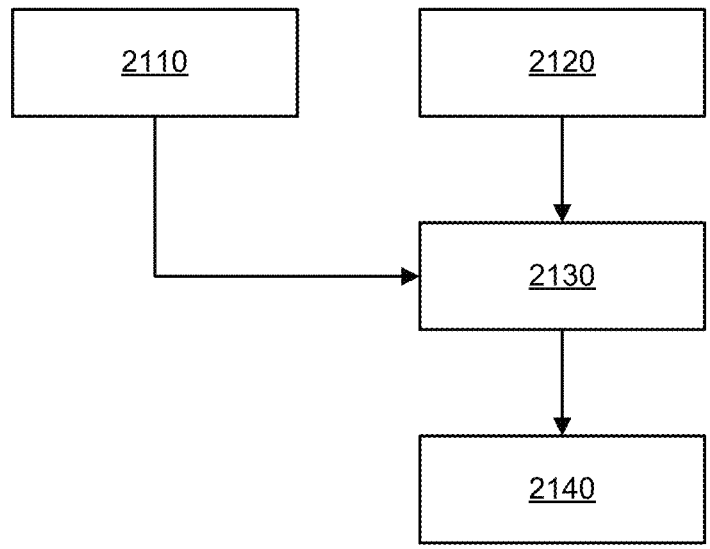
FIG. 12 is an example of a method.

FIG. 12 illustrates method 2100 for detecting an obstacle.

Method 2100 may start by step 2110 of receiving, by an I/O module of a vehicle, a visual obstacle identifier for visually identifying an obstacle; wherein the visual obstacle identifier is generated based on visual information acquired by at least one visual sensor during an execution of at least vehicle maneuver that is suspected as being an obstacle avoidance maneuver. Thus step 2110 may include receiving outputs of the learning processes of method 1600.

Method 2100 may also include step 2120 of acquiring, by a visual sensor of the vehicle, images of an environment of the vehicle.

Step 2120 may be followed by step 2130 of searching, by a processing circuitry of the vehicle, in the images of the environment of the vehicle for an obstacle that is identified by the visual obstacle identifier.

If finding such an obstacle then step 2130 may be followed by step 2140 of responding, by the vehicle, to a detection of an obstacle.

The responding may be based on a driving policy, may be responsive to the mode of controlling the vehicle (any level of automation—starting from fully manual control, following by partial human intervention and ending with fully autonomous).

For example—the responding may include generating an alert perceivable by a human driver of the vehicle, sending an alert to a computerized system located outside the vehicle, handing over the control of the vehicle to a human driver, handing over a control of the vehicle to an autonomous driving manager, sending an alert to an autonomous driving manager, performing an obstacle avoidance maneuver, determining whether the obstacle is a newly detected obstacle, informing another vehicle about the obstacle, and the like.

Determining a Location of a Vehicle

A vehicle, especially but not limited to an autonomous vehicle, has to be known its exact location in order to propagate in an efficient manner. For example—the vehicle may receive an obstacle warning that includes the location of the obstacle.

Responding to the obstacle warning may require knowing the exact location of the vehicle. Furthermore—an autonomous driving operation may require a knowledge of the exact location of the vehicle or may be executed in a more optimal manner if the exact location of the vehicle is known. In general, the processing burden associated with autonomous driving decision may be lowered when an autonomous driving manager is aware of the location of the vehicle.

Global positioning systems (GPS) are inaccurate and cannot be solely used for locating the exact location of a vehicle.

There is a growing need to determine the exact location of the vehicle in an efficient manner.

There is a provided an efficient and accurate method for determining the exact location of a vehicle.

The method is image-based in the sense that it is based on images acquired by the vehicle and on a comparison between the acquired images and reference information that was acquired at predefined locations.

The determining of the actual location of the vehicle is of a resolution that is smaller than a distance between adjacent reference images. For example—the resolution may be a fraction (for example between 1-15%, between 20-45%, of between 5-50%) of the distance between adjacent reference images. In the following example it is assumed that the distance between adjacent reference images is about 1 meter and the resolution is about 10 to 40 centimeters.

Figure 13:
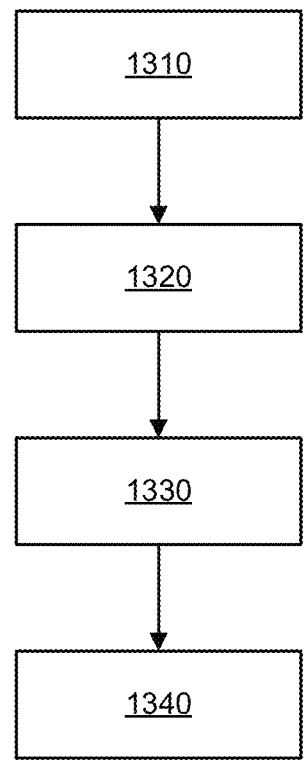
FIG. 13 is an example of a method.

FIG. 13 illustrates method 1300 for determining a location of a vehicle. receiving reference visual information that represents multiple reference images acquired at predefined locations.

Method 1300 may start by step 1310 of receiving reference visual information that represents multiple reference images acquired at predefined locations.

The multiple reference images may be taken within an area in which the vehicle is located. The area may be of any size and/or dimensions. For example, the area may include a part of a neighborhood, a neighborhood, a part of a city, a city, a part of a state, a state, a part of a country, a country, a part of a continent, a continent, and even the entire world.

A computerized system and the vehicle may exchange reference visual information in real-time (or near real-time) and/or in a burst mode, where the reference visual information may be provided either periodically and/or when conditions are suitable for a data exchange between the computerized system and the vehicle. For example, a vehicle may be configured to perform regular uploads/downloads of reference visual information when the engine is turned on (or off, with a keep alive battery function to facilitate communication with the computerized system). Alternatively, or in addition, the vehicle may be configured to perform such uploads/downloads when stationary (e.g., parked, or waiting at a traffic light) and a sufficiently reliable wireless connection is detected. Alternatively, or in addition, the uploads/downloads may be triggered by location, where the reference visual information may be downloaded from the computerized system when the vehicle enters an area for which it does not have up-to-date reference visual information.

The reference visual information may include the reference images themselves or any other representation of the reference images.

The reference information may include robust signatures of reference images. The robust signature may be robust to at least one out of noise, lighting conditions, rotation, orientation, and the like—which may provide a robust location detection signatures. Furthermore—using robust signatures may simplify the acquisition of the reference images—as there is no need to acquired reference images in different lighting conditions or other conditions to which the robust signature is indifferent.

The comparison between the reference information and information from the acquired image may be even more efficient when the reference visual information and information regarding the acquired image is represented in a cortex representation.

A cortex representation of an image is a compressed representation of the visual information that is generated by applying a cortex function that include multiple compression iteration. A signature of an image may be a map of firing neurons that fire when a neural network is fed with an image. The map undergoes multiple compression iterations during which popular strings are replaced by shorter representations.

Method 1300 may also include step 1320 of acquiring, by a visual sensor of the vehicle, an acquired image of an environment of the vehicle. It should be noted that multiple images may be acquired by the vehicle—but for simplicity of explanation the following text will refer to a single image. The vehicle may repetitively determine its location—and multiple repetitions of steps 1320, 1330 and 1340 may be repeated multiple times—for different images.

Step 1330 may include generating, based on the acquired image, acquired visual information related to the acquired image.

The location determination may be based on visual image regarding static obstacles. Accordingly—each one of the reference visual information and the acquired visual information may include static visual information related to static objects.

The extraction of the static visual information may include reducing from the visual information any visual information that is related to dynamic objects. The extraction of the static information may or may not require object recognition.

The acquired visual information may include acquired static visual information that may be related to at least one static object located within the environment of the vehicle.

Step 1330 may be followed by step 1340 of searching for a selected reference image out of the multiple reference images. The selected reference image may include selected reference static visual information that best matches the acquired static visual information.

Step 1340 may be followed by step 1350 of determining an actual location of the vehicle based on a predefined location of the selected reference image and to a relationship between the acquired static visual information and to the selected reference static visual information.

The determining of the actual location of the vehicle may be of a resolution that may be smaller than a distance between the selected reference image and a reference image that may be immediately followed by the selected reference image.

The determining of the actual location of the vehicle may include calculating a distance between the predefined location of the selected reference image and the actual location of the vehicle based on a relationship between at least one value of a size parameter of the at least one static object within the selected reference image and at least one value of the size parameter of the at least one static object within the acquired image.

The determining of the actual location of the vehicle may include determining whether the actual location of the vehicle precedes the predefined location of the selected reference image or precedes the predefined location of the selected reference image.

The method may include subtracting the first distance from the predefined location of the selected reference image when determining that the actual location of the vehicle precedes the predefined location of the selected reference image.

The method may include adding the first distance from the predefined location of the selected reference image when determining that the actual location of the vehicle follows the predefined location of the selected reference image.

Each predefined location may be associated with a single reference image.

Alternatively, each reference image may be associated with multiple images that differ from each other by scale. The images that differ from each other by scale may represent different relative distances between the vehicle and the predefined image—larger scale may be related to smaller distances.

Using images of different scale (or visual information related to images of different scale) may reduce the computational load associated with location determination—as it may eliminate the need to manipulate a single reference image to find an exact math that may determine the distance between the vehicle and the reference location.

Using visual information related to images of different scale may also assist when the visual information is a lossy representation of the images in which a representation of an object of certain scale cannot be easily generated based on a representation of the same object of another scale. The visual information may be a signature of an image may be a map of firing neurons that fire when a neural network is fed with an image. See, for example, the signature of U.S. Pat. Nos. 8,326,775 and 8,312,031, assigned to common assignee, which are hereby incorporated by reference.

Figure 14:
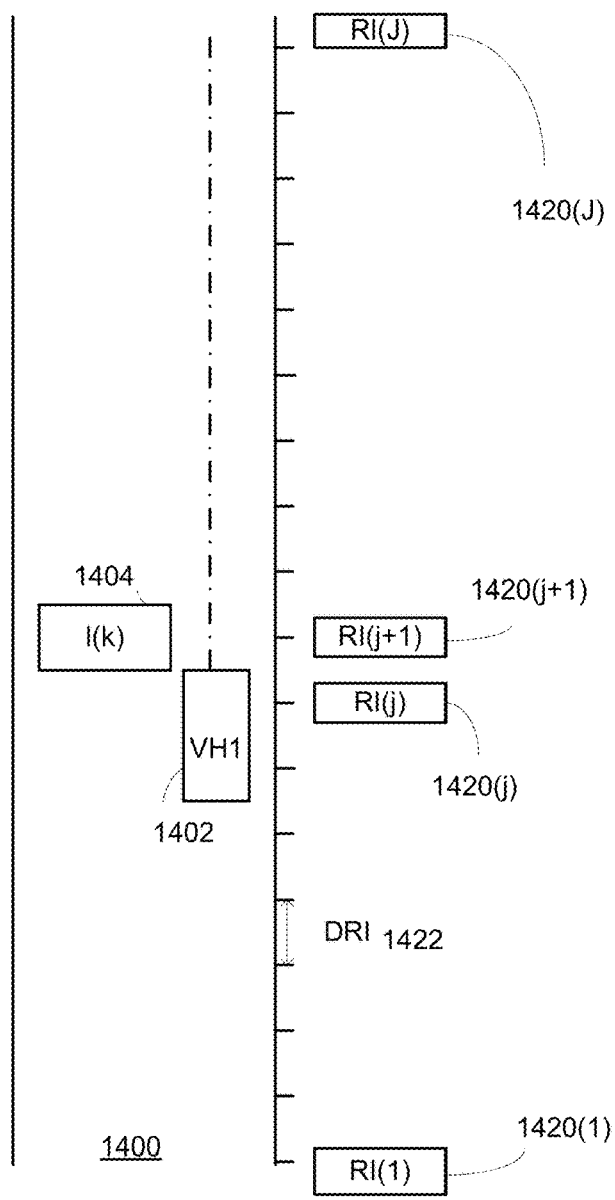
FIG. 14 is an example of a driving scenario.

FIG. 14 illustrates an example of a vehicle VH1 1402 that acquires an image I(k) 1404 and tries to determine its location based on analysis of visual information it generates from image I(k) and multiple reference images RI(1,1)-RI(j,1) 1402(1)-1402(j) and RI(j+1,1)-RI(j) 1402(j+1,1)-1402(J,1). The front of the vehicle is positioned between the predefined locations associated with reference images RI(j) and RI(j+1)—and one of these images should be associated with reference visual information that best matches the visual information associated with image I(k). The distance between consecutive predefined locations is DRI 1422—and the location resolution is finer than DRI.

Figure 15:
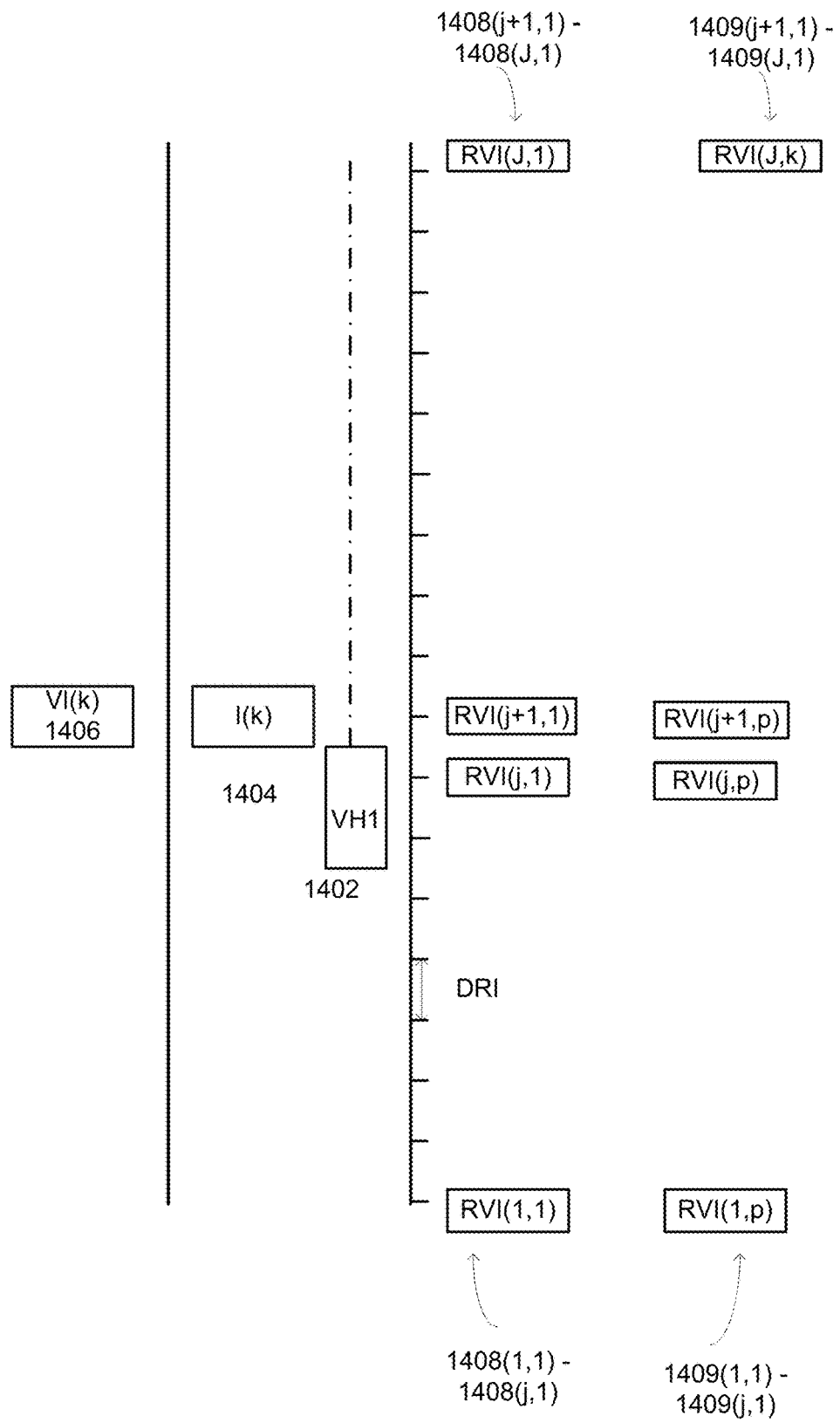
FIG. 15 is an example of a driving scenario.
Figure 16:
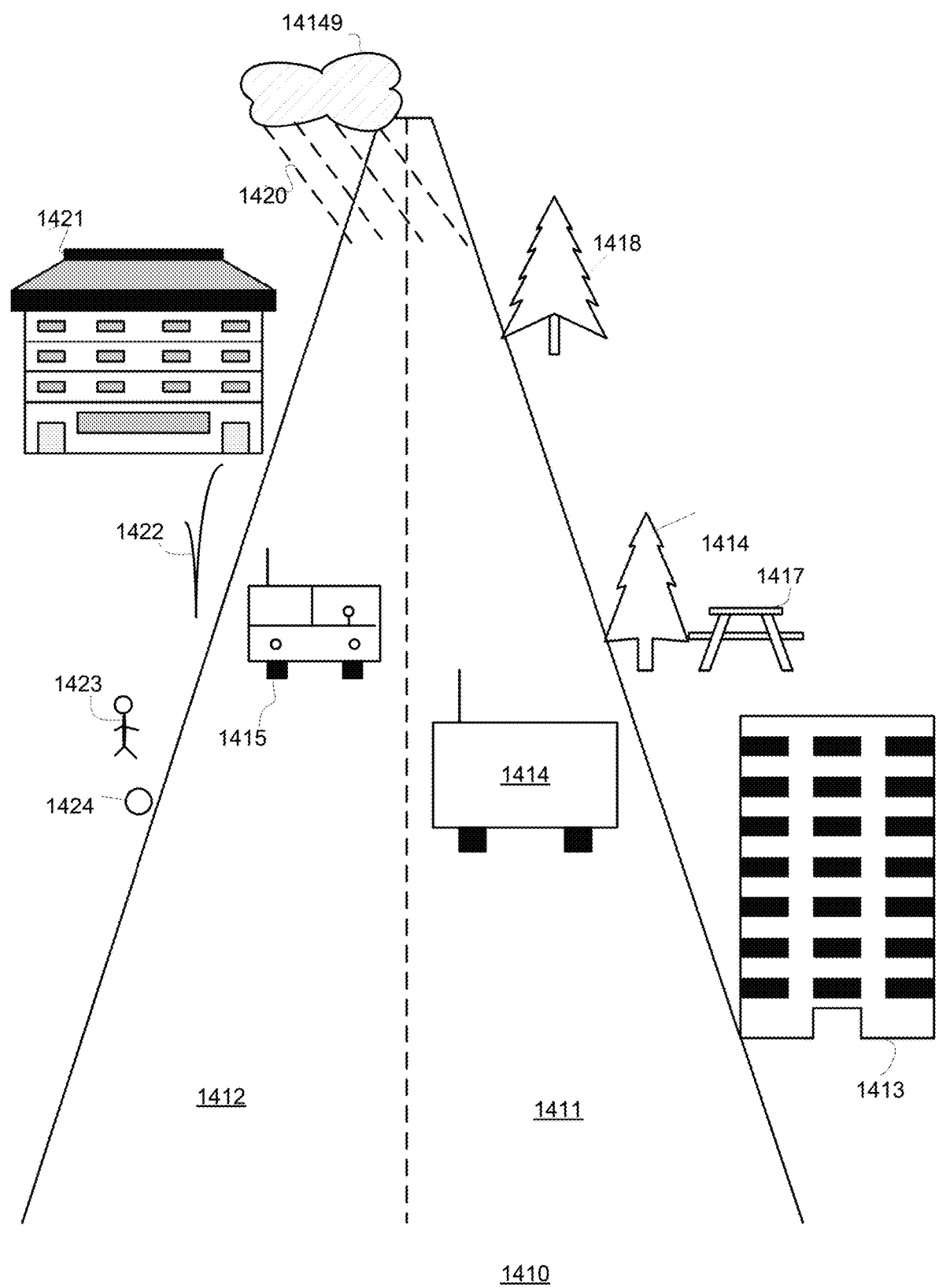
FIG. 16 is an example of a scene.

FIG. 15 illustrates an example of a vehicle VH1 1402 that acquires an image I(k) 1404 and tries to determine its location based on analysis of visual information (1406) it generates from image I(k) and visual information related to reference images. In FIG. 15 each predefined location is associated with a plurality of reference images—with a plurality (p) of reference visual information per reference location—1408(1,1)-1408(j,1), 1408(j+1,1)-1408(J,1), 1409(1,p)-1409(j,p), and 1409(j+1,p)-1409(J,p).

The front of the vehicle is positioned between the j'th and (j+1)'th predefined locations and the vehicle may determine the best matching predefined location and also the distance from the predefined locations based on the p different reference visual information associated with one of these predefined locations.

Figure 17:
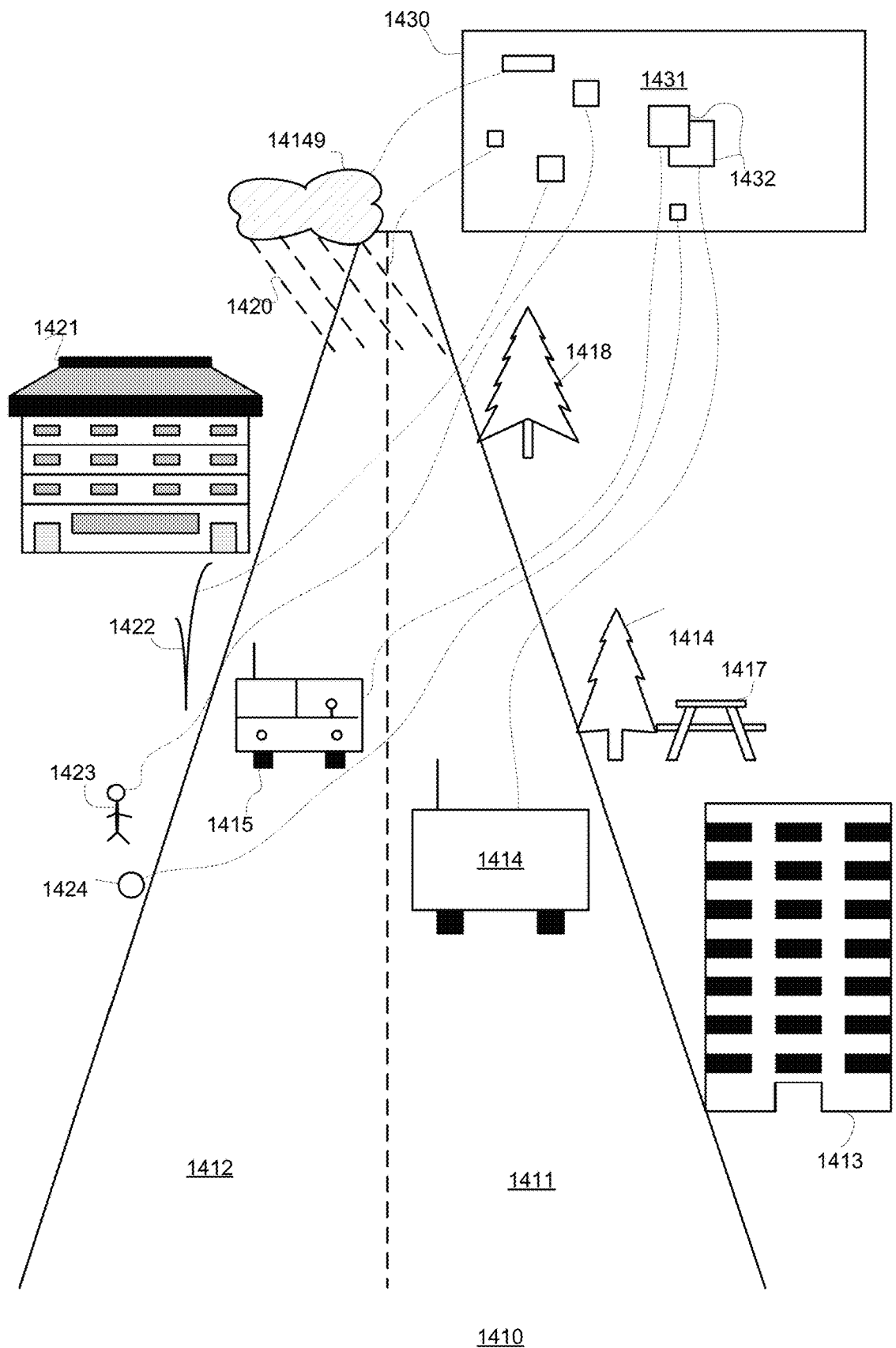
FIG. 17 is an example of a scene.
Figure 18:
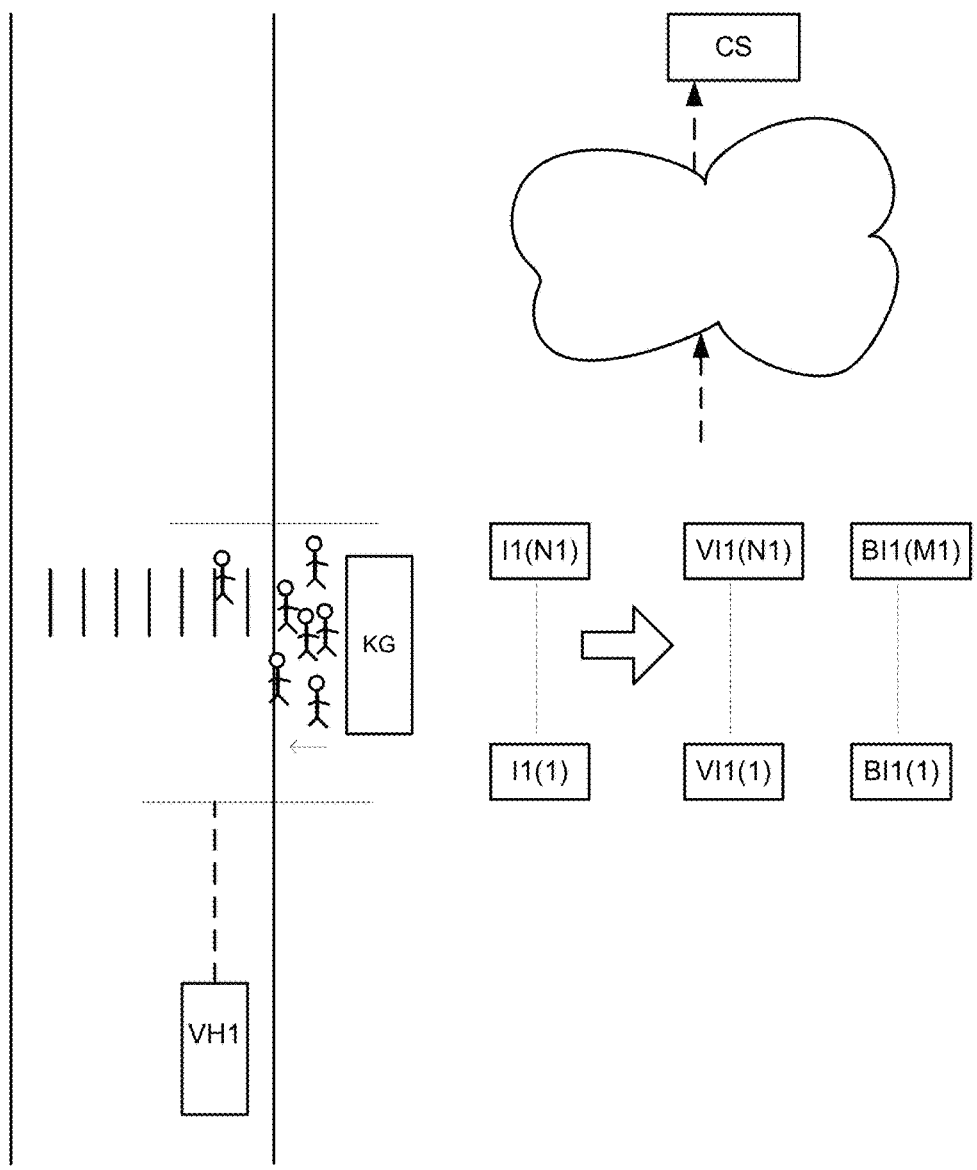
FIG. 18 is an example of a driving scenario.

FIGS. 17 and 18 illustrate an example of an image and static visual information.

FIG. 17 illustrates an example of an image acquired by a vehicle. The image shows two lanes 1411 and 1412 of a road, right building 1413, vehicles 1414 and 1415, first tree 1416, table 1417, second tree 1418, cloud 1419, rain 1420, left building 1421, shrubbery 1422, child 1423 and ball 1424.

The dynamic objects of this image include vehicles 1414 and 1415, cloud 1419, rain 1420, shrubbery 1422, child 1423 and ball 1424. These dynamic objects may be represented by visual information (such as signatures) that describe them as dynamic—and visual information related to these dynamic objects may be removed from the visual information of the images to provide static visual information.

FIG. 18 illustrates the removal (blocks 1432) of dynamic visual information from the visual information 1430 to provide static visual information 1431.

Visual information 1430 may be a map of firing neurons of a network that fired when the neural network was fed with image I(k)—or may be a compressed representation (for example a cortex representation) of such map.

Triggering Human Intervention

FIG. 19 illustrates method 1450.

Method 1450 may be aimed to find at least one trigger for human intervention in a control of a vehicle.

Method 1450 may start by step 1452 of receiving, from a plurality of vehicles, and by an I/O module of a computerized system, visual information acquired during situations that are suspected as situations that require human intervention in the control of at least one of the plurality of vehicles.

Step 1452 may be followed by step 1456 of determining, based at least on the visual information, the at least one trigger for human intervention. The at least one trigger is represented by trigger visual information.

Step 1456 may include at least one out of

Determining a complexity of the situation.

Determining a danger level associated with the situation.

Determining in response to statistics of maneuvers executed by different vehicles during a same situation that is suspected as a situation that requires human intervention in the control of at least one of the plurality of vehicles.

Determining based on generated or received movement information of entities included in the visual information. The movement information may represent entity movement functions of the entities.

The determining may include estimating, based on the entity movement functions, a future movement of the entities.

The determining of step 1456 may be executed in an unsupervised manner or a supervised manner.

The determining of step 1456 is responsive to at least one human intervention policy of the at least one vehicle. The human intervention policy of a vehicle may differ from the human intervention policy of another vehicle.

A human intervention policy of a vehicle may define certain criteria human intervention such as the danger level of a situation, the complexity of the situation (especially complexity of maneuvers required to overcome the situation), the potential damage that may result to the vehicle, driver or surroundings due to the situation. A human intervention policy of a vehicle may also define certain situations that require human intervention—such as specific locations (for example near a cross road of a school), or specific content (near a school bus), and the like.

A trigger may be determined during step 1456 when the situation or one of the attributes of the situation (danger level, location, combination of location and time) match those of the human intervention policy.

Situations that are suspected as requiring human intervention in the control of a vehicle may be viewed as situations that are complex and/or dangerous and/or require changes in the behavior of a vehicle. These situations may result from an obstacle or may result from other reasons.

Situations that are suspected as requiring human intervention in the control of a vehicle may be automatically detected by processing images obtained while a vehicle performs maneuvers that are suspected as resulting from situations that are suspected as requiring human intervention in the control of a vehicle.

Situations that are suspected as requiring human intervention in the control of a vehicle may be detected based on behavioral information regarding behavior of the plurality of vehicles, during an execution of the maneuvers that are suspected as resulting from situations that are suspected as requiring human intervention in the control of a vehicle.

The behavioral information may represent the behavior (speed, direction of propagation, and the like) of the entire vehicle and/or may represent the behavior of parts or components of the vehicle (for example damping a shock by a shock absorber, slowing the vehicle by the breaks, turns of the steering wheel, and the like), and/or may represent the behavior of the driver (the manner in which the driver drives), and the like.

After a situation is tagged as requiring human intervention in the control of a vehicle—the vehicle may trigger human intervention when this situation is visually detected. For example—some events (or some types of events) may be defined (even based on previous recognition of a situation as requiring human intervention in the control of a vehicle) as requiring human intervention. For example—an image of a cross road located near a school, an image of a school bus that transports children, an image of a bar and drunken pedestrians near the bar, an image of multiple people that are near the road, and the like may be flagged as situation as requiring human intervention in the control of a vehicle A determination of what constitutes a vehicle maneuver suspected as requiring human intervention in the control of a vehicle may be detected in a supervised manner or in an unsupervised manner.

Such a maneuver may be an uncommon maneuver in comparison to at least one out of (a) maneuvers of the same vehicle, (b) maneuvers performed at the same location by other drivers, (c) maneuvers performed in other places by other drivers, and the like. The maneuver may be compared to other maneuvers at the same time of day, at other times of day, at the same date, at other dates and the like.

The vehicle maneuver suspected as related to a situation that requires human intervention in the control of a vehicle may involve a change (especially a rapid change) in the direction and/or speed and/or acceleration of the vehicle, a deviation from a lane, a deviation from a previous driving pattern followed at attempt to correct the deviation, and the like.

For example—when applying supervised learning of obstacles—the computerized system may be fed with examples of vehicle behaviors that require human intervention in the control of a vehicle.

For example—the determining may include ruling out common behaviors such as stopping in front of a red traffic light.

For example—a fast and significant change in the speed and direction of a vehicle at a linear road path may indicate that the vehicle encountered a situation requiring human intervention in the control of a vehicle The visual information may be raw image data (such as images) acquired by a visual sensor of the vehicle, processed images, metadata or any other type of visual information that represents the images acquired by visual sensor.

The visual information may include one or more robust signatures of one or more images acquired by one or more visual sensors of the vehicle. A non-limiting example of a robust signature is illustrated in U.S. Pat. No. 8,326,775 which is incorporated herein by reference.

Step 1456 may be followed by step 1460 of transmitting to one or more of the plurality of vehicles, the trigger visual information.

Figure 20:
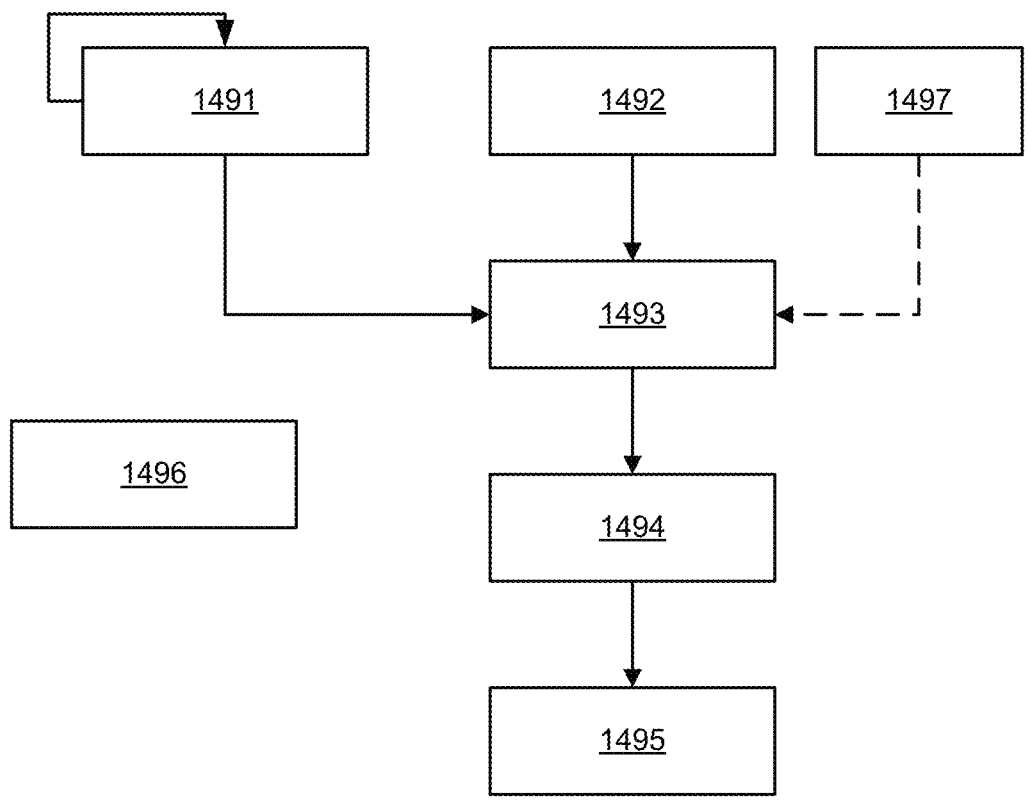
FIG. 20 is an example of a method.
Figure 21:
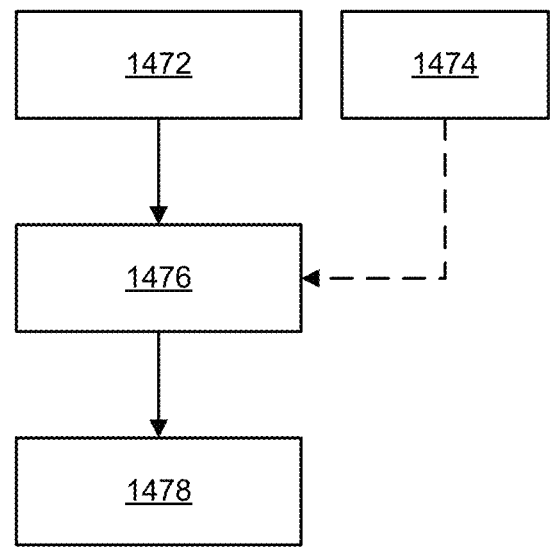

FIG. 20 illustrates a method 1490 for detecting situation that requires human intervention in the control of a vehicle. The method may be executed by a vehicle.

Method 1490 may start by steps 1491 and 1492.

Step 1491 may include sensing, by a non-visual sensor of a vehicle, a behavior of a vehicle. The non-visual sensor may be an accelerometer, a shock absorber sensor, a brakes sensor, and the like.

Step 1492 may include acquiring, by a visual sensor of the vehicle, images of an environment of the vehicle.

Steps 1491 and 1492 may be followed by step 1493 of determining, by a processing circuitry of the vehicle, whether the behavior of the vehicle is indicative of a vehicle maneuver that is related to a situation that is suspected as requiring human intervention in the control of a vehicle.

The vehicle maneuver related to a situation that is suspected as requiring human intervention in the control of a vehicle may be detected based on behavioral information that may be obtained from one or more sensors such as an accelerometer, a wheel speed sensor, a vehicle speed sensor, a brake sensor, a steering wheel sensor, an engine sensor, a shock absorber sensor, a driver sensor for sensing one or more physiological parameter of the driver (such as heart beat), or any other sensor—especially any other non-visual sensor.

The vehicle maneuver related to a situation that is suspected as requiring human intervention in the control of a vehicle may involve a change (especially a rapid change) in the direction and/or speed and/or acceleration of the vehicle, a deviation from a lane, a deviation from a previous driving pattern followed at attempt to correct the deviation, and the like.

Step 1493 may be followed by step 1494 of processing the images of the environment of the vehicle obtained during a vehicle maneuver related to a situation that is suspected as requiring human intervention in the control of a vehicle to provide visual information.

The visual information may be raw image data (such as images) acquired by a visual sensor of the vehicle, processed images, metadata or any other type of visual information that represents the images acquired by visual sensor.

The visual information may include one or more robust signatures of one or more images acquired by one or more visual sensors of the vehicle. A non-limiting example of a robust signature is illustrated in U.S. Pat. No. 8,326,775 which is incorporated herein by reference.

Step 1494 may be followed by step 1495 of transmitting the visual information to a system that is located outside the vehicle.

Method 1490 may also include step 1496 of receiving at least one visual obstacle identifier from a remote computer.

Method 1490 may include step 1497 receiving verification information indicative of whether the maneuver related to a situation that is suspected as requiring human intervention in the control of a vehicle maneuver is actually related to a situation that actually requires human intervention in the control of a vehicle. This may be used in the vehicle during step 1493.

Methods 1450 and 1490 illustrate a learning process. The products of the learning process may be used to detect situations that require human intervention in the control of a vehicle—during a vehicle control process that uses the outputs of the learning process.

The learning process may continue during the vehicle control process or may terminate before the vehicle control process.

Figure 21:
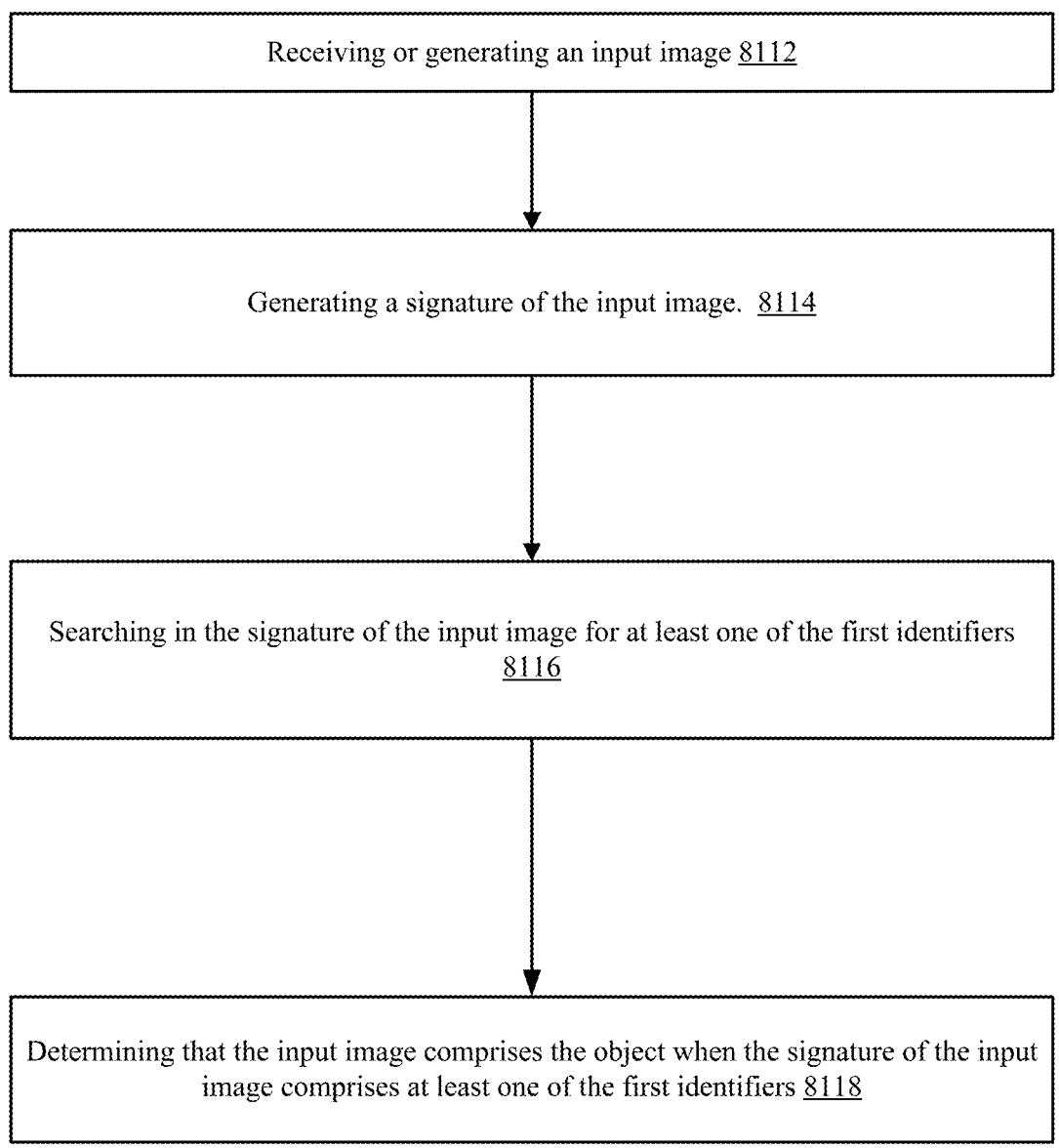
FIG. 21 is an example of a method.

FIG. 21 illustrates method 1470.

Method 1470 may start by step 1472 of receiving, by an I/O module of a vehicle, trigger visual information for visually identifying situations that require human intervention in the control of a vehicle. The visual obstacle identifier is generated based on visual information acquired by at least one visual sensor during an execution of at least vehicle maneuver that is suspected as being an obstacle avoidance maneuver. Thus step 1472 may include receiving outputs of the learning processes of method 1450.

Method 1470 may also include step 1474 of acquiring, by a visual sensor of the vehicle, images of an environment of the vehicle.

Step 1474 may be followed by step 1476 of searching, by a processing circuitry of the vehicle, images of the environment of the vehicle for a situation that is identified by the trigger visual information.

If finding such a situation then step 1476 may be followed by step 1478 of triggering human intervention in the control of a vehicle. This may include alerting the driver that human intervention is required, handing the control of the vehicle to the driver—and the like.

Step 1478 may include, for example—generating an alert perceivable by a human driver of the vehicle, sending an alert to a computerized system located outside the vehicle, handing over the control of the vehicle to a human driver, handing over a control of the vehicle from an autonomous driving manager, sending an alert to an autonomous driving manager, informing another vehicle about the trigger, and the like.

FIGS. 22-27 illustrate example of situations that are suspected as requiring human intervention in the control of a vehicle.

Figure 22:
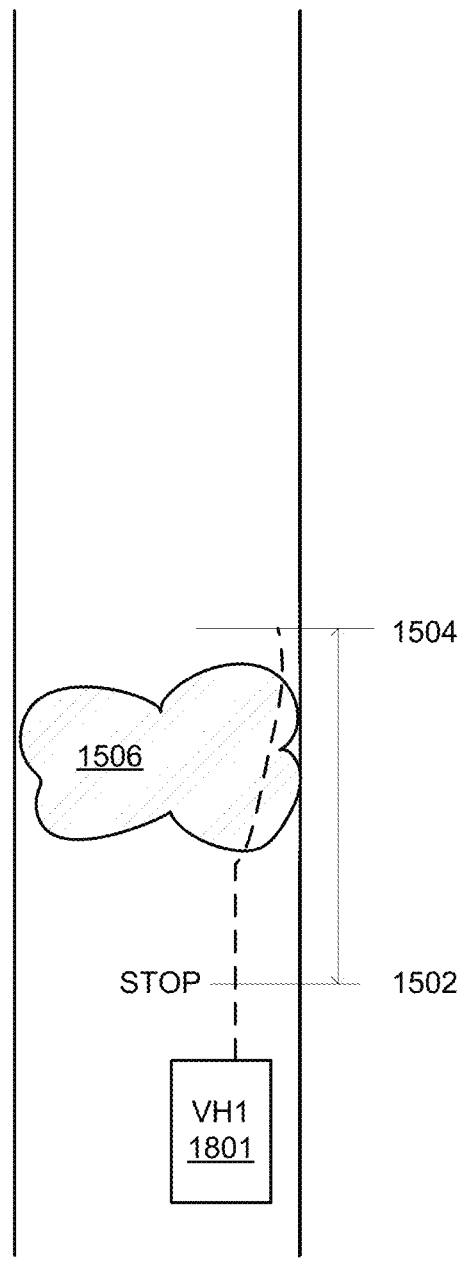
FIG. 22 is an example of a driving scenario.

FIG. 22 illustrates first vehicle VH1 1801 as stopping (position 1501) in front of a puddle 1506 and then passing the puddle (may drive straight or change its direction till ending the maneuver at point 1502. The maneuver may be indicative that passing the puddle may require human intervention.

Visual information acquired between positions 1501 and 1502 are processed during step 1494.

Figure 23:
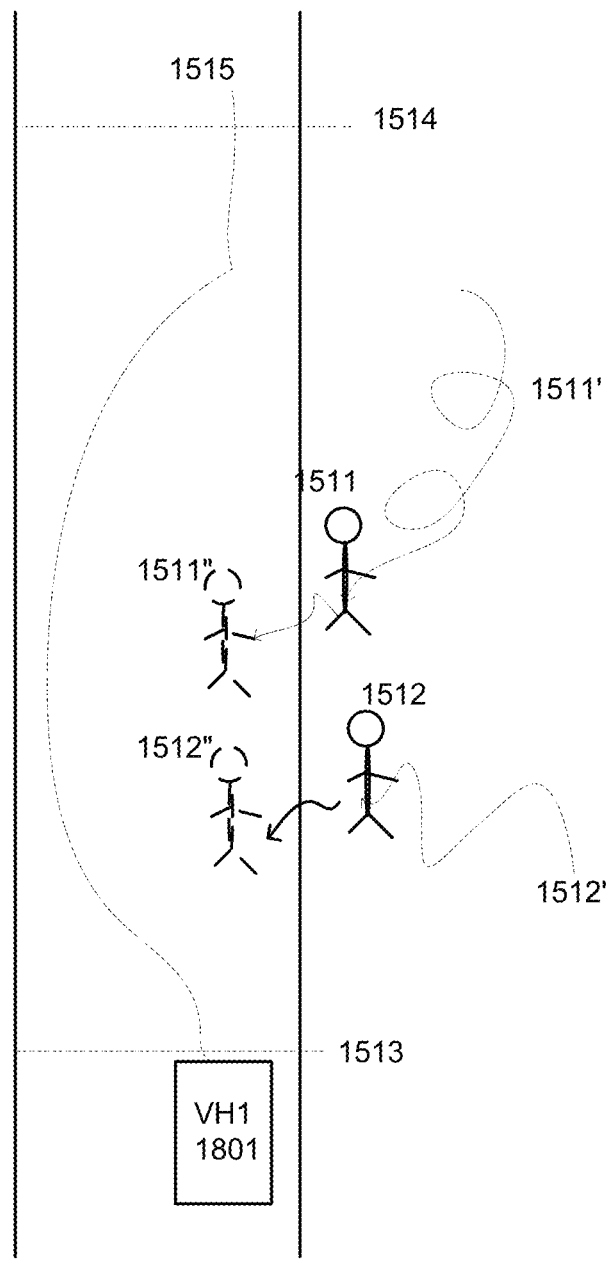
FIG. 23 is an example of a driving scenario.

FIG. 23 illustrates first vehicle VH1 1801 as sensing pedestrians 1511 and 1512. These pedestrians either are associated with temporal signatures that illustrate their movement (1511' and 1512') and/or the vehicle may sense the movements of the pedestrians—and the vehicle may send (based on the movement) the future movement and the future location (1511" and 1512") of the pedestrians and perform a maneuver that may include altering speed (for example stopping at point 1513) and/or bypassing the pedestrians (maneuver 1515).

Visual information acquired between positions 1513 and 1514 (end of the maneuver) are processed during step 1494.

Figure 24:
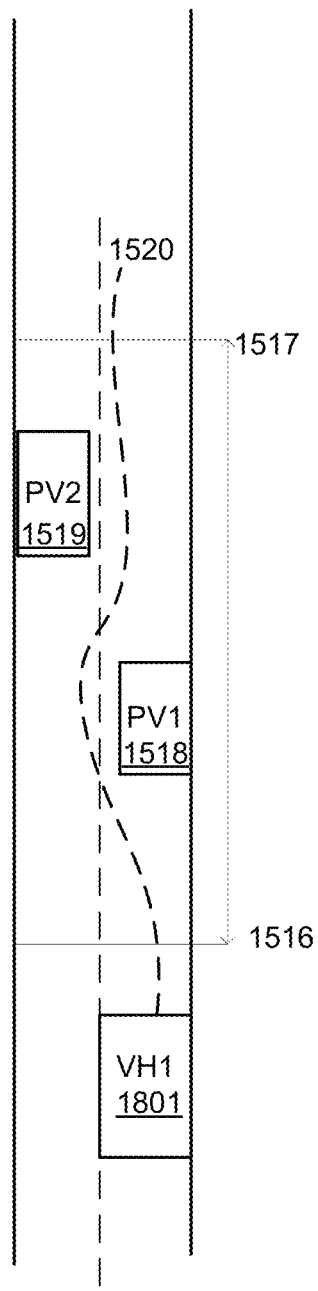
FIG. 24 is an example of a driving scenario.

FIG. 24 illustrates first vehicle VH1 1801 as sensing parked vehicles PV1 1518 and PV2 1519 that part on both sides of a double-lane bi-directional road, that require the first vehicle to perform a complex maneuver 1520 that includes changing lanes and changing direction relatively rapidly.

Visual information acquired between positions 1516 (beginning of the maneuver) and 1517 (end of the maneuver) are processed during step 1494.

Figure 25:
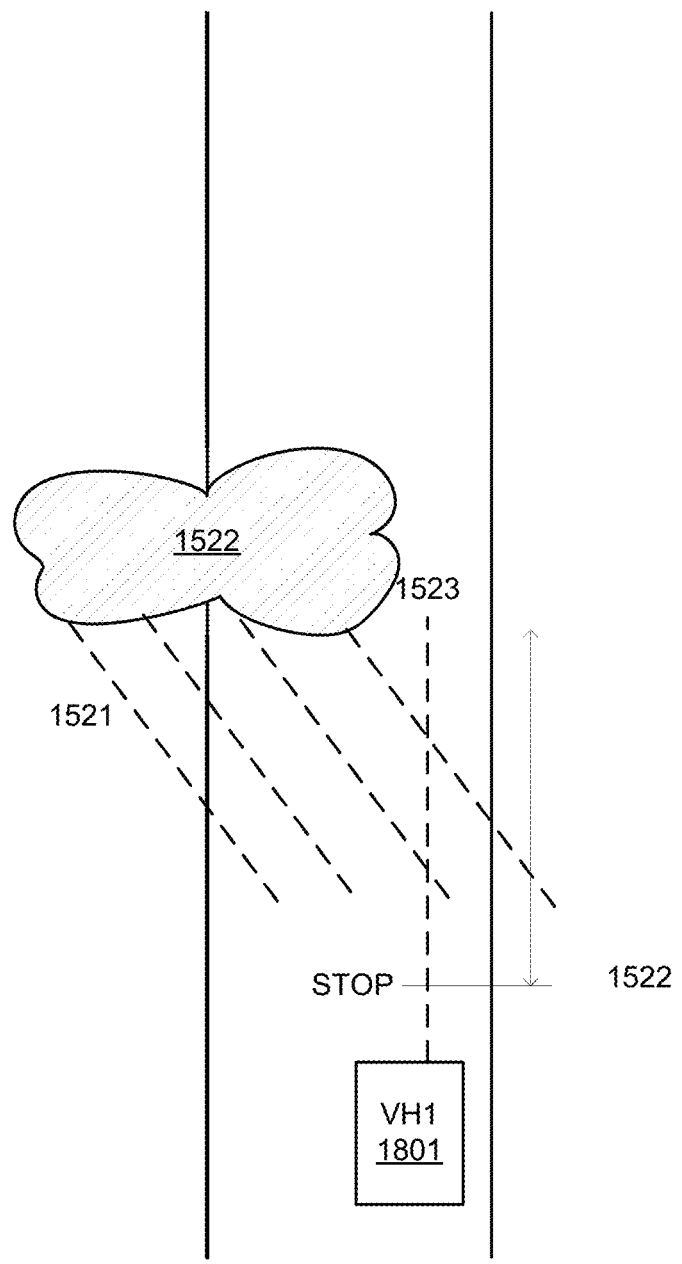
FIG. 25 is an example of a driving scenario.

FIG. 25 illustrates first vehicle VH1 1801 as stopping (position 1522) in front of wet segment of the road on which rain 1521 (from cloud 1522) falls. The stop (at location 1522) and any further movement after moving to another part of the road may be regarded as a maneuver 1523 that is indicative that passing the wet segment may require human intervention.

Visual information acquired between position 1522 (beginning of the maneuver) and the end of the maneuver are processed during step 1494.

Figure 26:
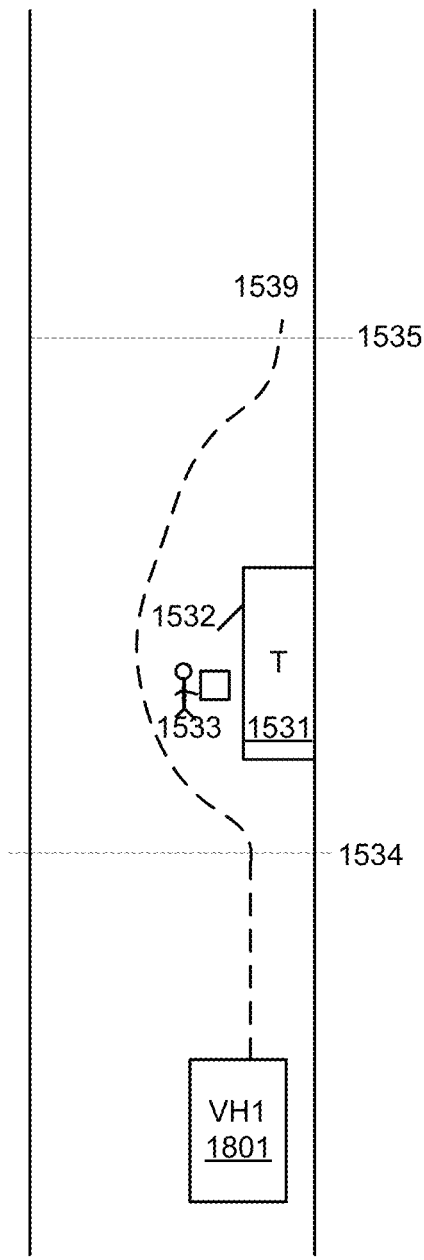
FIG. 26 is an example of a driving scenario.

FIG. 26 illustrates first vehicle VH1 1801 as stopping (position 1534) in front of a situation that may be labeled as a packing or unpacking situation—a track 1531 is parked on the road, there is an open door 1532, and a pedestrian 1533 carries luggage on the road. The first vehicle 1801 bypasses the truck and the pedestrian between locations 1534 and 1535 during maneuver 1539. The maneuver may be indicative that a packing or unpacking situation may require human intervention.

Visual information acquired between positions 1534 and 1535 are processed during step 1494.

Figure 27:
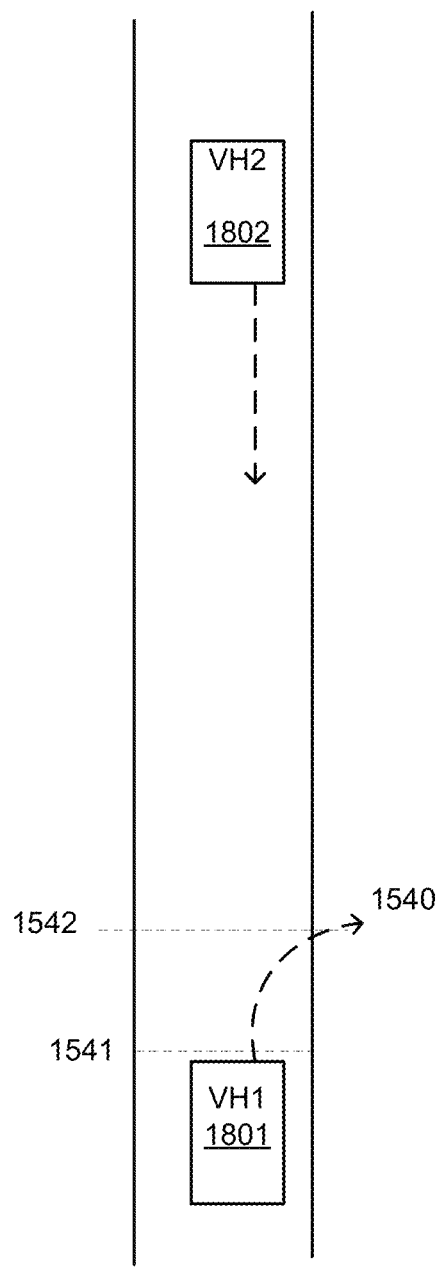
FIG. 27 is an example of a driving scenario.

FIG. 27 illustrates first vehicle VH1 1801 as turning away (maneuver 1540) from the road when sensing that it faces a second vehicle VH2 1802 that moves towards VH1 1801. Maneuver 1540 may be indicative that such as potential collision situation may require human intervention.

Visual information acquired between positions 1541 and 1542 (start and stop of maneuver 1540) are processed during step 1494.

Tracking after an Entity

There may be beneficial to detect and object in a robust and an efficient manner by taking into account the temporal behavior of the entity and also its spatial signature. Using signatures of multiple type may increase the reliability of the detection, one signature may verify the other signature. In addition—one signature may assist in detecting the entity when the other signature is missing or of a low quality. Furthermore—estimating the future movement of an entity—based on the spatial signature of the entity (or of those of entities of the same type) may enable to predict the future effect that this entity may have on the vehicle and allow to determine the future driving pattern of the vehicle in advance.

The temporal signature may be compresses—thus saving memory and allowing a vehicle to allocate limited memory resources for tracking each entity—even when tracking multiple entities.

Figure 28:
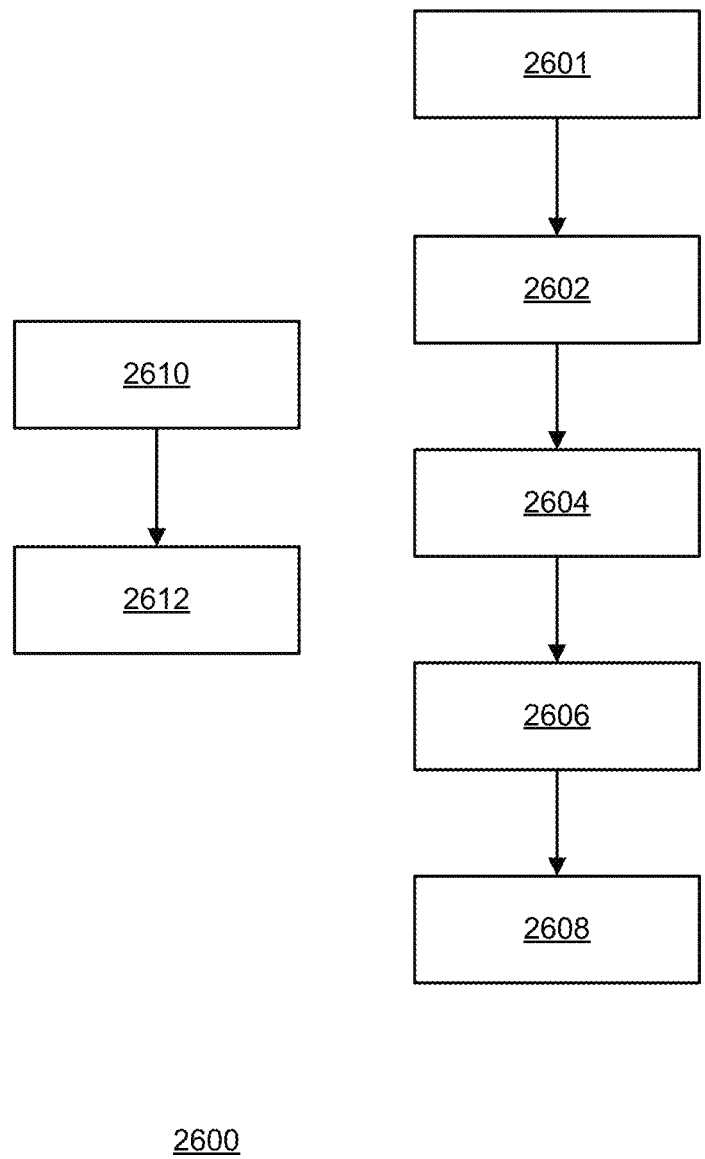
FIG. 28 is an example of a method.

FIG. 28 illustrates a method 2600 for tracking after an entity.

Method 2600 may include steps 2602, 2604, 2606 and 2608.

Tracking, by a monitor of a vehicle, a movement of an entity that appears in various images acquired during a tracking period. S2602.

Generating, by a processing circuitry of the vehicle, an entity movement function that represents the movement of the entity during the tracking period. S2604.

Generating, by the processing circuitry of the vehicle, a compressed representation of the entity movement function. S2606.

Responding to the compressed representation of the entity movement function. S2608.

The compressed representation of the entity movement function may be indicative of multiple properties of extremum points of the entity movement function.

The multiple properties of an extremum point of the extremum points, may include a location of the extremum point, and at least one derivative of the extremum point.

The multiple properties of an extremum point of the extremum points may include a location of the extremum point, and at least two derivative of at least two different orders of the extremum point.

The multiple properties of an extremum point of the extremum points, may include a curvature of the function at a vicinity of the extremum point.

The multiple properties of an extremum point of the extremum points, may include a location and a curvature of the function at a vicinity of the extremum point.

Method 2600 may include acquiring the images by a visual sensor of the vehicle. S2601.

At least one image of the various images may be acquired by an image sensor of another vehicle.

Step 2608 may include at least one out of:
Storing, in a memory unit of the vehicle, the compressed representation of the entity movement function.
Transmitting the compressed representation of the entity movement function to a system that may be located outside the vehicle.
Estimating, by a processing circuitry of the vehicle, a future movement of the entity, based on the compressed representation of the entity movement function.
Generating a profile of the entity, by a processing circuitry of the vehicle, based on the compressed representation of the entity movement function.
Predicting an effect of a future movement of the entity on a future movement of the vehicle, wherein the predicting may be executed by a processing circuitry of the vehicle, and may be based on the compressed representation of the entity movement function.
searching for a certain movement pattern within the movement of the entity, by a processing circuitry of the vehicle, based on the compressed representation of the entity movement function.

Method 2600 may include receiving a compressed representation of another entity movement function, the other entity movement function may be generated by another vehicle and may be indicative of the movement of the entity during at least a subperiod of the tracking period. S2610.

Method 2600 may include amending the compressed representation of the entity movement function based on the compressed representation of the other entity movement function. S2612.

Method 2600 may include determining a duration of the tracking period. S2603. The duration may be determine based on the certainty level of the prediction, based on memory and/or computational resources allocated to the tracking, and the like.

Figure 29:
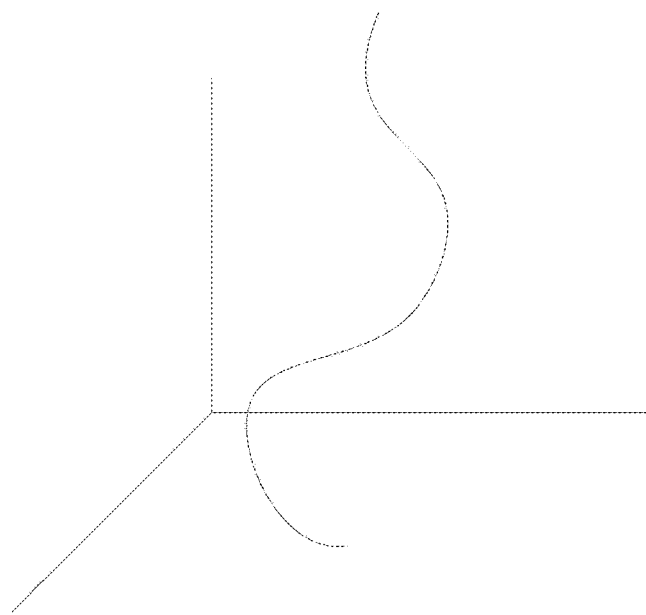
FIG. 29 is an example of entity movement functions.
Figure 29:
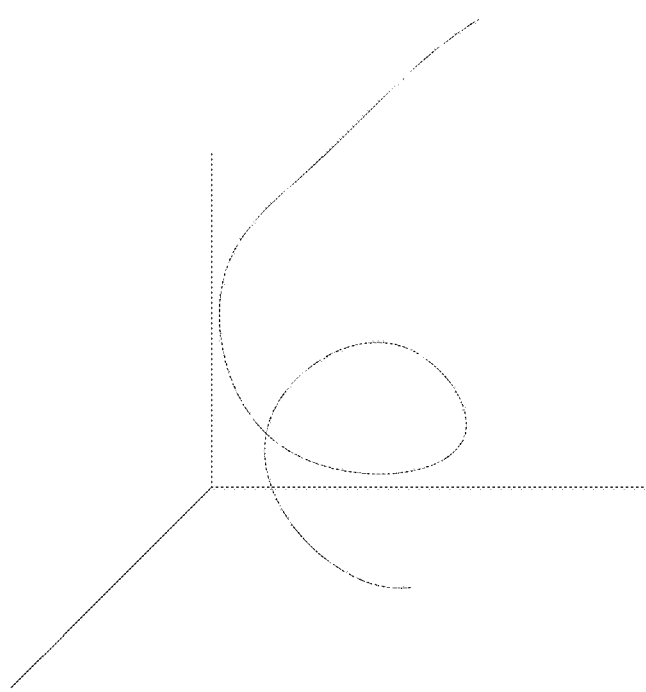

FIG. 29 illustrates examples of entity movement functions. One axis is time. Other axes are spatial axes (x-axis, y-axis and the like).

Figure 30:
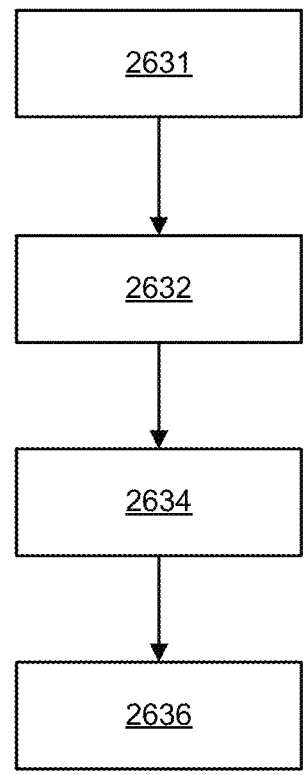
FIG. 30 is an example of a method.

FIG. 30 illustrates method 2630.

Method 2630 may include steps 2631, 2632, 2634 and 2636.

Method 2630 may include calculating or receiving an entity movement function that represents a movement of the entity during a tracking period. S2632.

Searching, by a search engine, for a matching reference entity movement function. S2634

Identifying the entity using reference identification information that identifies a reference entity that exhibits the matching reference entity movement function. S2636.

The reference identification information may be a signature of the entity.

The method may include acquiring a sequence of images by an image sensor; and calculating the entity movement based on the sequence of images. S2631

Figure 31:
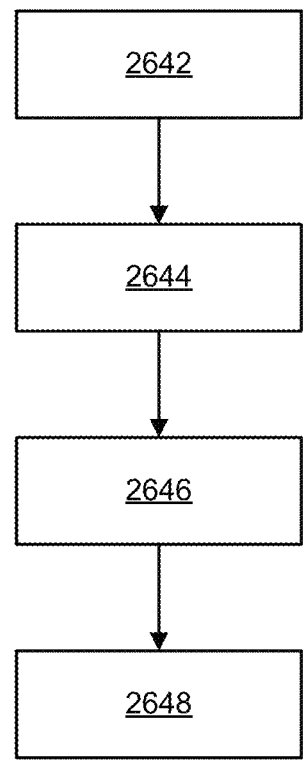
FIG. 31 is an example of a method.

FIG. 31 illustrates a method 2640.

Method 2630 may include steps 2642, 2644, 2646 and 2648.

Method 2640 may start by calculating or receiving multiple entity movement functions that represent movements of multiple entities. S2642.

Clustering the multiple entity movement functions to clusters. S2644.

For each cluster, searching, by a search engine, for a matching type of reference entity movement functions. S2646.

Identifying, for each cluster, a type of entity, using reference identification information that identifies a type of reference entities that exhibits the matching type of reference entity movement functions. S2648.

Figure 32:
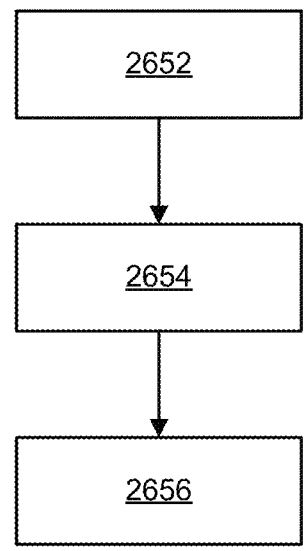
FIG. 32 is an example of a method.

FIG. 32 illustrates a method 2650.

Method 2650 may include steps 2652, 2654 and 2656.

Method 2650 may start by calculating or receiving (a) an entity movement function that represents a movement of an entity, and (b) a visual signature of the entity. S2652.

Comparing the entity movement function and the visual signature to reference entity movement functions and reference visual signatures of multiple reference objects to provide comparison results. S2654.

Classifying the object as one of the reference objects, based on the comparison results. S2656.

Figure 33:
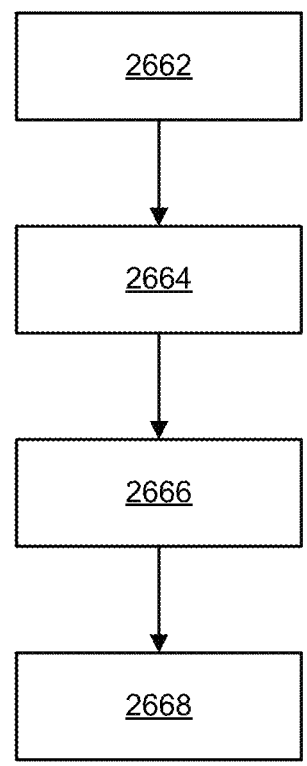
FIG. 33 is an example of a method.

FIG. 33 illustrates a method 2660.

Method 2660 may include steps 2662, 2664, 2666 and 2668.

Step 2662 may include calculating or receiving an entity movement function that represents a movement of an entity.

Step 2664 may include comparing the entity movement function to reference entity movement functions to provide comparison results.

Step 2666 may include classifying the object as a selected reference object of the reference objects, based on the comparison results.

Step 2668 may include verifying the classifying of the object as the selected reference object by comparing a visual signature of the object to a reference visual signature of the reference object.

Figure 34:
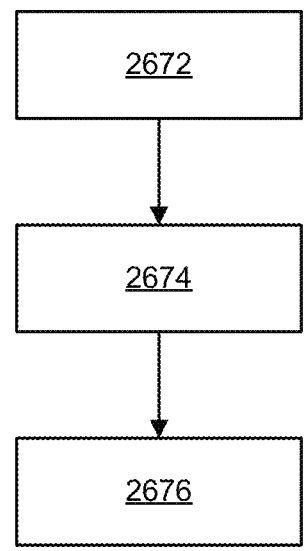
FIG. 34 is an example of a method.

FIG. 34 illustrates a method 2670.

Method 2670 may include steps 2672, 2674, 2676 and 2678.

Step 2672 may include calculating or receiving a visual signature of the object.

Step 2674 may include comparing a visual signature of the object to reference visual signatures of multiple reference objects to provide comparison results.

Step 2644 may include classifying the object as a selected reference object of the reference objects, based on the comparison results.

Step 2678 may include verifying the classifying of the object as the selected reference object by comparing an entity movement function that represents a movement of the entity to a reference entity movement functions to provide comparison results.

Figure 35:
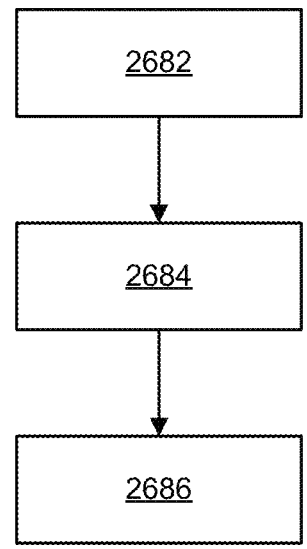
FIG. 35 is an example of a method.

FIG. 35 illustrates a method 2680.

Method 2680 may include steps 2682, 2684 and 2686.

Method 2680 is for generating a signature of an object.

Step 2682 may include calculating or receiving a visual signature of the object.

Step 2684 may include calculating or receiving an entity movement function that represents a movement of the object.

Step 2686 may include generating a spatial-temporal signature of the object that represents the visual signature and the entity movement function of the object.

Figure 36:
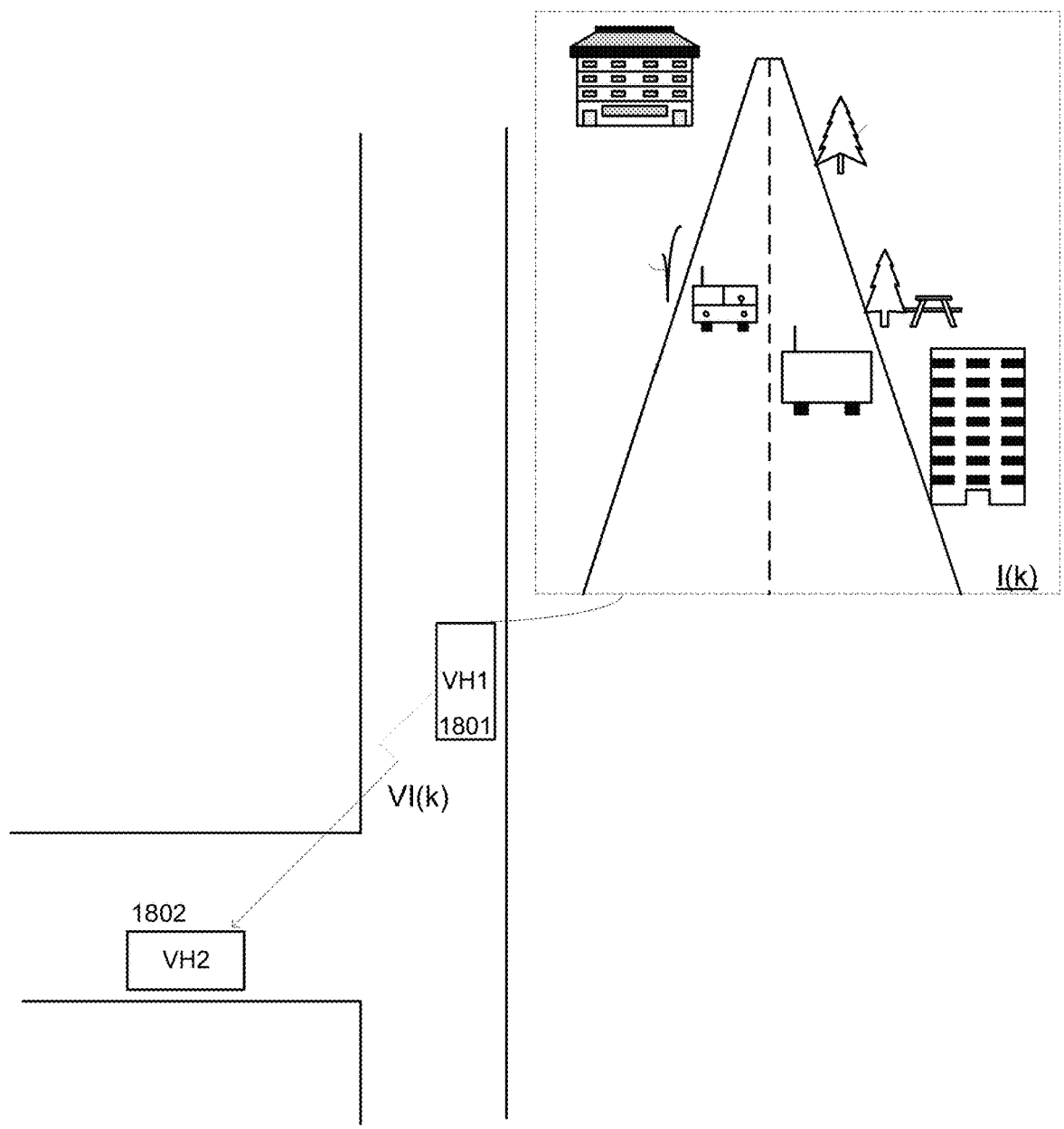
FIG. 36 is an example of a driving scenario.

FIG. 36 illustrates a method 2700.

Method 2700 may include steps 2702, 2704 and 2706.

Method 2700 is for driving a first vehicle based on information received from a second vehicle.

The exchange of information—especially compact and robust signatures between vehicles may improve the driving of the vehicle and at a modest cost—especially when the vehicles exchange compact signatures between themselves.

Step 2702 may include receiving, by the first vehicle, acquired image information regarding (a) a signature of an acquired image that was acquired by the second vehicle, (b) a location of acquisition of the acquired image.

Step 2704 may include extracting, from the acquired image information, information about objects within the acquired image.

Step 2706 may include preforming a driving related operation of the first vehicle based on the information about objects within the acquired image.

The acquired image information regarding the robust signature of the acquired image may be the robust signature of the acquired image.

The acquired image information regarding the robust signature of the acquired image may be a cortex representation of the signature.

The method may include acquiring first vehicle images by the first vehicle; extracting, from the first vehicle acquired images, information about objects within the first vehicle acquired images; and preforming the driving related operation of the first vehicle based on the information about objects within the acquired image and based on the information about objects within the first vehicle acquired images.

The image information may represent data regarding neurons of a neural network, of the second vehicle, that fired when the neural network was fed with the acquired image.

The extracting, of the information about objects within the acquired image may include (a) comparing the signature of the acquired image to concept signatures to provide comparison results; each concept signature represents a type of objects; and (b) determining types of objects that may be included in the acquired image based on the comparison results.

Figure 37:
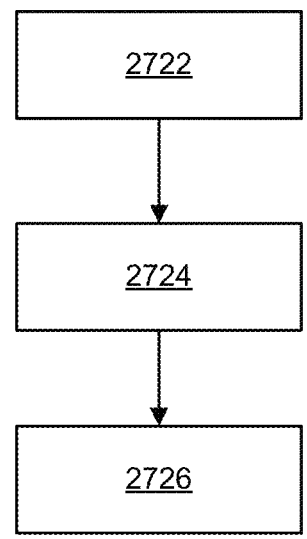
FIG. 37 is an example of a method.

FIG. 37 illustrates one vehicle that updates another vehicle—especially with objects that are not currently seen by the other vehicle—thereby allowing the other vehicle to calculate his driving path based (also) on the object it currently does not see.

Concept Update

A concept structure includes multiple signatures that are related to each other and metadata related to these signatures.

The concepts may be updated by removing signatures—and even parts of the signatures that are more "costly" to keep than maintain.

The "cost" may represent one or more factors such as false detection probability, a robustness of the concept, an accuracy of the concept, and the like.

One or more vehicles may decide to update a concept—and then send the update (or an indication about the update) to other vehicles—therefore improving the detection process by using updated concepts.

Figure 38:
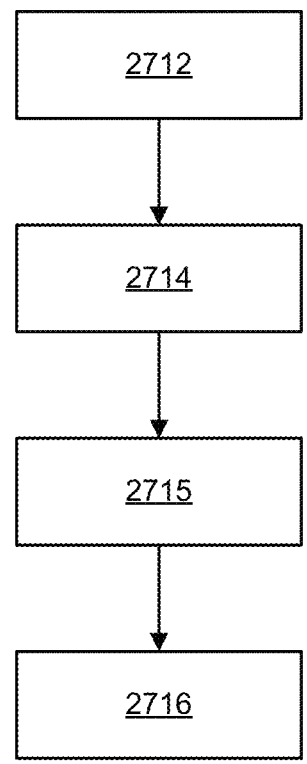
FIG. 38 is an example of a method.

FIG. 38 illustrates a method 2710.

Method 2710 may include steps 2712, 2714 and 2726.

Method 2710 is for concept update.

Figure 39:
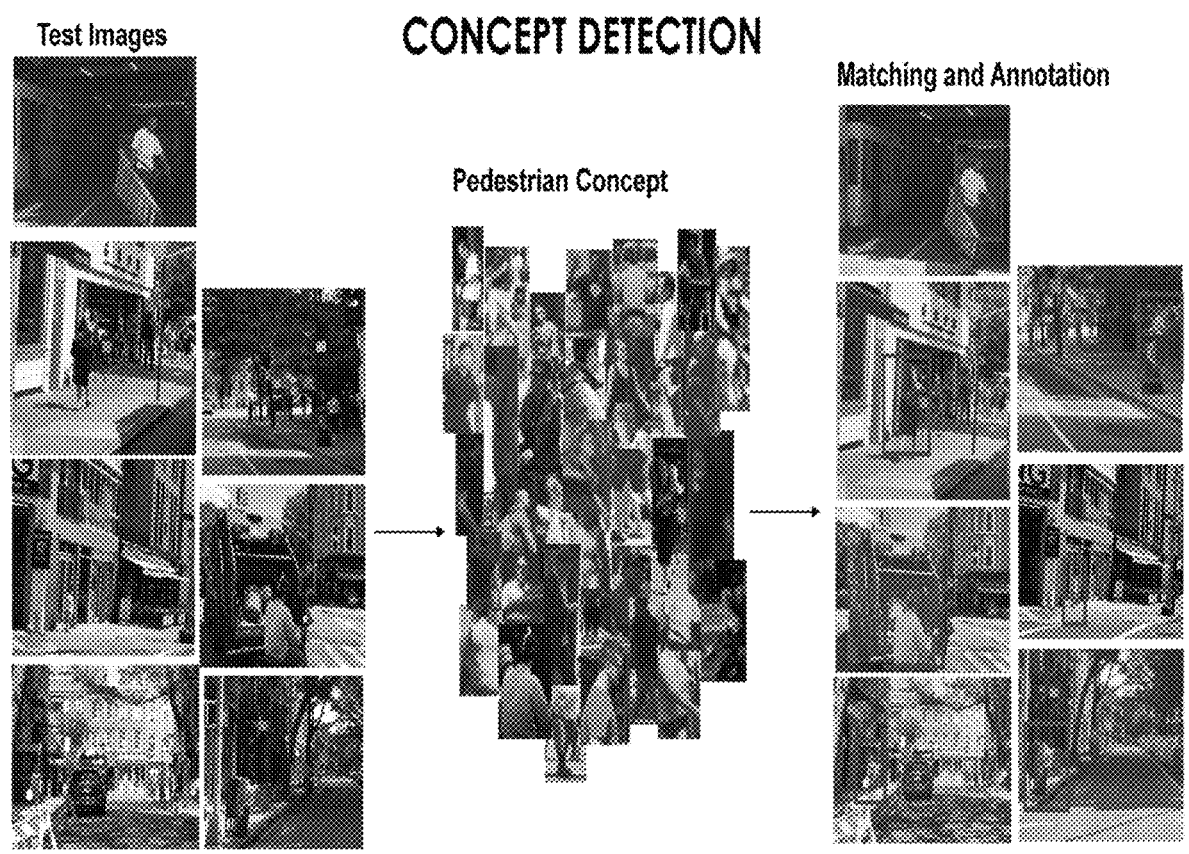
FIGS. 39-44 illustrate various data structures including a concept, test images and matching results, as well as various processes related to the data structures.
Figure 40:
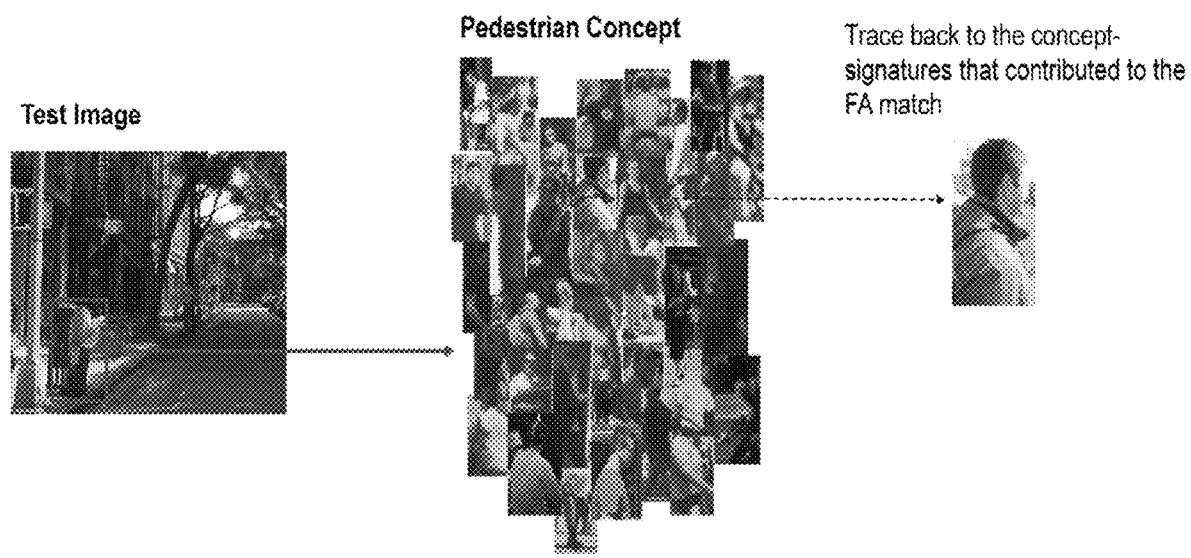

Method 2710 may include:

Step 2712 of detecting that a certain signature of an object causes a false detection (see, for example FIGS. 39 and 40). The certain signature belongs to a certain concept structure that may include multiple signatures. The false detection may include determining that the object may be represented by the certain concept structure while the object may be of a certain type that may be not related to the certain concept structure. For example—a concept of a pedestrian may classify (by error) a mail box as a pedestrian.

Figure 41:
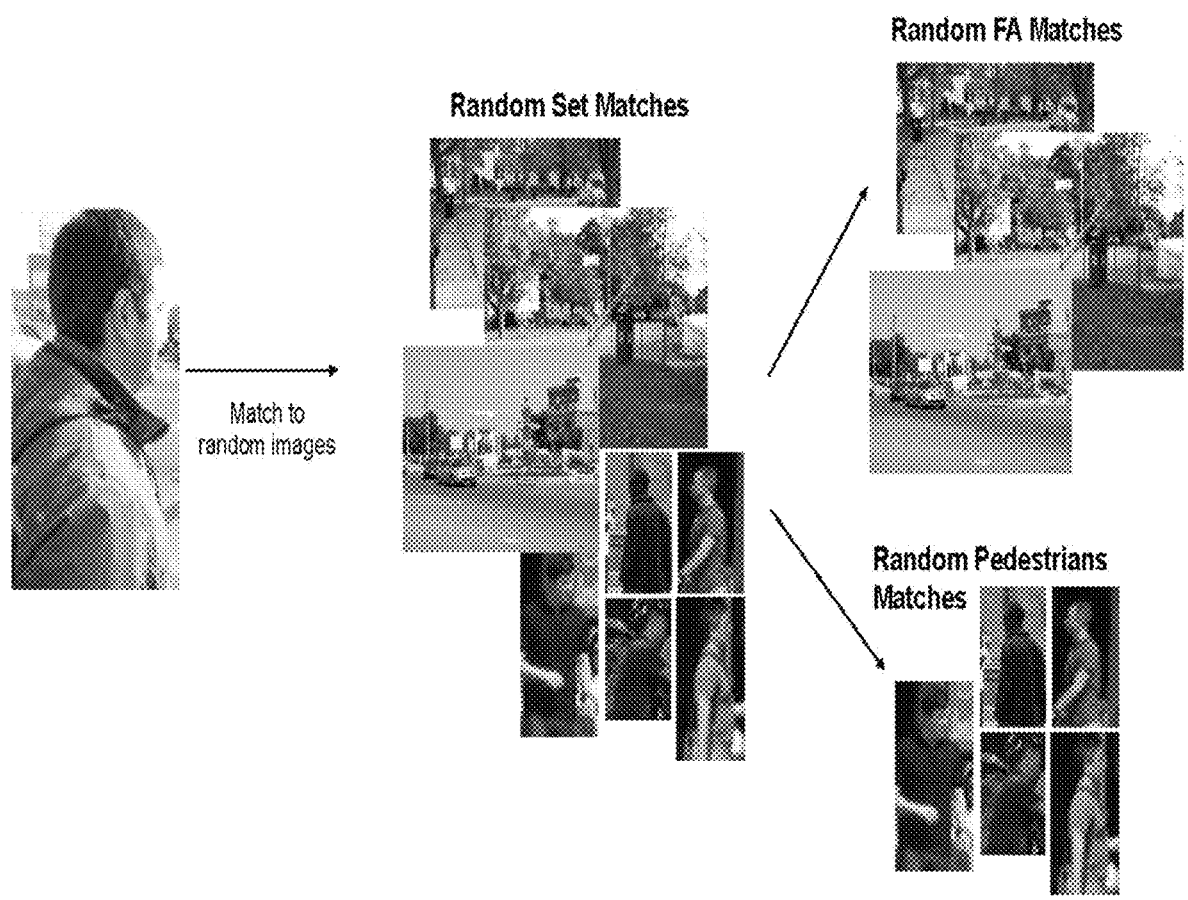
Figure 42:
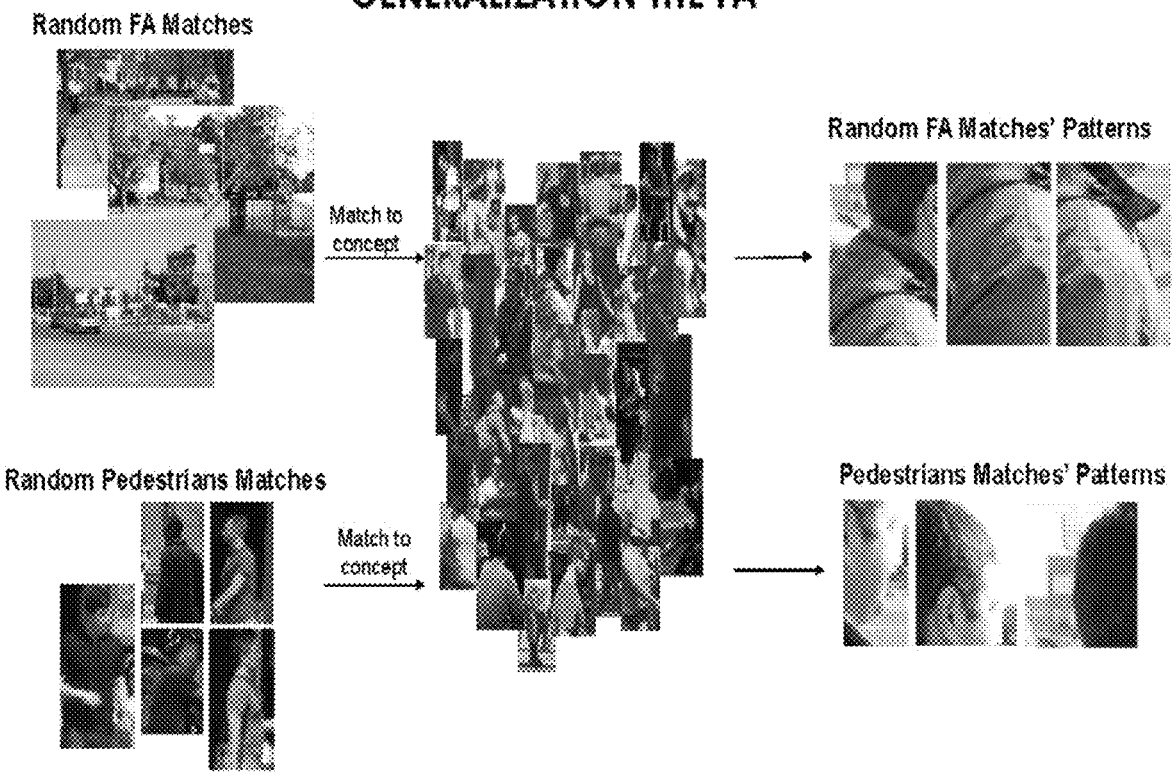
Figure 43:
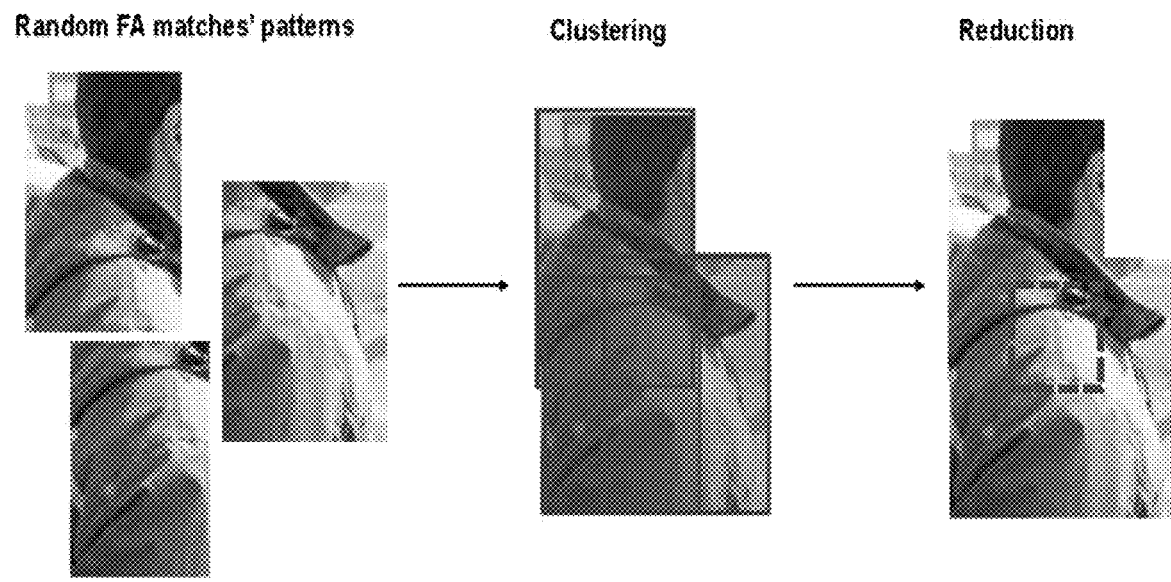

Step 2714 of searching for an error inducing part (see, for example FIGS. 41-43) of the certain signature that induced the false detection.

Step 2715 of determining whether to remove the error inducing part of the certain signature. This may involve calculating a cost related to a removing the error inducing part from the concept structure—and removing the error inducing part when the cost may be within a predefined range.

Figure 44:
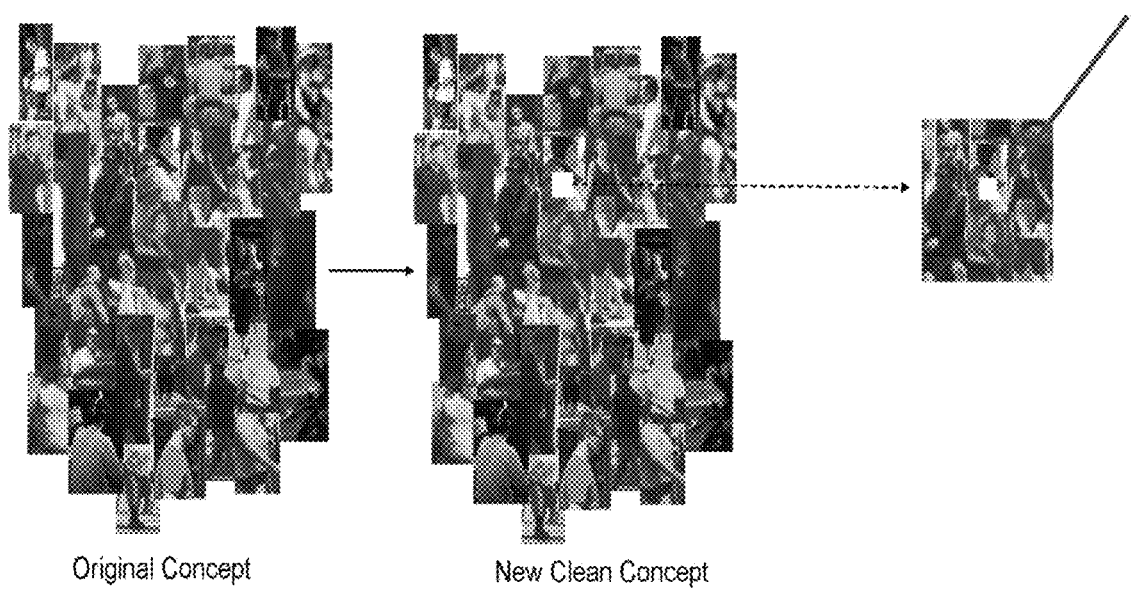

Step 2726 of removing (see, for example FIG. 44) from the concept structure the error inducing part to provide an updated concept structure.

Each signature may represent a map of firing neurons of a neural network.

Step 2714 may include:

Generating or receiving a test concept structure that includes (a) first signatures of images that may include one or more objects of the certain type (that should not belong to the concept), and (b) second signatures of second images that may include one or more objects of a given type that may be properly associated with the concept structure. The images of both types may be selected in any manner—for example may be randomly selected.

Comparing the certain signature to the test concept structure to provide matching first signatures and matching second signatures.

Comparing the matching first signatures and matching second signatures to find parts that causes false errors and parts that result in positive detection.

Defining the error inducing part of the certain signature based on an overlap between the matching parts of the certain signature.

The updated concept may be shared between vehicles.

Situation Aware Processing

Reference information such as but not limited to signatures, cluster structures and the like may be related to a vast number of situations. It has been found that situation aware processing may be much more effective than processing that is not situation aware.

Situation aware processing includes various steps, some of which may include detecting a situation and then performing a situation related processing based on the situation. The situation related processing may include, for example, object detection, object behavior estimation, responding to an outcome of the object detection, responding to an outcome of an object behavior estimation, and the like.

Various non-limiting example of a responses to object detection and/or responding to an outcome of an object behavior estimation are provided in FIGS. 3A-44. For example—the responding may include at least one out of (i) performing an obstacle avoidance movement in response to the outcome of the object detection and/or the object behavior estimation, (ii) autonomously driving an autonomous vehicle in response to the outcome of the object detection and/or the object behavior estimation, (iii) assisting a driver in response to the outcome of the object detection and/or the object behavior estimation, (iv) determining which entity (human or non-human) will control the autonomous vehicle in response to the outcome of the object detection and/or the object behavior estimation, (v) communicate with other vehicles in response to the outcome of the object detection and/or the object behavior estimation, and the like.

A situation may be at least one of (a) a location of the vehicle, (b) one or more weather conditions, (c) one or more contextual parameters, (d) a road condition, (e) a traffic parameter.

The road condition may include the roughness of the road, the maintenance level of the road, presence of potholes or other related road obstacles, whether the road is slippery, covered with snow or other particles.

The traffic parameter and the one or more contextual parameters may include time (hour, day, period or year, certain hours at certain days, and the like), a traffic load, a distribution of vehicles on the road, the behavior of one or more vehicles (aggressive, calm, predictable, unpredictable, and the like), the presence of pedestrians near the road, the presence of pedestrians near the vehicle, the presence of pedestrians away from the vehicle, the behavior of the pedestrians (aggressive, calm, predictable, unpredictable, and the like), risk associated with driving within a vicinity of the vehicle, complexity associated with driving within of the vehicle, the presence (near the vehicle) of at least one out of a kindergarten, a school, a gathering of people, and the like.

Figure 45:
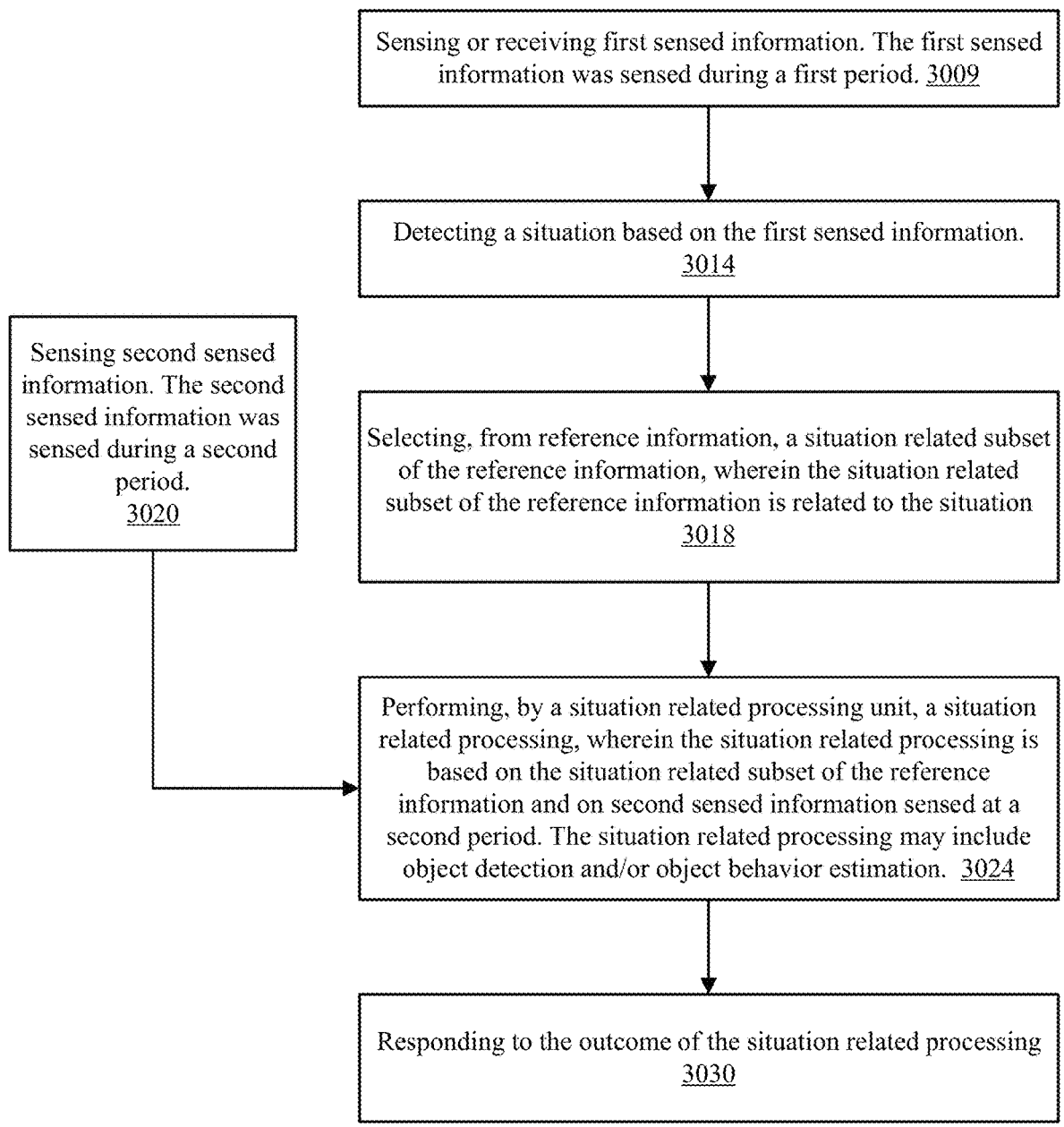
FIG. 45 is an example of a method.

FIG. 45 illustrates an example of method 3000.

Method 3000 may start by step 3009 of sensing or receiving first sensed information. The first sensed information may be any type of information (visual, radar, sonar, non-visual, and the like).

The first sensed information may be sensed by at least one first sensor of a vehicle.

The first sensed information may be sensed by a sensor that does not belong to a vehicle.

Step 3009 may be followed by step 3014 of detecting a situation based on first sensed information.

Step 3014 may be followed by step 3018 of selecting, from reference information, a situation related subset of the reference information. The situation related subset of the reference information is related to the situation.

The situation related subset of the object related reference information is a subset of reference information required for performing a situation related processing operation that may be relevant to the situation. The reference information may be, for example, information that may be compared to sensed information in order to detect objects, detect movement patterns, and the like. The comparing is merely one example of how the reference information can be used.

The situation related subset of the object related reference information may be related to at least one out of (a) a location of the vehicle, (b) one or more weather conditions, (c) one or more contextual parameters, (d) a road condition, (e) a traffic parameter, (f) a potential risk, and the like.

For example—the situation related subset may include at least one out of (a) signatures and metadata of a cluster structure of roundabouts, (b) signatures and metadata of a cluster structure of a cross road located at a certain city, (c) signatures and metadata of a cluster structure of a highway acquired at sunset, (d) signatures and metadata of a cluster structure of a specific road segment, (e) signatures and metadata of a cluster structure of a specific road segment taken at a certain weather condition, (f) signatures and metadata of a cluster structure of certain roundabout acquired at rush hour, and the like.

The reference information may be stored in a memory unit of the vehicle and the selecting may include informing a processor the locations of the situation related subset, allocating a higher cache or other data retrieval priority to the subset, and the like.

At least a part of the subset may be stored outside the vehicle and the selecting may include retrieving the at least part of the subset to the vehicle.

The retrieval of the situation related subset may include retrieving it to a cache or other memory unit (for example a high priority memory unit) allocated to the processor or included in the processor.

The retrieval may include ignoring reference information not related to the situation—reference information that differs from the situation related subset.

The retrieval of only the situation related subset reduces memory resource consumption—as the situation related subset and not the entire reference information is loaded to the vehicle and/or to the processor and/or to the cache and/to a high priority memory unit.

Method 3000 may also include step 3020 of sensing second sensed information by the at least one vehicle sensor at a second period.

The second period may follow the detecting of the situation, may precede the detection of the situation, may partially overlap the detecting of the situation, may follow the detecting of the situation, may precede the detecting of the situation, may partially overlap the detecting of the situation.

The first sensed information may be included in the second sensed information, may partially overlap the second sensed information, may not overlap the second sensed information, may differ by type from the first sensed information, and the like.

For example an image that is processed to detect a situation may also be used for image processing, may be a part of images that are processed to detect movement of objects, and the like.

Steps 3020 and 3018 may be followed by step 3024 of performing, by a situation related processing unit, a situation related processing to find detected objects, wherein the situation related processing is based on the situation related subset of the reference information and on the second sensed information sensed by the at least one vehicle sensor at a second period.

Step 3024 may be executed by any of the method illustrated in the specification.

For example—step 3024 may include calculating one or more second signatures of the second sensed information; and searching, out of the concept structures related to the situation, for at least one matching concept structure that matches the one or more second signatures, and determining at least an identity of a detected object based on metadata of the at least one matching concept structure.

Step 3024 may include, for example, object detection, object behavior estimation, and the like.

Step 3014 of detecting the situation and step 3024 may be executed at the same manner—using the same algorithms, applying a same type of operations, exhibit a same or similar levels of complexity, exhibit a same or similar consumption of memory resources, exhibit a same or similar consumption of processing resources, and the like.

Alternatively—step 3014 of detecting the situation and step 3024 may differ from each other by at least one out of manner of execution—for example may differ from each other by at least one out of—algorithms, type of operations, levels of complexity, consumption of memory resources, consumption of processing resources, and the like.

Step 3024 may be executed by searching matching concept structures and step 3014 may be executed without searching for matching concept structures.

Step 3014 may be executed calculating signatures of a type used in the object related processing.

Step 3024 may be followed by step 3030 of responding to the outcome of the object related processing.

Various non-limiting example of a responses to object detection and/or responding to an outcome of an object behavior estimation are provided in FIGS. 3A-44. For example—the responding may include at least one out of (i) performing an obstacle avoidance movement in response to the outcome of the object detection and/or the object behavior estimation, (ii) autonomously driving an autonomous vehicle in response to the outcome of the object detection and/or the object behavior estimation, (iii) assisting a driver in response to the outcome of the object detection and/or the object behavior estimation, (iv) determining which entity (human or non-human) will control the autonomous vehicle in response to the outcome of the object detection and/or the object behavior estimation, the determining may be responsive to at least one autonomous driving rule, (v) communicate with other vehicles in response to the outcome of the object detection and/or the object behavior estimation, and the like.

Method 3000 may be executed by different vehicles that cooperate with each other—the cooperation may be made in a distributed manner, in a hierarchical or non-hierarchical manner. For example—one vehicle may process first sensed information from another vehicle, two or more vehicle may share resources to execute step 3024, and the like.

Figure 46:
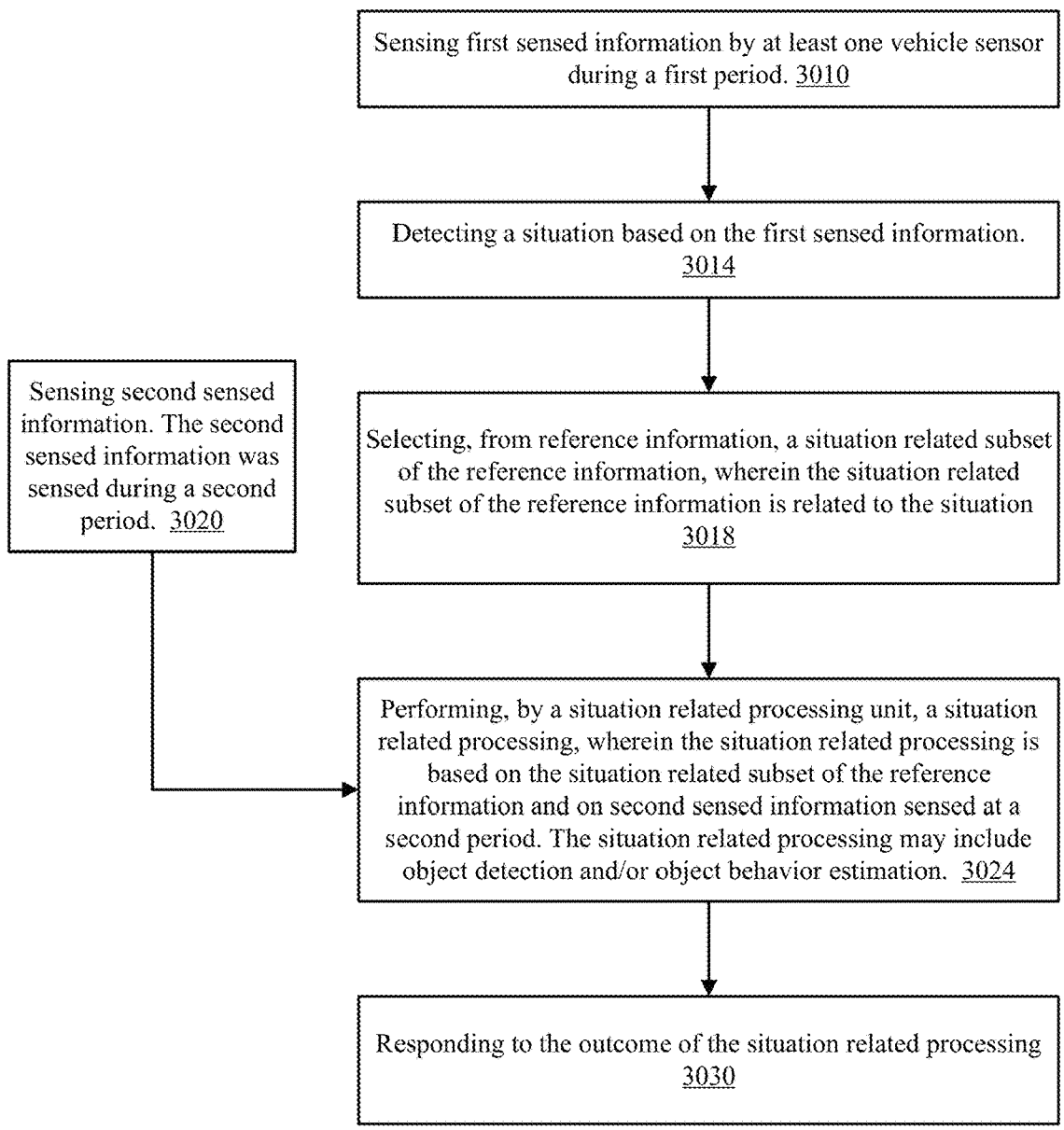
FIG. 46 is an example of a method.

FIG. 46 illustrates an example of method 3001.

Method 3001 of FIG. 46 differs from method 3000 of FIG. 45 by having step 3010 instead of step 3009. Step 3010 includes sensing the first sensed information by at least one vehicle sensor during the first period. The at least one vehicle sensor belongs to the same vehicle that includes the one or more second sensors that sensed the second sensed information.

Step 3010 is followed by step 3014. Step 3014 is followed by step 3018. Steps 3020 and 3014 are followed by step 3018. Step 3018 is followed by step 3024. Step 3024 is followed by step 3030.

The at least one first vehicle sensor may differ from the one or more second sensors. The at least one first vehicle sensor may be the one or more second sensors. There may be a partial overlap between the at least one first vehicle sensor and the one or more second sensors.

Figure 47:
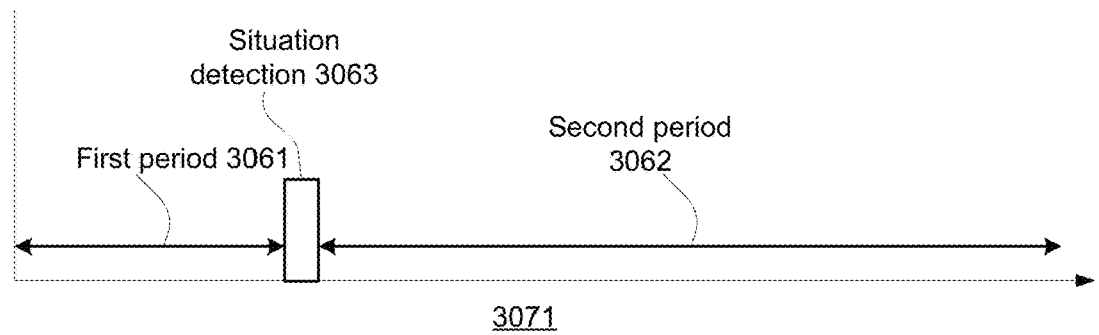
FIG. 47 is a timing diagram.
Figure 47:
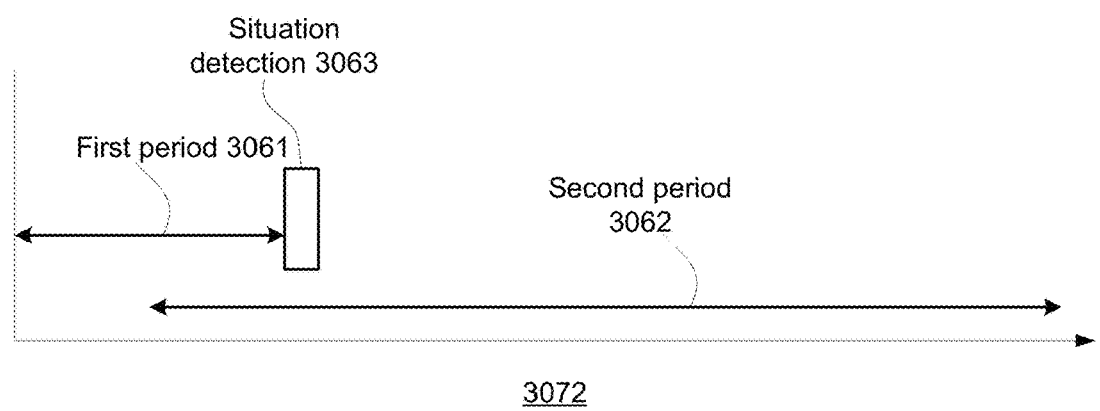
Figure 47:
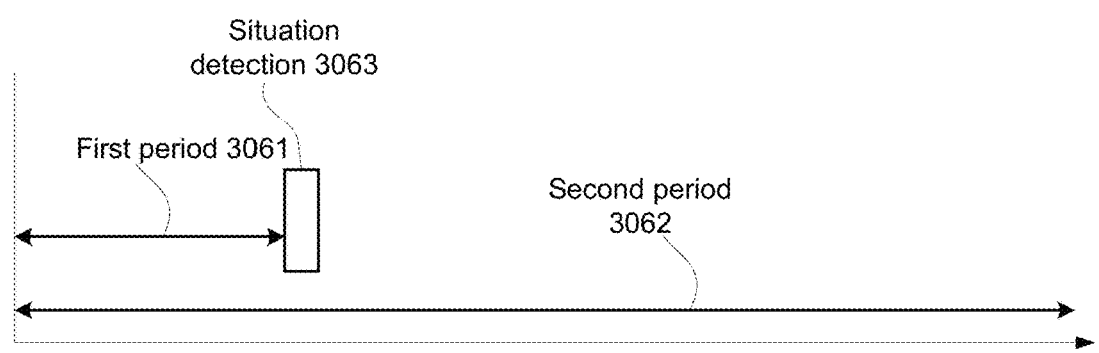

FIG. 47 includes three timing diagrams 3071, 3072 and 3073 that illustrates various timing relationships between the first period 3061, situation detection 3062 and the second period 3062.

Timing diagram 3071 illustrates the situation detection 3062 as following the first period 3061 and preceding the second period 3062—without timing overlap.

Timing diagram 3071 illustrates the situation detection 3062 as following the first period 3061. The second period 3062 partially overlaps the first period 3061 and overlaps the entire situation detection 3062.

Timing diagram 3073 illustrates the situation detection 3062 as following the first period 3061. The second period 3062 and the first period 3061 start together and the second period 3061 precedes the situation detection 3062.

Figure 48:
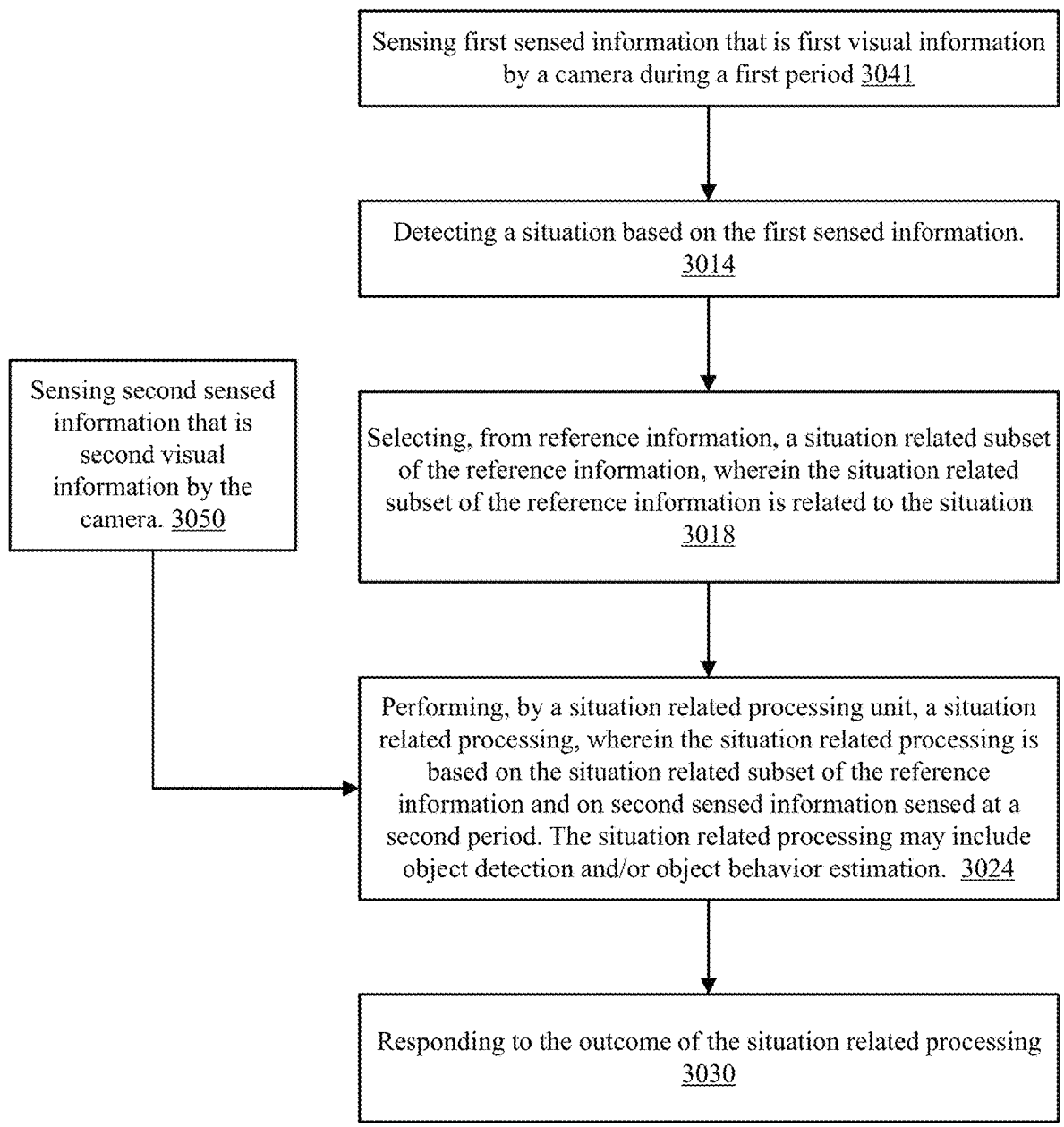
FIG. 48 is an example of a method.

FIG. 48 illustrates an example of method 3003.

Method 3003 of FIG. 48 differs from method 3000 of FIG. 45 by having step 3041 instead of step 3009, and having step 3050 instead of step 3020.

Step 3041 includes sensing first sensed information that is first visual information by a camera during a first period.

Step 3050 includes sensing second sensed information that is second visual information by the camera.

Step 3041 is followed by step 3014. Step 3014 is followed by step 3018. Steps 3050 and 3014 are followed by step 3018. Step 3018 is followed by step 3024. Step 3024 is followed by step 3030.

Figure 49:
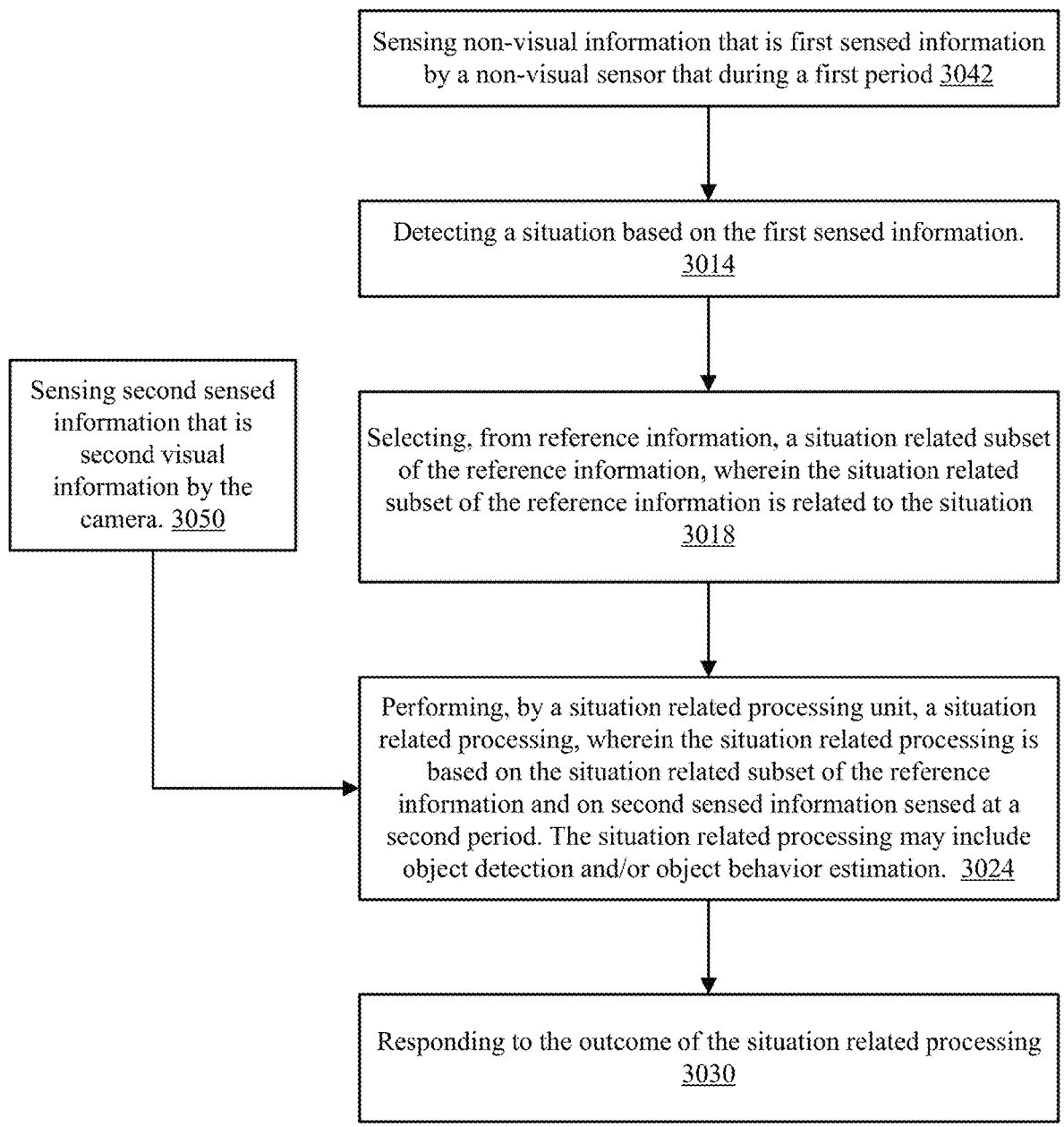
FIG. 49 is an example of a method.

FIG. 49 illustrates an example of method 3003.

Method 3003 of FIG. 49 differs from method 3000 of FIG. 45 by having step 3042 instead of step 3009, and having step 3050 instead of step 3020.

Step 3042 includes sensing non-visual information that is first sensed information by a non-visual sensor that during a first period.

Step 3051 includes sensing second sensed information that is second visual information by the camera.

Step 3042 is followed by step 3014. Step 3014 is followed by step 3018. Steps 3050 and 3014 are followed by step 3018. Step 3018 is followed by step 3024. Step 3024 is followed by step 3030.

Figure 50:
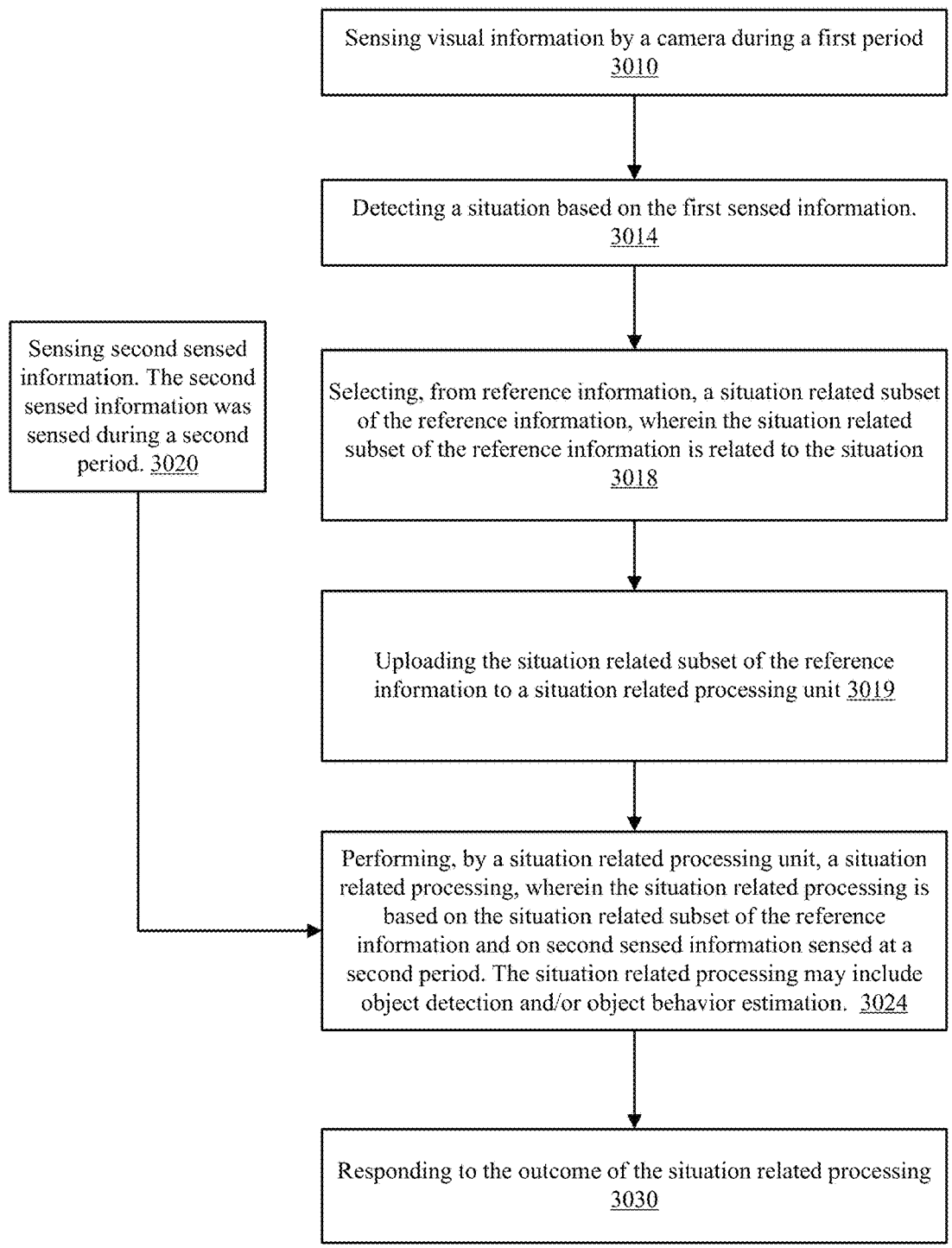
FIG. 50 is an example of a method.

FIG. 50 illustrates an example of method 3004.

Method 3003 of FIG. 49 differs from method 3000 of FIG. 45 by having step 3049 of uploading the situation related subset of the reference information to a situation related processing unit.

Step 3010 is followed by step 3014. Step 3014 is followed by step 3018. Step 3018 is followed by step 3019. Steps 3019 and 3020 are followed by step 3018. Step 3018 is followed by step 3024. Step 3024 is followed by step 3030.

Computational resources and/or memory resources can further be saved when the second sensed information is segmented to portions and the processing of the portions is based on their relevancy to the situation.

Thus—less resources are allocated to the processing of irrelevant second sensed information segments, and such irrelevant portions may be ignored of.

There may be more than two relevancy classes and the allocation of the resources may be based on the relevancy level.

The relevancy may also be determined based on the situation and at least one additional parameters—such as the type of the object that is being detected and/or the type of object that its behavior is being monitored.

Any of the mentioned below methods may include determining, based on the situation, a relevancy value for each portion out of multiple portions of the second sensed information.

The determining may be followed by performing the situation related processing based on the relevancy value of the each portion.

The determining of the relevancy value may include finding, for a certain type of object, a relevant portion and an irrelevant portion. The performing of the situation related processing is executed without searching for the certain type of object within the irrelevant portion.

The determining of relevancy value may be followed by determining a resolution of signatures or concept structures based on the relevancy value of the each portion.

The preforming of the situation related processing within the irrelevant portion may be executed without using concept structures that describe the object of the certain type.

Figure 51:
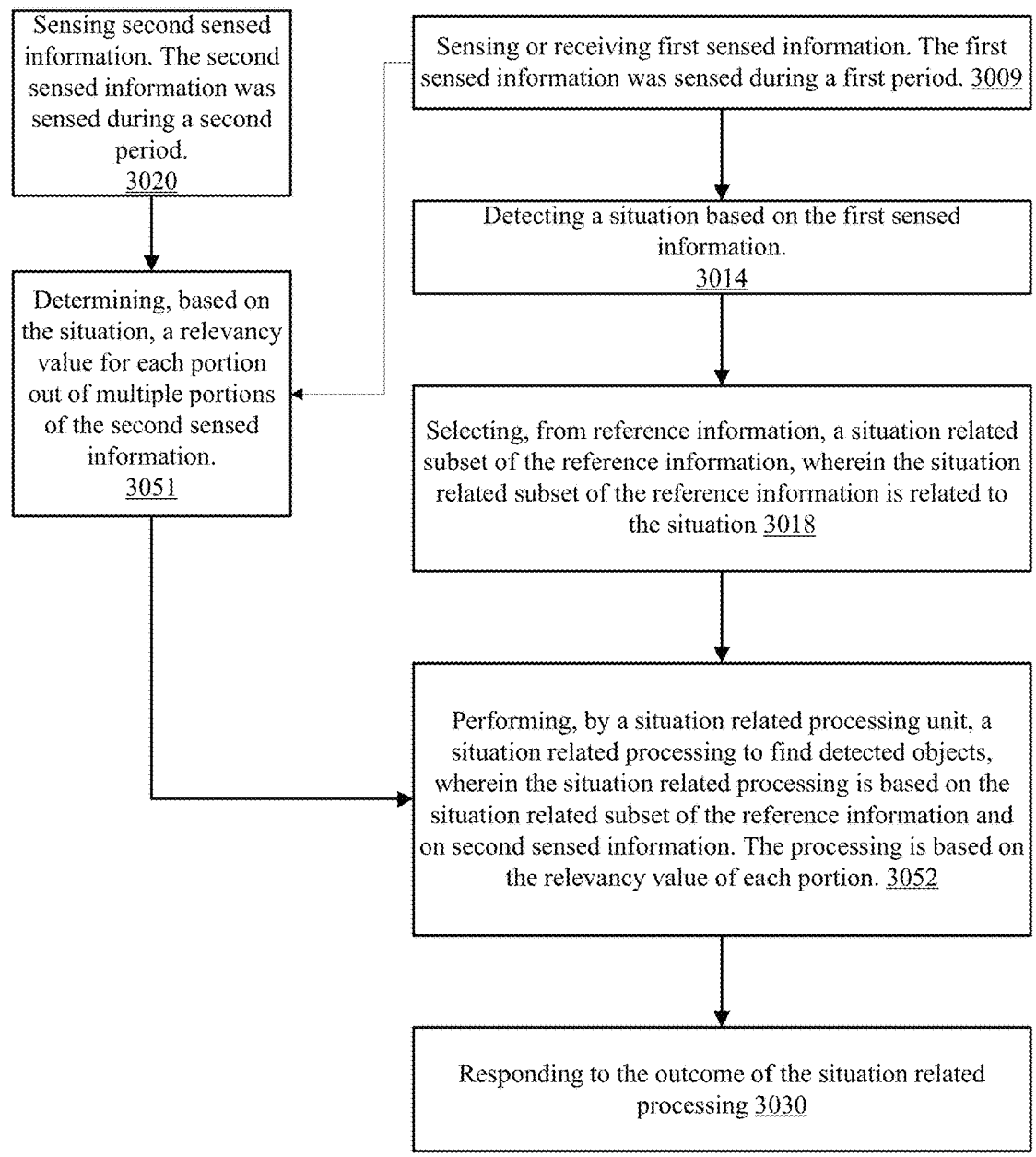
FIG. 51 is an example of a method.

FIG. 51 illustrates an example of method 3005.

Method 3005 may start by step 3009 of sensing or receiving first sensed information. The first sensed information may be any type of information (visual, radar, sonar, non-visual, and the like).

Step 3009 may be followed by step 3014 of detecting a situation based on first sensed information.

Step 3014 may be followed by step 3018 of selecting, from reference information, a situation related subset of the reference information. The situation related subset of the reference information is related to the situation.

Method 3000 may also include step 3020 of sensing second sensed information by the at least one vehicle sensor at a second period.

Step 3030 and step 3009 may be followed by step 3051 of determining, based on the situation, a relevancy value for each portion out of multiple portions of the second sensed information.

Steps 3051 and 3018 may be followed by step 3052 of performing, by a situation related processing unit, a situation related processing to find detected objects, wherein the situation related processing is based on the situation related subset of the reference information and on the second sensed information sensed by the at least one vehicle sensor at a second period. The processing is based on the relevancy value of each portion.

Step 3052 may be executed by any of the method illustrated in the specification—but is based on the relevancy value of each portion.

For example—step 3052 may include calculating one or more second signatures of the second sensed information; and searching, out of the concept structures related to the situation, for at least one matching concept structure that matches the one or more second signatures, and determining at least an identity of a detected object based on metadata of the at least one matching concept structure.

The length of the signatures may be based on the priority of each portion. For example—shorter or lower resolution signatures may be allocated to lower priority portions. The size of the concepts may be based on the priority of each portion.

Step 3052 may include, for example, object detection, object behavior estimation, and the like.

Step 3014 of detecting the situation and step 3052 may be executed at the same manner—using the same algorithms, applying a same type of operations, exhibit a same or similar levels of complexity, exhibit a same or similar consumption of memory resources, exhibit a same or similar consumption of processing resources, and the like.

Step 3024 may be followed by step 3052 of responding to the outcome of the object related processing.

Various non-limiting example of a responses to object detection and/or responding to an outcome of an object behavior estimation are provided in FIGS. 3A-44. For example—the responding may include at least one out of (i) performing an obstacle avoidance movement in response to the outcome of the object detection and/or the object behavior estimation, (ii) autonomously driving an autonomous vehicle in response to the outcome of the object detection and/or the object behavior estimation, (iii) assisting a driver in response to the outcome of the object detection and/or the object behavior estimation, (iv) determining which entity (human or non-human) will control the autonomous vehicle in response to the outcome of the object detection and/or the object behavior estimation, the determining may be responsive to at least one autonomous driving rule, (v) communicate with other vehicles in response to the outcome of the object detection and/or the object behavior estimation, and the like.

Method 3005 may be executed by different vehicles that cooperate with each other—the cooperation may be made in a distributed manner, in a hierarchical or non-hierarchical manner. For example—one vehicle may process first sensed information from another vehicle, two or more vehicle may share resources to execute step 3024, and the like.

Figure 52:
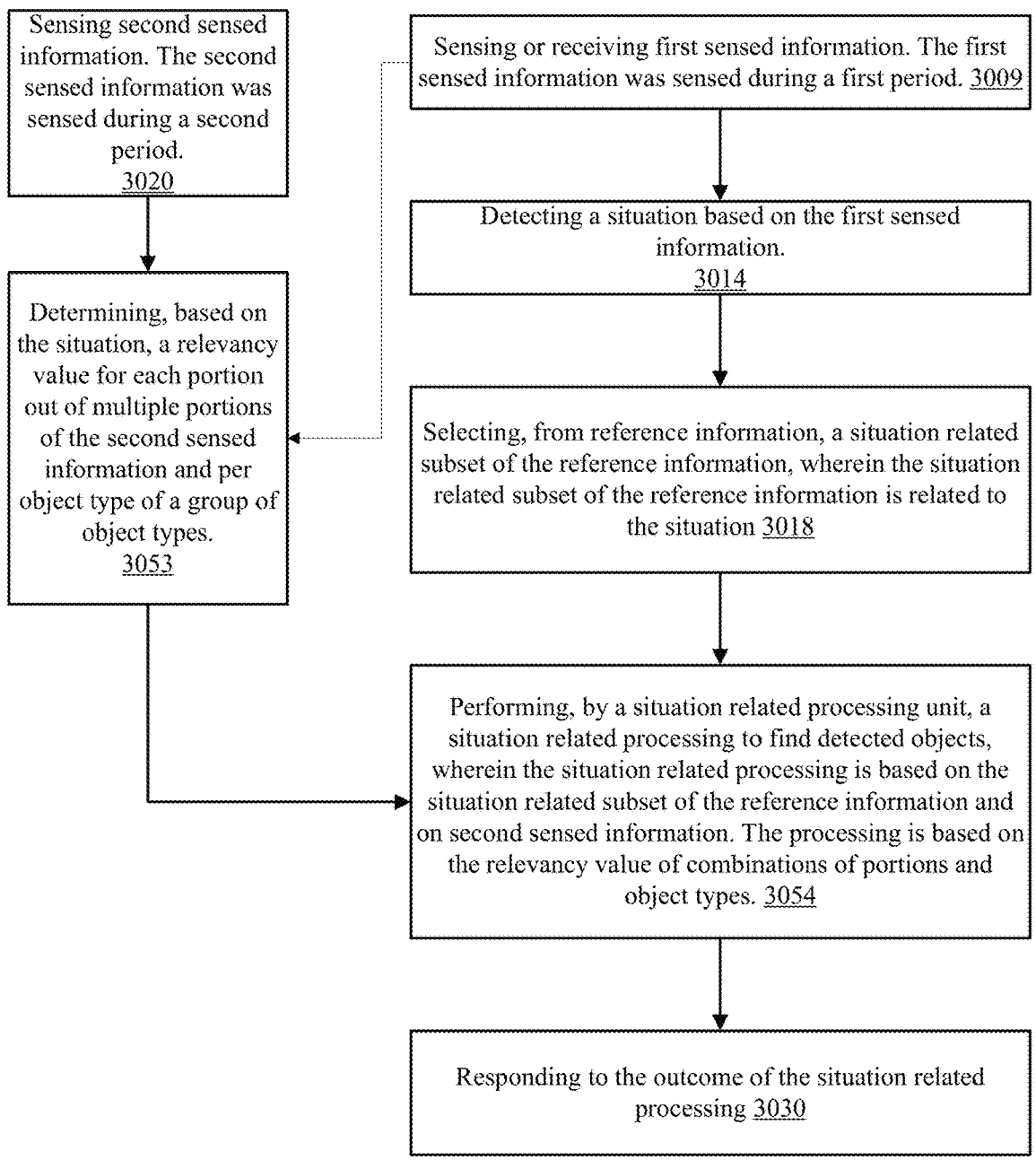
FIG. 52 is an example of a method.

FIG. 52 illustrates an example of method 3006.

Method 3006 differs from method 51 of FIG. 51 by determining the priority per a combination of second sensed information portions and object types. One image portion may be relevant to one object type and irrelevant for another object type. One image portion may be relevant to multiple object types and irrelevant to one or more object types.

The relevancy of portion to a type of object may be determined in any manner-supervised or unsupervised.

Figure 53:
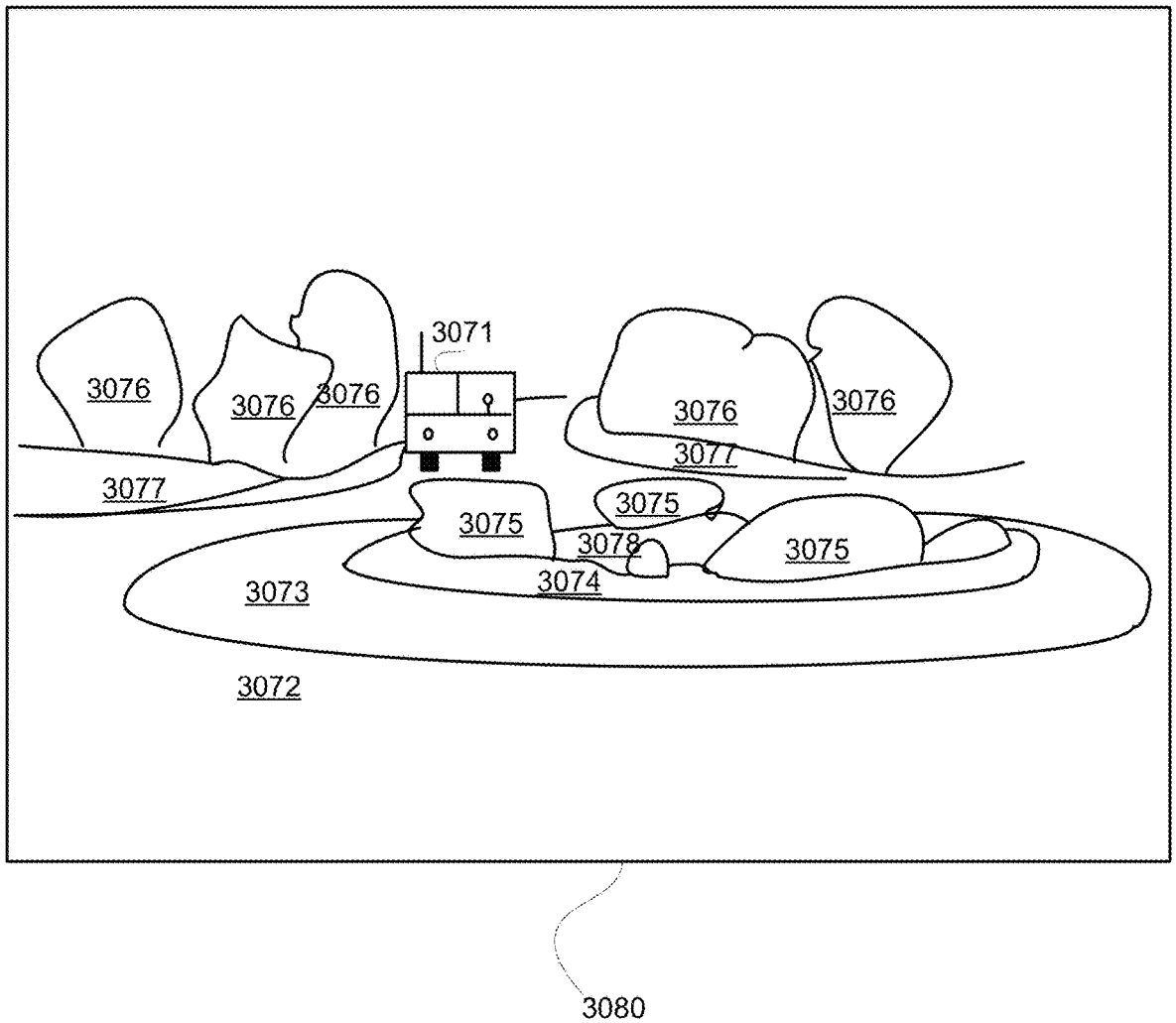
FIG. 53 is an example of an image.

FIG. 53 illustrates an image 3080 of a roundabout. Image 3080 includes include a curved road 3072 within the roundabout, an ring shaped zone 3073 that surrounds the inner circle 3074 of the roundabout, sand 3078 and few bushes or plants 3075 located in the inner circle 3074, various trees 3076 that surround the roundabout, a pavement 3075 that surrounds the roundabout, and a vehicle 3071 that is about to enter the roundabout.

Figure 54:
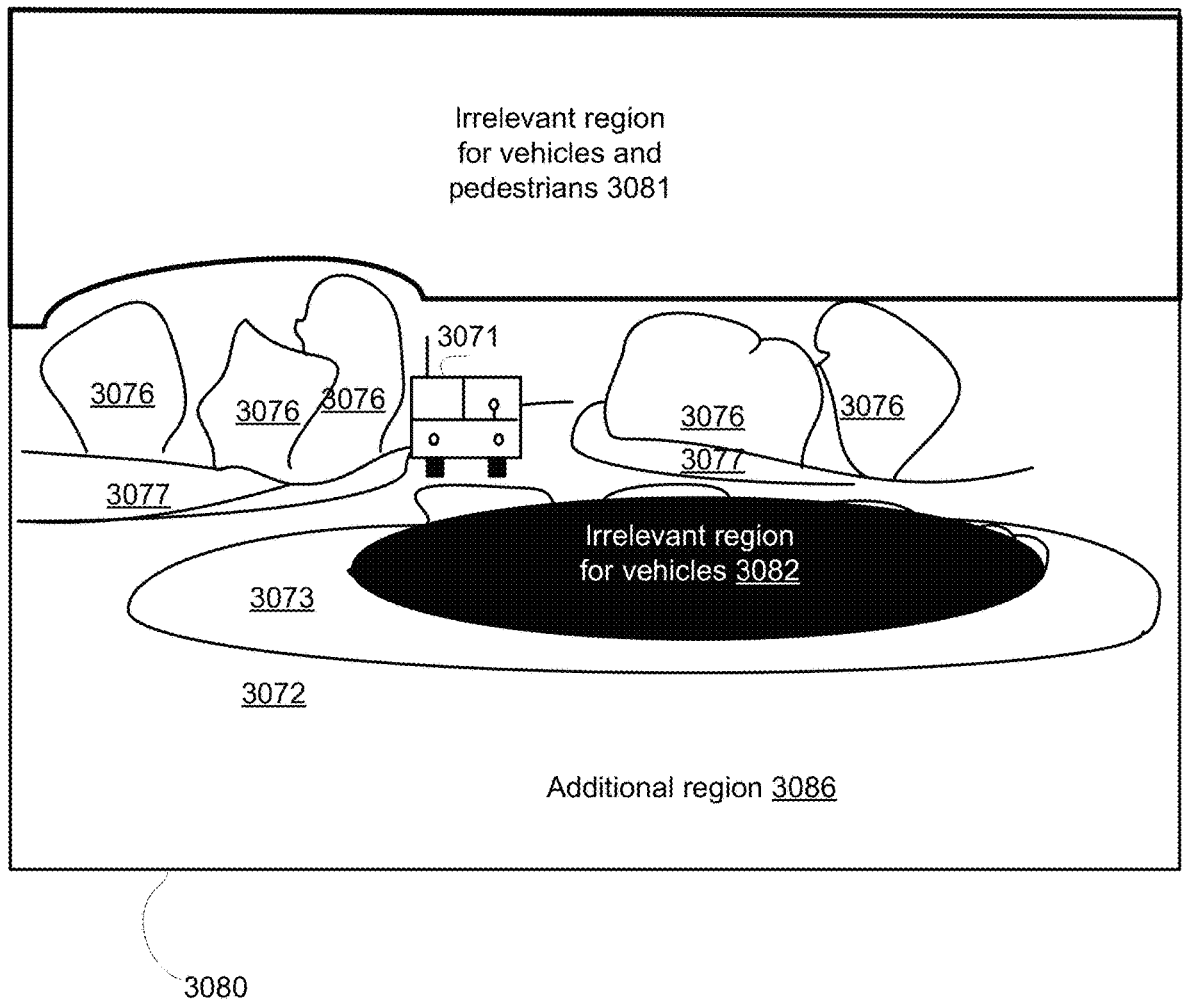
FIG. 54 is an example of an image.

FIG. 54 illustrates relevant and irrelevant regions within image 3080.

Assuming that vehicles are not expected to pass through the inner circle 3074 of the roundabout, sand 3078 and few bushes or plants 3075 located in the inner circle 3074—the inner circle 3074 and the elements located within the inner circle may be deemed irrelevant for searching for vehicles—as indicated by region 3082.

Assuming that pedestrians and vehicle do not fly—the sky part of the image may be regarded as irrelevant for pedestrians and vehicle—as can be noted in region 3081.

Accordingly—the situation related processing may not search for vehicles in regions 3082 and 3081—and may not retrieve reference concept structures related to vehicles, may not search for matching concept structures from reference concept data structures associated with vehicles, may use, when searching these regions, vehicle signatures of less resolution.

The same applies for searching pedestrians in region 3081.

Figure 55:
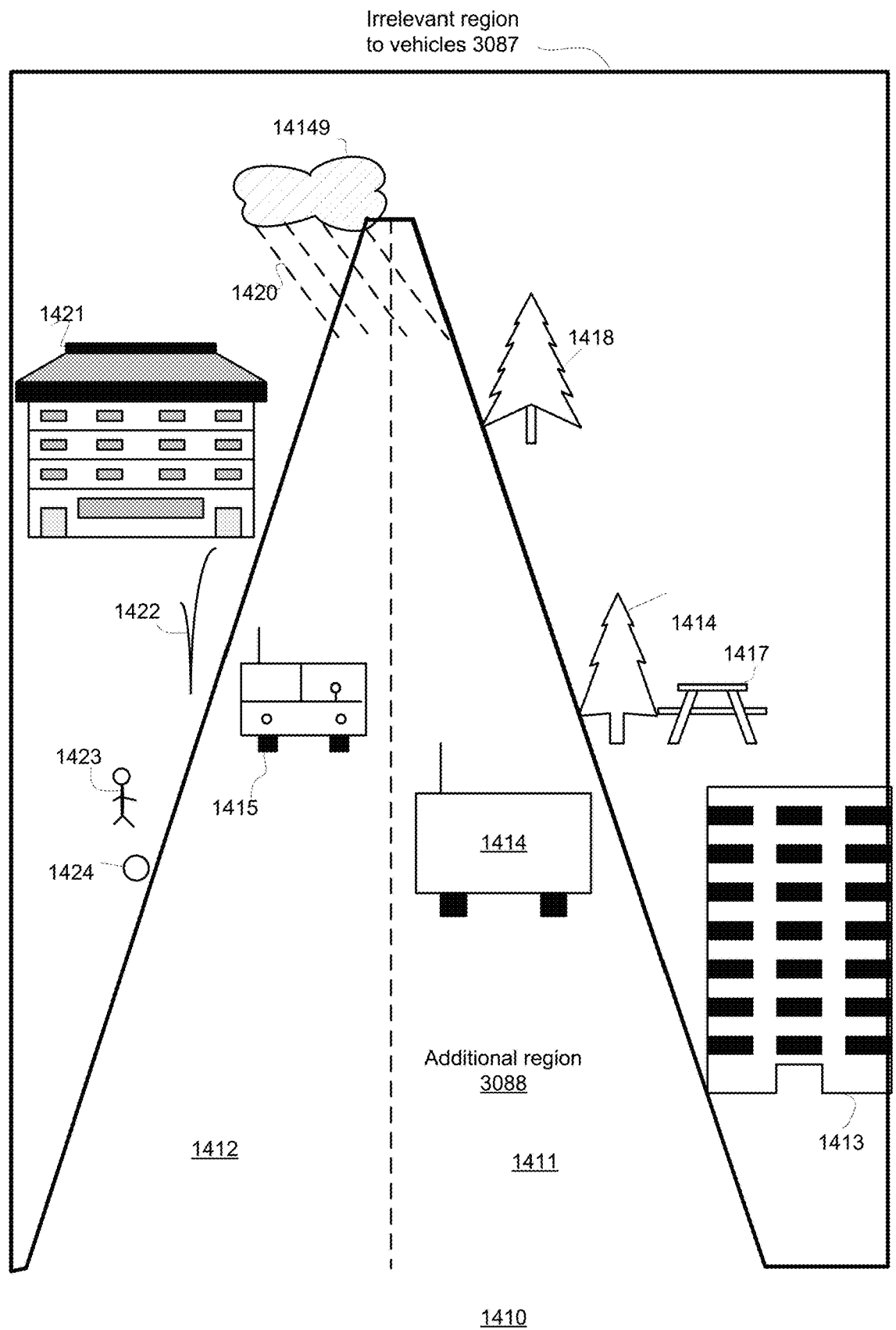
FIG. 55 is an example of an image.

FIG. 55 illustrates an example of an image acquired by a vehicle. The image shows two lanes 1411 and 1412 of a road, right building 1413, vehicles 1414 and 1415, first tree 1416, table 1417, second tree 1418, cloud 1419, rain 1420, left building 1421, shrubbery 1422, child 1423 and ball 1424.

It is assumed that vehicles should not be found outside lanes 1411 and 1412—and thus a region of irrelevancy (for vehicles) 3087 is defined outside the lanes.

Figure 56:
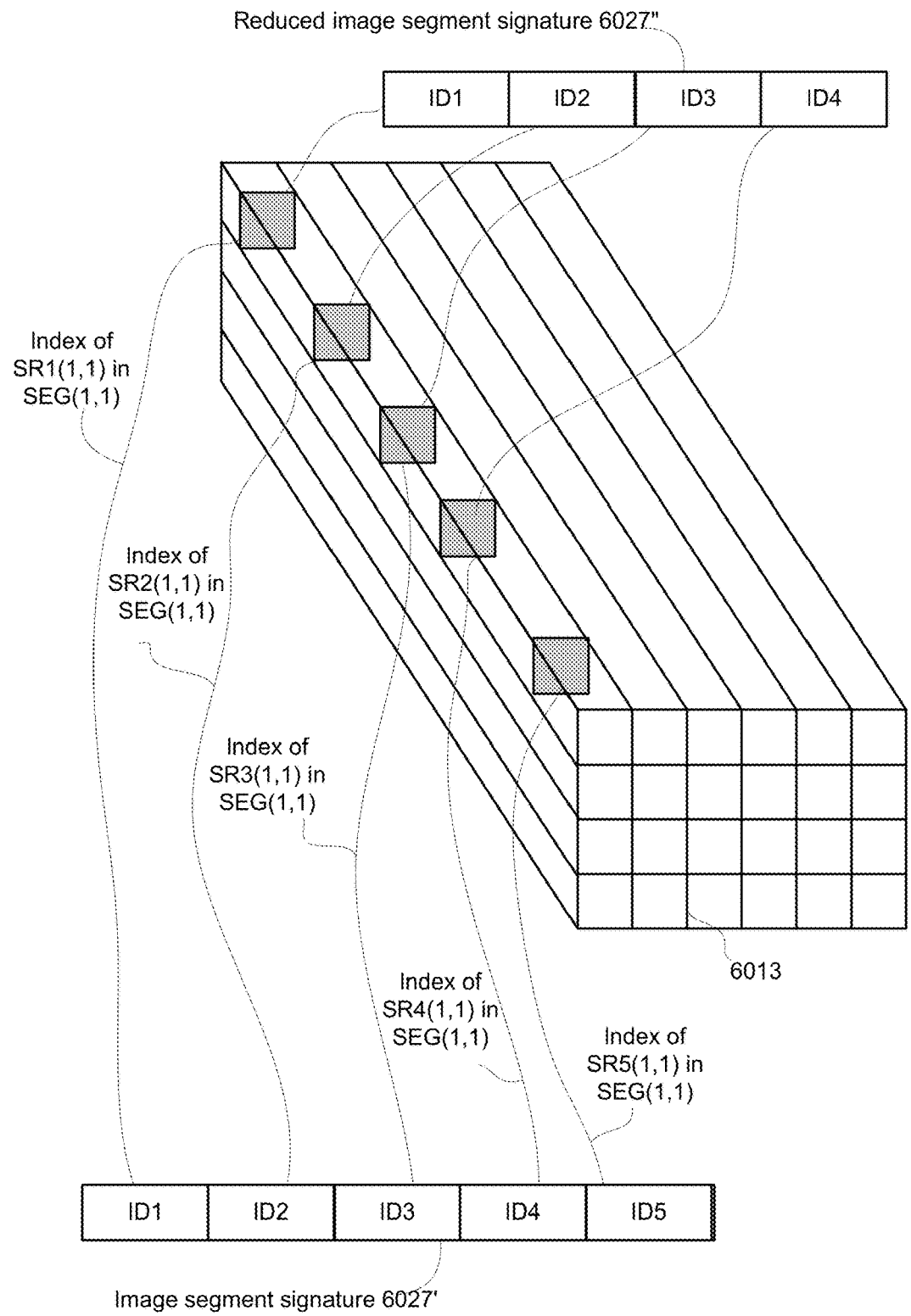
FIG. 56 illustrates examples of two signatures of different resolutions.

FIG. 56 illustrates two signatures of different resolutions—one signature (6027') including five indexes and a second signature (6027") include less indexes.

The number of indexes may differ from four of five. The first and second signatures may differ from each other by more than a single index.

Figure 57:
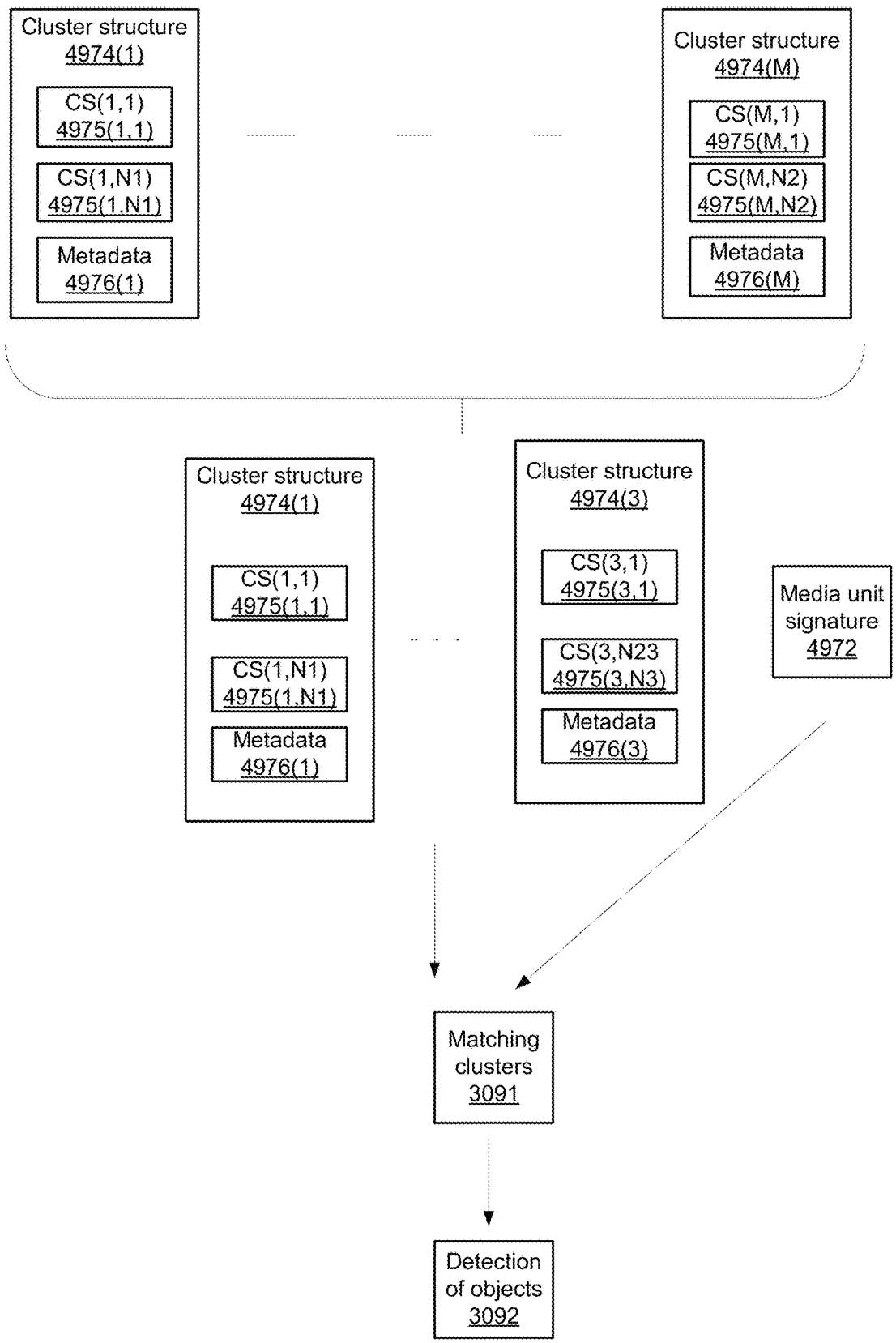
FIG. 57 illustrates an example of various data structures and processes.

FIG. 57 illustrates an example of various data structures and processes.

Assuming that the reference information includes multiple (M) cluster structures 4974(1)-4974(M). Each cluster structure includes cluster signatures, metadata regarding the cluster signature For example—first cluster structure 4974(1) includes multiple (N1) signatures (referred to as cluster signatures CS) CS(1,1)-CS(1,N1) 4975(1,1)-4975(1,N1), and metadata 4976(1). Y Yet for another example—M'th cluster structure 4974(M) includes multiple (N2) signatures (referred to as cluster signatures CS) CS(M,1)-CS(M,N2) 4975(M,1)-4975(M,N2), and metadata 4976(M).

It is assumed that there are three cluster structures related to a situation—first cluster structure 4974(1), second cluster structure 4974(2), and first cluster structure 4974(3).

In this scenario only the three cluster structures may be retrieved or processed during a situation related processing.

For example—a media unit signature 4972 may be compared to the three clusters in order to find one or more matching clusters 3091.

The object or object that represented by the media unit signature 4972 is detected 3092 based on the metadata of the matching concept structure.

Figure 58:
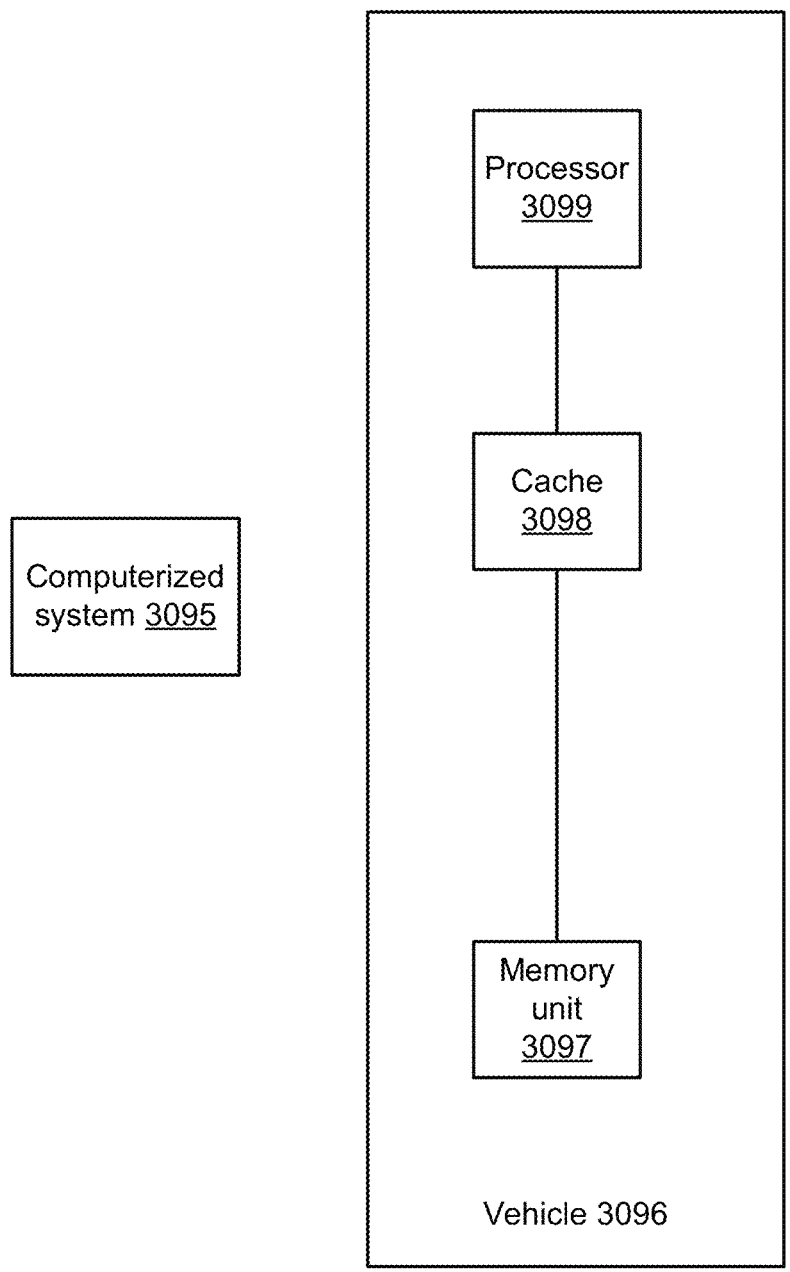
FIG. 58 illustrates an example of a vehicle and a system.

FIG. 58 illustrates an example of vehicle 3096 that computerized system 3095.

Reference information may be stored in the computerized system 4095 and/or in memory unit 3097. A relevant subset of the reference information may be fed to cache 3098 (from memory unit 3097) or may be fed to memory unit 3097 from computerized system 3095.

Wrong-Way Driving

Wrong-way driving may be determined by comparing the direction of the vehicle to indicators that indicate the right direction of driving.

Non-limiting examples of a right direction of driving may include marks (arrows, text) on the road, side of a traffic sign/light (front back), direction of parked cars, exists of diagonal parking—its direction (marks of the road and parking cars), advertising billboards or signs, road structure—for example if there is a solid line—meaning its 2 way.

A wrong-way driving indication and a right-way driving indicator illustrate the relationship between the driving of the vehicle and the right direction indicator—for example seeing a back of multiple advertisement signs located at a side of the road in which the vehicle drives is a wrong-way driving indication, driving in an opposite direction indicated by a one-way driving sign is a wrong-way driving indication, driving against a direction of an arrow on the road is a wrong-way driving indication, driving against the direction of all parked vehicle may be a wrong-way driving indication, and the like.

A combination of factors may provide a wrong-way driving indication.

Figure 59:
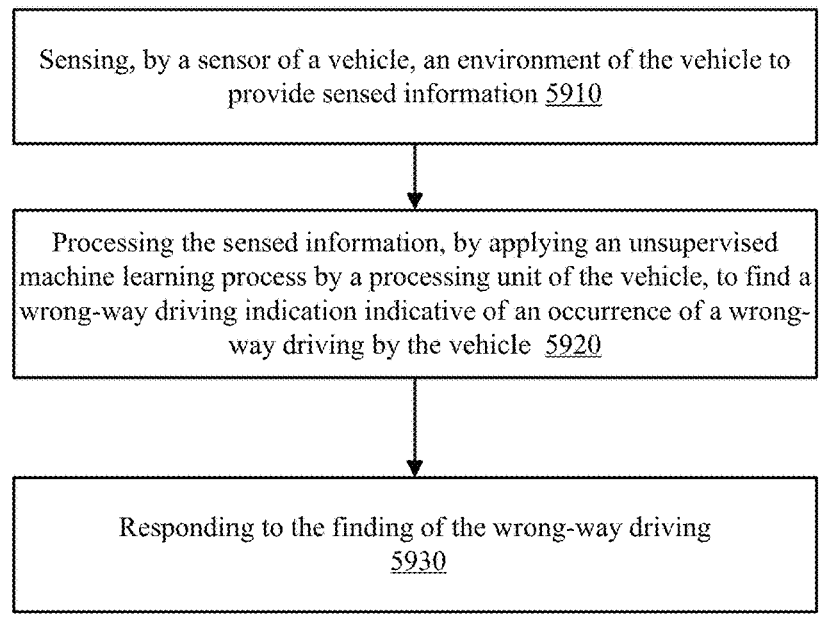
FIG. 59 is an example of a method.

FIG. 59 illustrates a method 5900 for wrong-way driving warning. The method 5900 involved applying a machine learning process that it trained to distinguish between wrong-way driving a right-way driving.

Method 5900 may start by step 5910 of sensing, by a sensor of a vehicle, an environment of the vehicle to provide sensed information.

Step 5910 may be followed by step 5920 of processing the sensed information, by applying a machine learning process by a processing unit of the vehicle, to find a wrong-way driving indication indicative of an occurrence of a wrong-way driving by the vehicle. The machine learning process may be supervised or unsupervised.

The machine learning process is trained with at least one out of (a) wrong-way driving videos acquired from wrong-way driving sessions (these videos are tagged as related to wrong-way driving), and (b) right-way driving videos acquired from right-way driving sessions (these videos are tagged as related to right-way driving).

Step 5910 may include feeding the machine learning process with wrong-way driving videos acquired from wrong-way driving sessions, and (b) right-way driving videos acquired from right-way driving sessions.

In such a case the outcome of the training will includes features that distinguish wrong-way driving from right-way driving.

Alternatively, during the training, the machine learning process may not be fed with wrong-way driving videos acquired from wrong-way driving sessions but is fed with right-way driving videos acquired from right-way driving sessions. In this case step 5920 may include searching for outliers.

Alternatively, during the training, the machine learning process may be fed with wrong-way driving videos acquired from wrong-way driving sessions but is not fed with right-way driving videos acquired from right-way driving sessions. In this case finding right-way driving includes searching for outliers.

The videos may be acquired from multiple locations. The processing of step 5920 may be responsive to location information (such as GPS information)—for example detecting wrong-way location based previous knowledge regarding allowed direction of driving and a monitored direction of driving.

According to another example—the processing of step 5920 may ignore location information of the vehicle—which allows the method to detect wrong-way driving even when the allowed driving direction at a certain location has changed.

Step 5920 is followed by step 5930 of responding to the finding of the wrong-way driving.

Step 5930 may include at least one out of alerting a driver of the vehicle, stopping the vehicle, starting to autonomously drive the vehicle, starting to manually drive the vehicle, reversing a direction of driving the vehicle, driving the vehicle to a side of a road, and the like.

Figure 60:
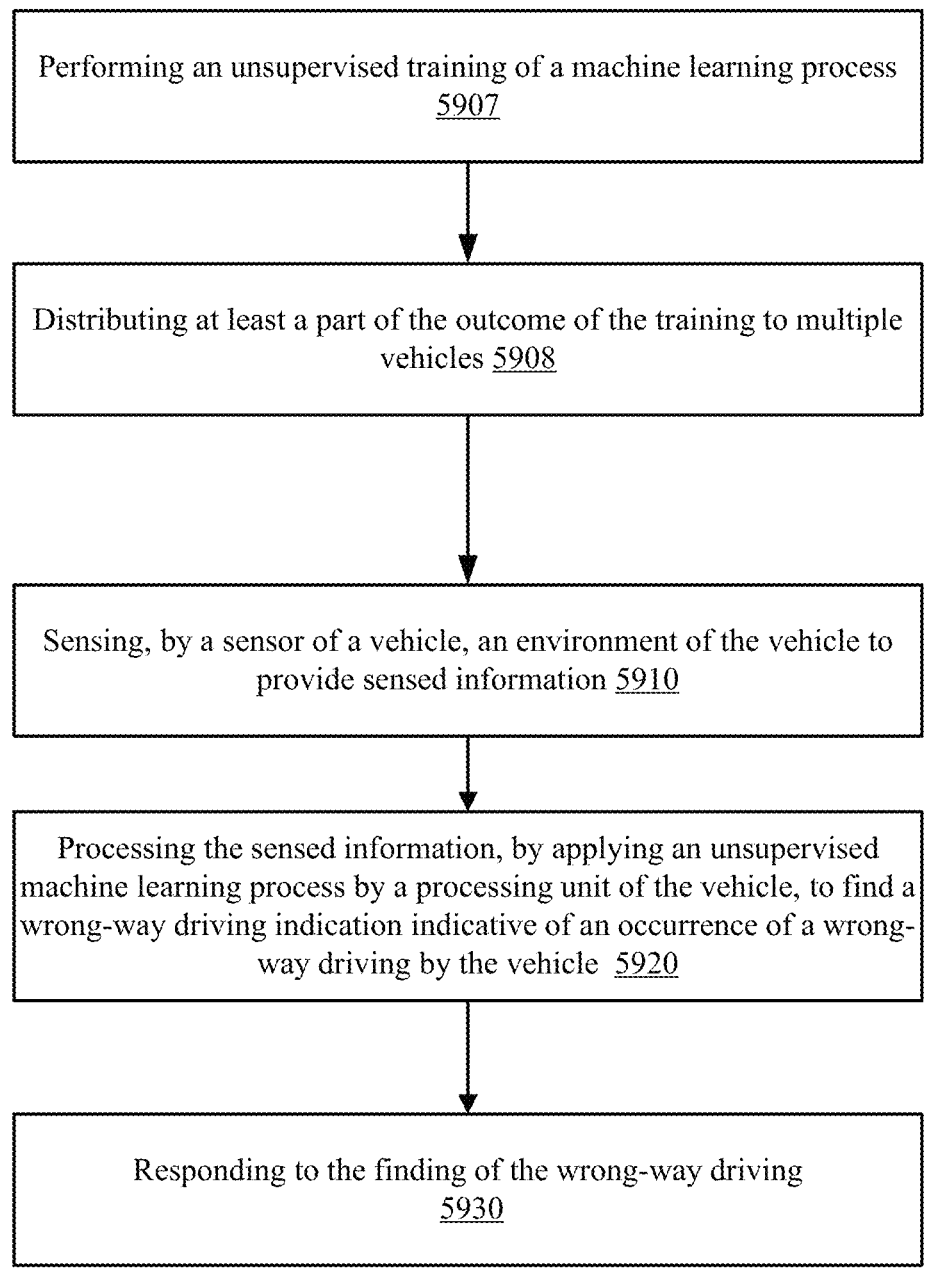
FIG. 60 is an example of a method.

FIG. 60 illustrates a method 5901 for wrong-way driving warning.

Method 5901 may start by step 5907 of performing a training of a machine learning process. The training may be supervised or unsupervised.

Step 5907 may be based on at least one out of (a) wrong-way driving videos acquired from wrong-way driving sessions (these videos are tagged as related to wrong-way driving), and (b) right-way driving videos acquired from right-way driving sessions (these videos are tagged as related to right-way driving).

The videos may be acquired from multiple locations and be acquired by multiple vehicles.

It is beneficial to receive as many videos as possible. It may be beneficial to have videos that were obtained while performing wrong-way driving in situations where there are no wrong-way (or right-way) road markings or signs and/or when the such wrong-way (or right way) road markings or signs are misleading or confusing. It may be beneficial to have videos that were obtained during situations in which road markings or signs are present.

Step 5907 may be executed by a vehicle computer, may be executed in a distributed manner by multiple vehicle computers, or may be executed by a computerized system located outside the vehicles—for example by a data center, a cloud computer array, and the like.

The results of the learning may be features that distinguish wrong-way driving from right-way driving. These features are distributed to vehicles that are designated to perform wrong-way driving detection.

It should be noted that in some cases one or more features may indicate wrong-way driving by themselves—while in other cases a combination of features may be required to identify wrong-way driving.

The features may include wrong-way (or right-way) road markings or signs—but one of the benefits of the suggested method is that wrong-way driving can be detected even at the absence of such wrong-way road markings or signs—and even when the such wrong-way road markings or signs are misleading or confusing.

The outcome of the training may include one or more clusters of signatures that are indicative of wrong-way driving and/or one or more clusters of signatures of right-way driving.

Step 5907 may include finding visual elements that unique to the wrong-way driving videos and generating wrong-way driving indications based on the that unique to the wrong-way driving videos.

Step 5907 may include training the machine learning process by finding shared visual elements that are shared by the wrong-way driving videos and by the right-way driving.

Step 5907 may include ignoring shared visual elements that are shared by the wrong-way driving videos and by the right-way driving videos.

Step 5907 may be followed by step 5908 of distributing at least a part of the outcome of the training to multiple vehicles.

This may include transmitting to vehicles at least one wrong-way clusters, and/or at least one right-way clusters, and/or transmitting one or more features that distinguish wrong-way driving from right-way driving.

Method 5901 may also include step 5910.

The training process may be executed continuously or non-continuously, may stop before the execution of step 5910 or may be executed even after executing step 5910. The training may result ins ending one or more updated training process outcomes.

The training process may be updated with new videos acquired during at least one of right-way driving and wrong-way driving—even by the vehicles that execute steps 5910, 5920, and 5930.

Step 5910 may include sensing, by a sensor of a vehicle, an environment of the vehicle to provide sensed information.

Step 5910 may be followed by step 5920 of processing the sensed information, by applying machine learning process by a processing unit of the vehicle, to find a wrong-way driving indication indicative of an occurrence of a wrong-way driving by the vehicle. The machine learning process may be supervised or unsupervised.

Step 5920 may include detecting a wrong-way driving when one or more signatures of sensed information match a wrong-way cluster and for example may also not match a right-way driving cluster. The match may involve having a similarity above a threshold to a wrong-way cluster signature and being similar even above a higher degree to one of the signatures included in the wrong-way cluster.

Referring, for example, to FIG. 1O—one or more of clusters 4974(1)-4974(M) may be a wrong-way cluster that includes wrong-way cluster signatures. The detecting of a wrong-way driving may include generating signatures of images of the sensed information and finding at least one signature that belongs to the wrong-way cluster.

Step 5910 may include ignoring reference cluster structures that are associated with shared visual elements that are shared by the wrong-way driving videos and by the right-way driving videos.

Step 5920 is followed by step 5930 of responding to the finding of the wrong-way driving.

Using Rear Sensor for Wrong-Way Driving Warning

A vehicle has a front side and a rear side. Unless driving in reverse—the front side points to the direction of progress of the vehicle. The vehicle may include one or more sensors.

A front sensor is a sensor of a vehicle that has a field of view that covers at least a part (for example—at least a slice of at least 10 degrees and up to 180 degrees) of the environment that is positioned in front of the vehicle.

A rear sensor is a sensor of a vehicle that has a field of view that covers at least a part (for example—at least a slice of at least 10 degrees and up to 180 degrees) of the environment that faces the rear of the vehicle.

A rear sensor and a front sensor are examples of radiation sensors for sensing the environment of the vehicle. The sensors may be active (for example LIDAR, radar) or passive. The radiation may be of a frequency range within the visible frequency range, within the infrared frequency range, within the radio frequency wave, and the like.

A rear sensor and a front sensor may be a single sensor. There may be more than one rear sensor and/or more than one front sensor.

Wrong-way driving may be detected based on an analysis of visual information obtained by a rear sensor of a vehicle—especially by comparing rear-sensed vehicle progress direction indications that are based on information sensed by the rear sensor to front-sensed vehicle progress direction indications that are based on information sensed by front visual indicators obtained during driving sessions such as right-way driving sessions. The comparison may be executed in various manners—and may be assisted by a machine learning process—or may be executed without applying a machine learning process.

It should be noted that the roles of the rear sensor and the front sensor may be switched—and front-sensed vehicle progress direction indications may be compared to rear-sensed vehicle progress direction indications obtained during driving sessions such as right-way driving sessions.

Figure 61:
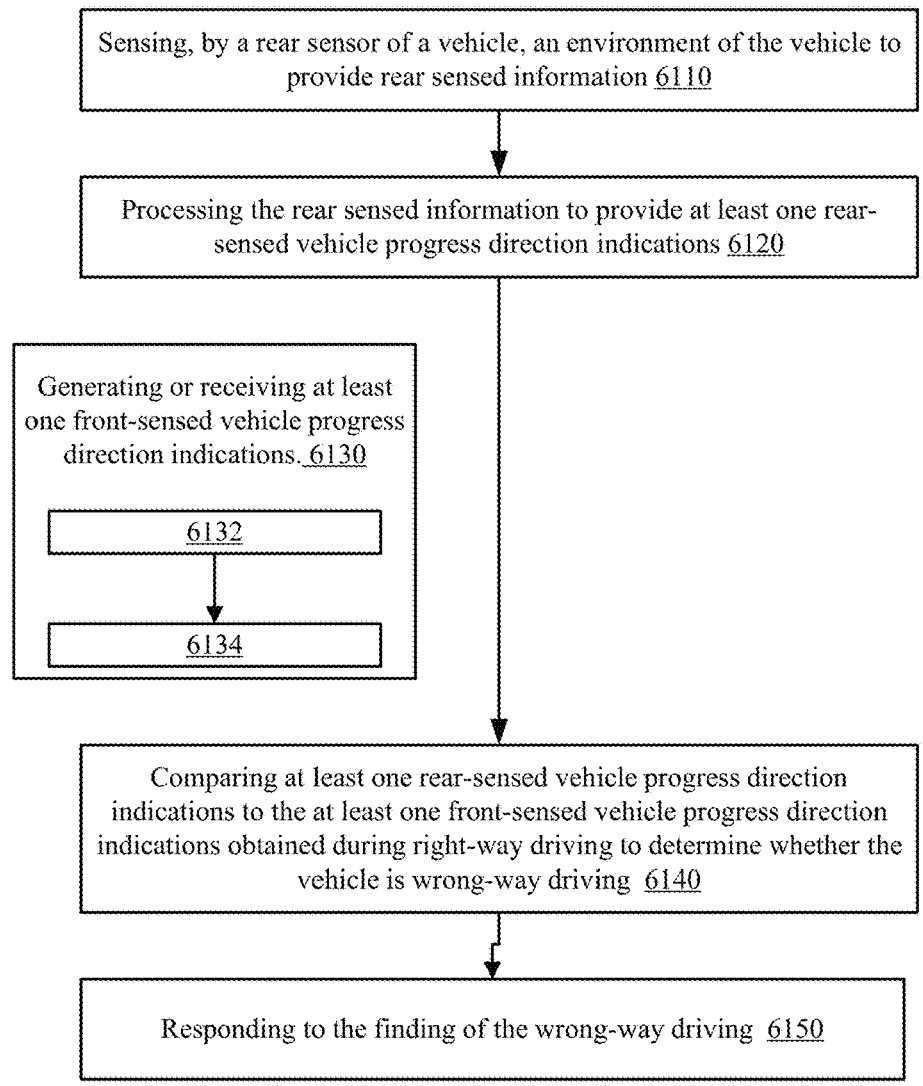
FIG. 61 is an example of a method.

FIG. 61 illustrated method 6100 of method for wrong-way driving warning.

Method 6100 may start by step 6110 of sensing, by a rear sensor of a vehicle, an environment of the vehicle to provide rear sensed information.

Step 6110 may be followed by step 6120 of processing the rear sensed information to provide at least one rear-sensed vehicle progress direction indications.

The processing of step 6120 may include applying object detection to provide objects that may indicate the progress direction of the vehicle. For example—the object may be a front light (usually white, bigger than the rear light) or a rear light (such a brake light—usually red and smaller than the front light) of another vehicle that drives at the same lane as the vehicle.

Method 6100 may also include step 6130 of generating or receiving at least one front-sensed vehicle progress direction indications. The at least one front-sensed vehicle progress direction indications is generated by processing front-sensed information acquired during right-way progress.

If generating then step 6130 may include steps 6132 and 6134.

Step 6132 may include sensing, by a front sensor of a vehicle, and during one or more driving sessions that are known to be right-way driving session an environment of the vehicle to provide front sensed information.

The sensing may be executed by other front sensors of other vehicles—for example during a learning process.

Step 6134 may include processing the front sensed information to provide at least one front-sensed vehicle progress direction indications related to right-way driving.

The at least one front-sensed vehicle progress direction indications is generated by processing front-sensed information acquired during right-way progress.

The processing of step 6134 may include applying object detection to provide objects that may indicate the progress direction of the vehicle—during right-way driving sessions. For example—the object may be a front light (usually white, bigger than the rear light) or a rear light (such a brake light—usually red and smaller than the front light) of another vehicle that drives at the same lane as the vehicle Steps 6120 and 6130 may be followed by step 6140 of comparing at least one rear-sensed vehicle progress direction indications to the at least one front-sensed vehicle progress direction indications obtained during right-way driving to determine whether the vehicle is wrong-way driving.

The comparing may include, for example, searching for a rear light of vehicles driving at the same lane of the vehicle—within the rear-sensed vehicle progress direction indication and in the front-sensed vehicle progress direction indications.

Step 6140 may be followed by step 6150 of responding to the finding of the wrong-way driving.

Step 6140 may include determining the vehicle is wrong-way driving when a rear-sensed vehicle progress direction indication equals a front-sensed vehicle progress direction indications.

The at least one rear-sensed vehicle progress direction indications and the at least one front-sensed vehicle progress direction indications are indicative of a direction of progress of a another vehicle.

The at least one rear-sensed vehicle progress direction indications and the at least one front-sensed vehicle progress direction indications may include a color (for example red, yellow or white) of light emitted by another vehicle.

FIGS. 62-65 illustrate a vehicle and its environment.

Vehicle 6180 may include rear sensor 6181, front sensor 6182, processor 6183, memory 6184 and communication module 6184.

The communication module 6184 may facilitate communication between the different components (rear sensor 6181 {having field of view 6181'}, front sensor 6182 {having a field of view 6182'}, processor 6183, memory 6184) and/or allow one or more of the components to communicate with other vehicles and/or with other entities such as remote computerized system.

The processor may be configured to apply a machine learning process for executing various steps of method 6100. The training of the machine learning process may be executed by the processor or by a remote system not included in the vehicle.

Vehicle 6180 may be configured to execute method 6100.

Figure 62:
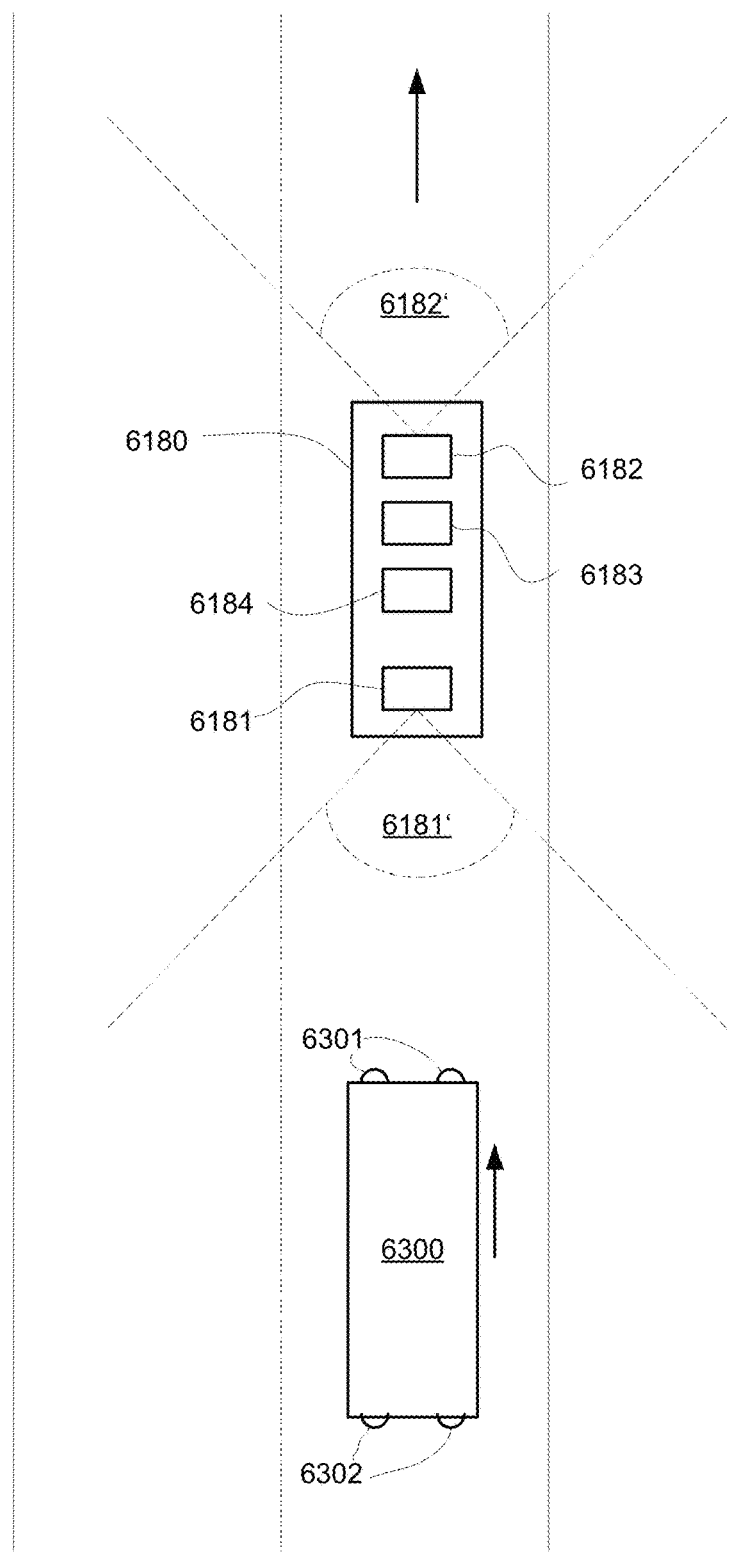
FIGS. 62-65 illustrate various situations.

In FIG. 62 another vehicle 6300 is driving behind vehicle 6180, at the same lane and same direction as vehicle 6180, and is sensed by rear sensor 6181. Rear sensor 6181 senses the front lights 6301 of the other vehicle and not the rear lights 6302 of the other vehicle.

Figure 63:
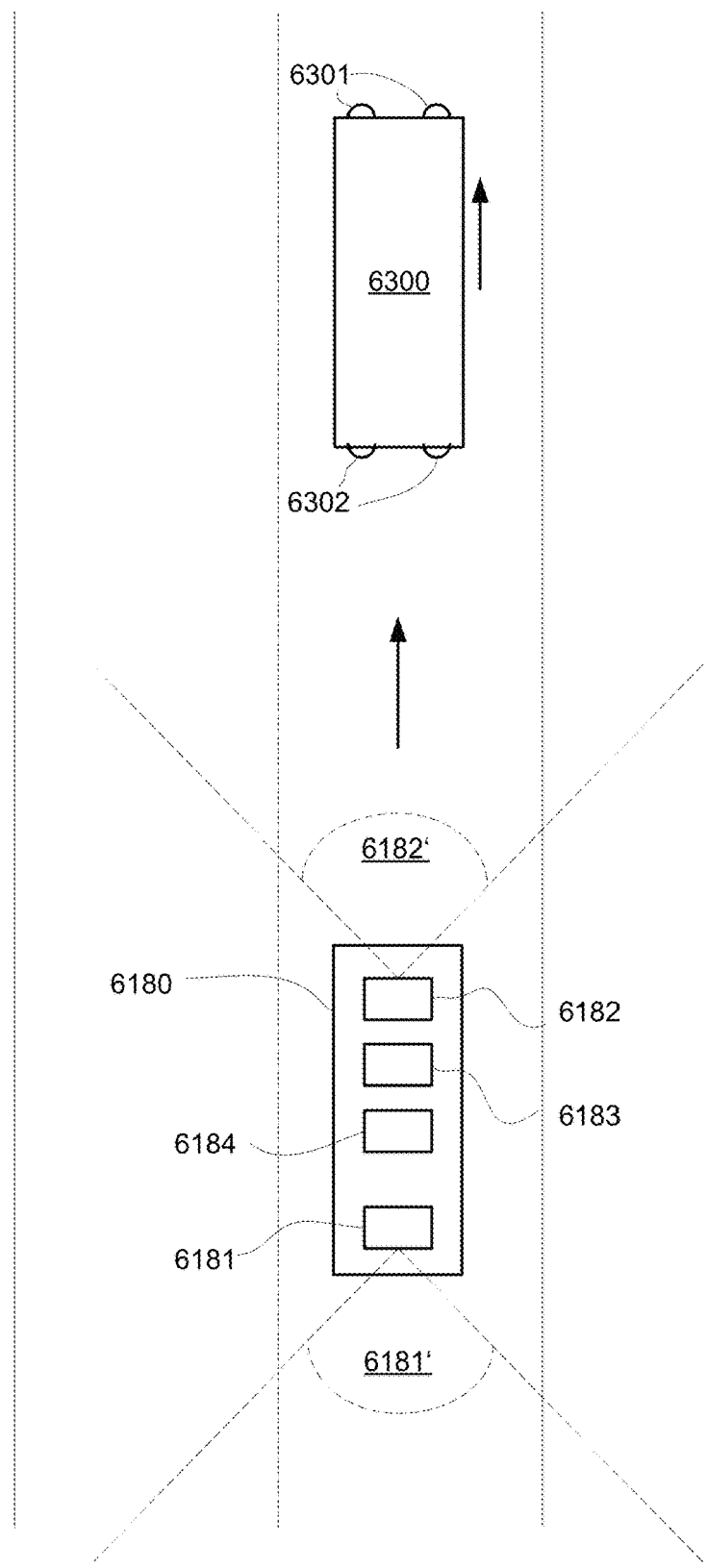

In FIG. 63 another vehicle 6300 is driving before vehicle 6180, at the same lane and same direction as vehicle 6180, and is sensed by front sensor 6182. Front sensor 6182 does not sense the front lights 6301 of the other vehicle and sensed the rear lights 6302 of the other vehicle.

Figure 64:
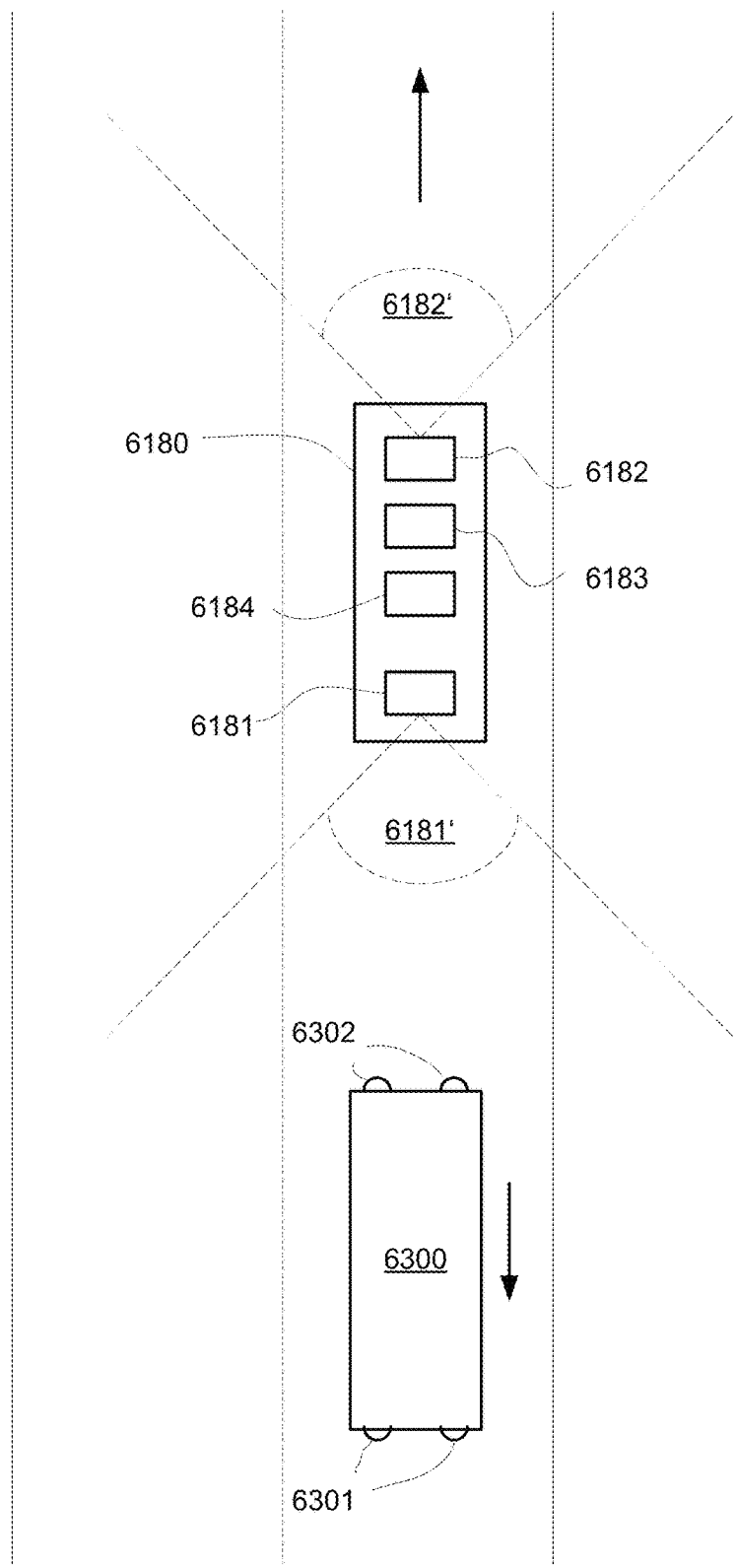

In FIG. 64 another vehicle 6300 is driving behind vehicle 6180, at the same lane and at an opposite direction (driving away from vehicle 6180), and is sensed by rear sensor 6181. Rear sensor 6181 senses the rear lights 6302 of the other vehicle and not the front lights 6301 of the other vehicle.

Figure 65:
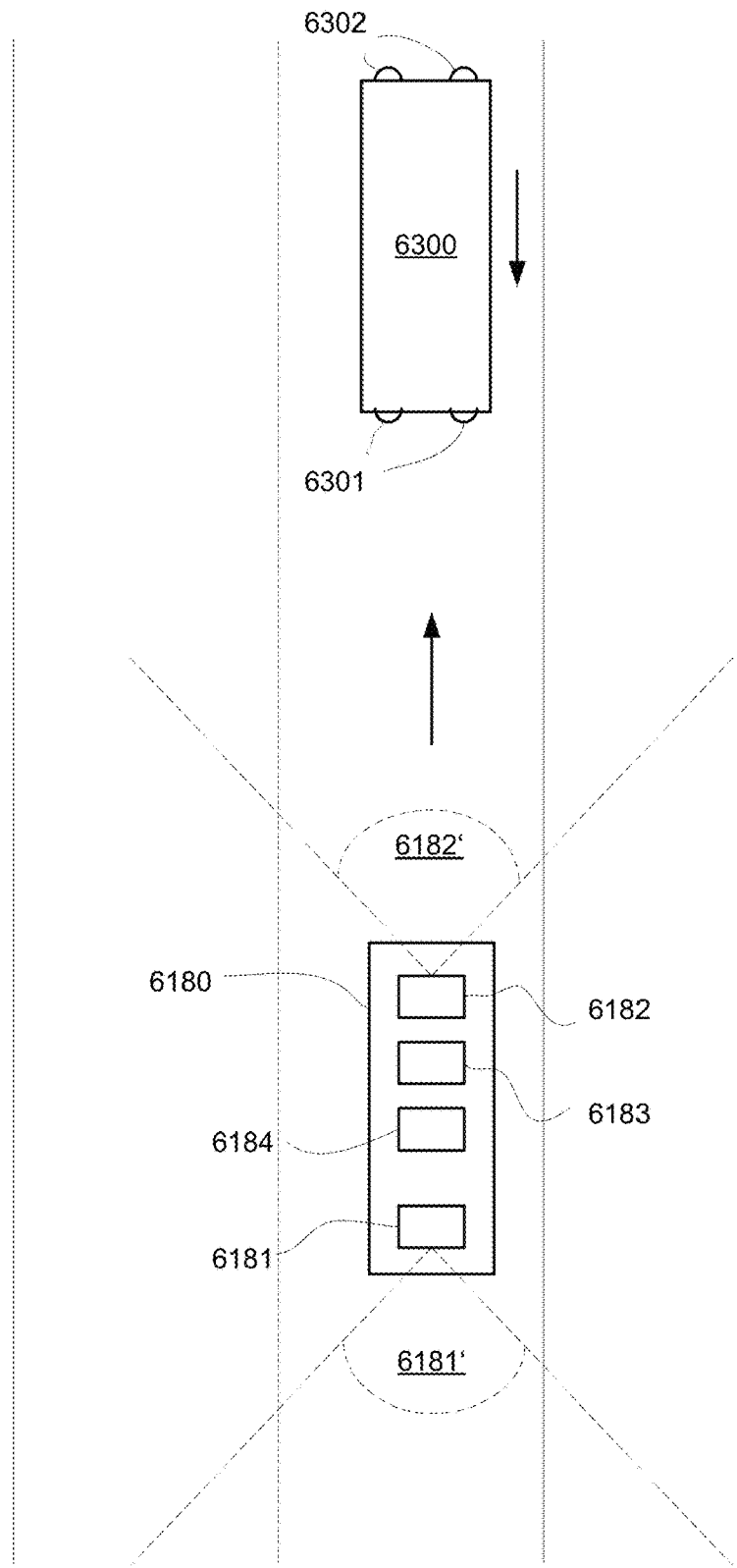

In FIG. 65 another vehicle 6300 is driving behind vehicle 6180, at the same lane and at an opposite direction (driving toward vehicle 6180), and is sensed by front sensor 6182. Front sensor 6182 senses the front lights 6301 of the other vehicle and not the rear lights 6301 of the other vehicle.

Figure 66:
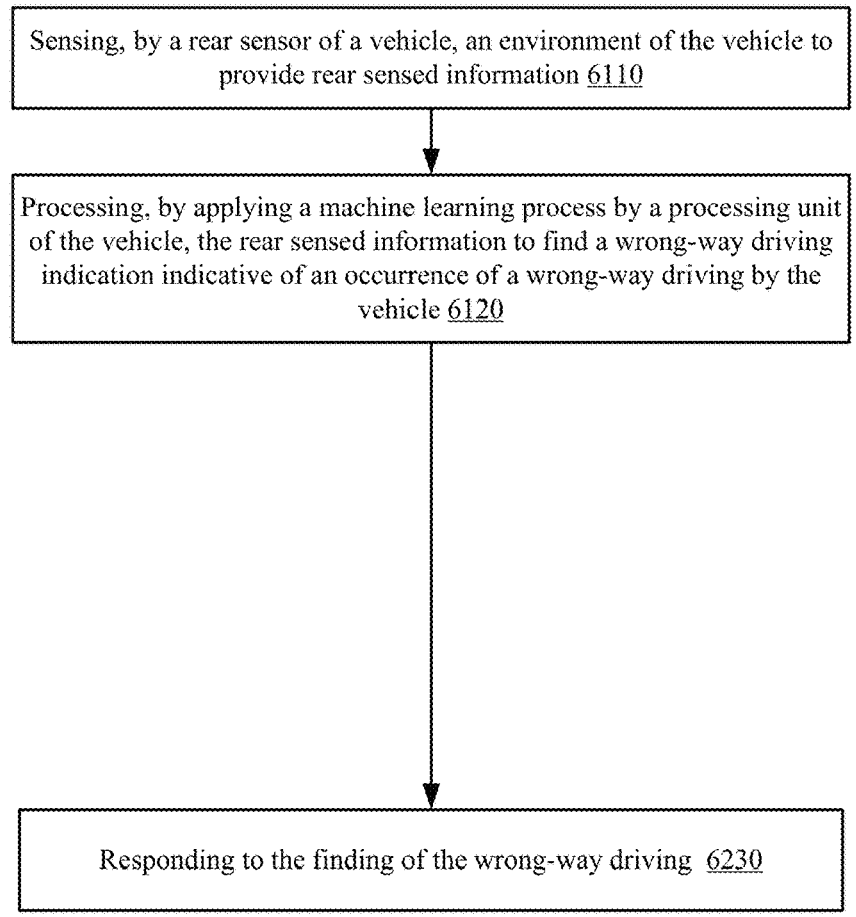
FIG. 66 is an example of a method.

FIG. 66 illustrates a method 6200 of method for wrong-way driving warning.

Method 6200 may start by step 6110 of sensing, by a rear sensor of a vehicle, an environment of the vehicle to provide rear sensed information.

Step 6110 may be followed by step 6220 of processing, by applying a machine learning process by a processing unit of the vehicle, the rear sensed information to find a wrong-way driving indication indicative of an occurrence of a wrong-way driving by the vehicle.

The machine learning process is trained with right-way driving videos acquired by at least one front sensor, from right-way driving sessions and/or with wrong-way driving videos acquired by at least one front sensor.

The training may be executed by applying any of the mentioned above methods.

The training may include generating signatures of images of the right-way driving videos that include objects indicative of right-way driving progress.

The signatures may be included in one or more clusters that represent right-way driving.

The signatures may be front-sensed vehicle progress direction indications.

The processing may include searching whether signature of the provide rear sensed information match a wrong-way driving cluster of signatures—or does not match any wrong-way driving cluster of signatures.

Referring, for example, to FIG. 1O—one or more of clusters 4974(1)-4974(M) may be a wrong-way cluster that includes wrong-way cluster signatures.

Step 6220 may be followed by step 6230 of responding to the finding of the wrong-way driving.

There may be provided a method for wrong-way driving warning, the method may include sensing, by a rear sensor of a vehicle, an environment of the vehicle to provide rear sensed information; processing, by applying a machine learning process by a processing unit of the vehicle, the rear sensed information to find a wrong-way driving indication indicative of an occurrence of a wrong-way driving by the vehicle; wherein the machine learning process is trained with right-way driving videos acquired by at least one front sensor, from right-way driving sessions; and responding to the finding of the wrong-way driving.

The method may include determining that the vehicle is wrong-way driving when a rear-sensed vehicle progress direction indication equals a front-sensed vehicle progress direction indications.

The at least one rear-sensed vehicle progress direction indications and the at least one front-sensed vehicle progress direction indications are indicative of a direction of progress of a another vehicle.

The at least one rear-sensed vehicle progress direction indications and the at least one front-sensed vehicle progress direction indications comprises a color of light emitted by another vehicle.

There may be provided a non-transitory computer readable medium for wrong-way driving warning, the non-transitory computer readable medium stores instructions for sensing, by a rear sensor of a vehicle, an environment of the vehicle to provide rear sensed information; processing, by applying a machine learning process by a processing unit of the vehicle, the rear sensed information to find a wrong-way driving indication indicative of an occurrence of a wrong-way driving by the vehicle; wherein the machine learning process is trained with right-way driving videos acquired by at least one front sensor, from right-way driving sessions; and responding to the finding of the wrong-way driving.

There may be provided a wrong-way monitor that may include a read sensor and a processor; wherein the rear sensor is configured to sense an environment of the vehicle to provide rear sensed information; wherein the processor is configured to: process, by applying a machine learning process by a processing unit of the vehicle, the rear sensed information to find a wrong-way driving indication indicative of an occurrence of a wrong-way driving by the vehicle; wherein the machine learning process is trained with right-way driving videos acquired by at least one front sensor, from right-way driving sessions; and participate in responding to the finding of the wrong-way driving. Participate in any manner.

It is appreciated that software components of the embodiments of the disclosure may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the disclosure. It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub combination. It will be appreciated by persons skilled in the art that the embodiments of the disclosure are not limited by what has been particularly shown and described hereinabove. Rather the scope of the embodiments of the disclosure is defined by the appended claims and equivalents thereof

We claim:

1. A method for wrong-way driving warning, the method comprises:
   sensing, by a rear sensor of a vehicle, an environment of the vehicle to provide rear sensed information;
   processing the rear sensed information to provide at least one rear-sensed vehicle progress direction indications;
   generating or receiving at least one front-sensed vehicle progress direction indications; wherein the at least one front-sensed vehicle progress direction indications is generated by processing front-sensed information acquired during right-way progress;
   comparing at least one rear-sensed vehicle progress direction indications to the at least one front-sensed vehicle progress direction indications to determine whether the vehicle is wrong-way driving; and
   responding to the finding of the wrong-way driving.

2. The method according to claim 1 comprising determining the vehicle is wrong-way driving when a rear-sensed vehicle progress direction indication equals a front-sensed vehicle progress direction indications.

3. The method according to claim 1 wherein the at least one rear-sensed vehicle progress direction indications and the at least one front-sensed vehicle progress direction indications are indicative of a direction of progress of a another vehicle.

4. The method according to claim 1 wherein the at least one rear-sensed vehicle progress direction indications and the at least one front-sensed vehicle progress direction indications comprises a color of light emitted by another vehicle.

5. The method according to claim 1 wherein the comparing comprises searching for a rear light of vehicles driving at the same lane of the vehicle—within the rear-sensed vehicle progress direction indication and in the front-sensed vehicle progress direction indications.

6. The method according to claim 1 wherein the comparing comprises applying a machine learning process.

7. The method according to claim 1 wherein the rear sensed information comprises one or more media units, wherein the processing of the rear sensed information comprises processing the media units by performing multiple iterations, wherein each iteration out of at least some of the multiple iterations comprises applying, (a) filtering operations that differ from each other and (b) a merge operation.

8. A non-transitory computer readable medium for wrong-way driving warning, the non-transitory computer readable medium stores instructions for:
   sensing, by a rear sensor of a vehicle, an environment of the vehicle to provide rear sensed information;
   processing the rear sensed information to provide at least one rear-sensed vehicle progress direction indications;
   generating or receiving at least one front-sensed vehicle progress direction indications; wherein the at least one front-sensed vehicle progress direction indications is generated by processing front-sensed information acquired during right-way progress;
   comparing at least one rear-sensed vehicle progress direction indications to the at least one front-sensed vehicle progress direction indications to determine whether the vehicle is wrong-way driving; and responding to the finding of the wrong-way driving.

9. The non-transitory computer readable medium according to claim 8 that stores instructions for determining the vehicle is wrong-way driving when a rear-sensed vehicle progress direction indication equals a front-sensed vehicle progress direction indications.

10. The non-transitory computer readable medium according to claim 8 wherein the at least one rear-sensed vehicle progress direction indications and the at least one front-sensed vehicle progress direction indications are indicative of a direction of progress of a another vehicle.

11. The non-transitory computer readable medium according to claim 8 wherein the at least one rear-sensed vehicle progress direction indications and the at least one front-sensed vehicle progress direction indications comprises a color of light emitted by another vehicle.

12. The non-transitory computer readable medium according to claim 8 wherein the comparing comprises searching for a rear light of vehicles driving at the same lane of the vehicle—within the rear-sensed vehicle progress direction indication and in the front-sensed vehicle progress direction indications.

13. The non-transitory computer readable medium according to claim 8 wherein the comparing comprises applying a machine learning process.

14. The non-transitory computer readable medium according to claim 8 wherein the rear sensed information comprises one or more media units, wherein the processing of the rear sensed information comprises processing the media units by performing multiple iterations, wherein each iteration out of at least some of the multiple iterations comprises applying, (a) filtering operations that differ from each other and (b) a merge operation.

15. A wrong-way monitor that comprises a read sensor and a processor; wherein the rear sensor is configured to sense an environment of the vehicle to provide rear sensed information;
wherein the processor is configured to:
process the rear sensed information to provide at least one rear-sensed vehicle progress direction indications;
generate or receive at least one front-sensed vehicle progress direction indications; wherein the at least one front-sensed vehicle progress direction indications is generated by processing front-sensed information acquired during right-way progress;
compare at least one rear-sensed vehicle progress direction indications to the at least one front-sensed vehicle progress direction indications to determine whether the vehicle is wrong-way driving; and
participate in responding to the finding of the wrong-way driving.

16. The wrong-way monitor according to claim 15 that is configured to determine that the vehicle is wrong-way driving when a rear-sensed vehicle progress direction indication equals a front-sensed vehicle progress direction indications.

17. The wrong-way monitor according to claim 15 wherein the at least one rear-sensed vehicle progress direction indications and the at least one front-sensed vehicle progress direction indications are indicative of a direction of progress of a another vehicle.

18. The wrong-way monitor according to claim 15 wherein the at least one rear-sensed vehicle progress direction indications and the at least one front-sensed vehicle progress direction indications comprises a color of light emitted by another vehicle.

\* \* \* \* \*